US012675822B2

(12) United States Patent
Grube et al.

(10) Patent No.: US 12,675,822 B2
(45) Date of Patent: \*Jul. 7, 2026

(54) UTILIZING A PUBLIC BENEFIT ASSETS SECURE TOKEN

(71) Applicant: Rebate Assets, LLC, Rockford, IL (US)

(72) Inventors: Gary W. Grube, Barrington Hills, IL (US); Peter M. Shannon, III, Western Springs, IL (US)

(73) Assignee: Rebate Assets, LLC, Rockford, IL (US)

( \* ) Notice: Subject to any disclaimer, the term of this patent is extended or adjusted under 35 U.S.C. 154(b) by 21 days.

This patent is subject to a terminal disclaimer.

(21) Appl. No.: 18/770,170

(22) Filed: Jul. 11, 2024

(65) Prior Publication Data

US 2025/0022060 A1 Jan. 16, 2025

Related U.S. Application Data

(60) Provisional application No. 63/526,591, filed on Jul. 13, 2023.

(51) Int. Cl.
| | |
|---|---|
| *G06Q 40/00* | (2023.01) |
| *G06Q 10/0635* | (2023.01) |
| *G06Q 40/04* | (2012.01) |
| *G06Q 40/06* | (2012.01) |

(52) U.S. Cl.
CPC ......... *G06Q 40/04* (2013.01); *G06Q 10/0635* (2013.01); *G06Q 40/06* (2013.01)

(58) Field of Classification Search
None
See application file for complete search history.

(56) References Cited

U.S. PATENT DOCUMENTS

| | | | | |
|---|---|---|---|---|
| 8,655,720 | B2 | 2/2014 | Woodward | |
| 10,423,993 | B2 | 9/2019 | Metnick | |
| 10,546,277 | B2 | 1/2020 | Metnick | |
| 10,679,267 | B2 | 6/2020 | Metnick | |
| 10,832,298 | B2 * | 11/2020 | Bousis | G06Q 30/0643 |
| 10,922,728 | B2 * | 2/2021 | McGregor | G06Q 30/0609 |
| 10,943,275 | B2 | 3/2021 | Metnick | |
| 11,995,657 | B2 * | 5/2024 | Shannon, III | G06Q 20/4016 |
| 12,062,050 | B2 * | 8/2024 | Shannon, III | G06Q 20/389 |
| 12,112,314 | B2 * | 10/2024 | Shannon, III | H04L 9/50 |

(Continued)

*Primary Examiner* — Olabode Akintola
(74) *Attorney, Agent, or Firm* — Gary W. Grube

(57) ABSTRACT

A method includes a computing entity issuing to an asset authenticity computing entity a request to select and authenticate a digital record that represents an available public benefit credit asset based on a digital record representing a hypothetical public benefit credit asset to produce a selected public benefit credit asset. The method further includes determining that authenticity information associated with the selected public benefit credit asset indicates that the selected public benefit credit asset matches the hypothetical public benefit credit asset. The method further includes generating a smart contract to indicate availability of the selected public benefit credit asset and obtaining a copy of an object distributed ledger. The method further includes causing inclusion of a next block on the object distributed ledger that includes the smart contract to represent the selected public benefit credit asset.

12 Claims, 85 Drawing Sheets

(56)           References Cited

U.S. PATENT DOCUMENTS

| | | | |
|---|---|---|---|
| 12,112,327 B2 * | 10/2024 | Shannon, III | G06Q 40/04 |
| 12,124,552 B2 * | 10/2024 | Shannon, III | G06Q 20/389 |
| 12,125,101 B2 * | 10/2024 | Shannon, III | G06Q 20/3829 |
| 12,260,402 B2 * | 3/2025 | Shannon, III | G06Q 30/08 |
| 12,282,952 B2 * | 4/2025 | Shannon, III | G06Q 40/04 |
| 12,301,719 B2 * | 5/2025 | Shannon, III | G06Q 40/04 |
| 2018/0253702 A1 * | 9/2018 | Dowding | H04L 63/123 |
| 2020/0090280 A1 * | 3/2020 | Roth | G06Q 20/108 |
| 2021/0295324 A1 * | 9/2021 | Kerseboom | H04L 9/3239 |

* cited by examiner

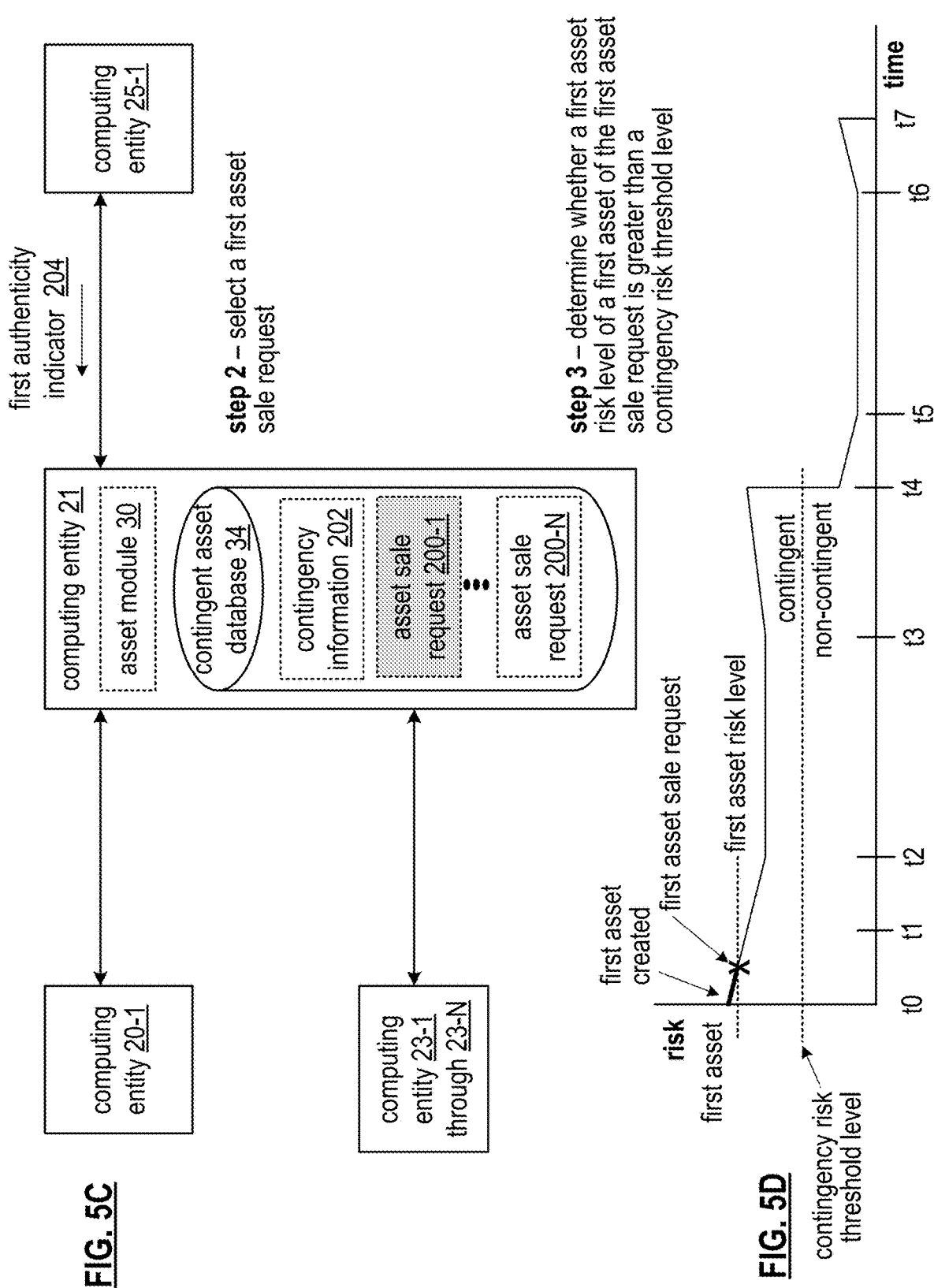

FIG. 5C computing entity 20-1 computing entity 25-1 first authenticity indicator 204 computing entity 21 asset module 30 contingent asset database 34 contingency information 202 asset sale request 200-1 asset sale request 200-N computing entity 23-1 through 23-N step 2 – select a first asset sale request step 3 – determine whether a first asset risk level of a first asset of the first asset sale request is greater than a contingency risk threshold level

FIG. 5D risk first asset first asset created first asset sale request first asset risk level contingency risk threshold level contingent non-contingent t0   t1   t2   t3   t4   t5   t6   t7   time

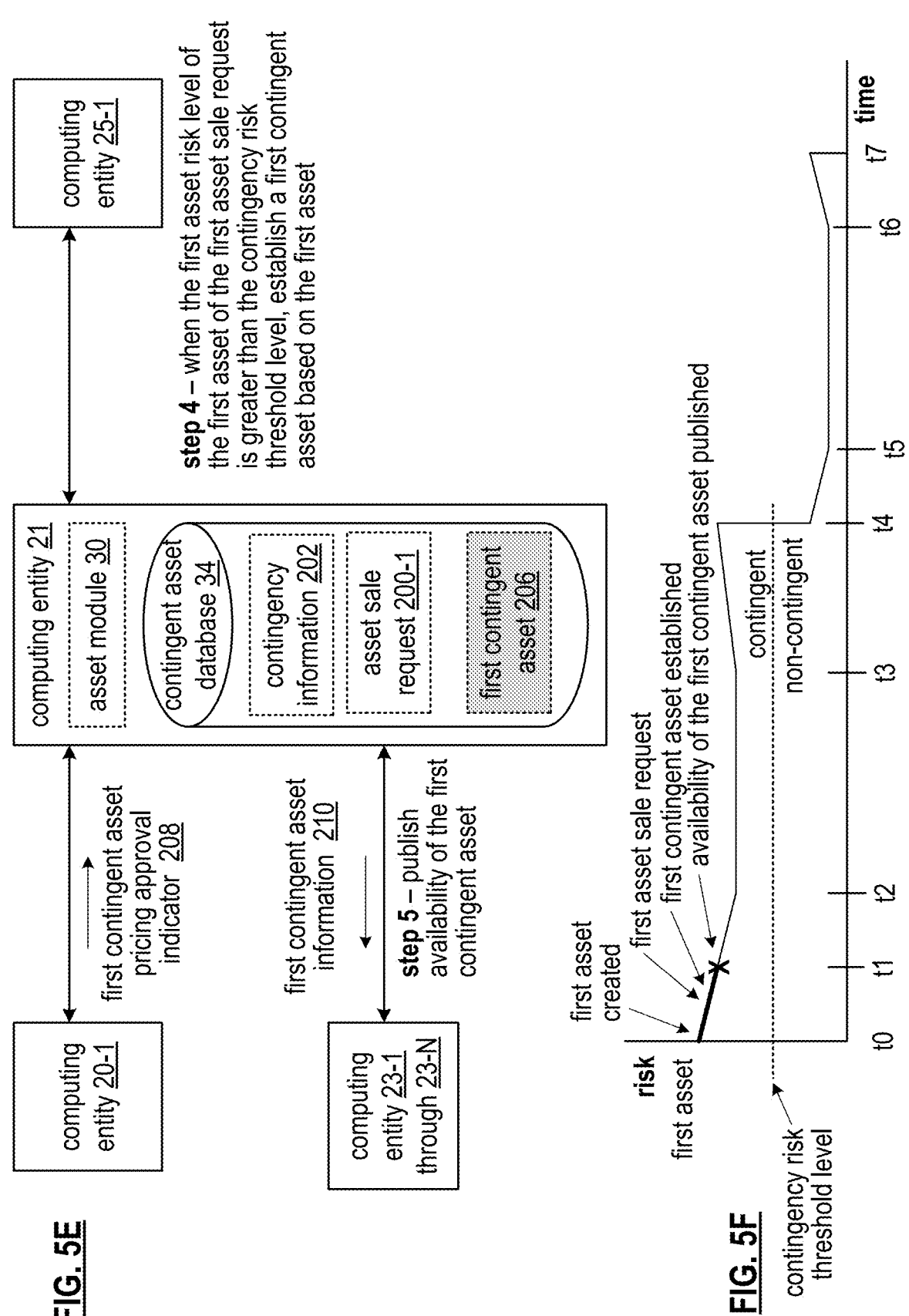

FIG. 5E computing entity 25-1 computing entity 21 asset module 30 contingent asset database 34 contingency information 202 asset sale request 200-1 first contingent asset 206 first contingent asset pricing approval indicator 208 computing entity 20-1 first contingent asset information 210 step 5 – publish availability of the first contingent asset computing entity 23-1 through 23-N step 4 – when the first asset risk level of the first asset of the first asset sale request is greater than the contingency risk threshold level, establish a first contingent asset based on the first asset

FIG. 5F risk
first asset first asset created first asset sale request first contingent asset established availability of the first contingent asset published contingent non-contingent contingency risk threshold level t0  t1  t2  t3  t4  t5  t6  t7  time step 5 – update the updated first available contingent asset to produce a first non-contingent asset when the first asset risk level is less than the contingency risk threshold level

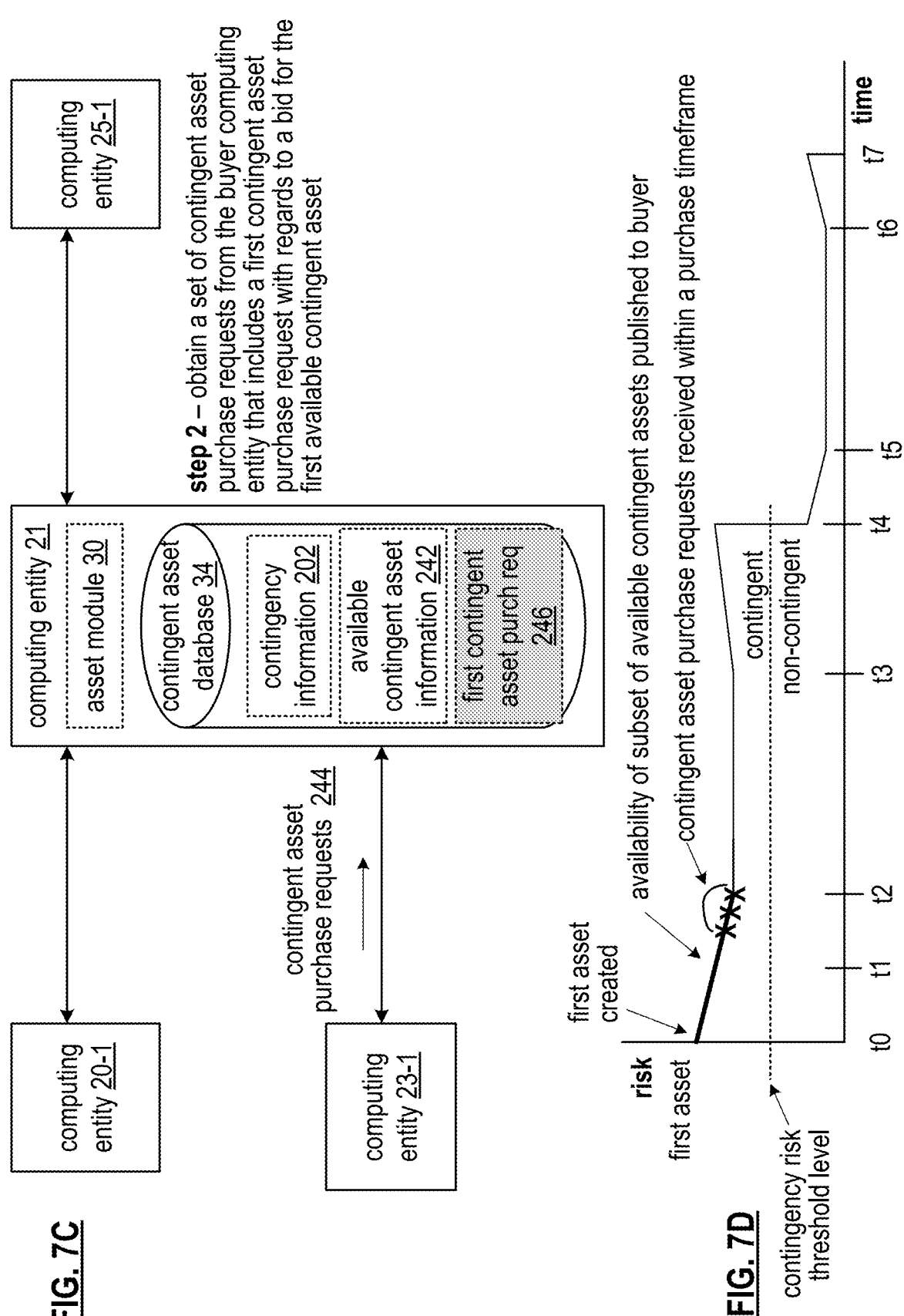

FIG. 7C computing entity 25-1 computing entity 21 asset module 30 contingent asset database 34 contingency information 202 available contingent asset information 242 first contingent asset purch req 246 step 2 – obtain a set of contingent asset purchase requests from the buyer computing entity that includes a first contingent asset purchase request with regards to a bid for the first available contingent asset computing entity 20-1 computing entity 23-1 contingent asset purchase requests 244

FIG. 7D risk first asset first asset created availability of subset of available contingent assets published to buyer contingent asset purchase requests received within a purchase timeframe contingent non-contingent contingency risk threshold level t0    t1    t2    t3    t4    t5    t6    t7    time

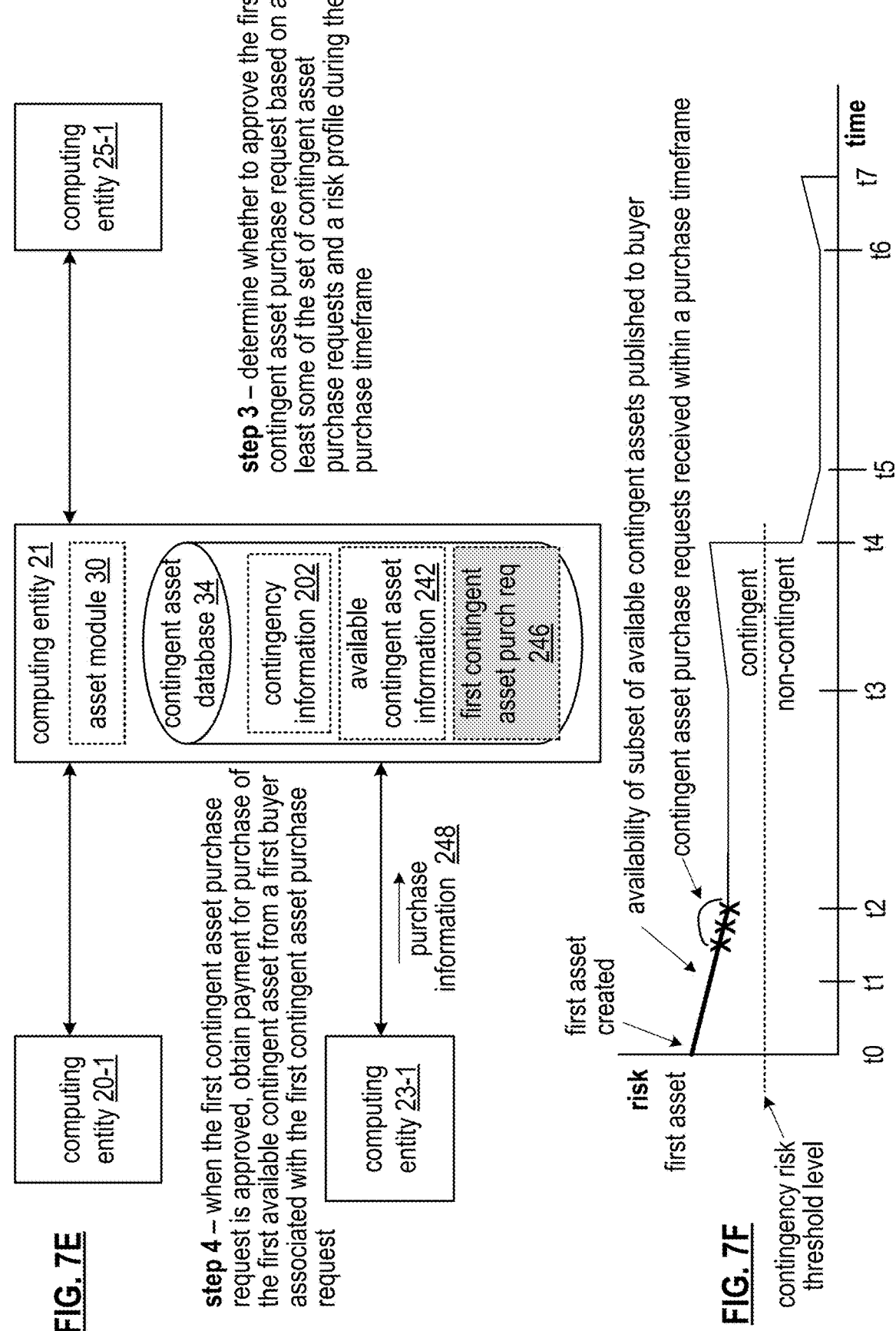

FIG. 7E step 4 – when the first contingent asset purchase request is approved, obtain payment for purchase of the first available contingent asset from a first buyer associated with the first contingent asset purchase request step 3 – determine whether to approve the first contingent asset purchase request based on at least some of the set of contingent asset purchase requests and a risk profile during the purchase timeframe computing entity 25-1 computing entity 21 asset module 30 contingent asset database 34 contingency information 202 available contingent asset information 242 first contingent asset purch req 246 computing entity 20-1 computing entity 23-1 purchase information 248

FIG. 7F contingency risk threshold level risk
first asset first asset created availability of subset of available contingent assets published to buyer contingent asset purchase requests received within a purchase timeframe contingent non-contingent t0   t1   t2   t3   t4   t5   t6   t7   time step 5 – facilitate seller payment utilizing the payment for purchase of the first available contingent asset step 6 – reassign an attribute of the first available contingent asset from the seller to the buyer

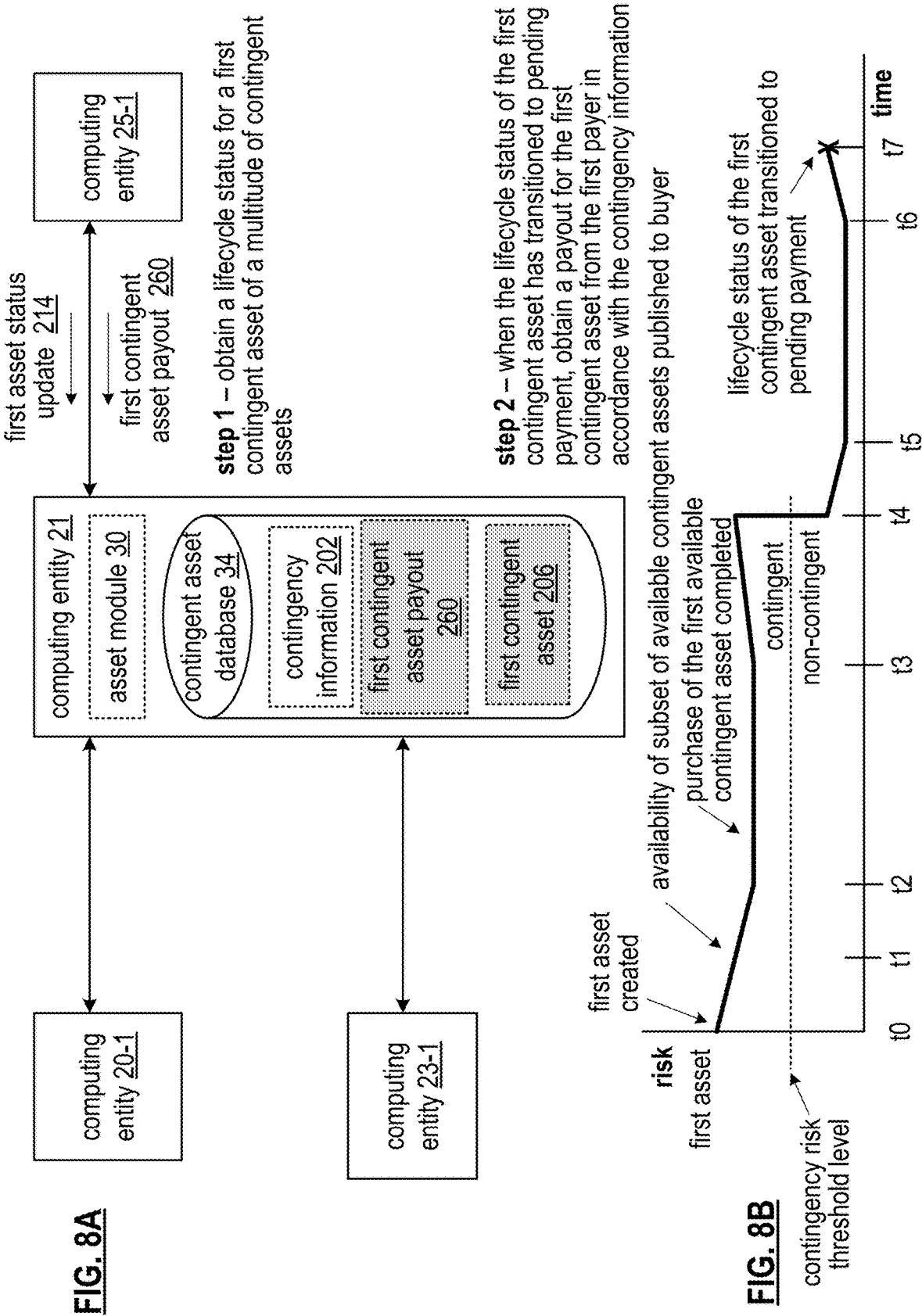

FIG. 8A computing entity 20-1 computing entity 21 computing entity 25-1 first asset status update 214 first contingent asset payout 260 asset module 30 contingent asset database 34 contingency information 202 first contingent asset payout 260 first contingent asset 206 computing entity 23-1 step 1 – obtain a lifecycle status for a first contingent asset of a multitude of contingent assets step 2 – when the lifecycle status of the first contingent asset has transitioned to pending payment, obtain a payout for the first contingent asset from the first payer in accordance with the contingency information

FIG. 8B risk first asset first asset created availability of subset of available contingent assets published to buyer purchase of the first available contingent asset completed lifecycle status of the first contingent asset transitioned to pending payment contingent non-contingent contingency risk threshold level t0   t1   t2   t3   t4   t5   t6   t7   time step 4 – facilitate payment of the payoff to the owner entity step 3 – determine a payoff for an owner entity based on the first contingent asset payout and the contingency information

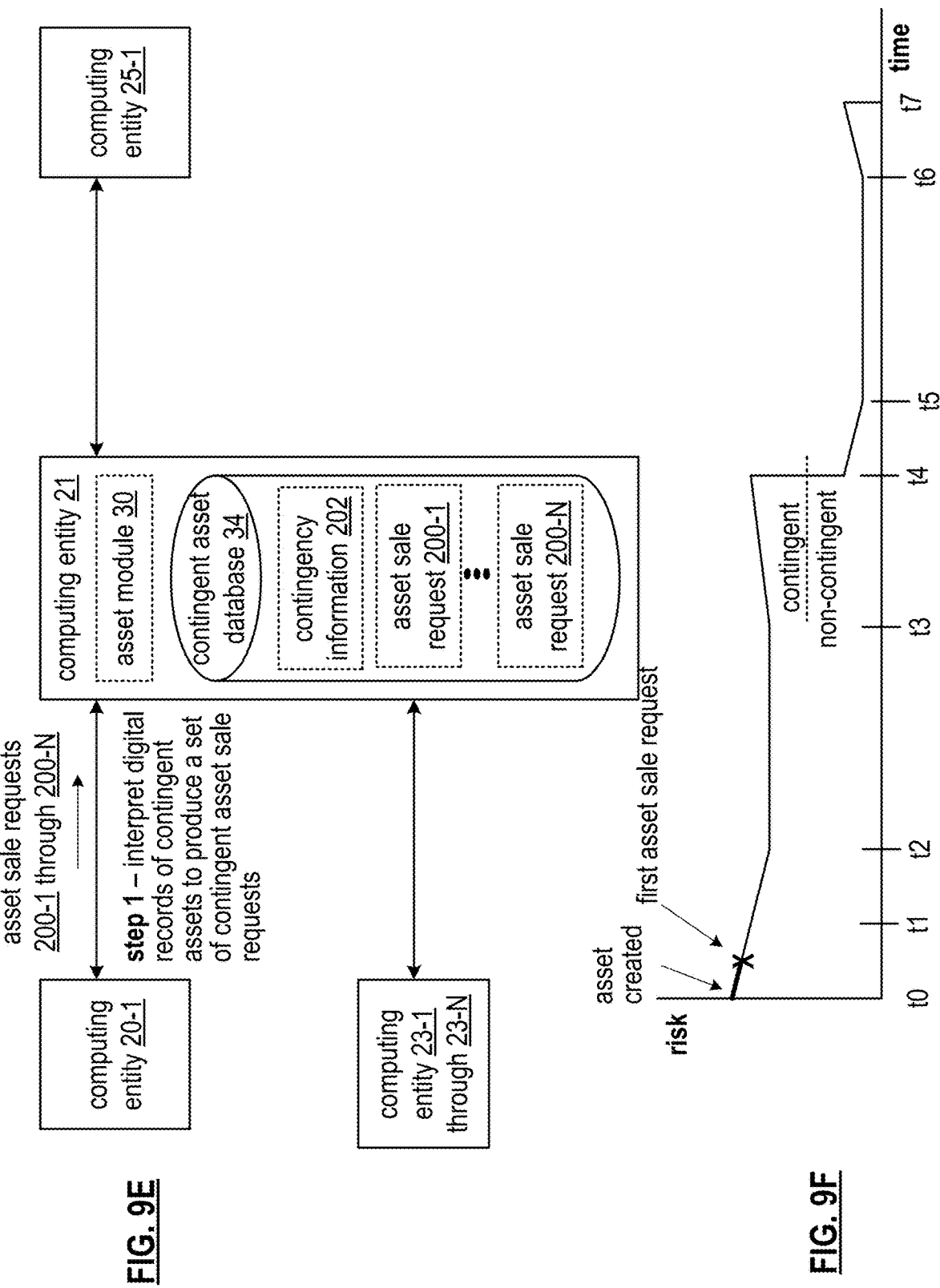

computing entity 25-1 computing entity 21 asset module 30 contingent asset database 34 contingency information 202 asset sale request 200-1

••• asset sale request 200-N asset sale requests 200-1 through 200-N step 1 – interpret digital records of contingent assets to produce a set of contingent asset sale requests computing entity 20-1 computing entity 23-1 through 23-N

FIG. 9E risk asset created first asset sale request contingent non-contingent t0   t1   t2   t3   t4   t5   t6   t7   time

FIG. 9F

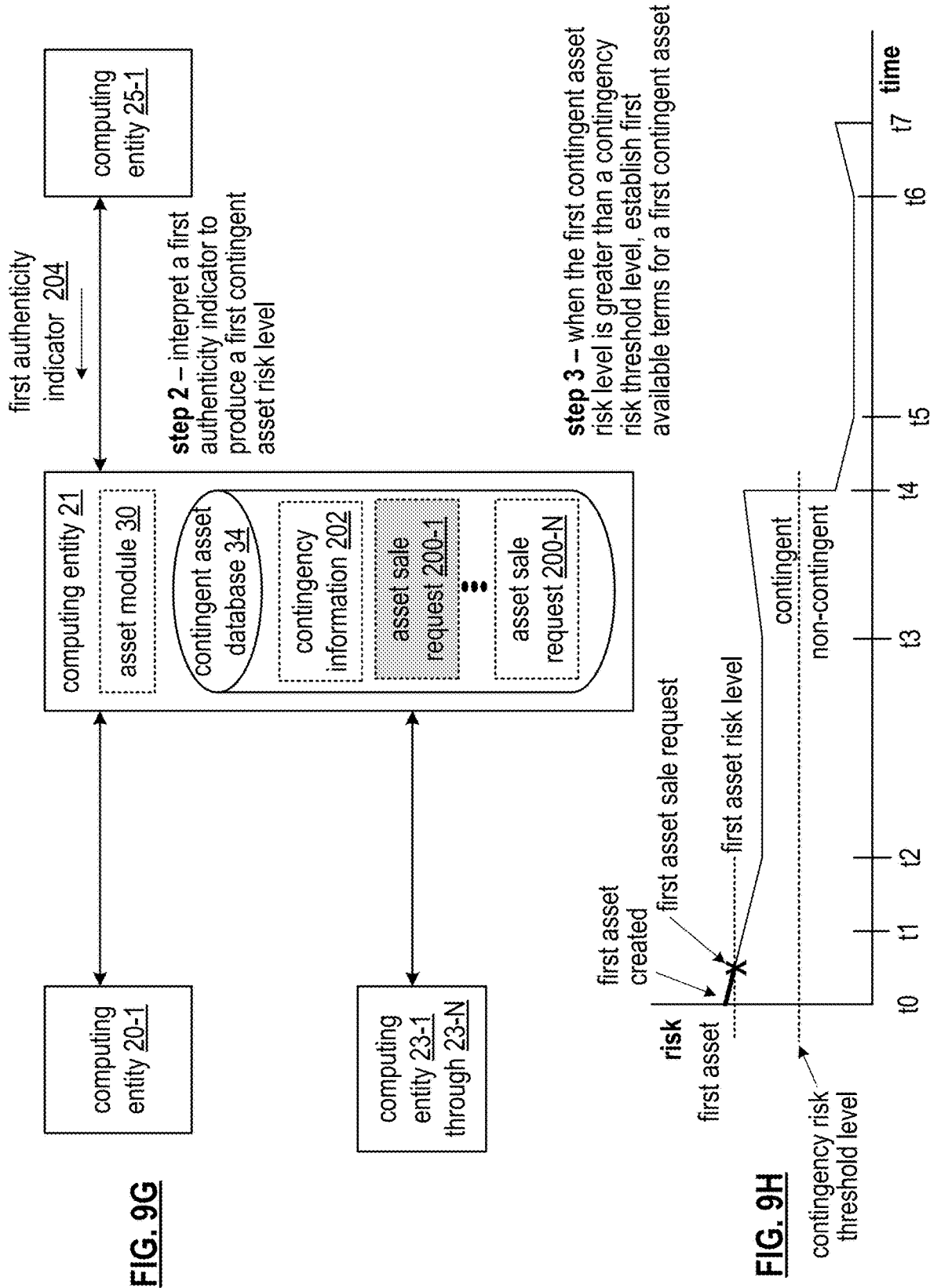

FIG. 9G computing entity 25-1 first authenticity indicator 204 step 2 – interpret a first authenticity indicator to produce a first contingent asset risk level computing entity 21 asset module 30 contingent asset database 34 contingency information 202 asset sale request 200-1

• • • asset sale request 200-N computing entity 20-1 computing entity 23-1 through 23-N step 3 – when the first contingent asset risk level is greater than a contingency risk threshold level, establish first available terms for a first contingent asset

FIG. 9H risk first asset first asset sale request first asset created first asset risk level contingent non-contingent contingency risk threshold level t0  t1  t2  t3  t4  t5  t6  t7  time

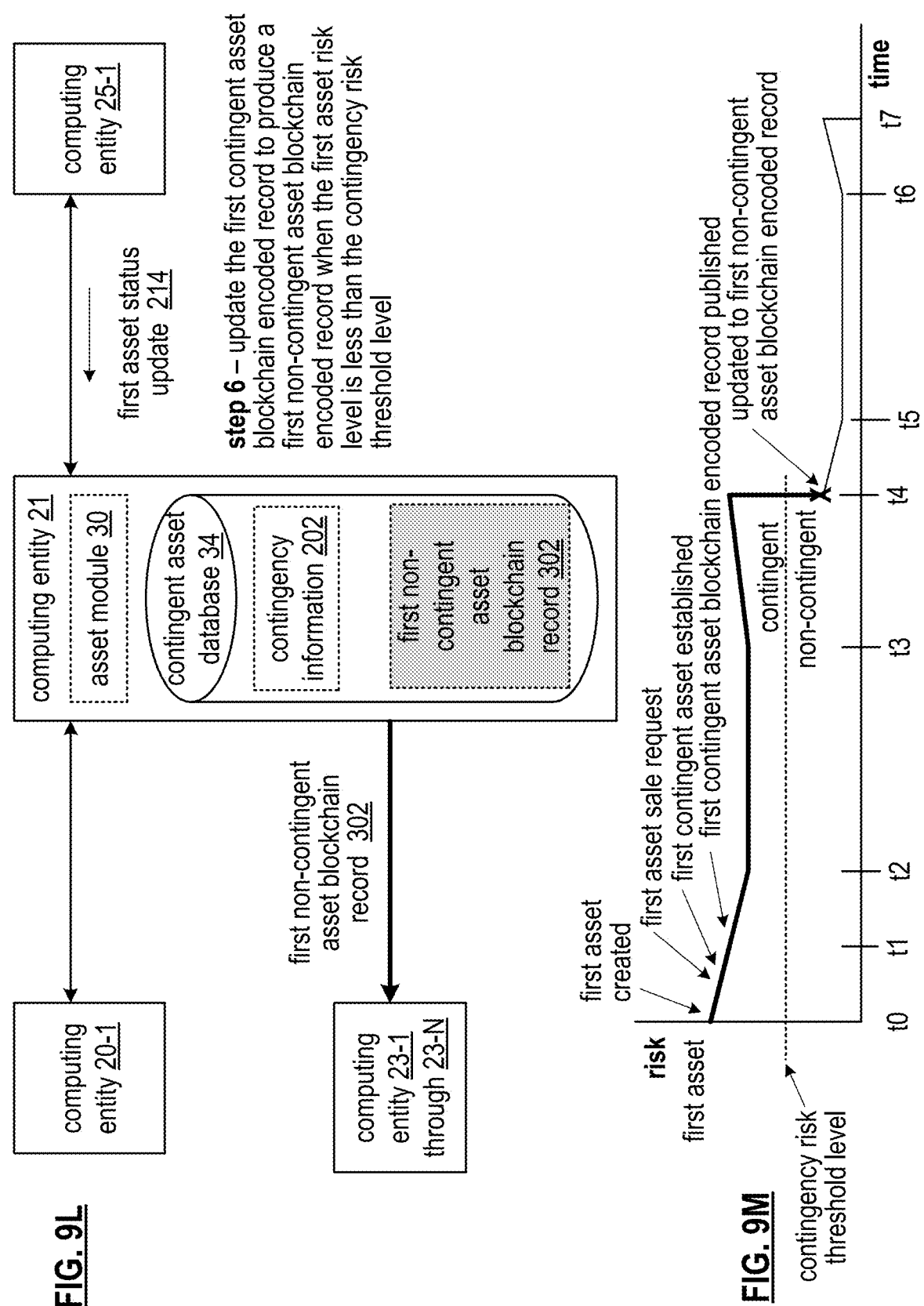

FIG. 9L computing entity 25-1 first asset status update 214 step 6 – update the first contingent asset blockchain encoded record to produce a first non-contingent asset blockchain encoded record when the first asset risk level is less than the contingency risk threshold level computing entity 21 asset module 30 contingent asset database 34 contingency information 202 first non-contingent asset blockchain record 302 computing entity 20-1 first non-contingent asset blockchain record 302 computing entity 23-1 through 23-N

FIG. 9M risk
first asset contingency risk threshold level first asset created first asset sale request first contingent asset established first contingent asset blockchain encoded record published first contingent asset blockchain encoded record updated to first non-contingent asset blockchain encoded record contingent non-contingent t0　t1　t2　t3　t4　t5　t6　t7　time

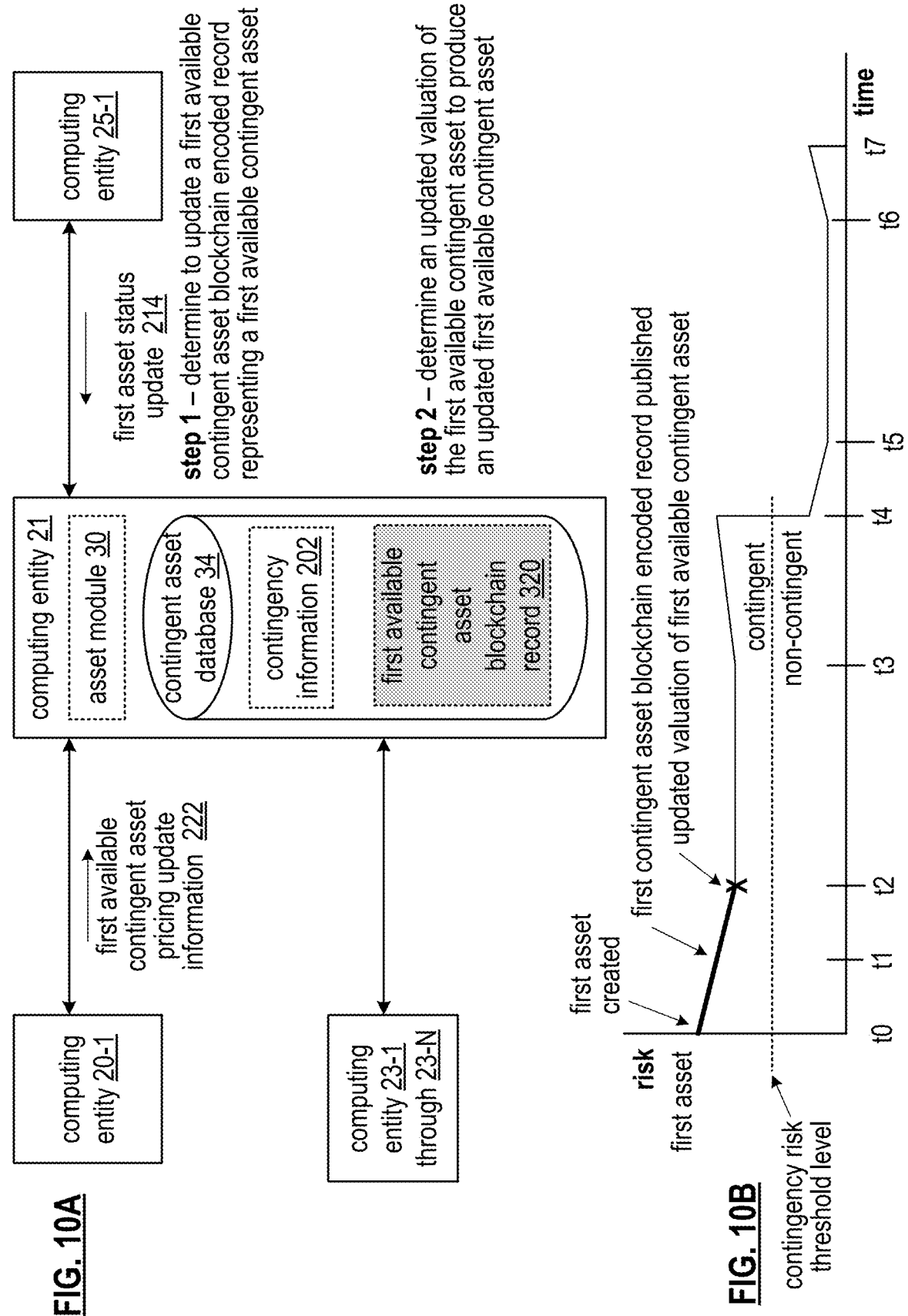

FIG. 10A computing entity 25-1 first asset status update 214 step 1 – determine to update a first available contingent asset blockchain encoded record representing a first available contingent asset step 2 – determine an updated valuation of the first available contingent asset to produce an updated first available contingent asset computing entity 21 asset module 30 contingent asset database 34 contingency information 202 first available contingent asset blockchain record 320 first available contingent asset pricing update information 222 computing entity 20-1 computing entity 23-1 through 23-N

FIG. 10B contingency risk threshold level risk
first asset first asset created first contingent asset blockchain encoded record published updated valuation of first available contingent asset contingent
non-contingent t0  t1  t2  t3  t4  t5  t6  t7   time

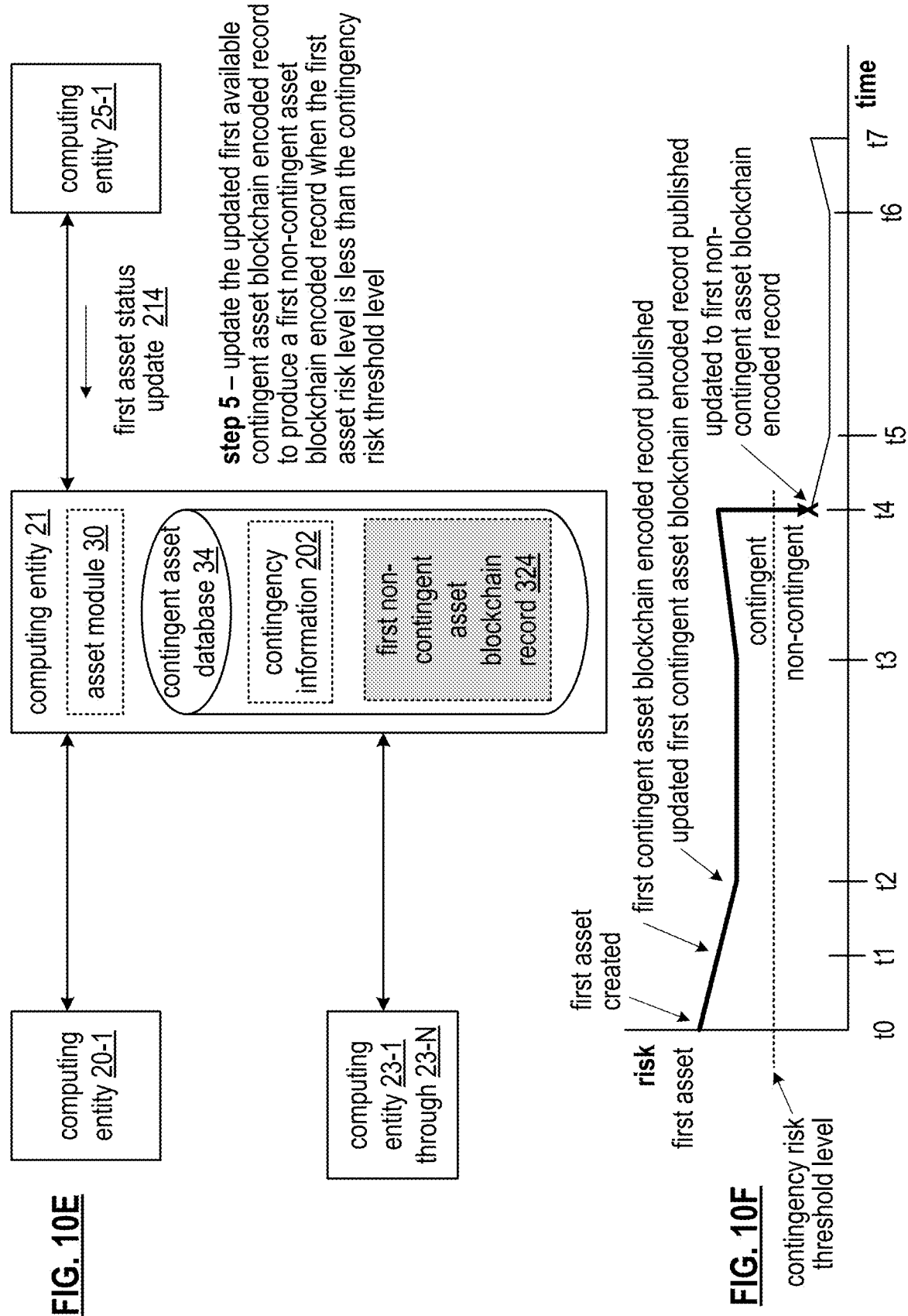

FIG. 10E computing entity 25-1 first asset status update 214 computing entity 21 asset module 30 contingent asset database 34 contingency information 202 first non-contingent asset blockchain record 324 step 5 – update the updated first available contingent asset blockchain encoded record to produce a first non-contingent asset blockchain encoded record when the first asset risk level is less than the contingency risk threshold level computing entity 20-1 computing entity 23-1 through 23-N

FIG. 10F first asset created first contingent asset blockchain encoded record published updated first contingent asset blockchain encoded record published updated to first non-contingent asset blockchain encoded record first non-contingent asset blockchain encoded record published contingent non-contingent risk
first asset contingency risk threshold level t0   t1   t2   t3   t4   t5   t6   t7   time

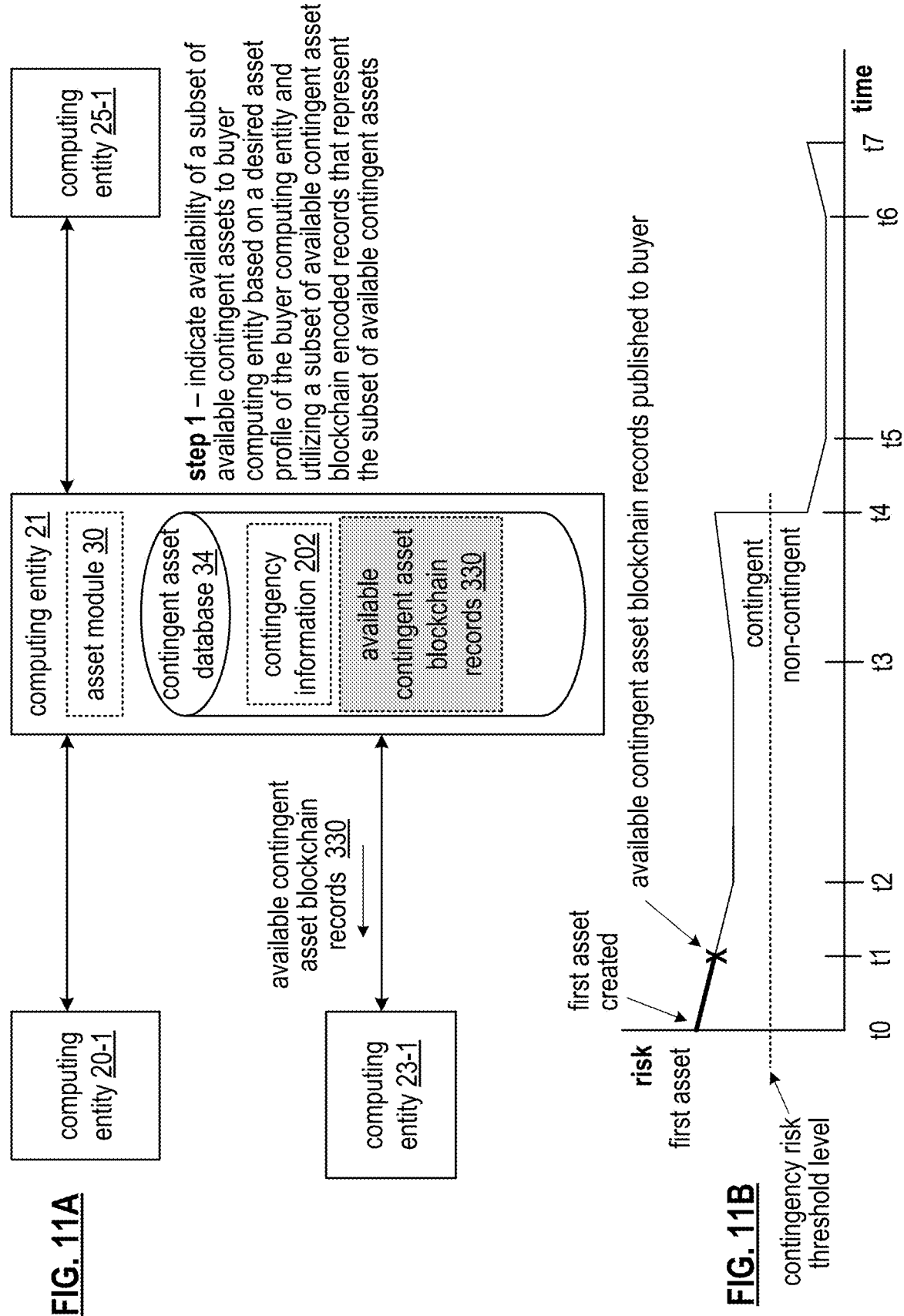

FIG. 11A computing entity 20-1 computing entity 21 asset module 30 contingent asset database 34 contingency information 202 available contingent asset blockchain records 330 computing entity 25-1 available contingent asset blockchain records 330 computing entity 23-1 step 1 – indicate availability of a subset of available contingent assets to buyer computing entity based on a desired asset profile of the buyer computing entity and utilizing a subset of available contingent asset blockchain encoded records that represent the subset of available contingent assets

FIG. 11B contingency risk threshold level first asset risk first asset created available contingent asset blockchain records published to buyer contingent non-contingent t0  t1  t2  t3  t4  t5  t6  t7  time

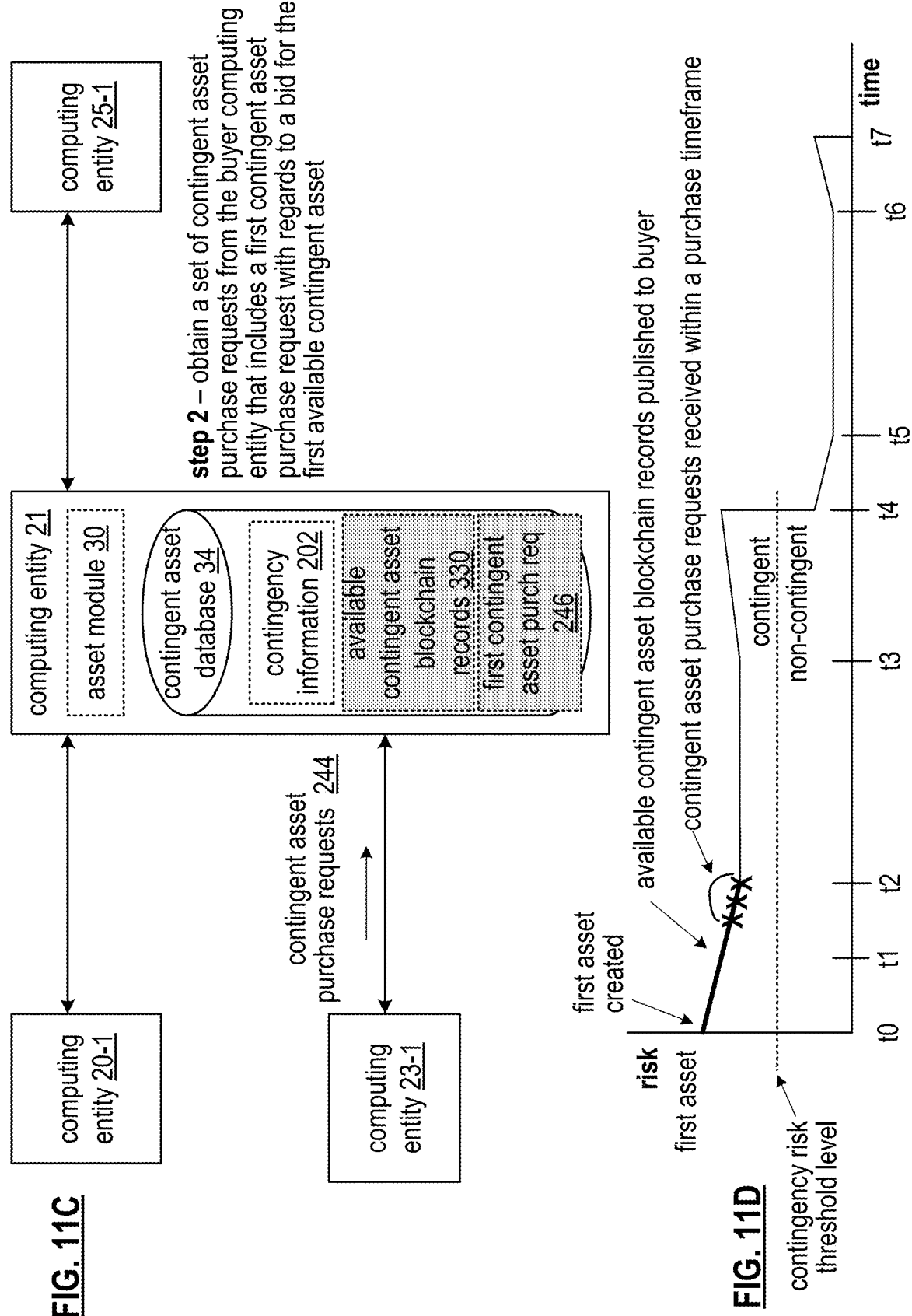

FIG. 11C computing entity 20-1 computing entity 21 asset module 30 contingent asset database 34 contingency information 202 available contingent asset blockchain records 330 first contingent asset purch req 246 computing entity 25-1 contingent asset purchase requests 244 computing entity 23-1 step 2 – obtain a set of contingent asset purchase requests from the buyer computing entity that includes a first contingent asset purchase request with regards to a bid for the first available contingent asset

FIG. 11D risk
first asset contingency risk threshold level first asset created available contingent asset blockchain records published to buyer contingent asset purchase requests received within a purchase timeframe contingent non-contingent t0  t1  t2  t3  t4  t5  t6  t7  time

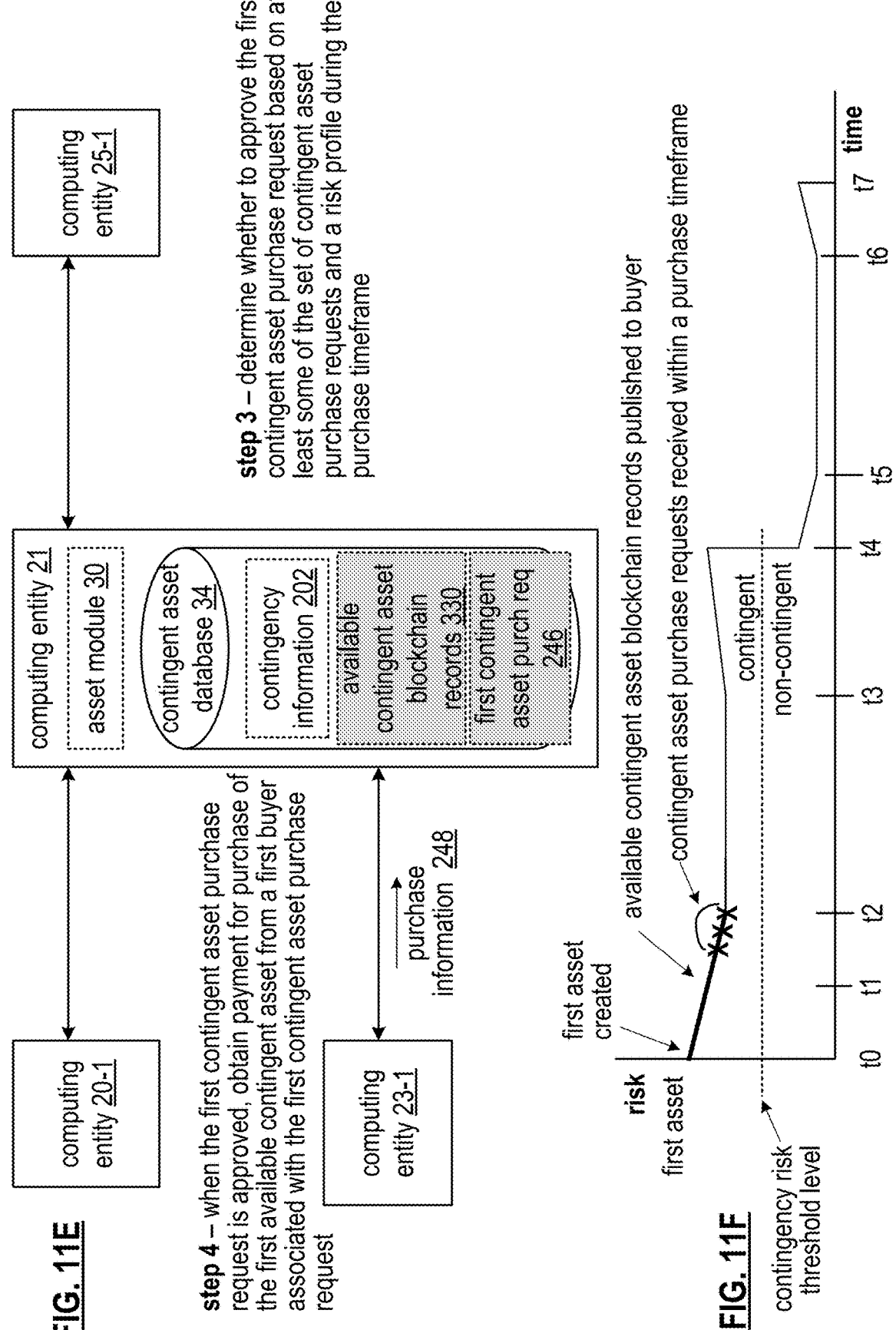

FIG. 11E step 4 – when the first contingent asset purchase request is approved, obtain payment for purchase of the first available contingent asset from a first buyer associated with the first contingent asset purchase request step 3 – determine whether to approve the first contingent asset purchase request based on at least some of the set of contingent asset purchase requests and a risk profile during the purchase timeframe

FIG. 11F

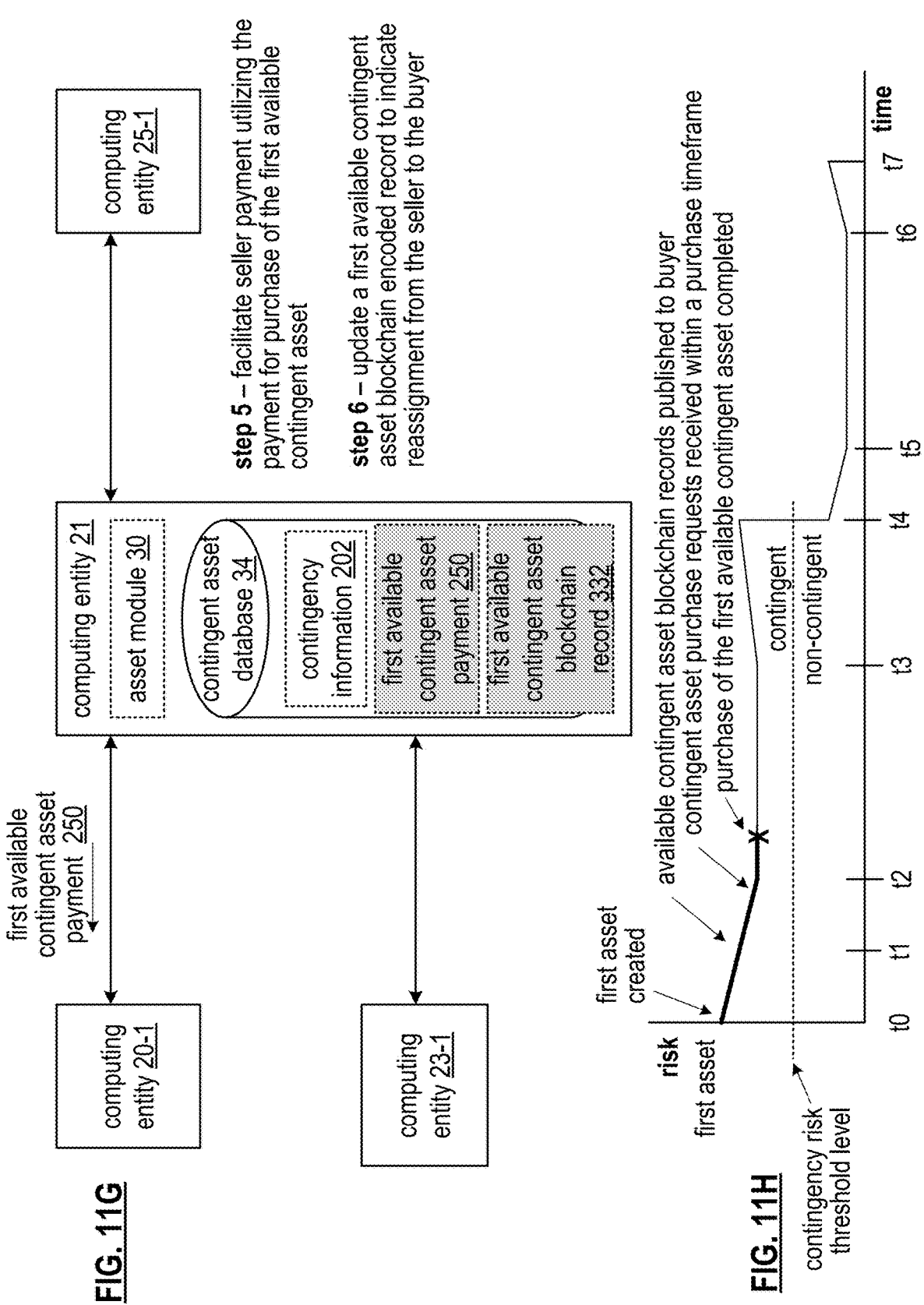

FIG. 11G computing entity 25-1 computing entity 21
asset module 30
contingent asset database 34
contingency information 202
first available contingent asset payment 250
first available contingent asset blockchain record 332 computing entity 20-1 computing entity 23-1 first available contingent asset payment 250 step 5 – facilitate seller payment utilizing the payment for purchase of the first available contingent asset step 6 – update a first available contingent asset blockchain encoded record to indicate reassignment from the seller to the buyer

FIG. 11H risk
first asset first asset created available contingent asset blockchain records published to buyer contingent asset purchase requests received within a purchase timeframe purchase of the first available contingent asset completed contingent
non-contingent contingency risk threshold level t0  t1  t2  t3  t4  t5  t6  t7  time

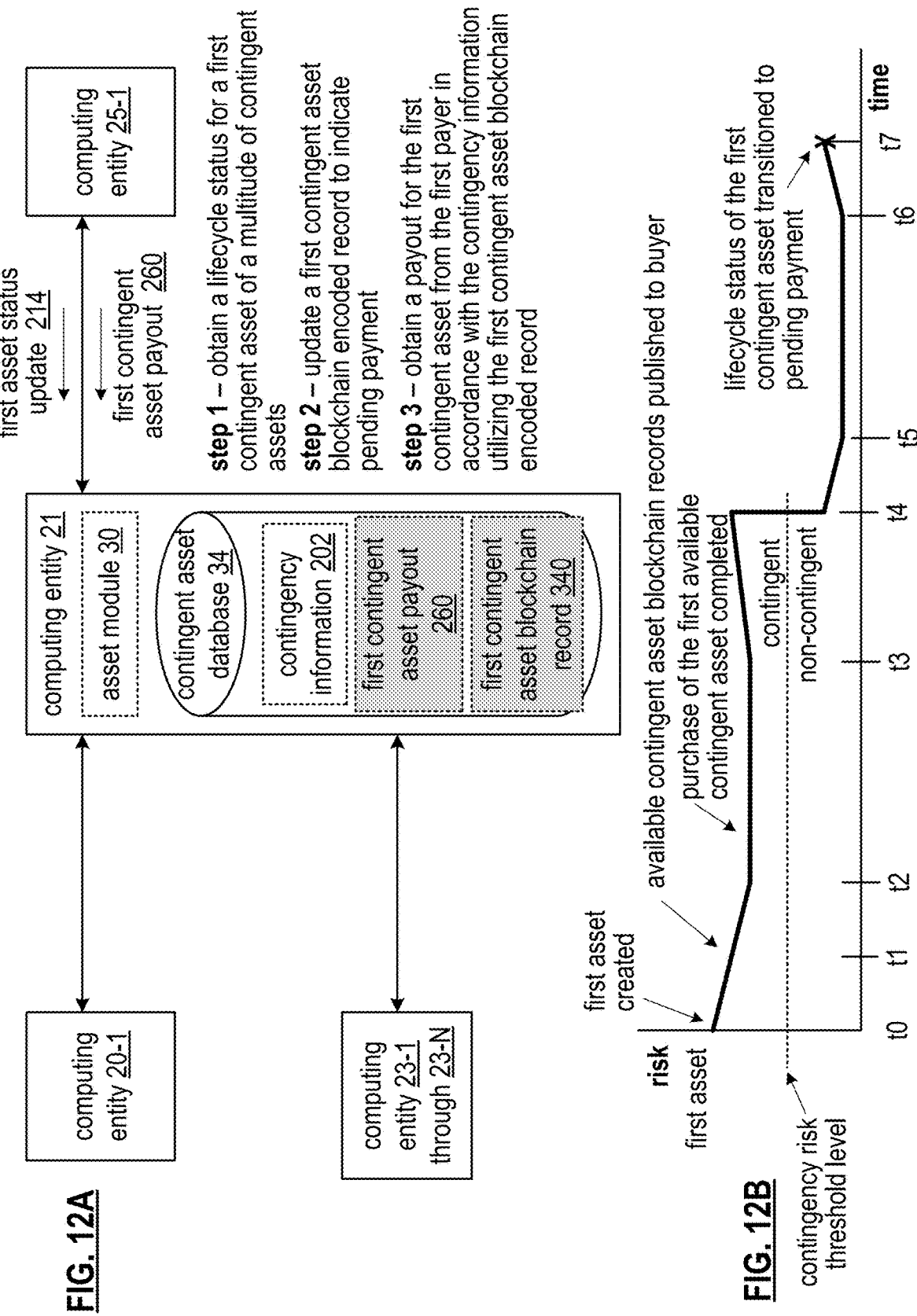

FIG. 12A computing entity 20-1 computing entity 21 asset module 30 contingent asset database 34 contingency information 202 first contingent asset payout 260 first contingent asset blockchain record 340 computing entity 23-1 through 23-N first asset status update 214 first contingent asset payout 260 computing entity 25-1 step 1 – obtain a lifecycle status for a first contingent asset of a multitude of contingent assets step 2 – update a first contingent asset blockchain encoded record to indicate pending payment step 3 – obtain a payout for the first contingent asset from the first payer in accordance with the contingency information utilizing the first contingent asset blockchain encoded record

FIG. 12B risk
first asset first asset created available contingent asset blockchain records published to buyer purchase of the first available contingent asset completed lifecycle status of the first contingent asset transitioned to pending payment contingency risk threshold level contingent non-contingent t0   t1   t2   t3   t4   t5   t6   t7   time

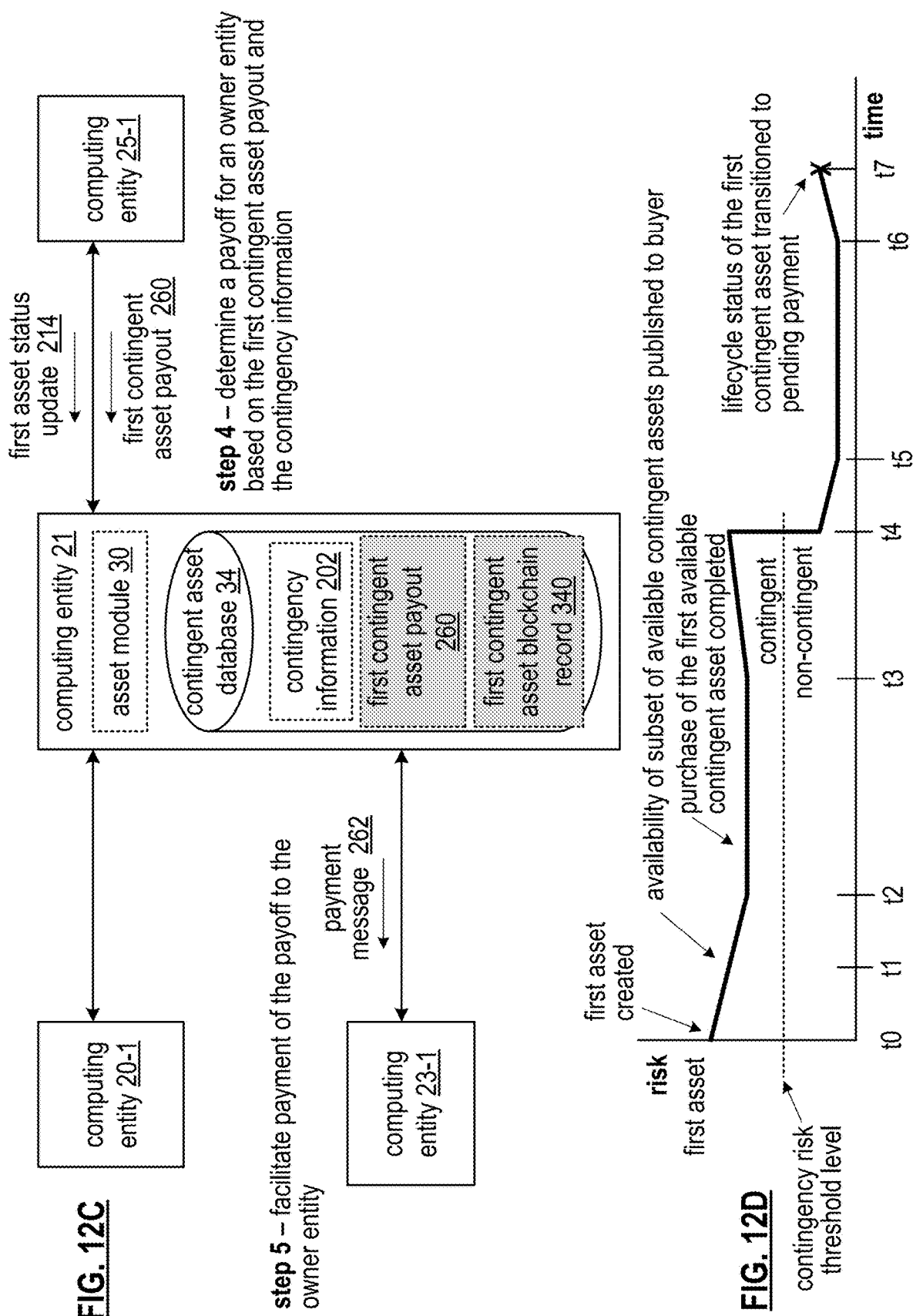

FIG. 12C computing entity 25-1 first asset status update 214 first contingent asset payout 260 computing entity 21 asset module 30 contingent asset database 34 contingency information 202 first contingent asset payout 260 first contingent asset blockchain record 340 computing entity 20-1 computing entity 23-1 payment message 262 step 4 – determine a payoff for an owner entity based on the first contingent asset payout and the contingency information step 5 – facilitate payment of the payoff to the owner entity

FIG. 12D risk
first asset first asset created availability of subset of available contingent assets published to buyer purchase of the first available contingent asset completed lifecycle status of the first contingent asset transitioned to pending payment contingency risk threshold level contingent non-contingent t0    t1    t2    t3    t4    t5    t6    t7    time

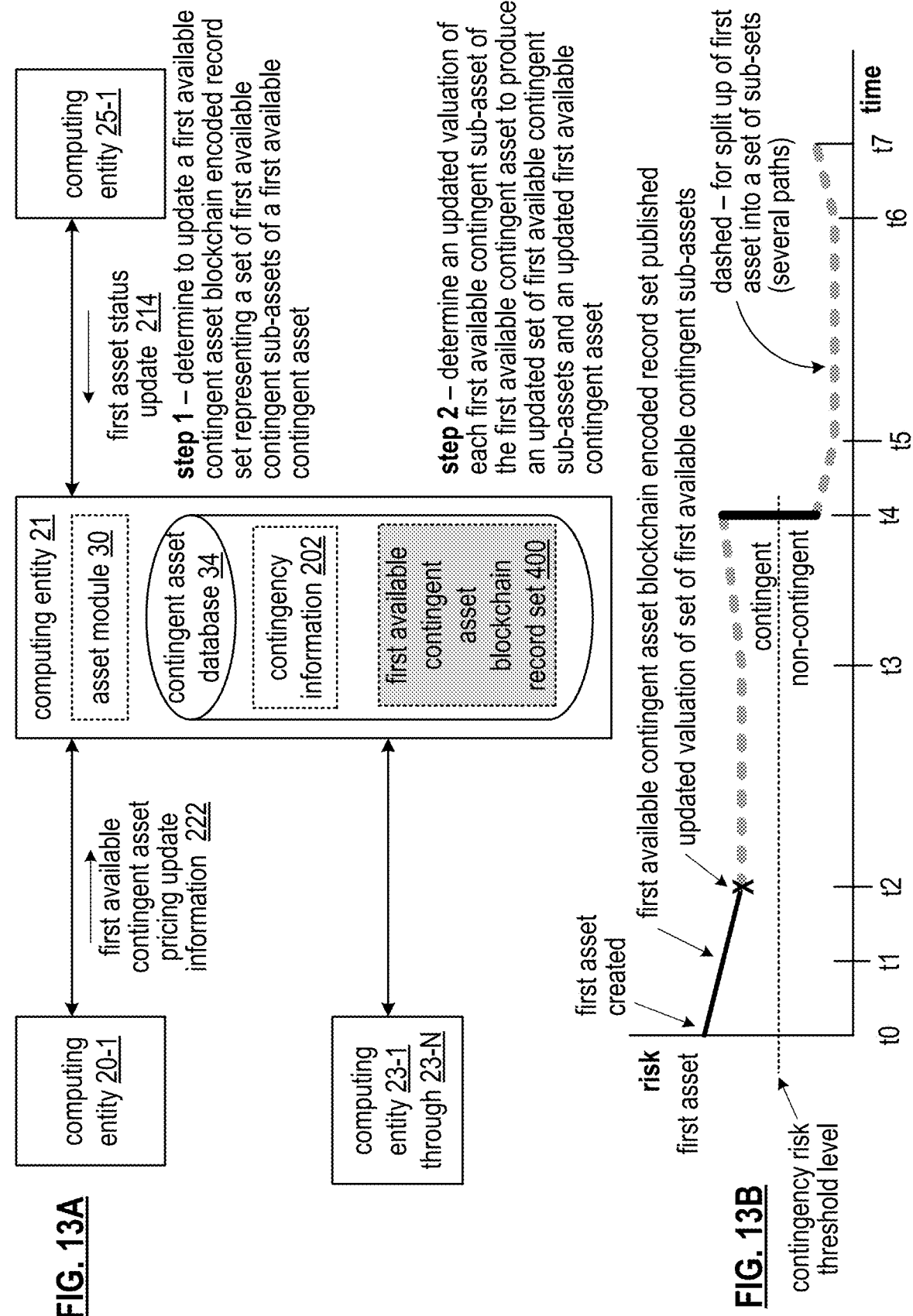

FIG. 13A computing entity 25-1 computing entity 21 asset module 30 contingent asset database 34 contingency information 202 first available contingent asset blockchain record set 400 computing entity 20-1 computing entity 23-1 through 23-N first asset status update 214 first available contingent asset pricing update information 222 step 1 – determine to update a first available contingent asset blockchain encoded record set representing a set of first available contingent sub-assets of a first available contingent asset step 2 – determine an updated valuation of each first available contingent sub-asset of the first available contingent asset to produce an updated set of first available contingent sub-assets and an updated first available contingent asset

FIG. 13B risk first asset first asset created first available contingent asset blockchain encoded record set published updated valuation of set of first available contingent sub-assets contingent non-contingent dashed – for split up of first asset into a set of sub-sets (several paths)

contingency risk threshold level t0    t1    t2    t3    t4    t5    t6    t7    time

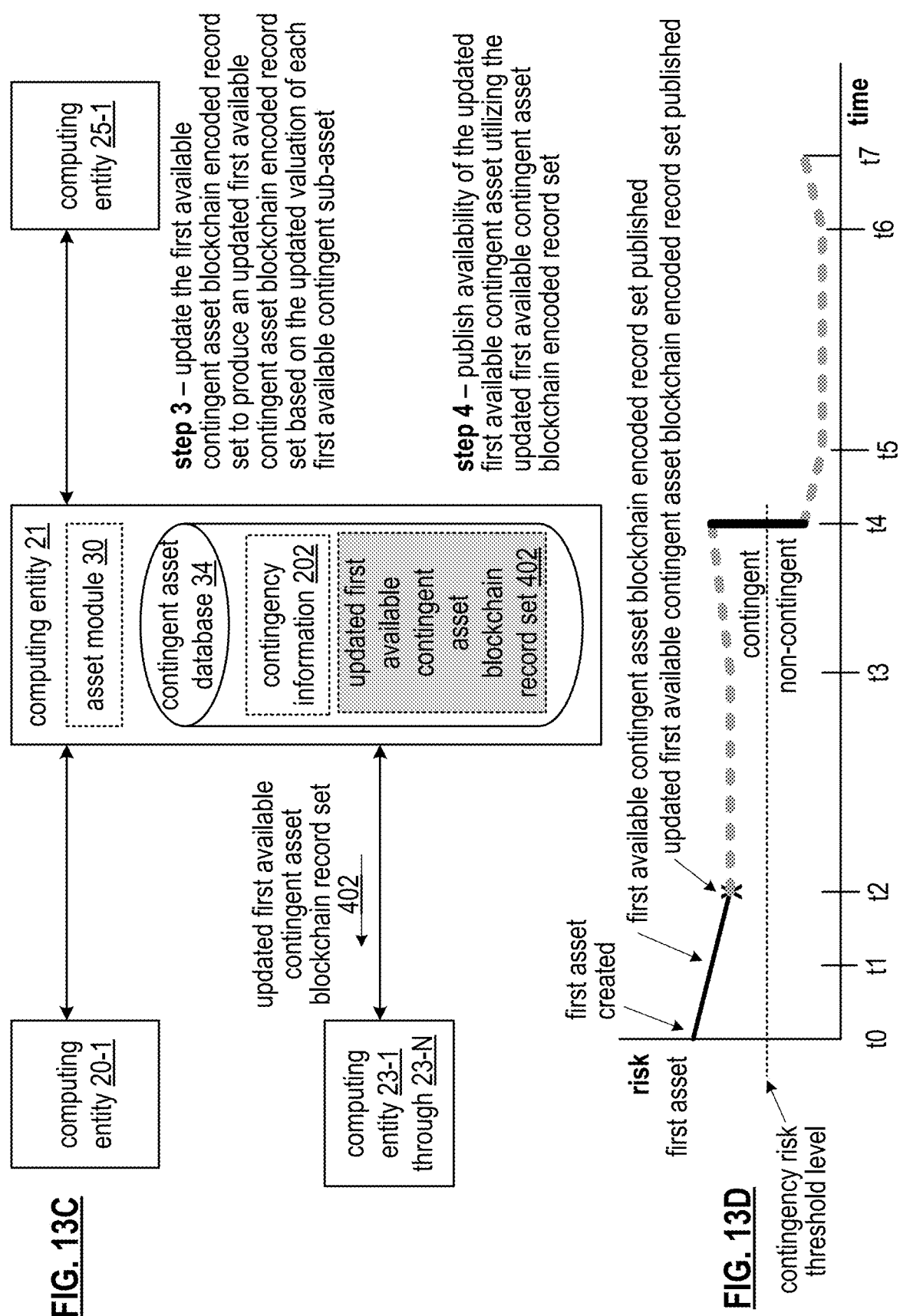

FIG. 13C computing entity 25-1 computing entity 21 asset module 30 contingent asset database 34 contingency information 202 updated first available contingent asset blockchain record set 402 computing entity 20-1 updated first available contingent asset blockchain record set 402 computing entity 23-1 through 23-N step 3 – update the first available contingent asset blockchain encoded record set to produce an updated first available contingent asset blockchain encoded record set based on the updated valuation of each first available contingent sub-asset step 4 – publish availability of the updated first available contingent asset utilizing the updated first available contingent asset blockchain encoded record set

FIG. 13D risk
first asset first asset created first available contingent asset blockchain encoded record set published updated first available contingent asset blockchain encoded record set published contingent
non-contingent contingency risk threshold level t0   t1   t2   t3   t4   t5   t6   t7   time

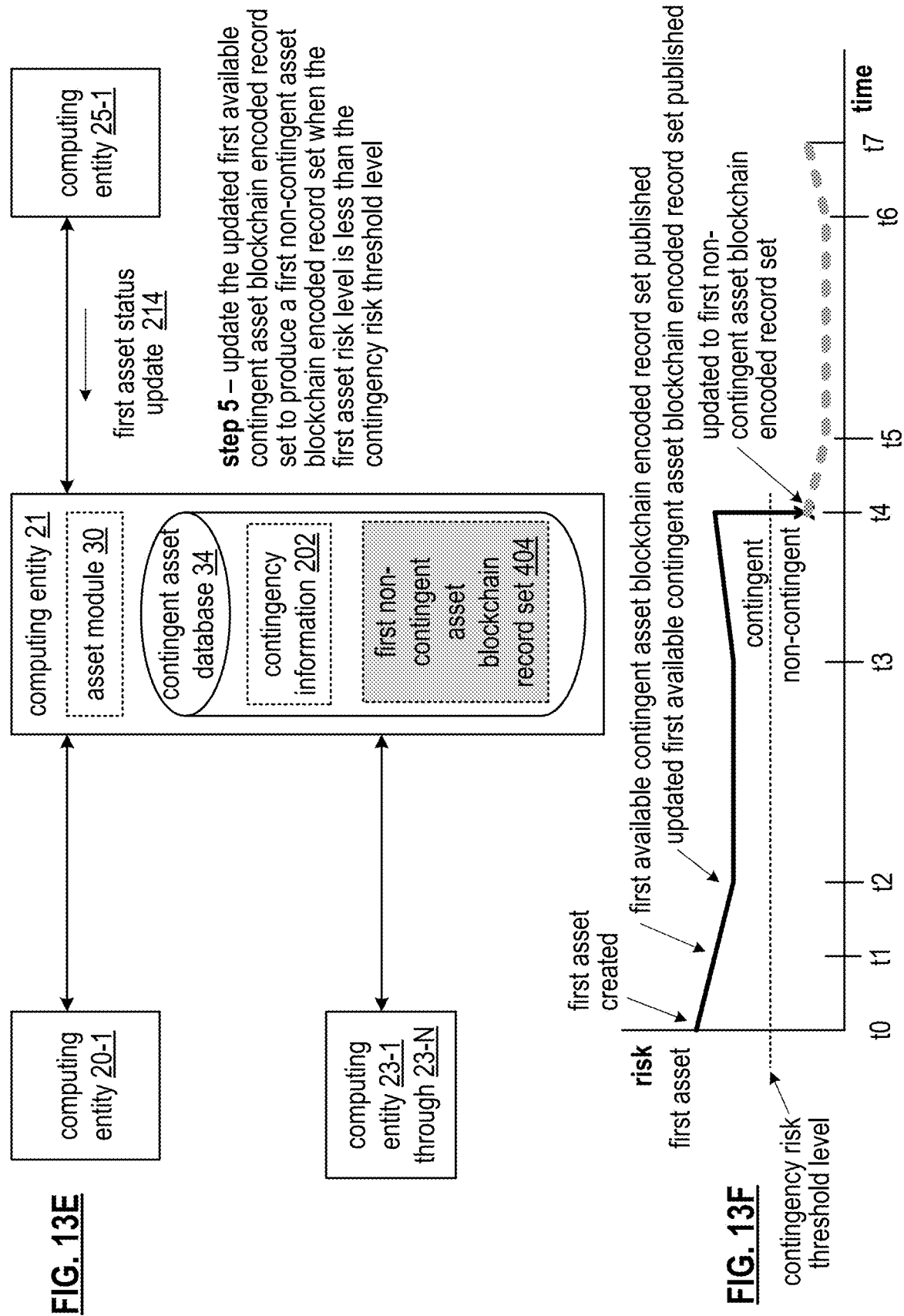

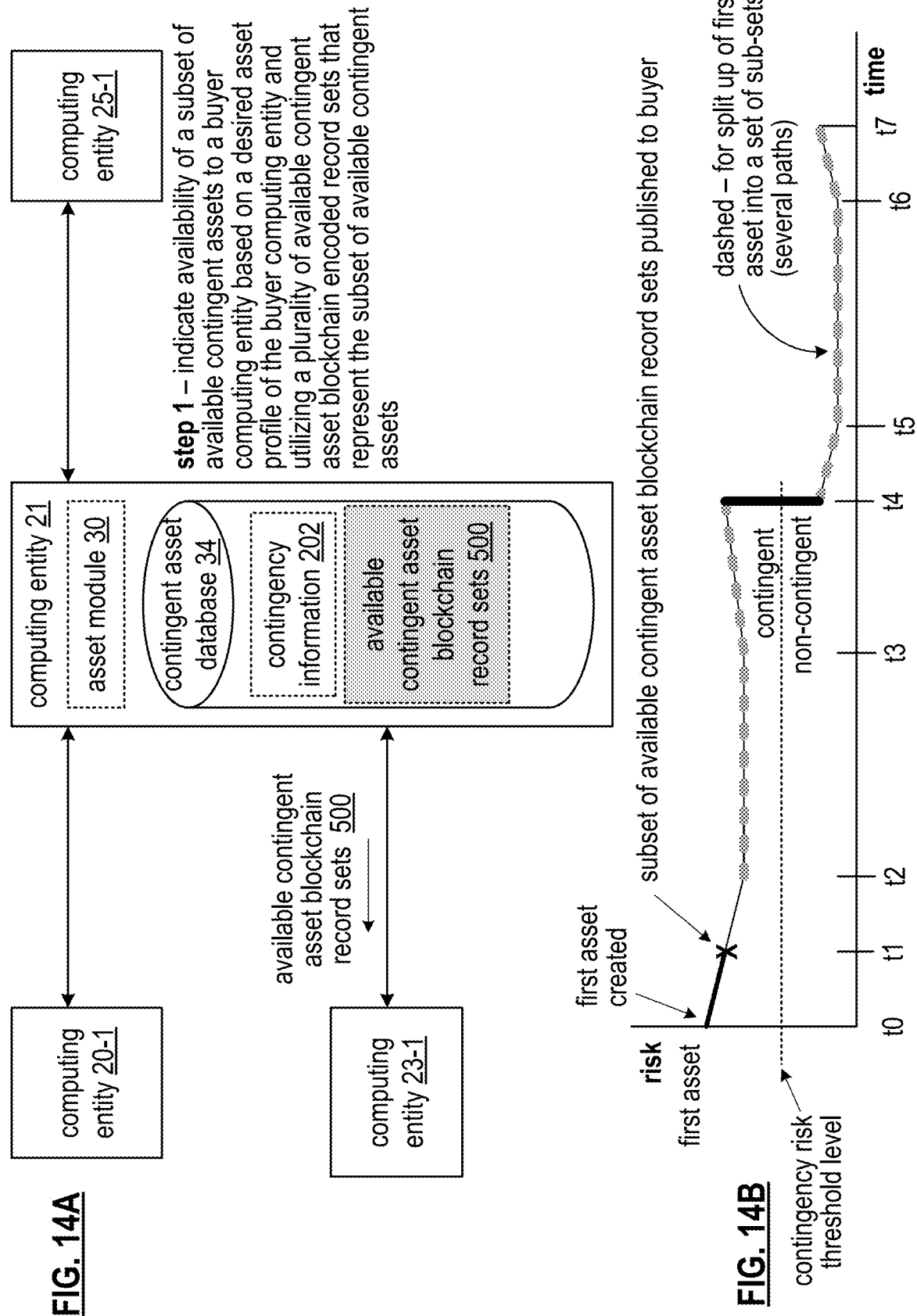

FIG. 14A computing entity 25-1 computing entity 21 asset module 30 contingent asset database 34 contingency information 202 available contingent asset blockchain record sets 500 computing entity 20-1 available contingent asset blockchain record sets 500 computing entity 23-1 step 1 – indicate availability of a subset of available contingent assets to a buyer computing entity based on a desired asset profile of the buyer computing entity and utilizing a plurality of available contingent asset blockchain encoded record sets that represent the subset of available contingent assets

FIG. 14B subset of available contingent asset blockchain record sets published to buyer dashed – for split up of first asset into a set of sub-sets (several paths)

first asset created risk first asset contingency risk threshold level contingent non-contingent t0    t1    t2    t3    t4    t5    t6    t7    time

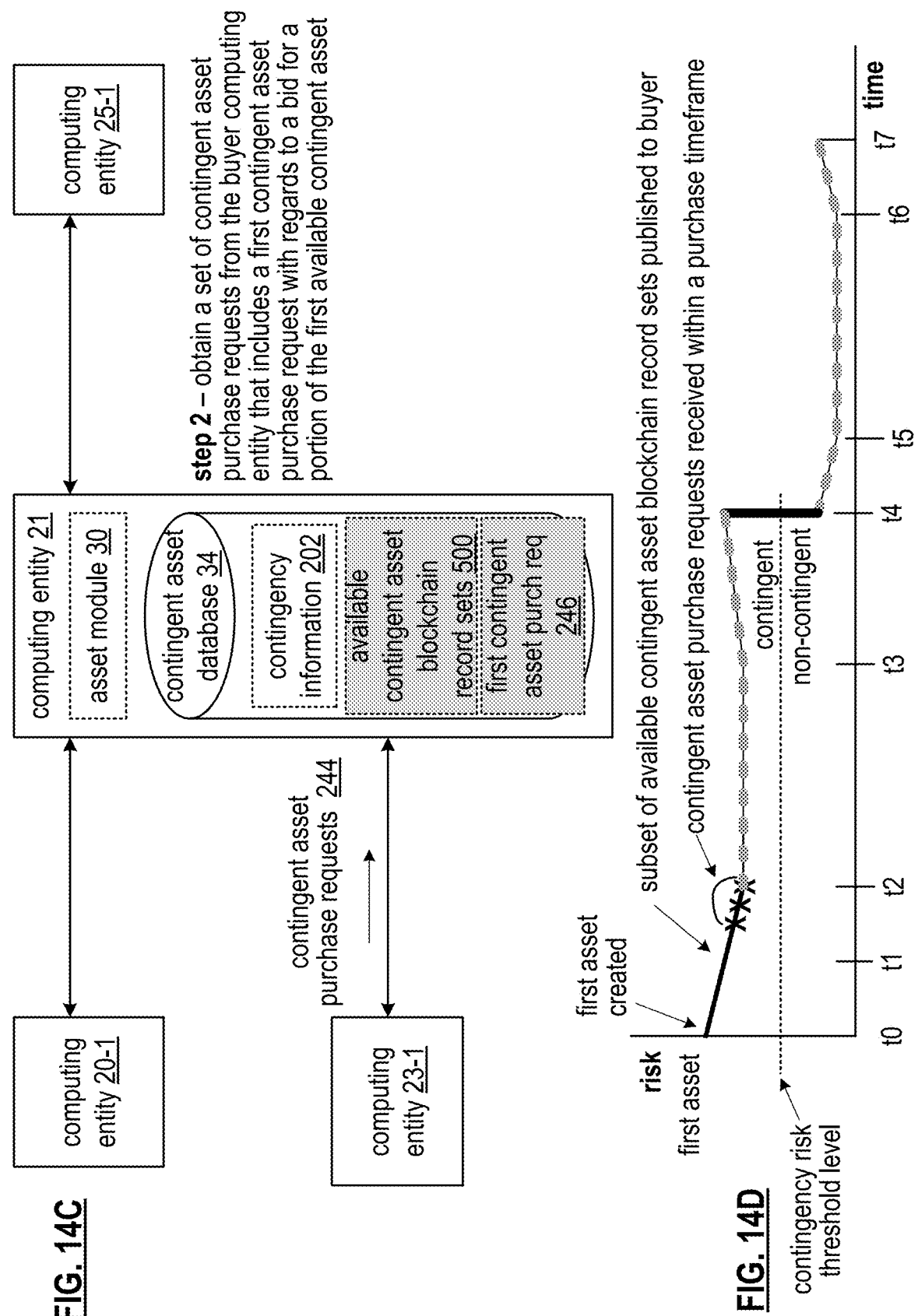

FIG. 14C computing entity 25-1 computing entity 21 asset module 30 contingent asset database 34 contingency information 202 available contingent asset blockchain record sets 500 first contingent asset purch req 246 step 2 – obtain a set of contingent asset purchase requests from the buyer computing entity that includes a first contingent asset purchase request with regards to a bid for a portion of the first available contingent asset computing entity 20-1 contingent asset purchase requests 244 computing entity 23-1

FIG. 14D first asset created subset of available contingent asset blockchain record sets published to buyer contingent asset purchase requests received within a purchase timeframe risk first asset contingency risk threshold level contingent non-contingent t0  t1  t2  t3  t4  t5  t6  t7  time

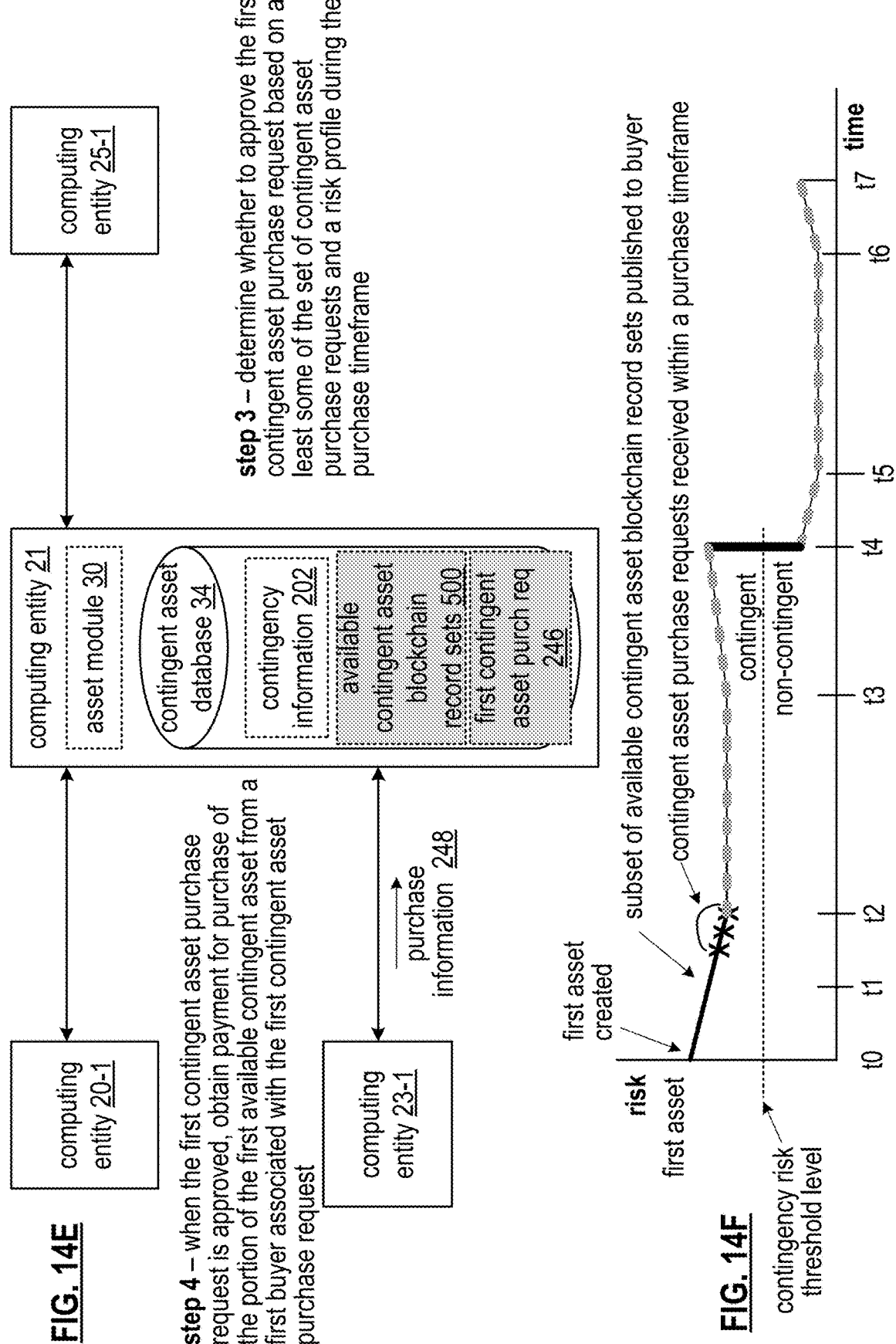

FIG. 14E computing entity 25-1 computing entity 20-1 computing entity 21 asset module 30 contingent asset database 34 contingency information 202 available contingent asset blockchain record sets 500 first contingent asset purch req 246 computing entity 23-1 purchase information 248 step 3 – determine whether to approve the first contingent asset purchase request based on at least some of the set of contingent asset purchase requests and a risk profile during the purchase timeframe step 4 – when the first contingent asset purchase request is approved, obtain payment for purchase of the portion of the first available contingent asset from a first buyer associated with the first contingent asset purchase request

FIG. 14F risk first asset first asset created subset of available contingent asset blockchain record sets published to buyer contingent asset purchase requests received within a purchase timeframe contingent non-contingent contingency risk threshold level t0  t1  t2  t3  t4  t5  t6  t7    time

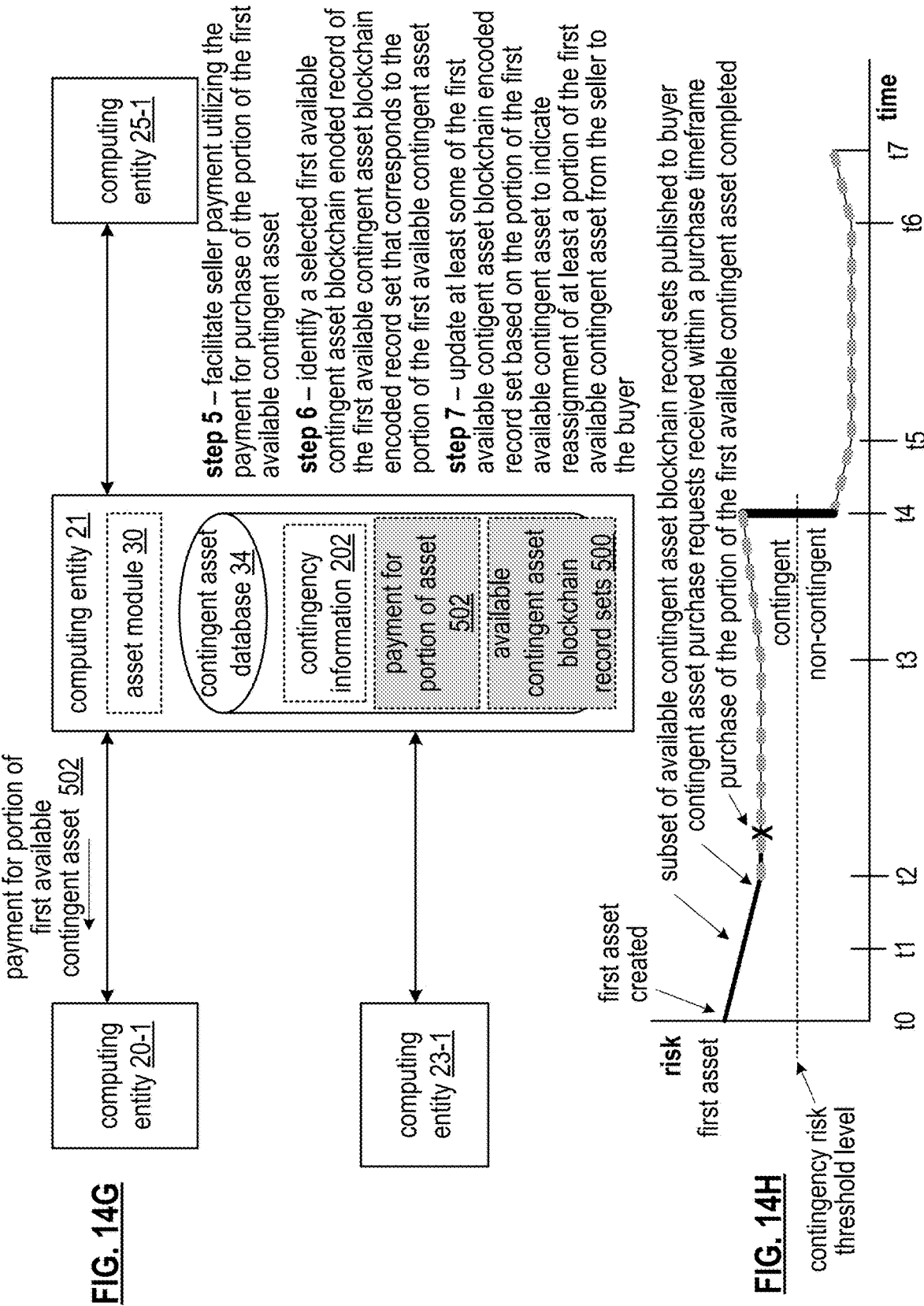

FIG. 14G computing entity 25-1 computing entity 20-1 payment for portion of first available contingent asset 502 computing entity 23-1 computing entity 21 asset module 30 contingent asset database 34 contingency information 202 payment for portion of asset 502 available contingent asset blockchain record sets 500 step 5 – facilitate seller payment utilizing the payment for purchase of the portion of the first available contingent asset step 6 – identify a selected first available contingent asset blockchain enoded record of the first available contingent asset blockchain encoded record set that corresponds to the portion of the first available contingent asset step 7 – update at least some of the first available contingent asset blockchain encoded record set based on the portion of the first available contingent asset to indicate reassignment of at least a portion of the first available contingent asset from the seller to the buyer

FIG. 14H contingency risk threshold level risk first asset first asset created subset of available contingent asset blockchain record sets published to buyer contingent asset purchase requests received within a purchase timeframe purchase of the portion of the first available contingent asset completed contingent non-contingent time t0   t1   t2   t3   t4   t5   t6   t7

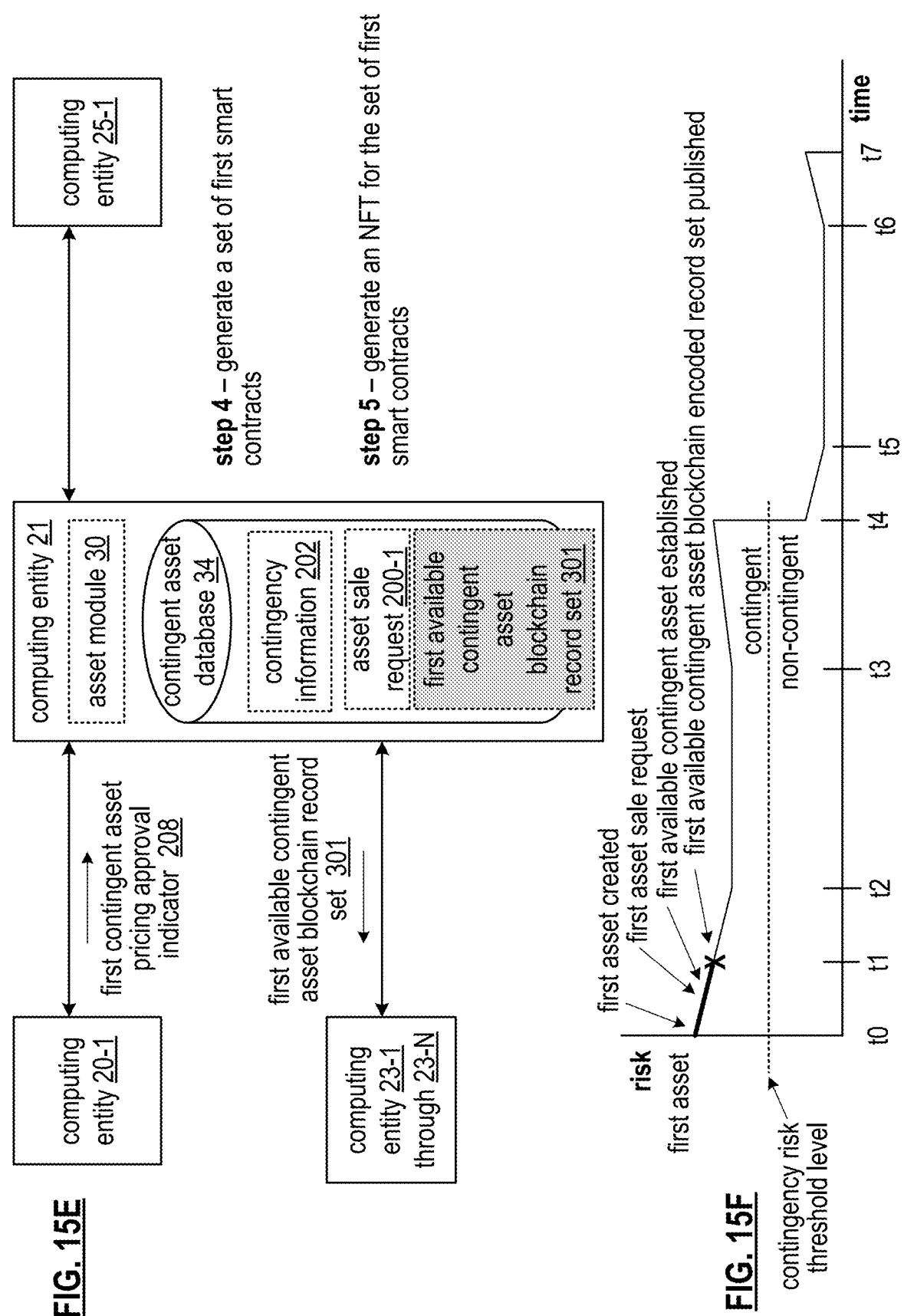

FIG. 15E computing entity 25-1 computing entity 21 asset module 30 contingent asset database 34 contingency information 202 asset sale request 200-1 first available contingent asset blockchain record set 301 computing entity 20-1 first contingent asset pricing approval indicator 208 first available contingent asset blockchain record set 301 computing entity 23-1 through 23-N step 4 – generate a set of first smart contracts step 5 – generate an NFT for the set of first smart contracts

FIG. 15F risk first asset first asset created first asset sale request first available contingent asset established first available contingent asset blockchain encoded record set published contingent non-contingent contingency risk threshold level t0  t1  t2  t3  t4  t5  t6  t7  time

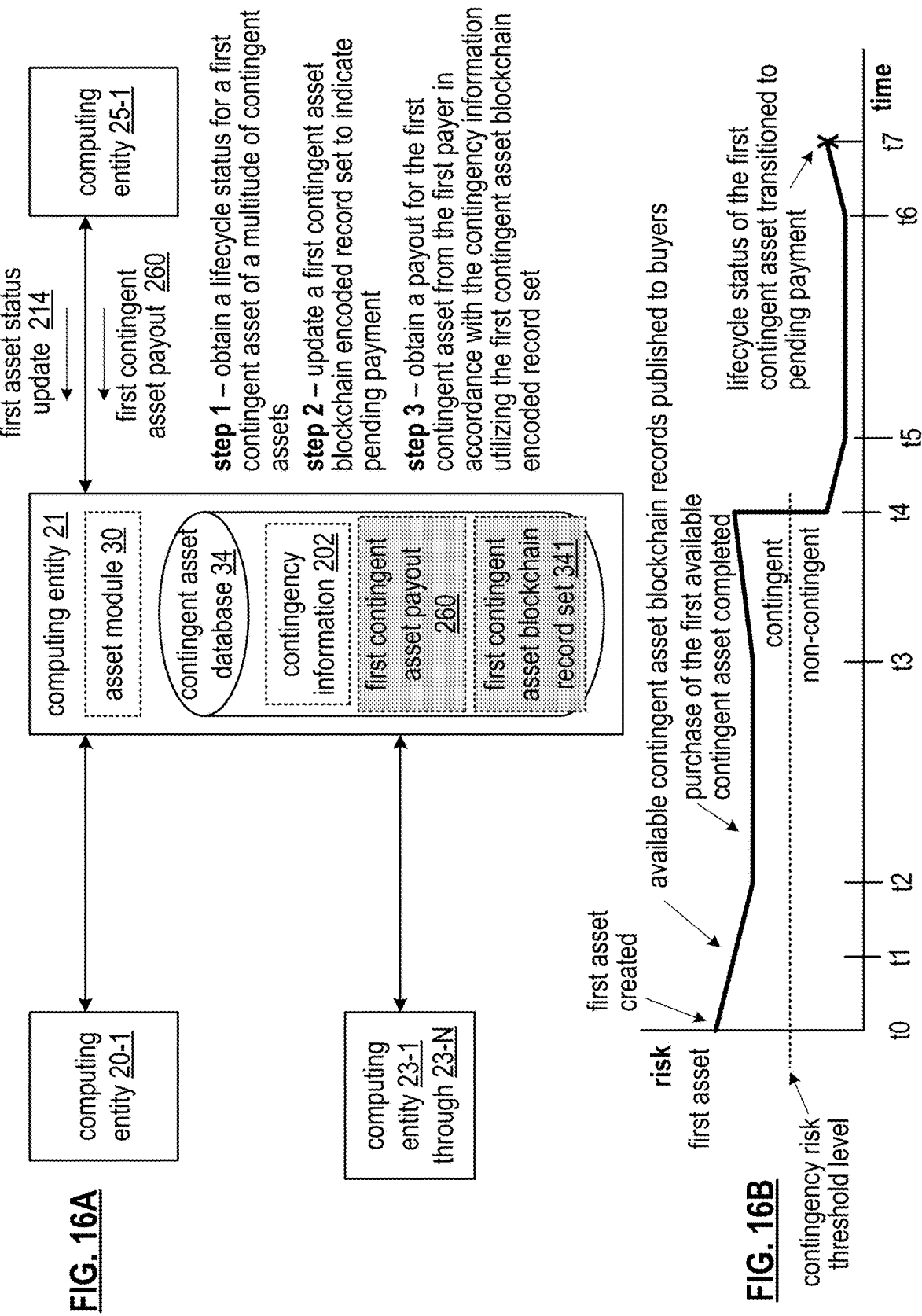

FIG. 16A computing entity 20-1 computing entity 21 asset module 30 contingent asset database 34 contingency information 202 first contingent asset payout 260 first contingent asset blockchain record set 341 computing entity 23-1 through 23-N first asset status update 214 first contingent asset payout 260 computing entity 25-1 step 1 – obtain a lifecycle status for a first contingent asset of a multitude of contingent assets step 2 – update a first contingent asset blockchain encoded record set to indicate pending payment step 3 – obtain a payout for the first contingent asset from the first payer in accordance with the contingency information utilizing the first contingent asset blockchain encoded record set

FIG. 16B risk
first asset first asset created available contingent asset blockchain records published to buyers purchase of the first available contingent asset completed contingent non-contingent lifecycle status of the first contingent asset transitioned to pending payment contingency risk threshold level t0   t1   t2   t3   t4   t5   t6   t7   time

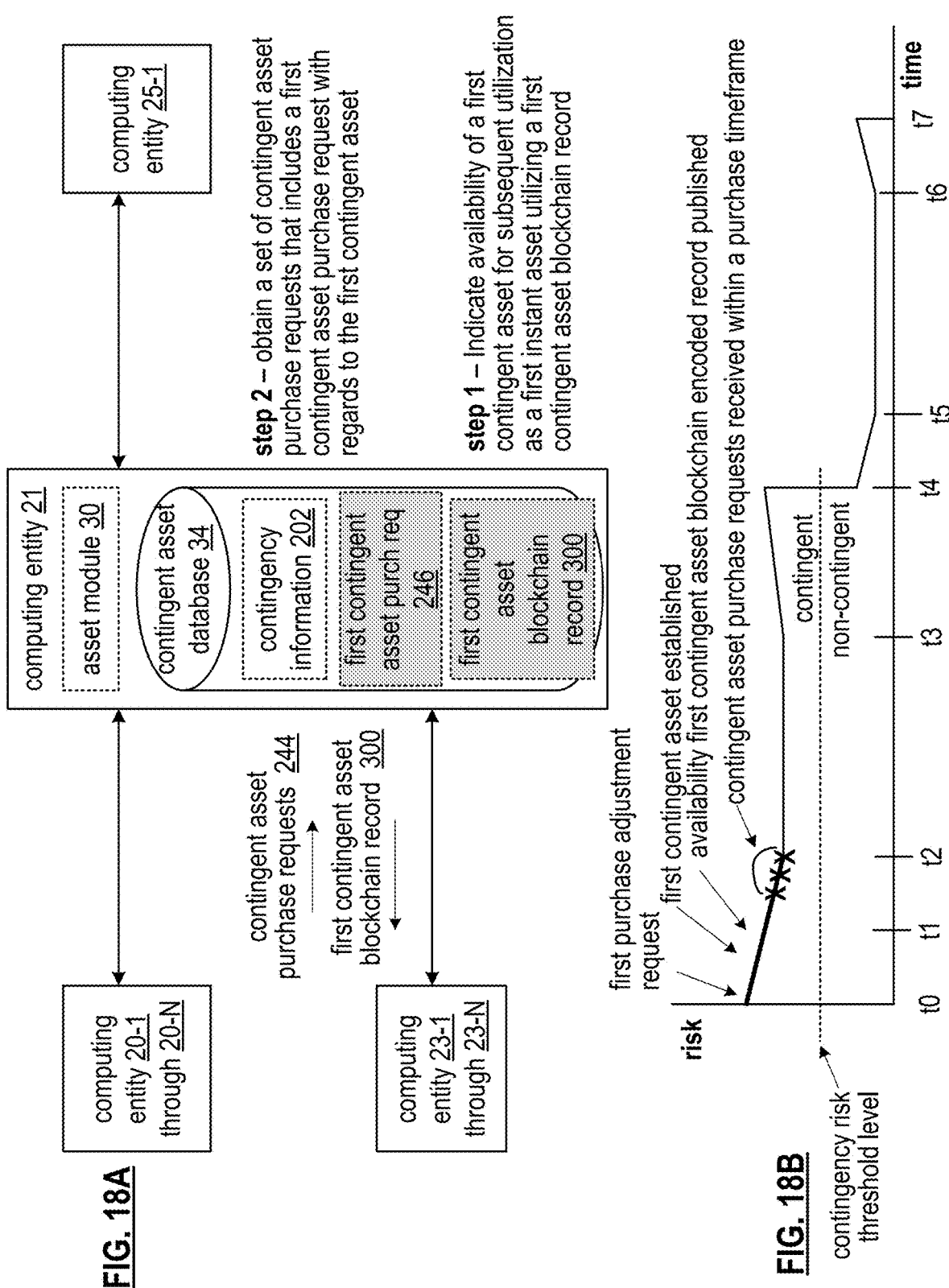

FIG. 18A computing entity 25-1 computing entity 21 asset module 30 contingent asset database 34 contingency information 202 first contingent asset purch req 246 first contingent asset blockchain record 300 computing entity 20-1 through 20-N contingent asset purchase requests 244 first contingent asset blockchain record 300 computing entity 23-1 through 23-N step 2 – obtain a set of contingent asset purchase requests that includes a first contingent asset purchase request with regards to the first contingent asset step 1 – Indicate availability of a first contingent asset for subsequent utilization as a first instant asset utilizing a first contingent asset blockchain record

FIG. 18B risk contingency risk threshold level first purchase adjustment request first contingent asset established availability first contingent asset blockchain encoded record published contingent asset purchase requests received within a purchase timeframe contingent non-contingent t0  t1  t2  t3  t4  t5  t6  t7  time

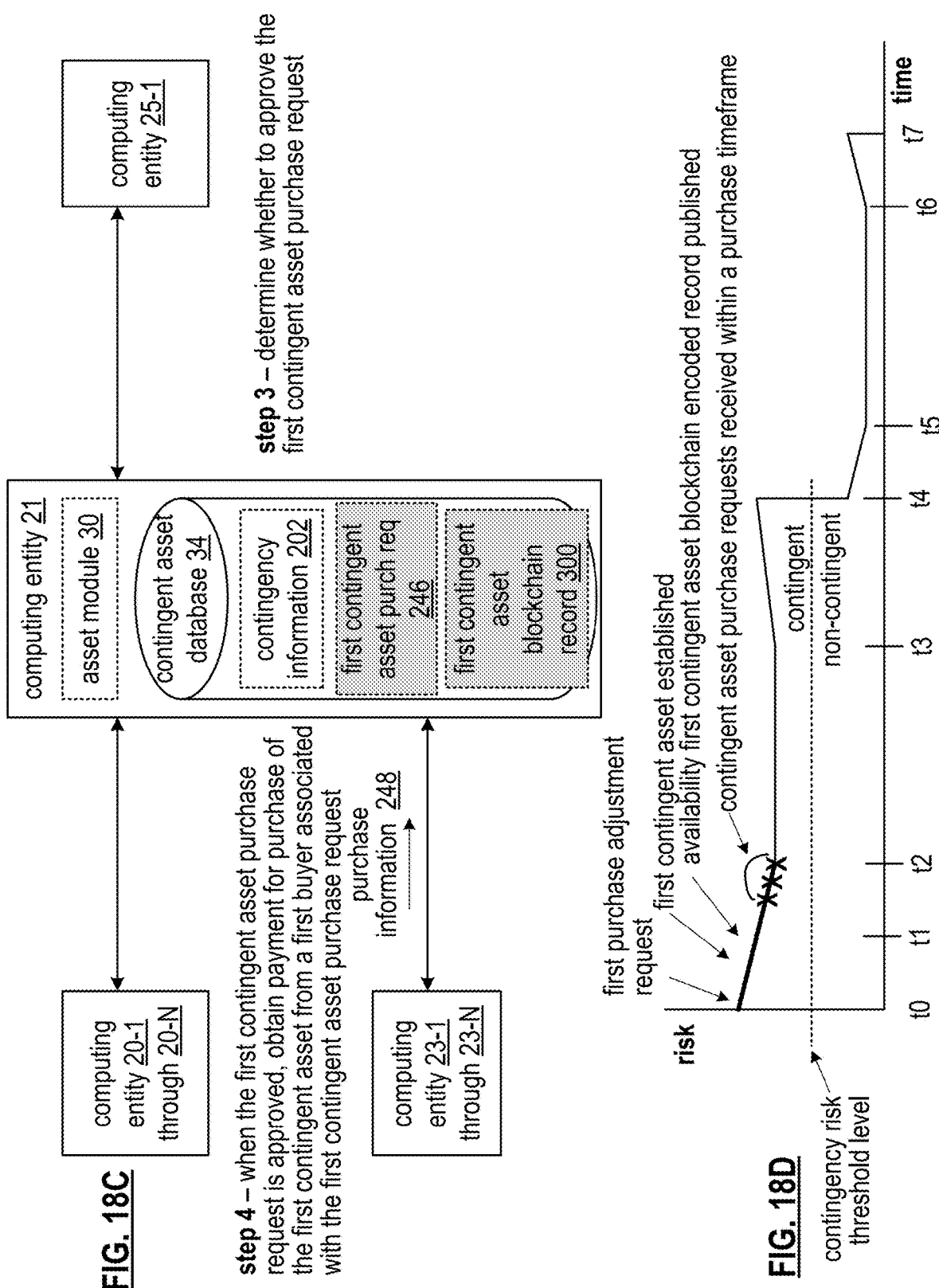

FIG. 18C computing entity 25-1 computing entity 21 asset module 30 contingent asset database 34 contingency information 202 first contingent asset purch req 246 first contingent asset blockchain record 300 computing entity 20-1 through 20-N computing entity 23-1 through 23-N purchase information 248 step 3 – determine whether to approve the first contingent asset purchase request step 4 – when the first contingent asset purchase request is approved, obtain payment for purchase of the first contingent asset from a first buyer associated with the first contingent asset purchase request

FIG. 18D risk contingency risk threshold level first purchase adjustment request first contingent asset purchase request first contingent asset established availability first contingent asset blockchain encoded record published contingent asset purchase requests received within a purchase timeframe contingent non-contingent t0  t1  t2  t3  t4  t5  t6  t7    time

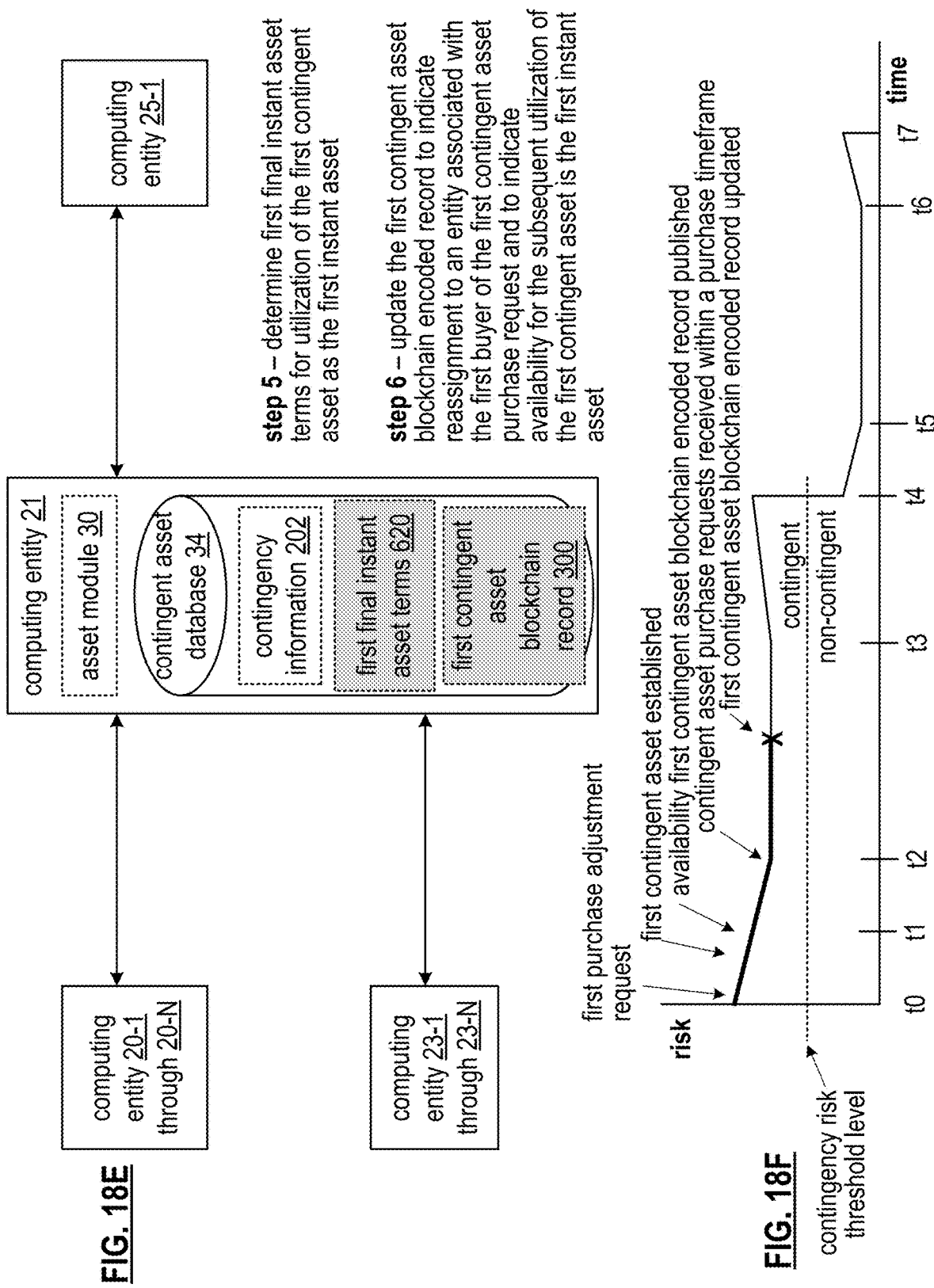

FIG. 18E computing entity 25-1 computing entity 21 asset module 30 contingent asset database 34 contingency information 202 first final instant asset terms 620 first contingent asset blockchain record 300 computing entity 20-1 through 20-N computing entity 23-1 through 23-N step 5 – determine first final instant asset terms for utilization of the first contingent asset as the first instant asset step 6 – update the first contingent asset blockchain encoded record to indicate reassignment to an entity associated with the first buyer of the first contingent asset purchase request and to indicate availability for the subsequent utilization of the first contingent asset is the first instant asset

FIG. 18F risk first purchase adjustment request first contingent asset established availability first contingent asset blockchain encoded record published contingent asset purchase requests received within a purchase timeframe first contingent asset blockchain encoded record updated contingent non-contingent contingency risk threshold level t0   t1   t2   t3   t4   t5   t6   t7   time

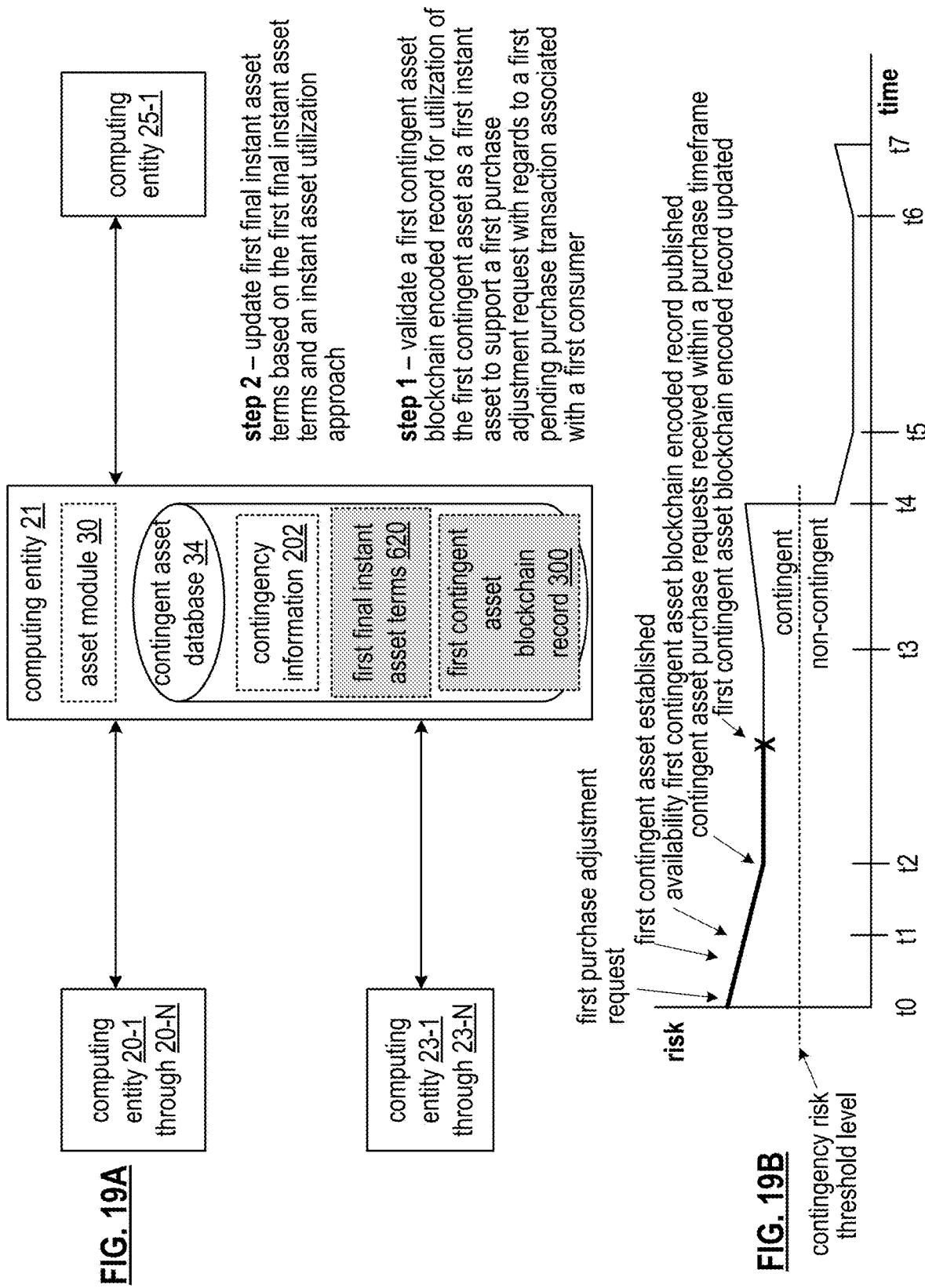

FIG. 19A computing entity 25-1 computing entity 21 asset module 30 contingent asset database 34 contingency information 202 first final instant asset terms 620 first contingent asset blockchain record 300 computing entity 20-1 through 20-N computing entity 23-1 through 23-N step 2 – update first final instant asset terms based on the first final instant asset terms and an instant asset utilization approach step 1 – validate a first contingent asset blockchain encoded record for utilization of the first contingent asset as a first instant asset to support a first purchase adjustment request with regards to a first pending purchase transaction associated with a first consumer

FIG. 19B risk contingency risk threshold level first purchase adjustment request first contingent asset established availability first contingent asset blockchain encoded record published contingent asset purchase requests received within a purchase timeframe first contingent asset blockchain encoded record updated contingent non-contingent t0  t1  t2  t3  t4  t5  t6  t7  time

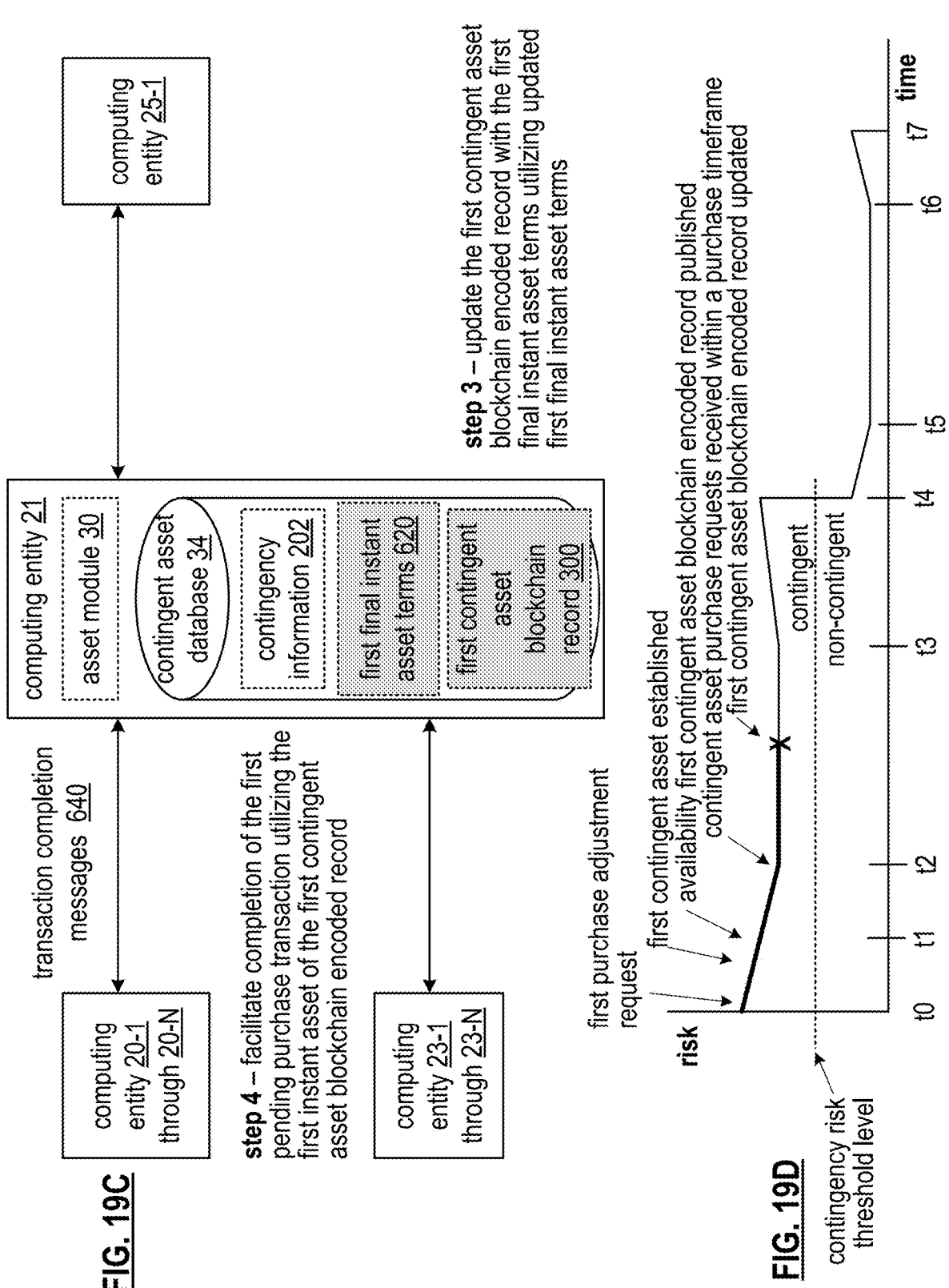

FIG. 19C computing entity 25-1 computing entity 21 asset module 30 contingent asset database 34 contingency information 202 first final instant asset terms 620 first contingent asset blockchain record 300 transaction completion messages 640 computing entity 20-1 through 20-N computing entity 23-1 through 23-N step 3 – update the first contingent asset blockchain encoded record with the first final instant asset terms utilizing updated first final instant asset terms step 4 – facilitate completion of the first pending purchase transaction utilizing the first instant asset of the first contingent asset blockchain encoded record

FIG. 19D risk time t0  t1  t2  t3  t4  t5  t6  t7 contingency risk threshold level first purchase adjustment request first contingent asset established availability first contingent asset blockchain encoded record published contingent asset purchase requests received within a purchase timeframe first contingent asset blockchain encoded record updated contingent non-contingent

UTILIZING A PUBLIC BENEFIT ASSETS SECURE TOKEN

CROSS-REFERENCE TO RELATED APPLICATIONS

The present U.S. Utility Patent Application claims priority pursuant to 35 U.S.C. § 119(e) to U.S. Provisional Application No. 63/526,591, entitled "UTILIZING A PUBLIC BENEFIT ASSETS SECURE TOKEN", filed Jul. 13, 2023, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer systems and more particularly to computer systems providing risk analysis.

Description of Related Art

Computer systems communicate data, process data, and/or store data. Such computer systems include computing devices that range from wireless smart phones, laptops, tablets, personal computers (PC), work stations, personal three-dimensional (3-D) content viewers, and video game devices, to data centers where data servers store and provide access to digital content. Some digital content is utilized to represent various aspects of assets. Examples of representations includes an asset type, an asset value, a value guarantee, an asset owner identifier, etc.

A variety of asset computing systems utilize asset listing and asset transaction techniques when asset valuation is not subject to a contingency. For example, a stock asset is offered on an exchange at a market price and is sold to a buyer. As another example, a receivable asset is offered on another exchange at another market price and is sold to another buyer.

BRIEF DESCRIPTION OF THE SEVERAL VIEWS OF THE DRAWING(S)

FIGS. 5A-5H are schematic block diagrams of another embodiment of a computing system and a contingent asset risk chart illustrating an example of listing a contingent asset for sale in accordance with the present invention;

FIGS. 7A-7H are schematic block diagrams of another embodiment of a computing system and a contingent asset risk chart illustrating an example of executing a sale of a contingent asset to a buyer from a seller in accordance with the present invention;

FIGS. 8A-8D are schematic block diagrams of another embodiment of a computing system and a contingent asset risk chart illustrating an example of facilitating payment from a payer to a buyer for a contingent asset in accordance with the present invention;

FIGS. 9E-9M are schematic block diagrams of another embodiment of a computing system, contingent asset risk charts, and a blockchain record illustrating an example of listing a contingent asset for sale utilizing an object distributed ledger in accordance with the present invention;

FIGS. 10A-10F are schematic block diagrams of another embodiment of a computing system and a contingent asset risk chart illustrating an example of updating a listing for a contingent asset for sale utilizing a blockchain record in accordance with the present invention;

FIGS. 11A-11H are schematic block diagrams of another embodiment of a computing system and a contingent asset risk chart illustrating an example of executing a sale of a contingent asset to a buyer from a seller utilizing a blockchain record in accordance with the present invention;

FIGS. 12A-12D are schematic block diagrams of another embodiment of a computing system and a contingent asset risk chart illustrating an example of facilitating payment from a payer to a buyer for a contingent asset utilizing a blockchain record in accordance with the present invention;

FIGS. 13A-13F are schematic block diagrams of another embodiment of a computing system and a contingent asset risk chart illustrating an example of updating a listing for a contingent asset for sale utilizing a split blockchain record in accordance with the present invention;

FIGS. 14A-14H are schematic block diagrams of another embodiment of a computing system and a contingent asset risk chart illustrating an example of executing a sale of a portion of a contingent asset to a buyer from a seller utilizing a split blockchain record in accordance with the present invention;

FIGS. 15A-15H are schematic block diagrams of another embodiment of a computing system and a contingent asset risk chart illustrating an example of listing a contingent asset for sale utilizing a split blockchain record in accordance with the present invention.

FIGS. 16A-16D are schematic block diagrams of another embodiment of a computing system and a contingent asset risk chart illustrating an example of facilitating payment from a payer to a buyer for a contingent asset utilizing a split blockchain record in accordance with the present invention;

Figure 18G:
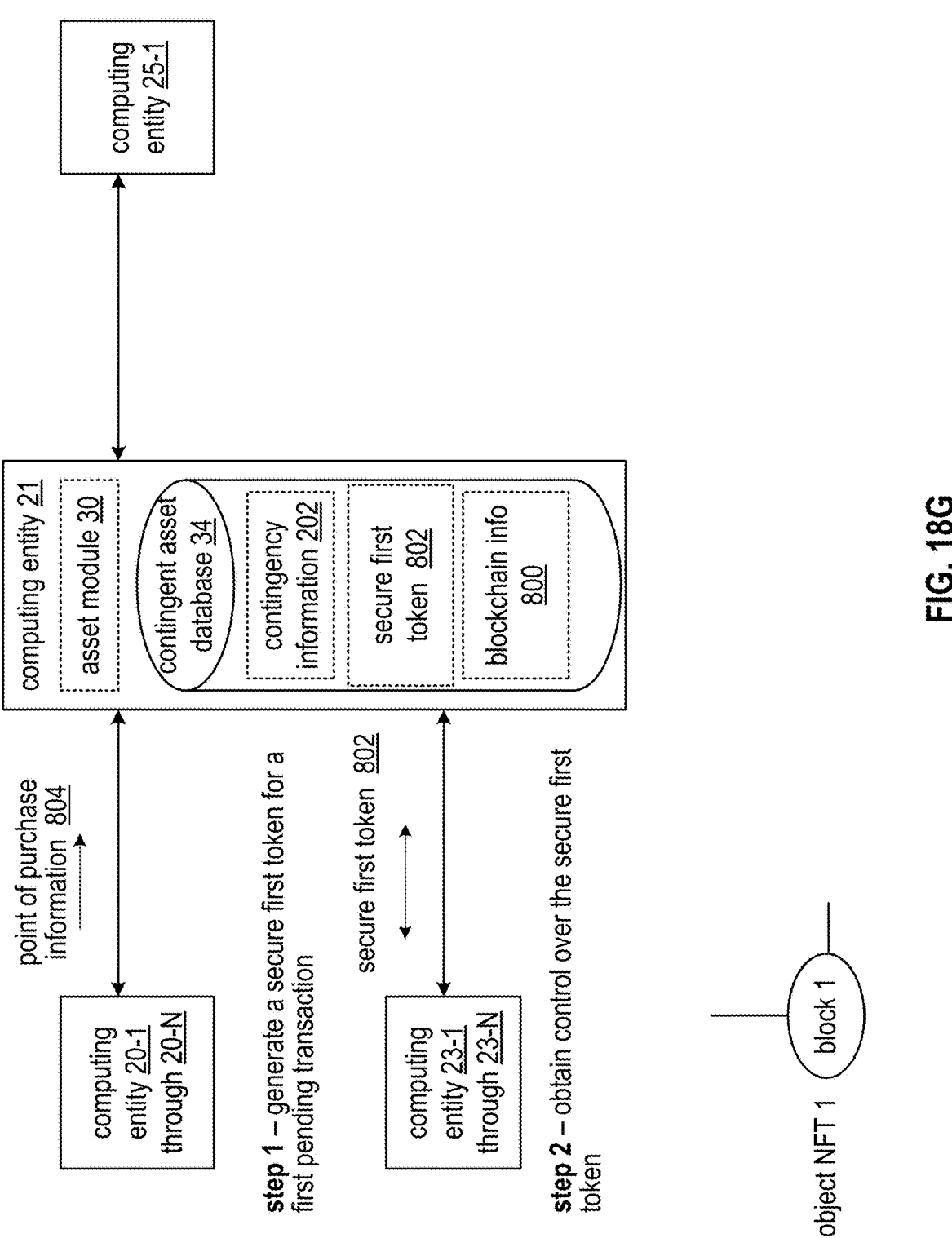
FIGS. 18A-18F are schematic block diagrams of another embodiment of a computing system and a contingent asset risk chart illustrating an example of executing a sale of a contingent asset for conversion into an instant asset at a point of purchase in accordance with the present invention.
Figure 18H:
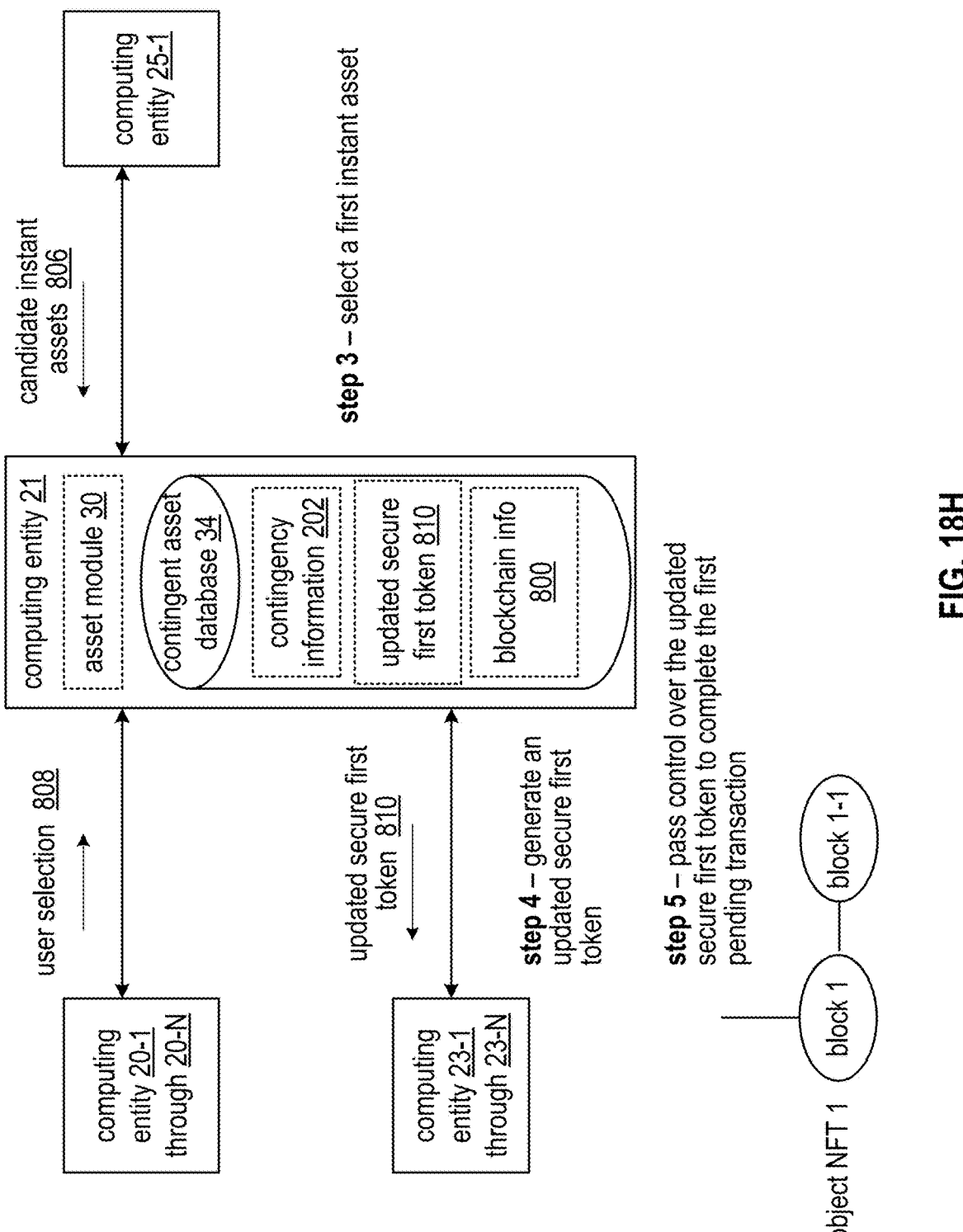
Figure 19E:
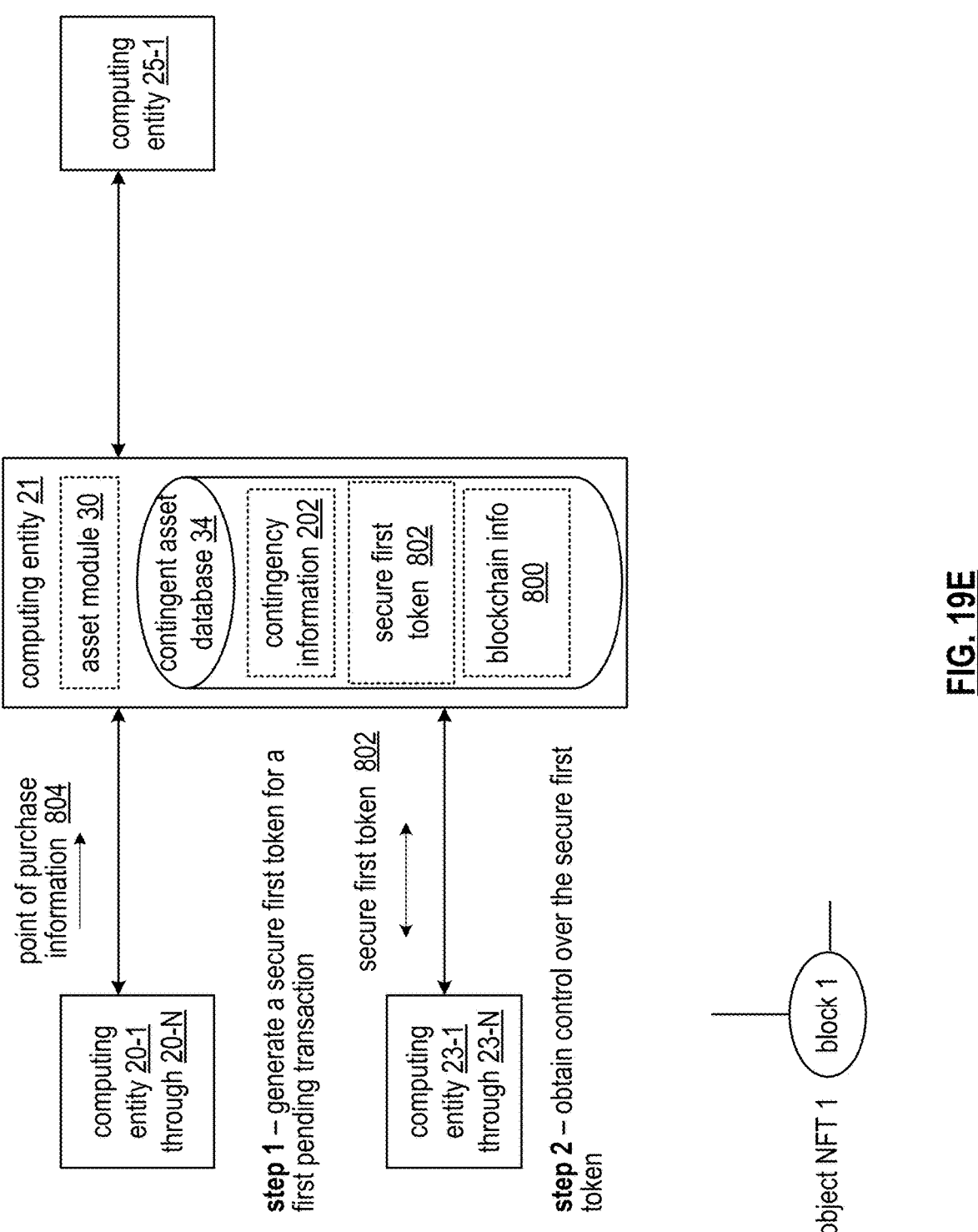
Figure 19F:
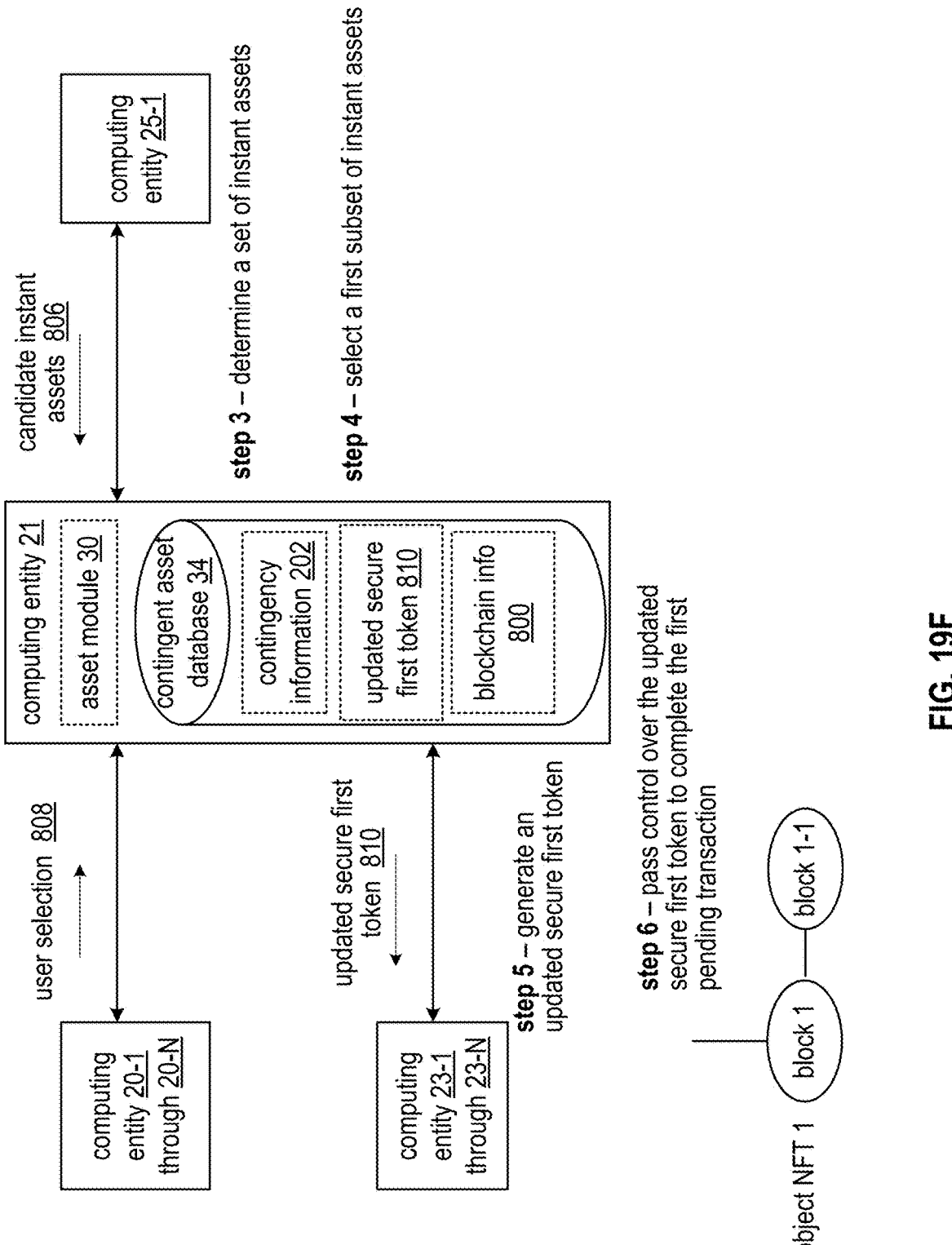
Figure 20A:
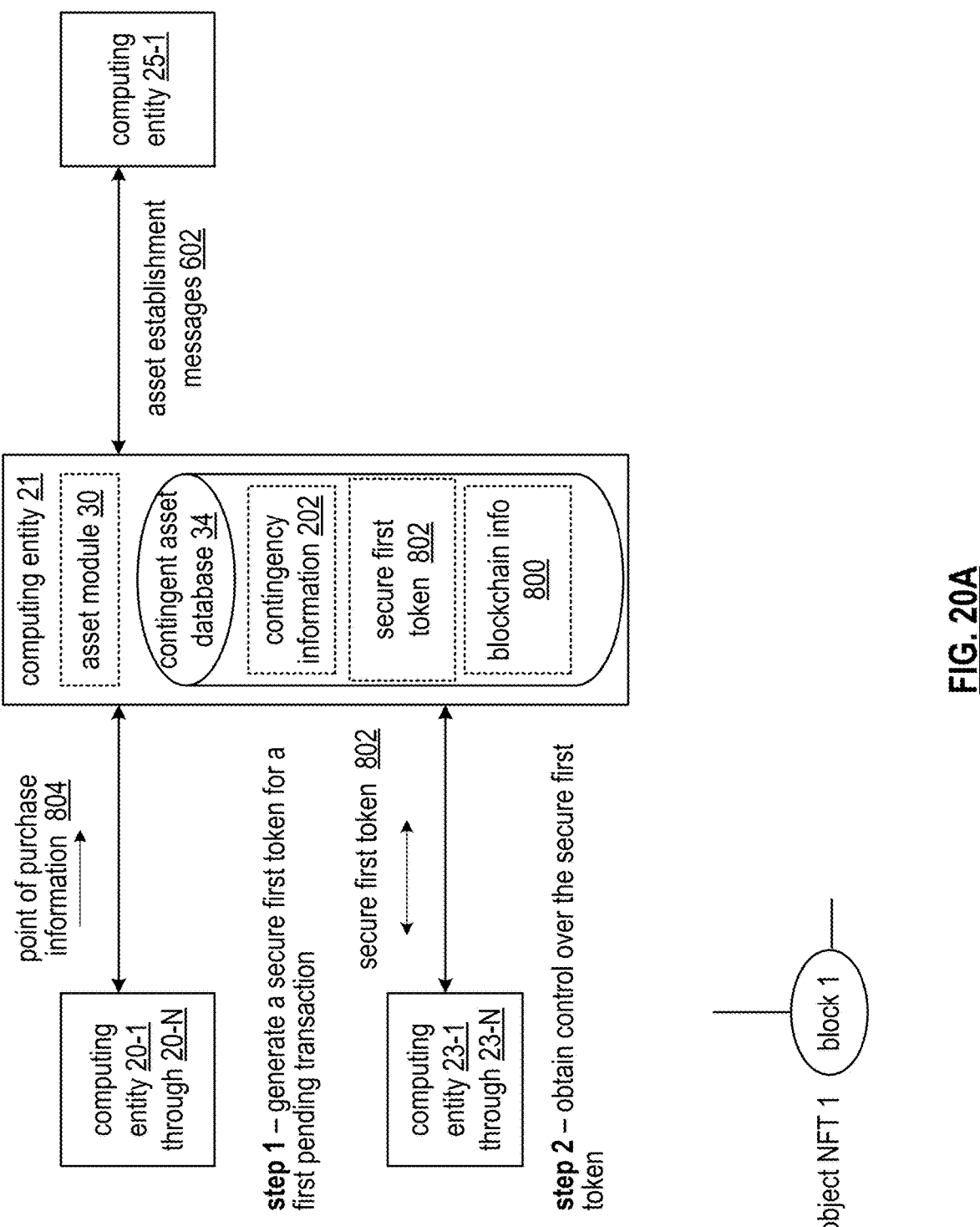
Figure 20B:
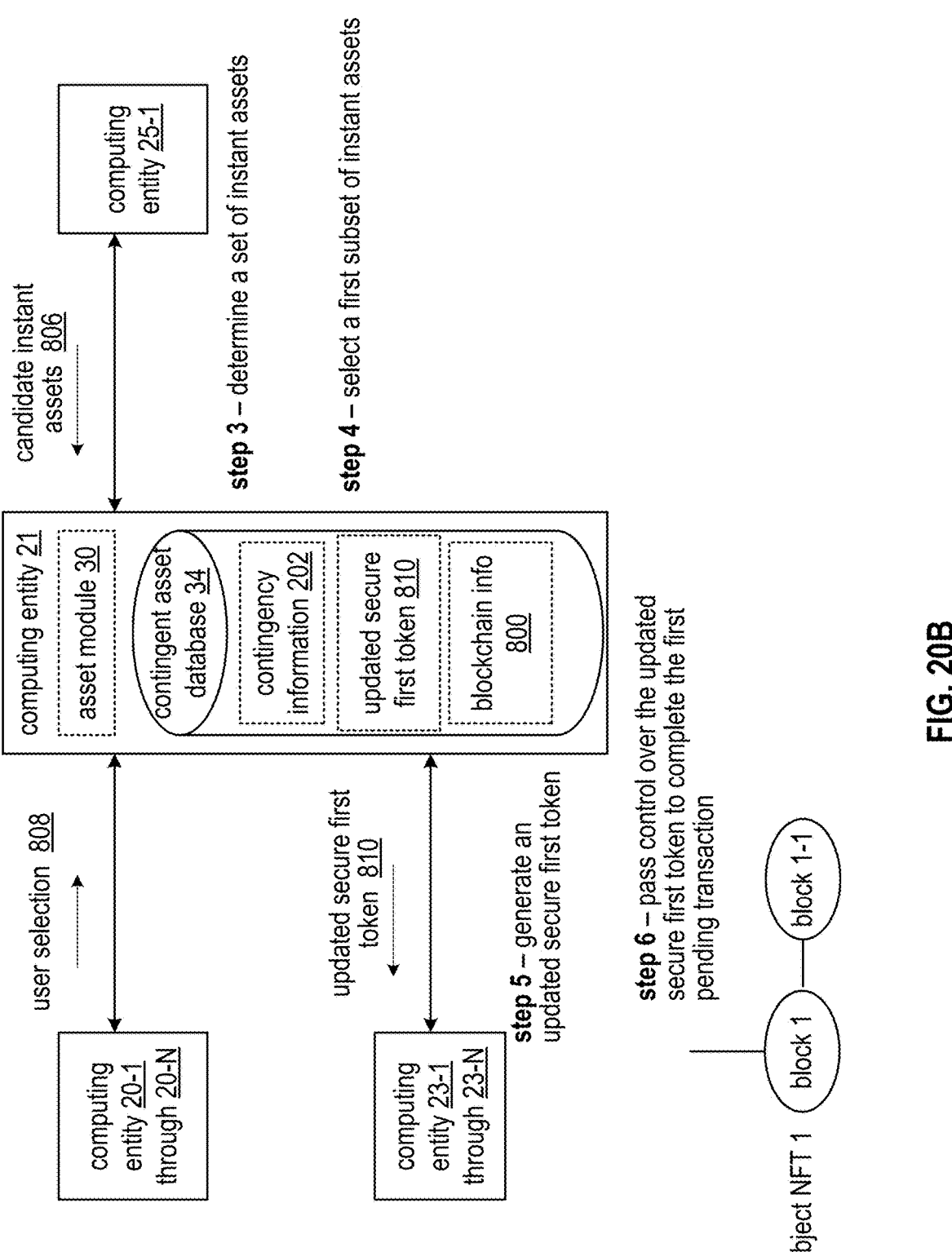
Figure 21A:
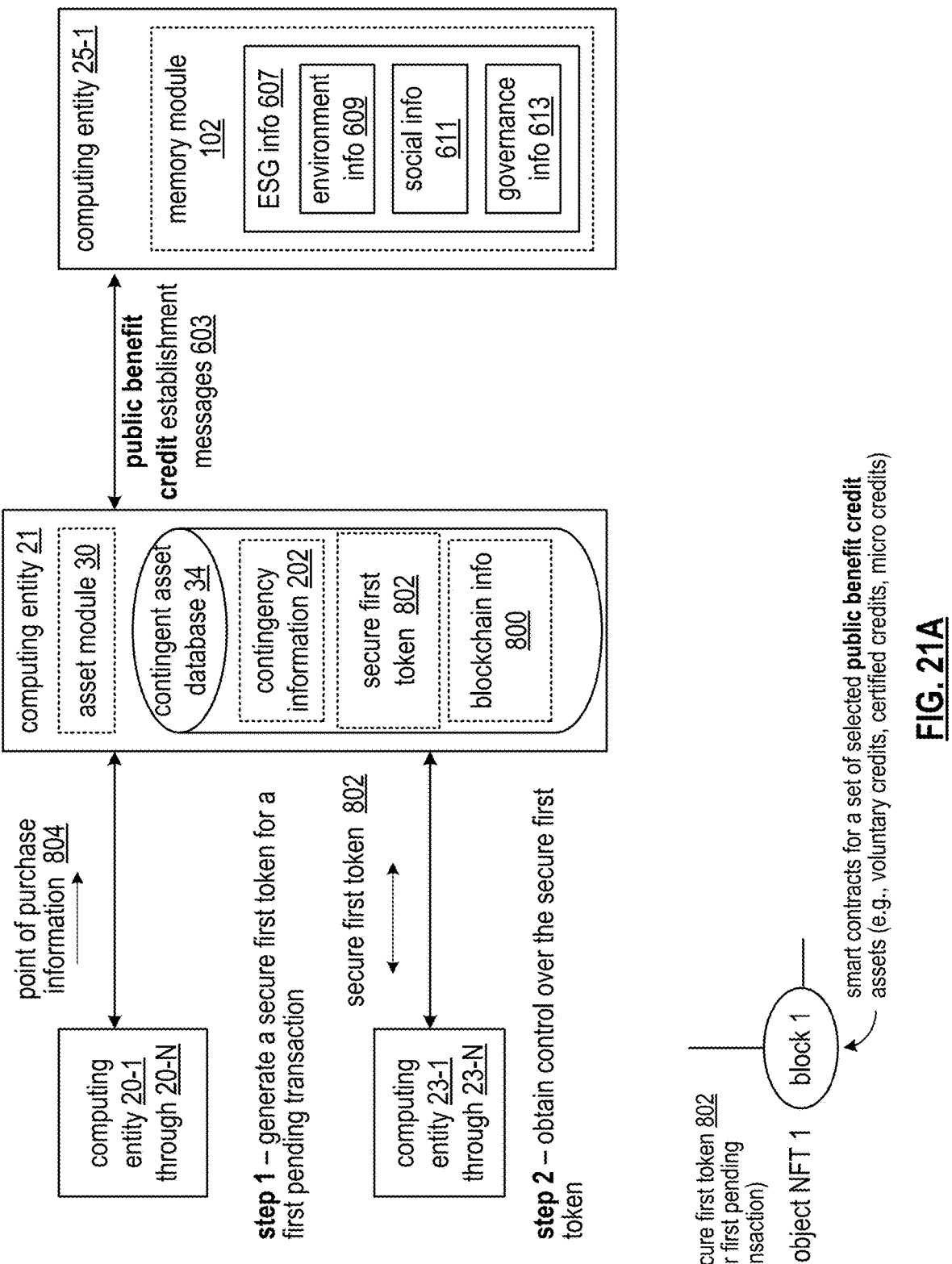
Figure 21B:
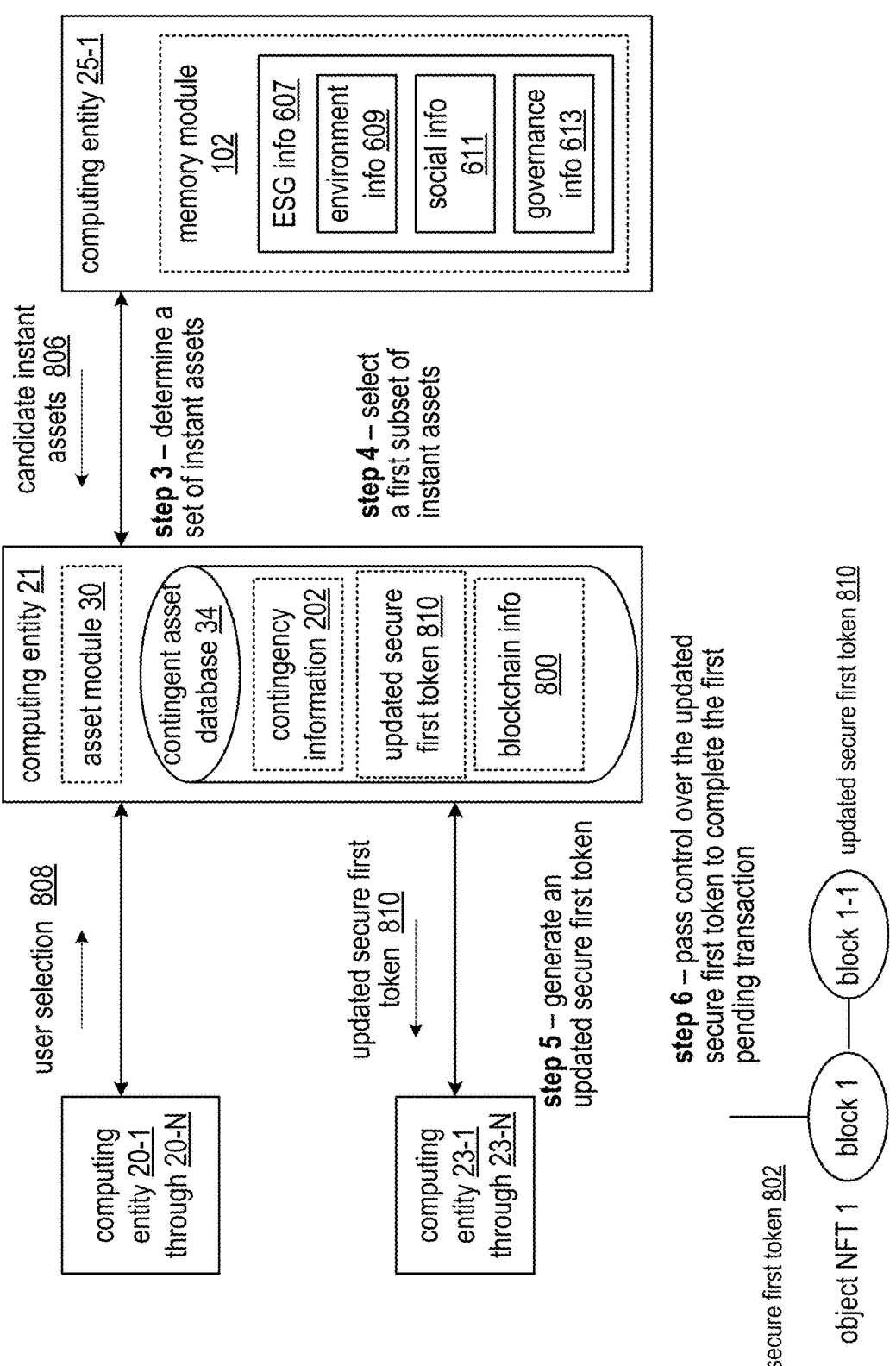
Figure 22A:
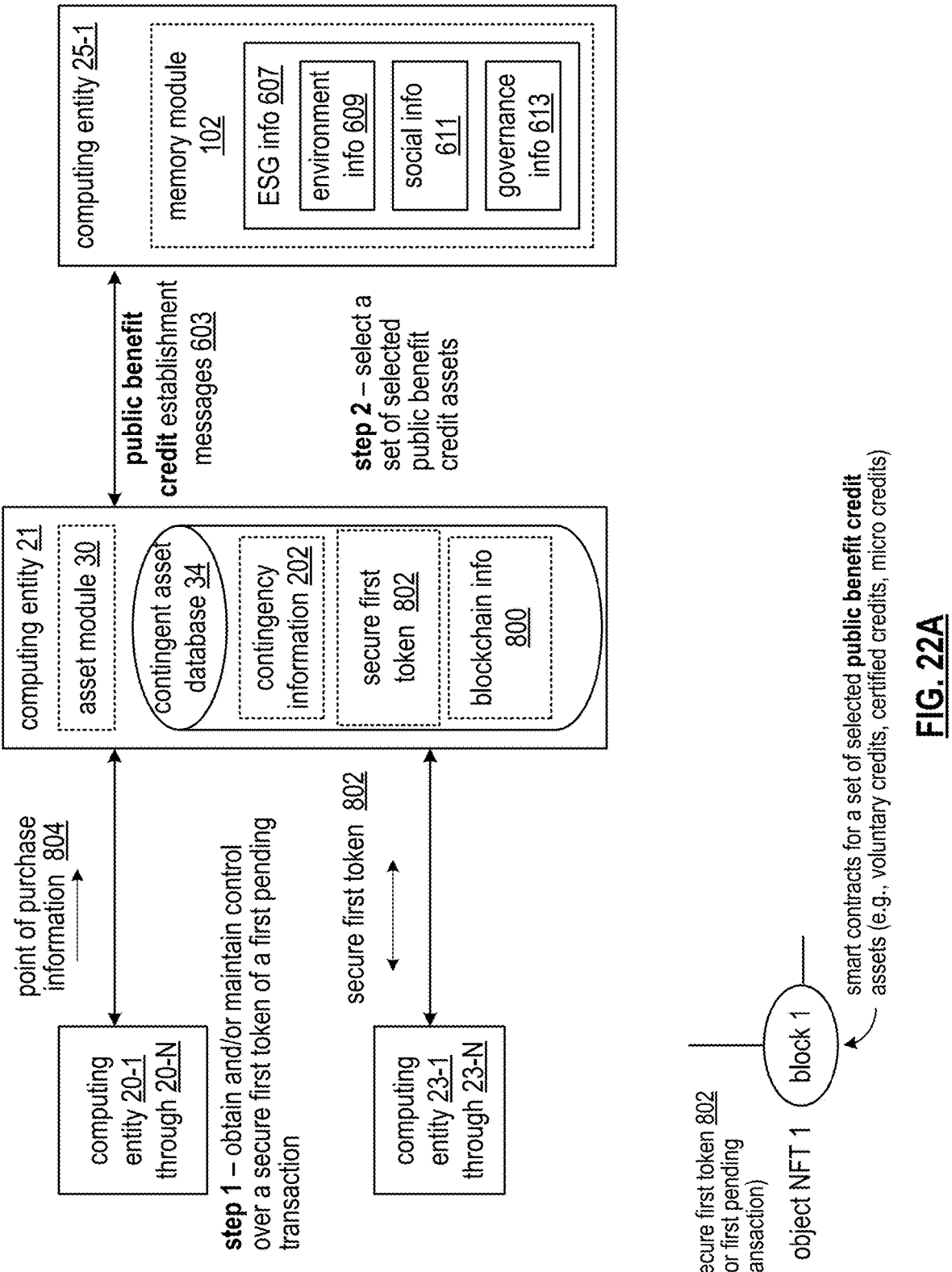
Figure 22B:
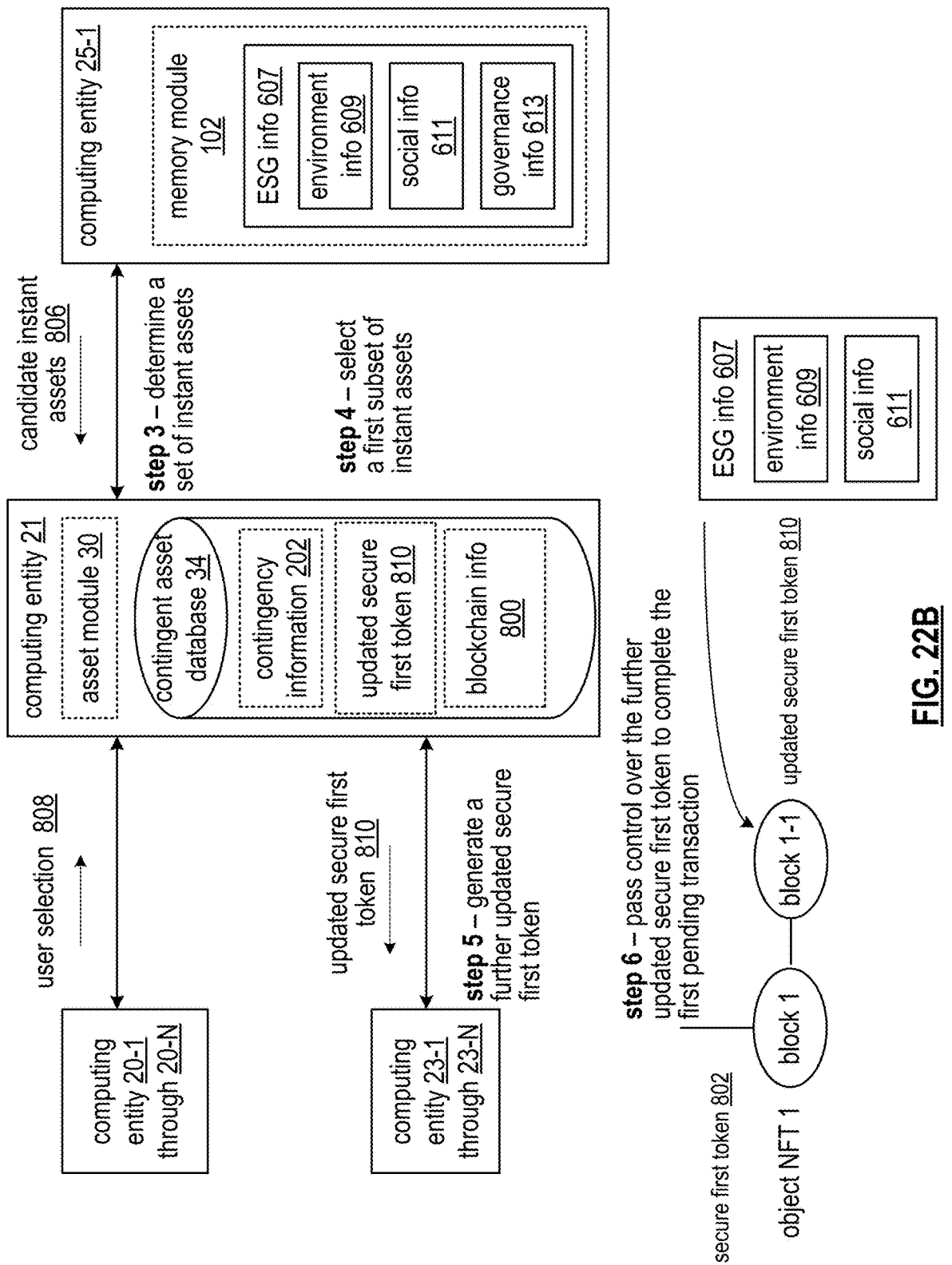
Figure 23A:
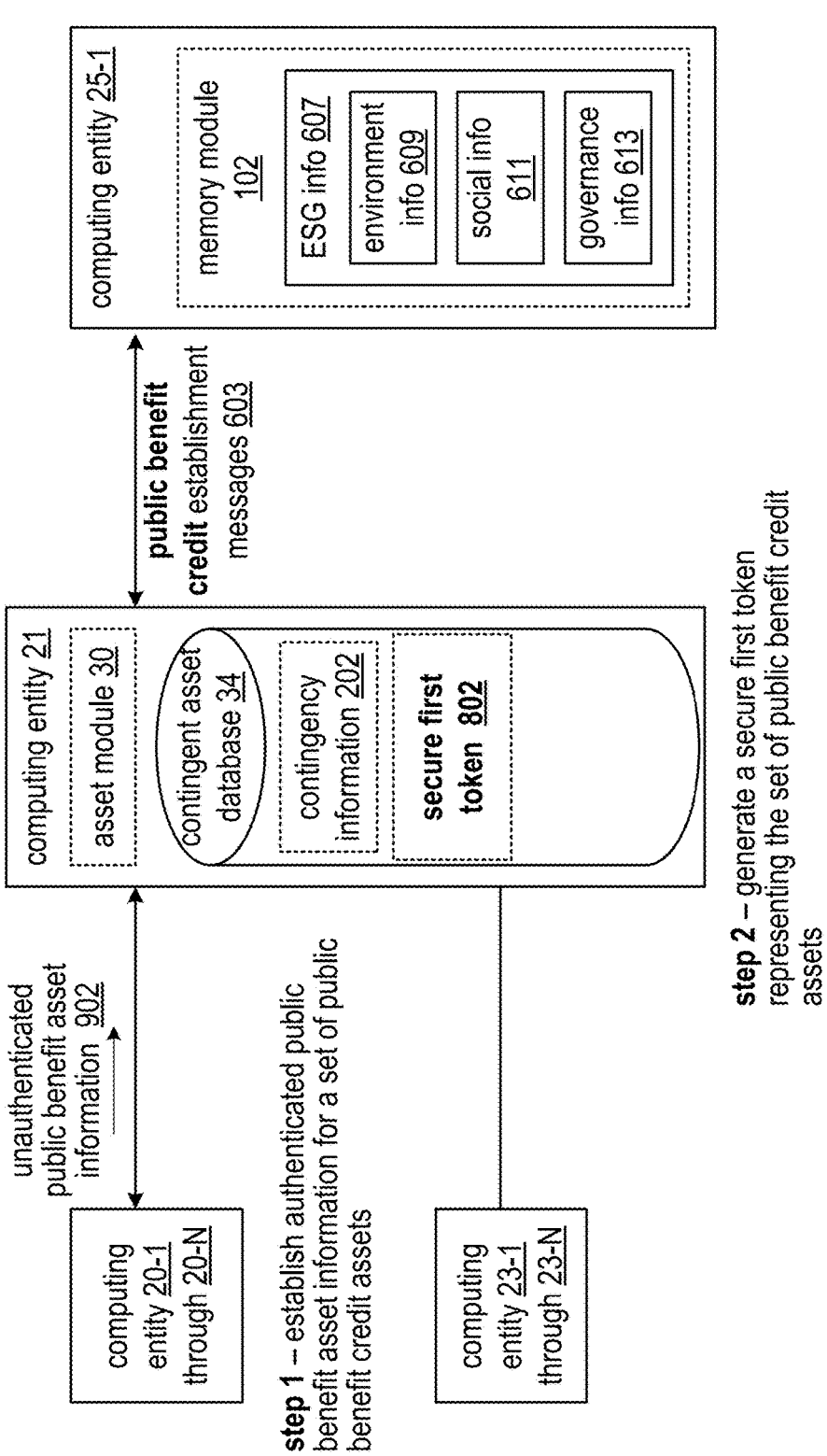
Figure 23B:
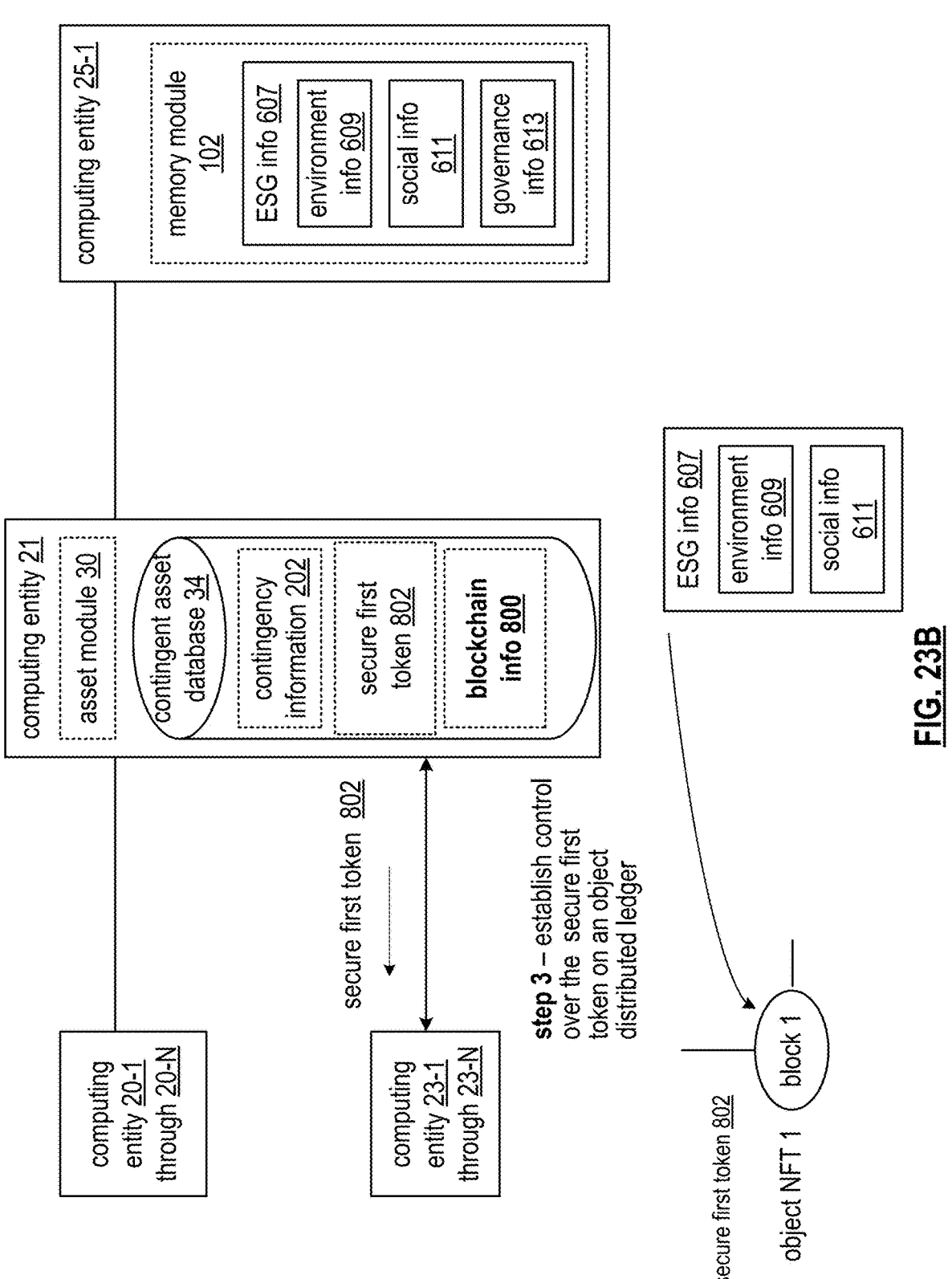
Figure 24A:
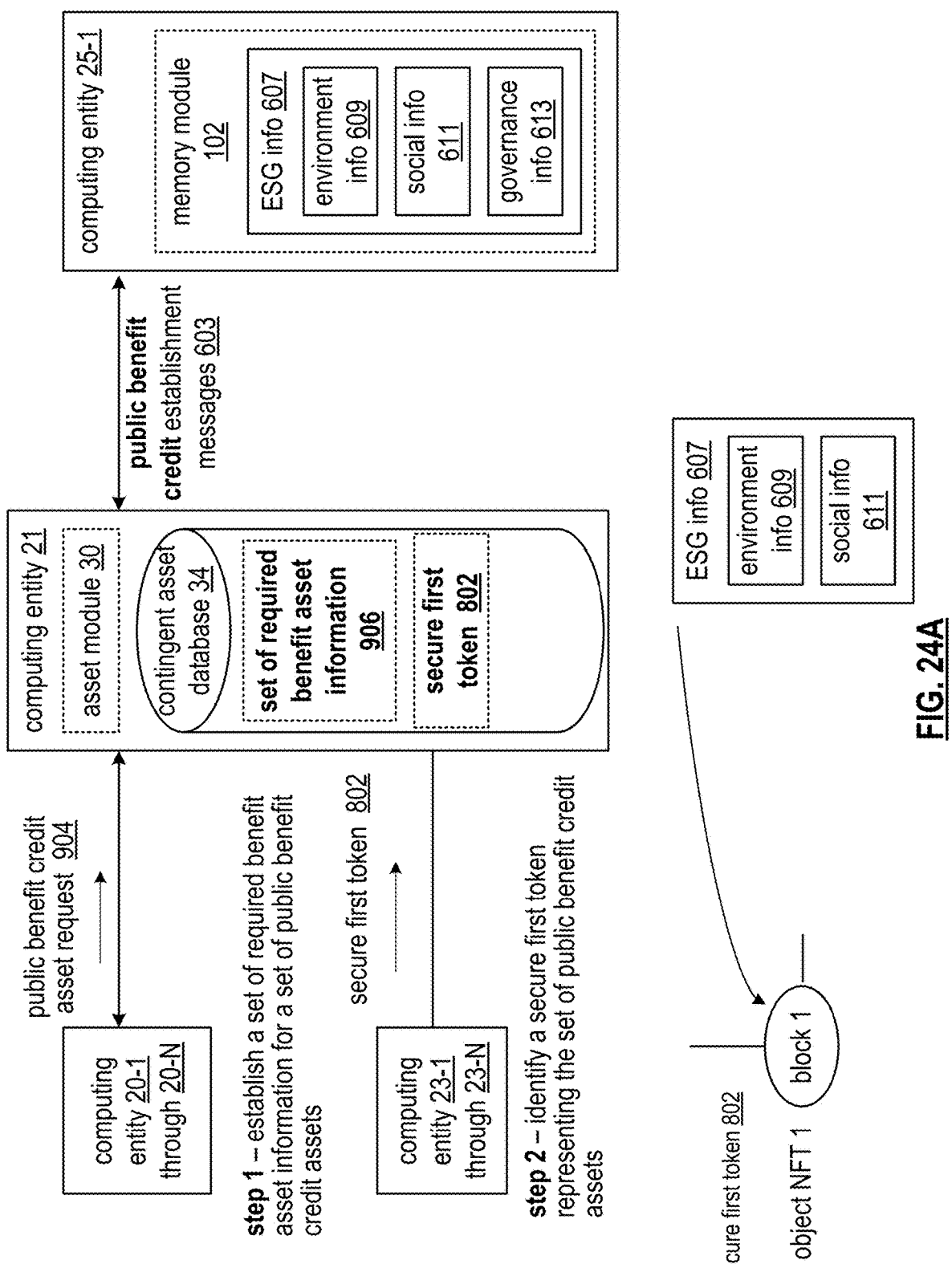
Figure 24B:
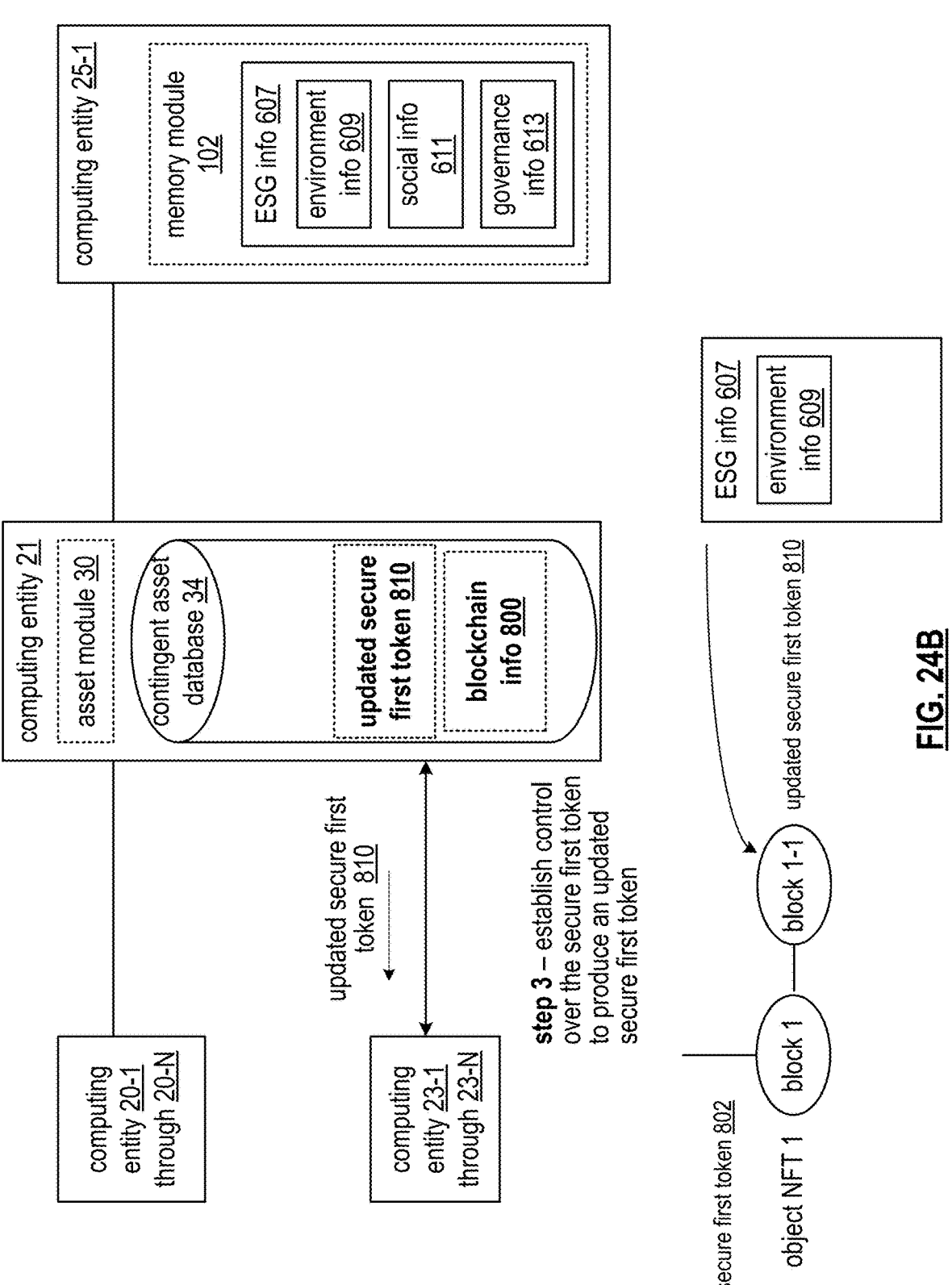
Figure 25A:
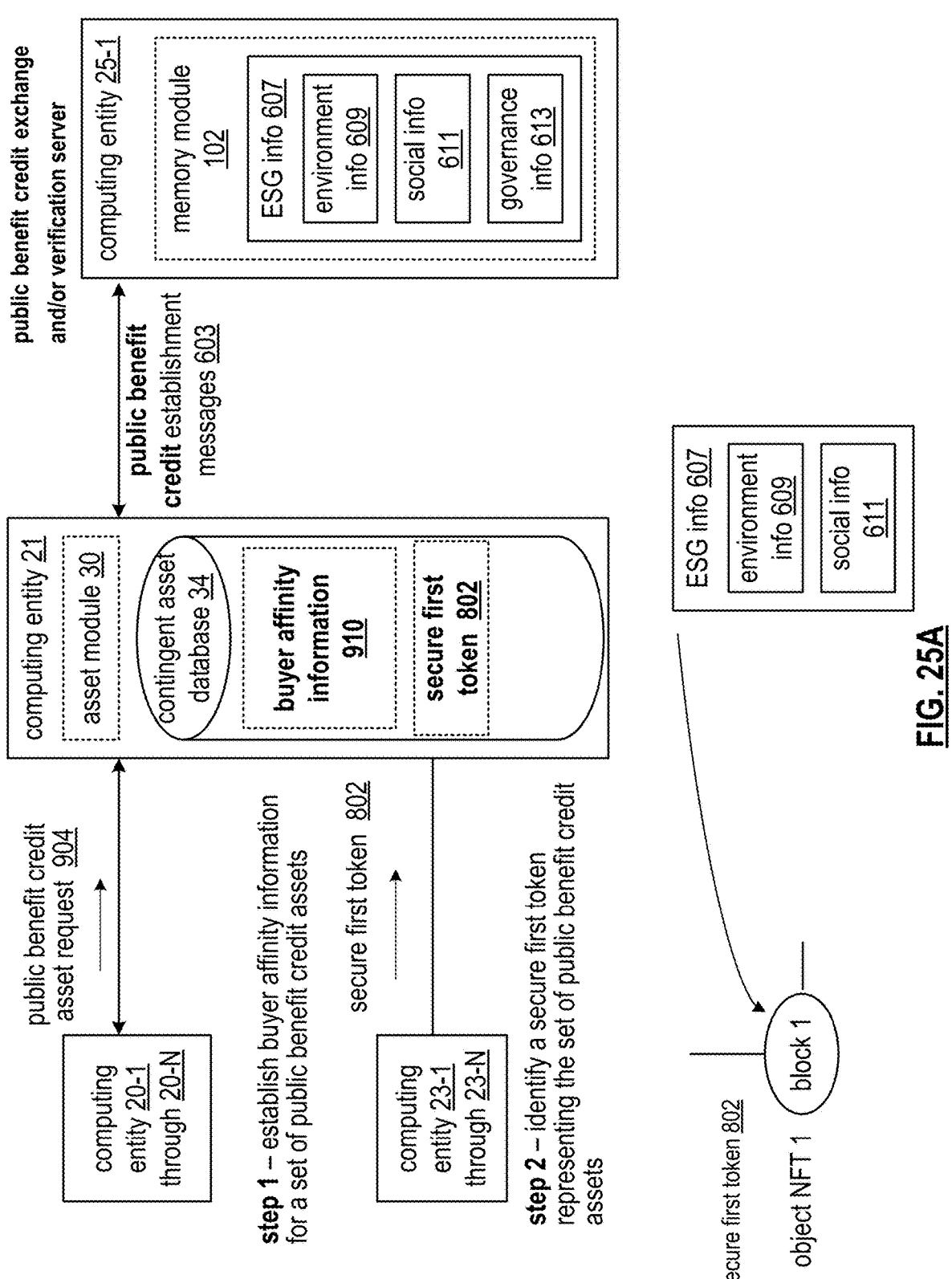
Figure 25B:
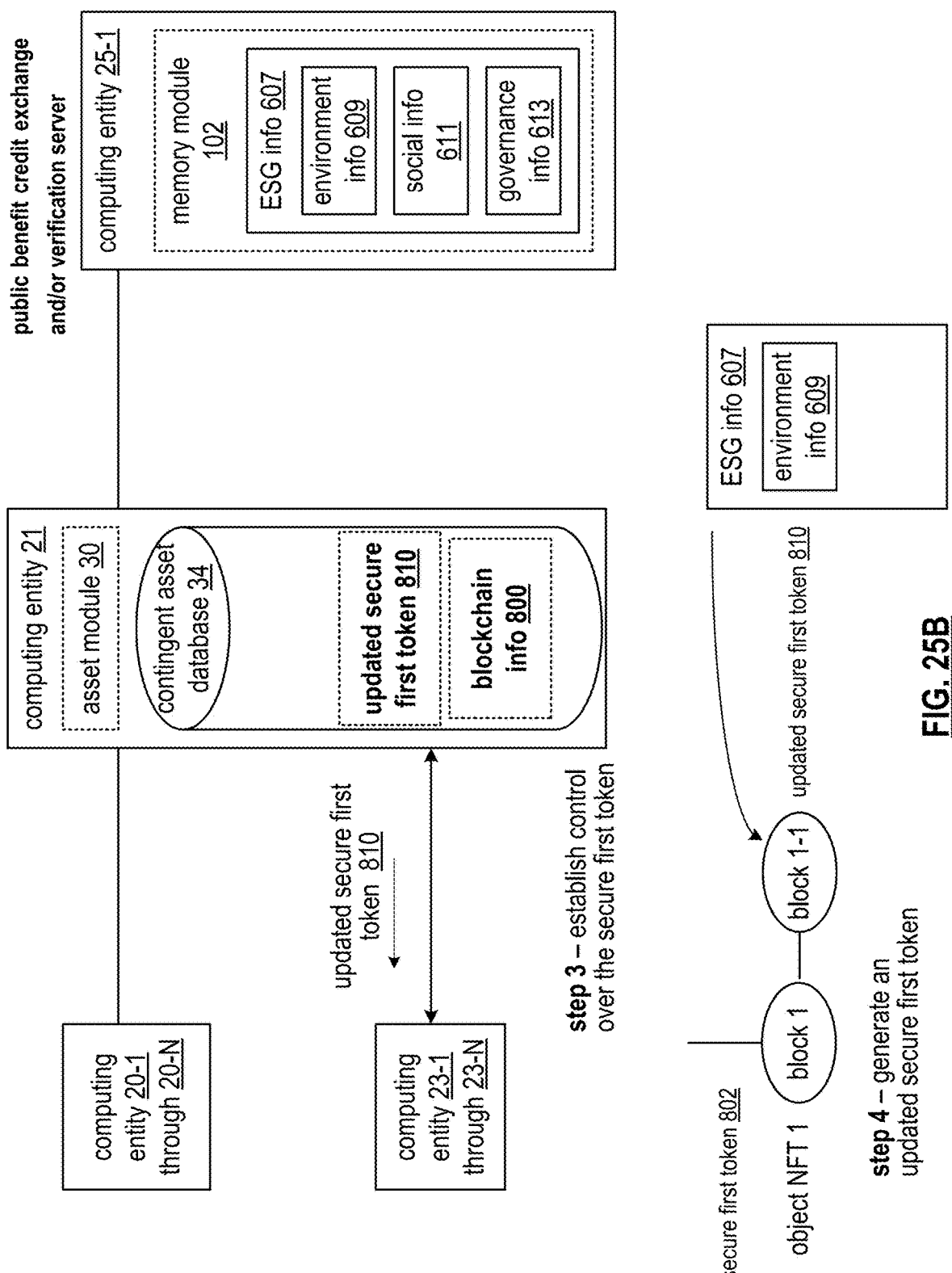
Figure 26A:
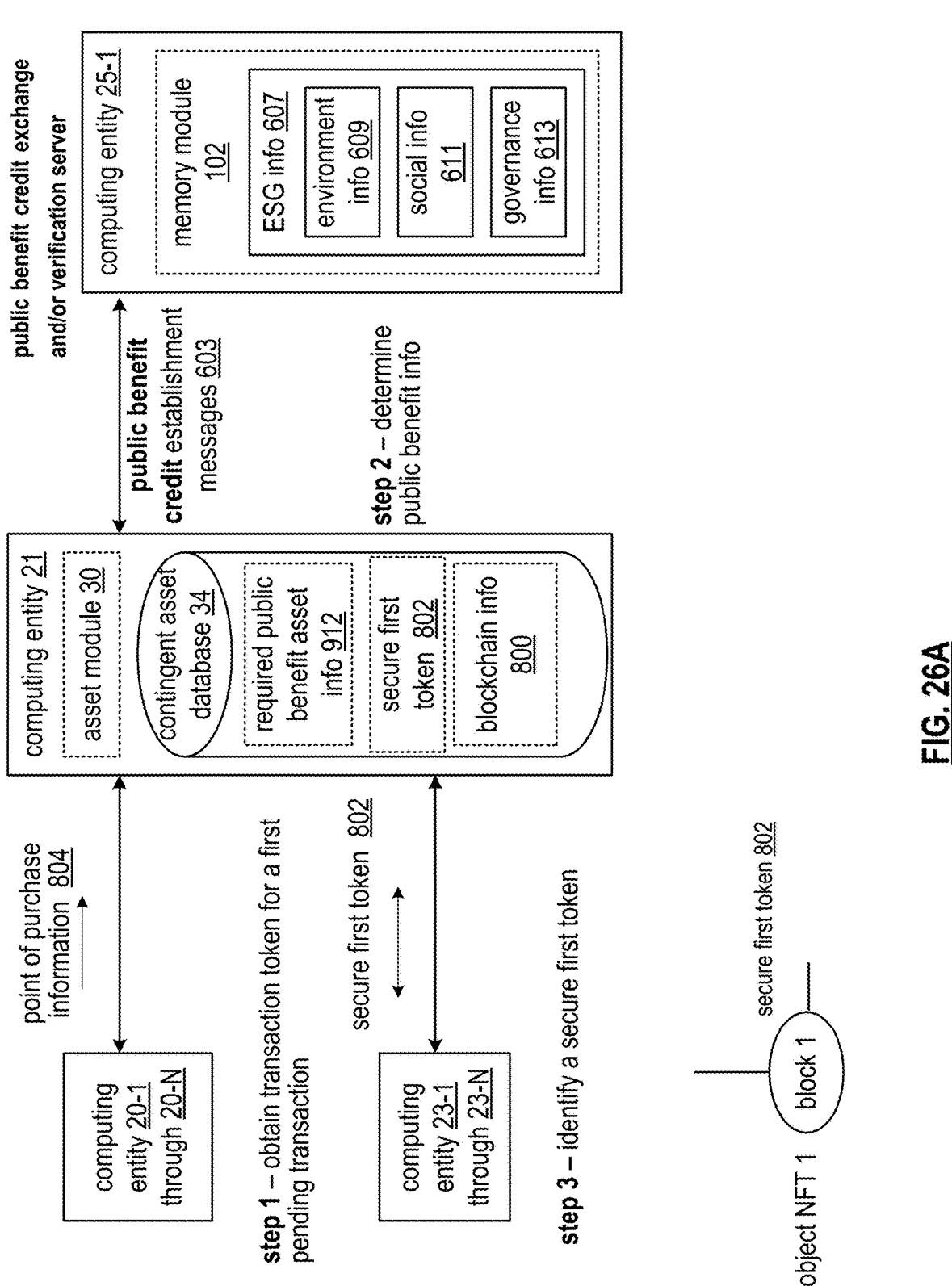
Figure 26B:
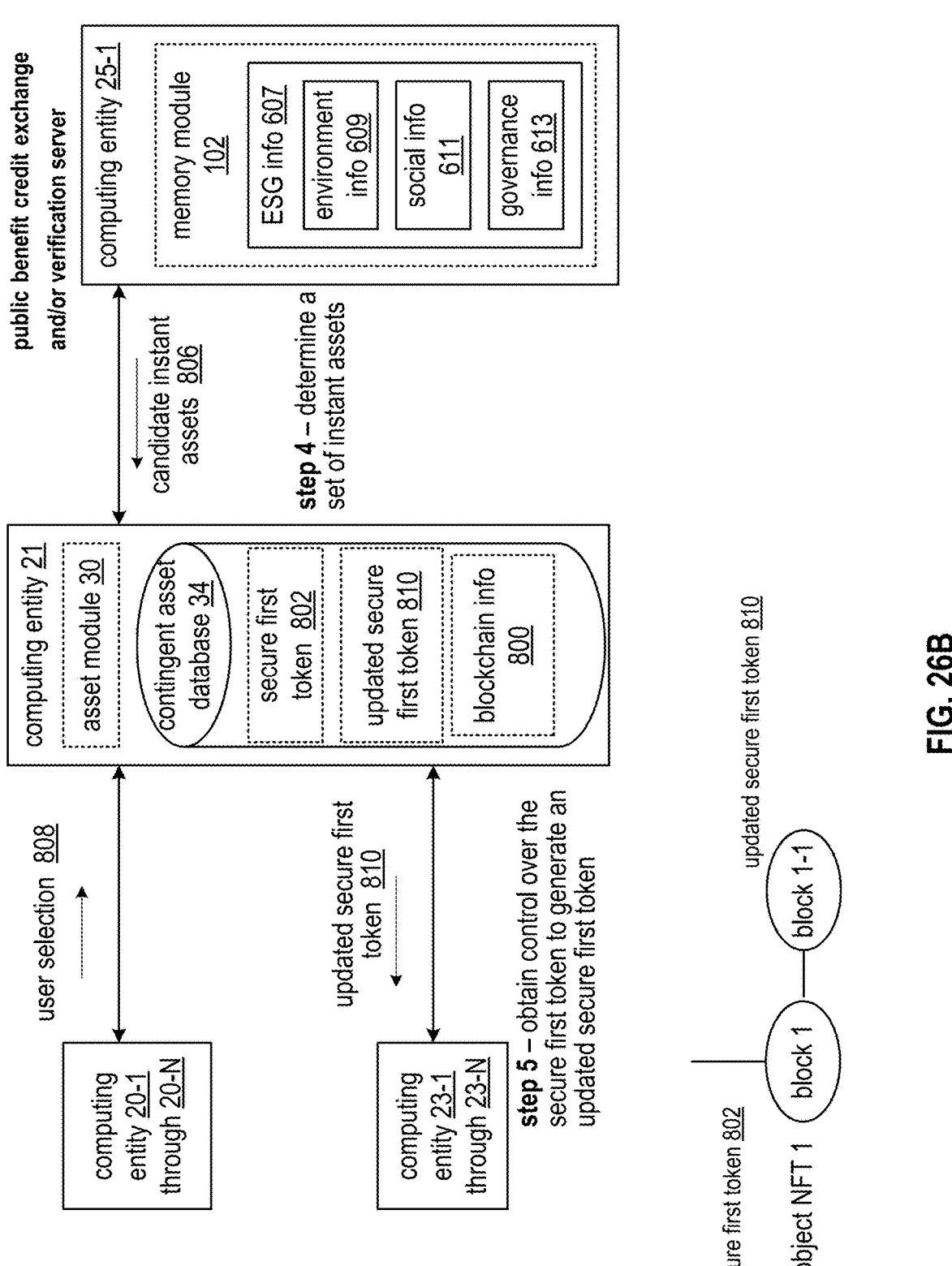
Figure 27A:
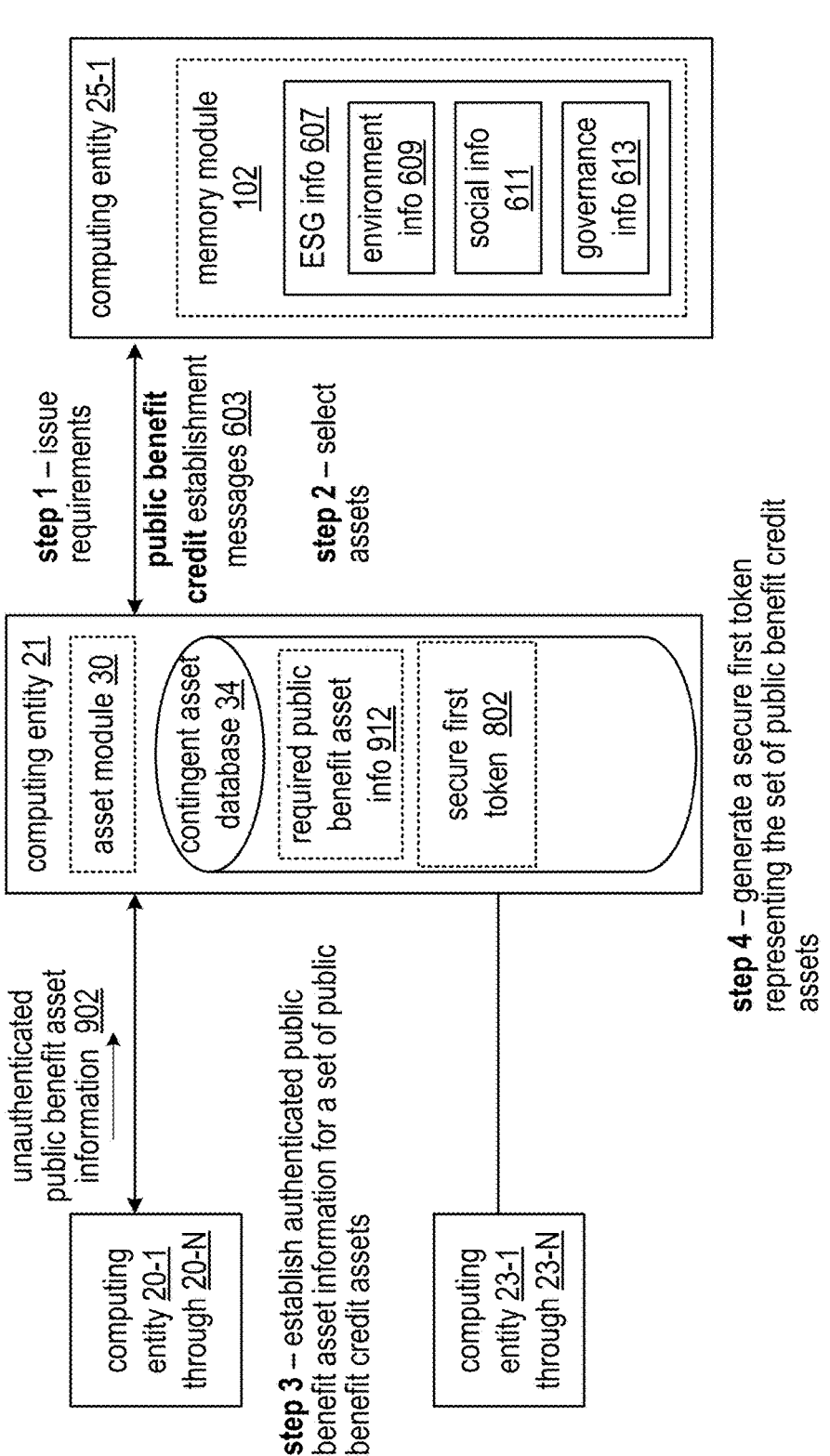
Figure 27B:
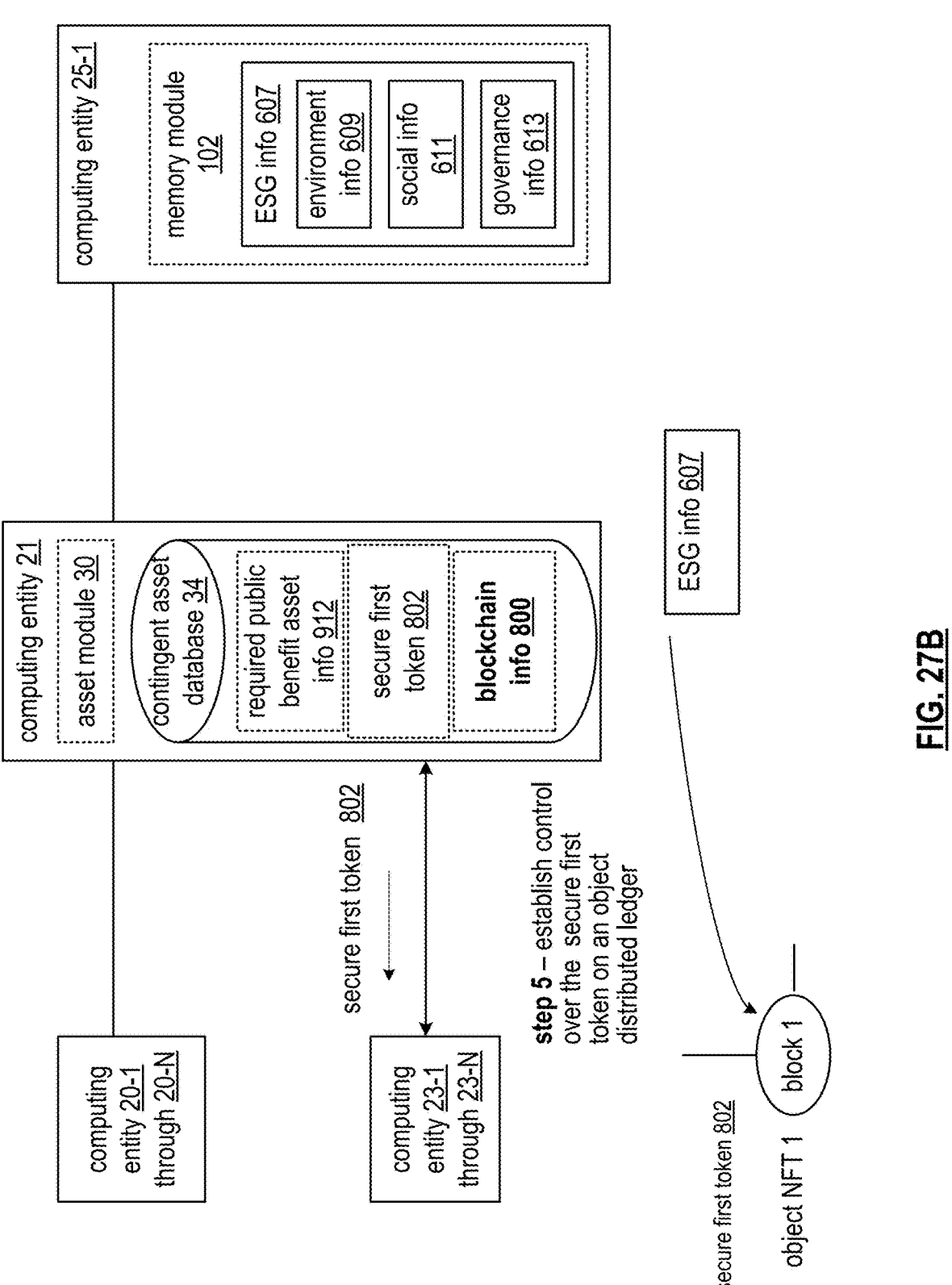
Figure 28A:
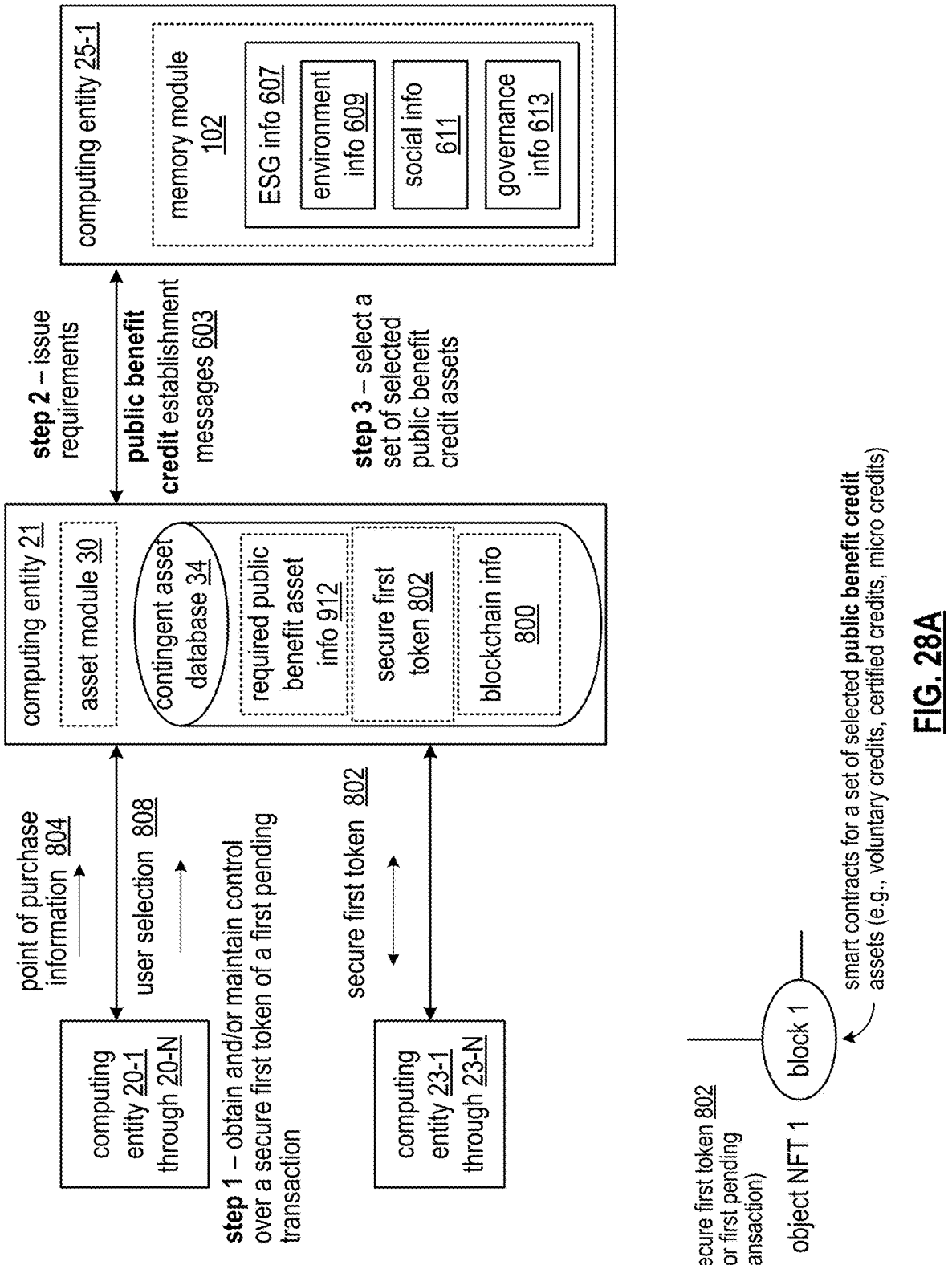
Figure 28B:
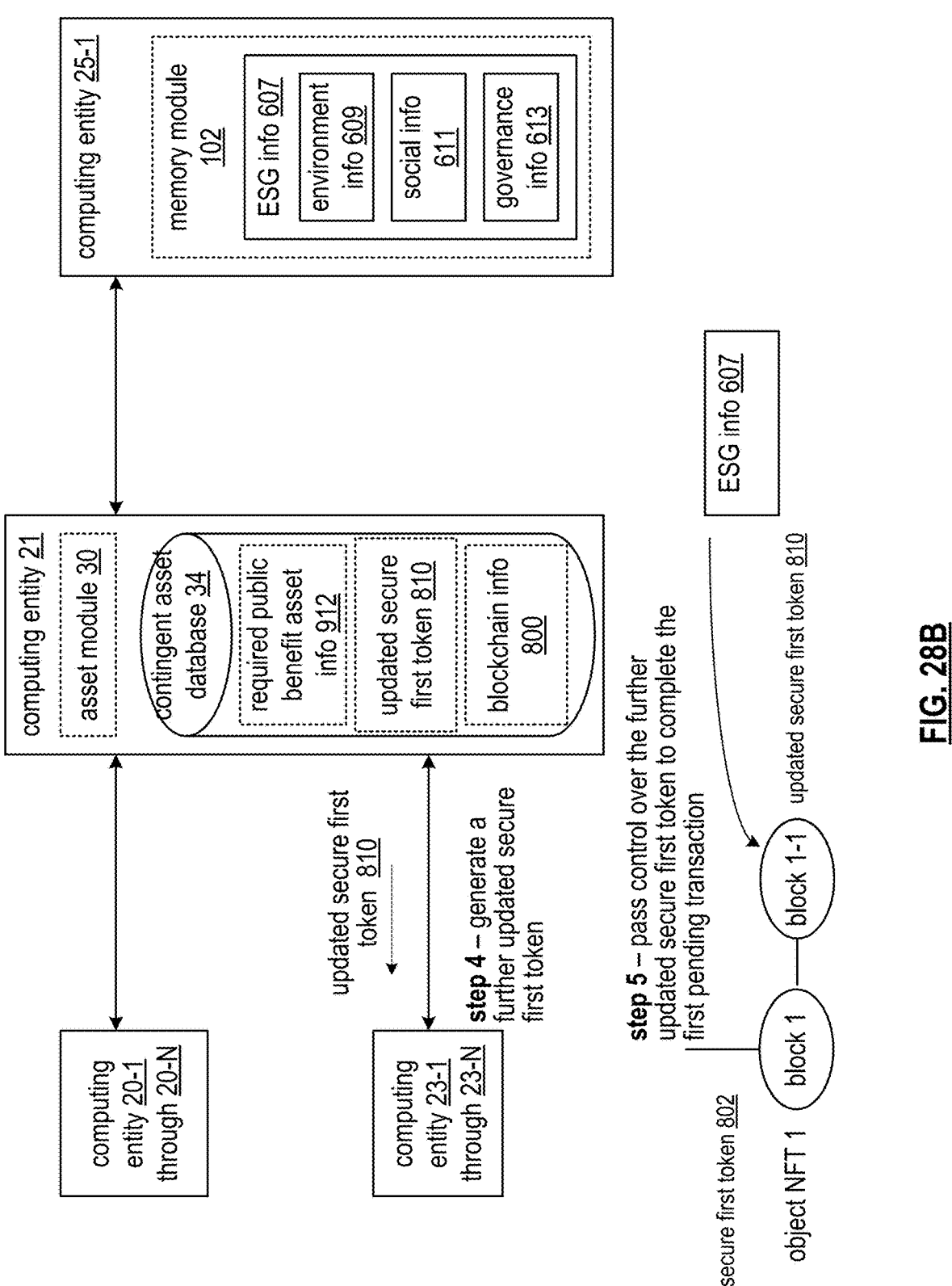
Figure 29A:
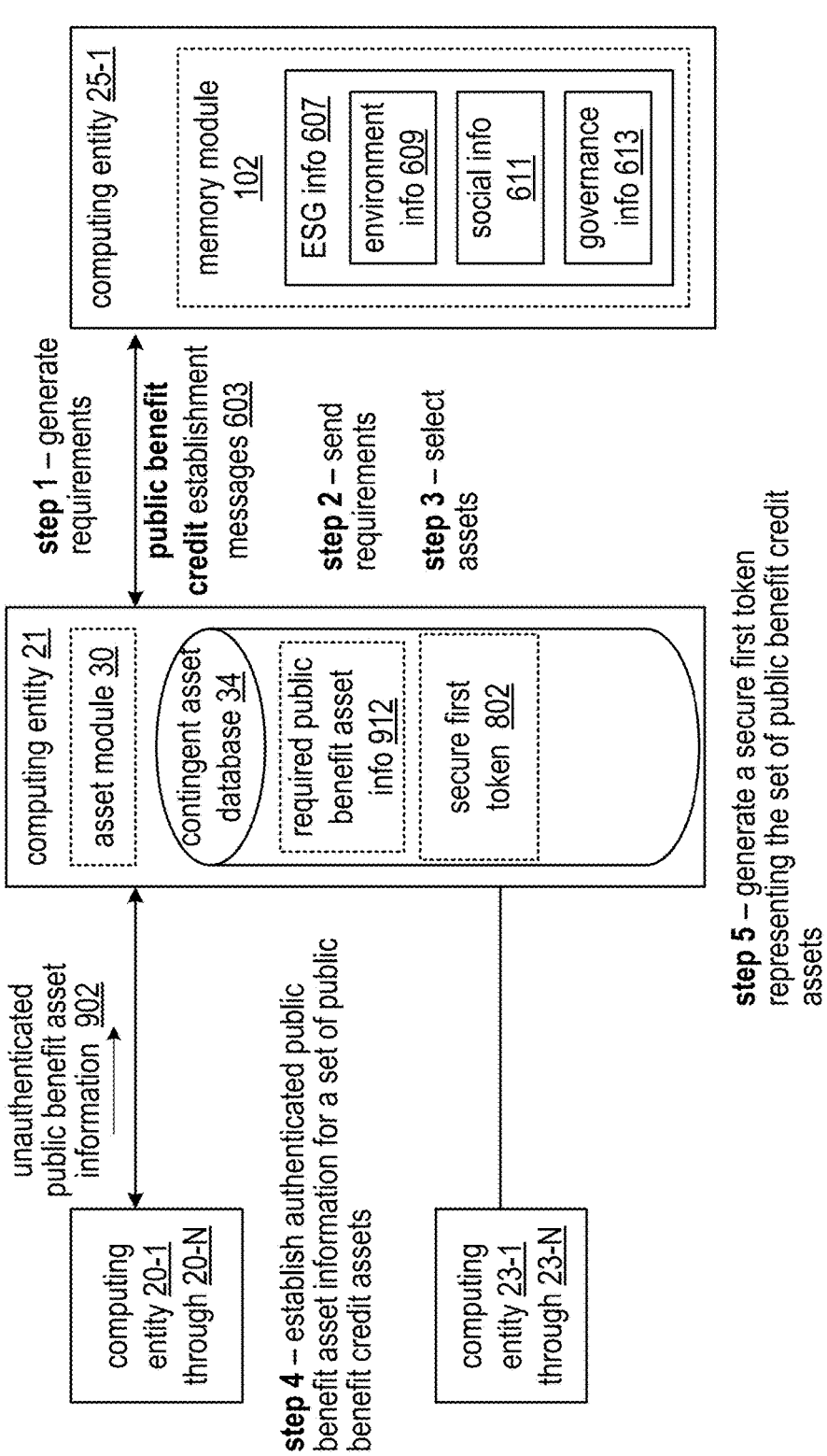
Figure 29B:
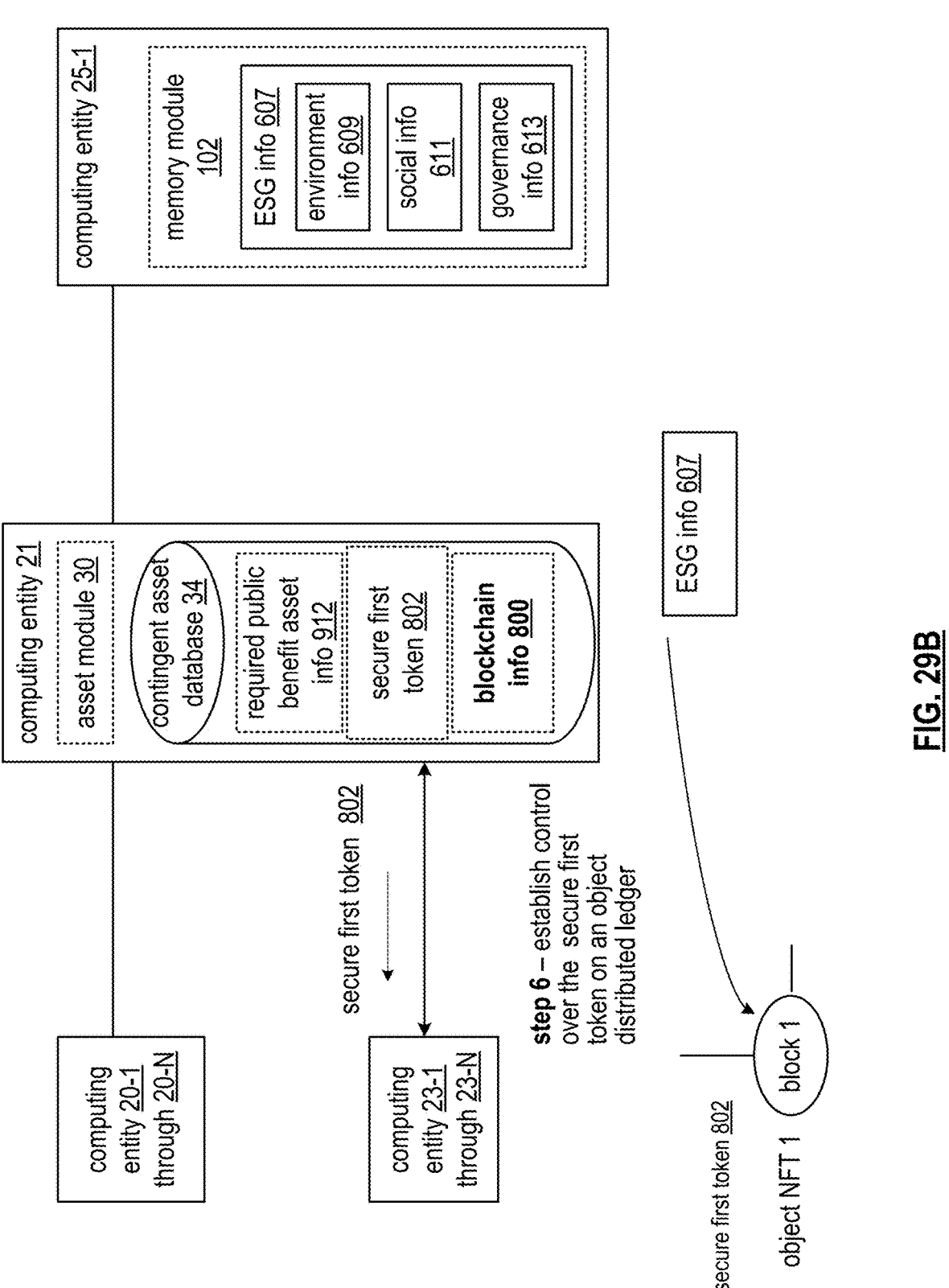
Figure 30A:
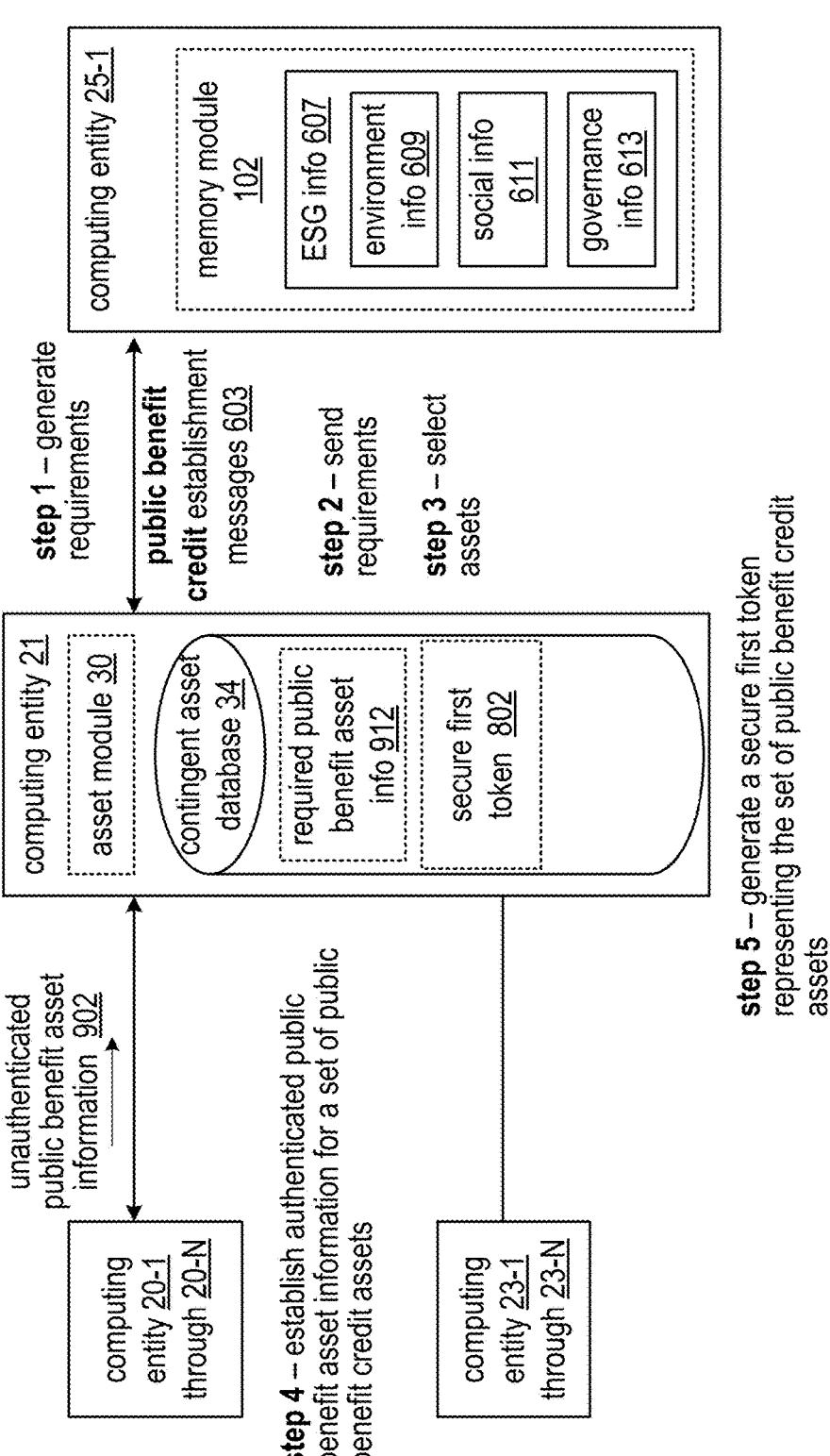
Figure 30B:
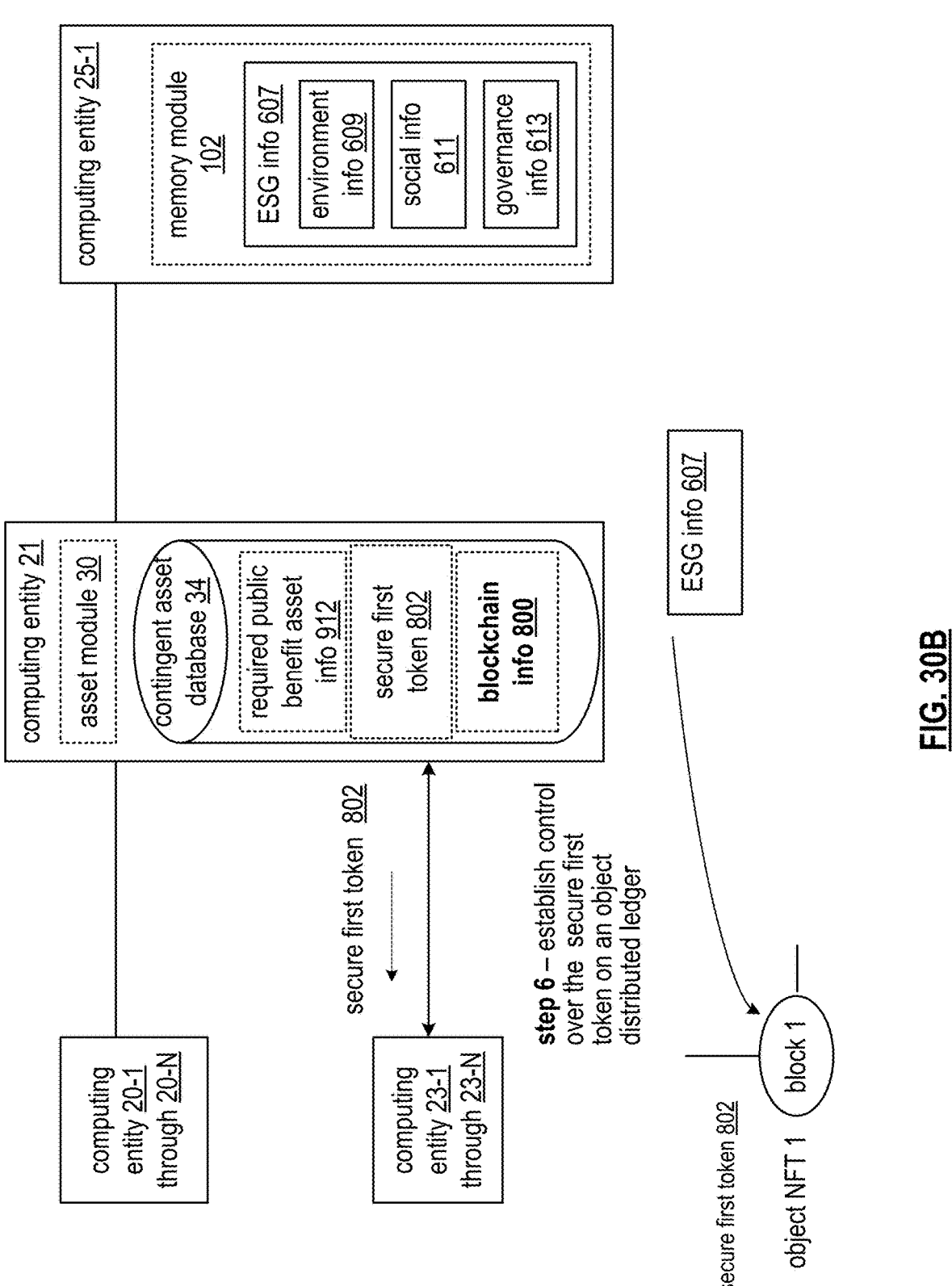
Figure 31A:
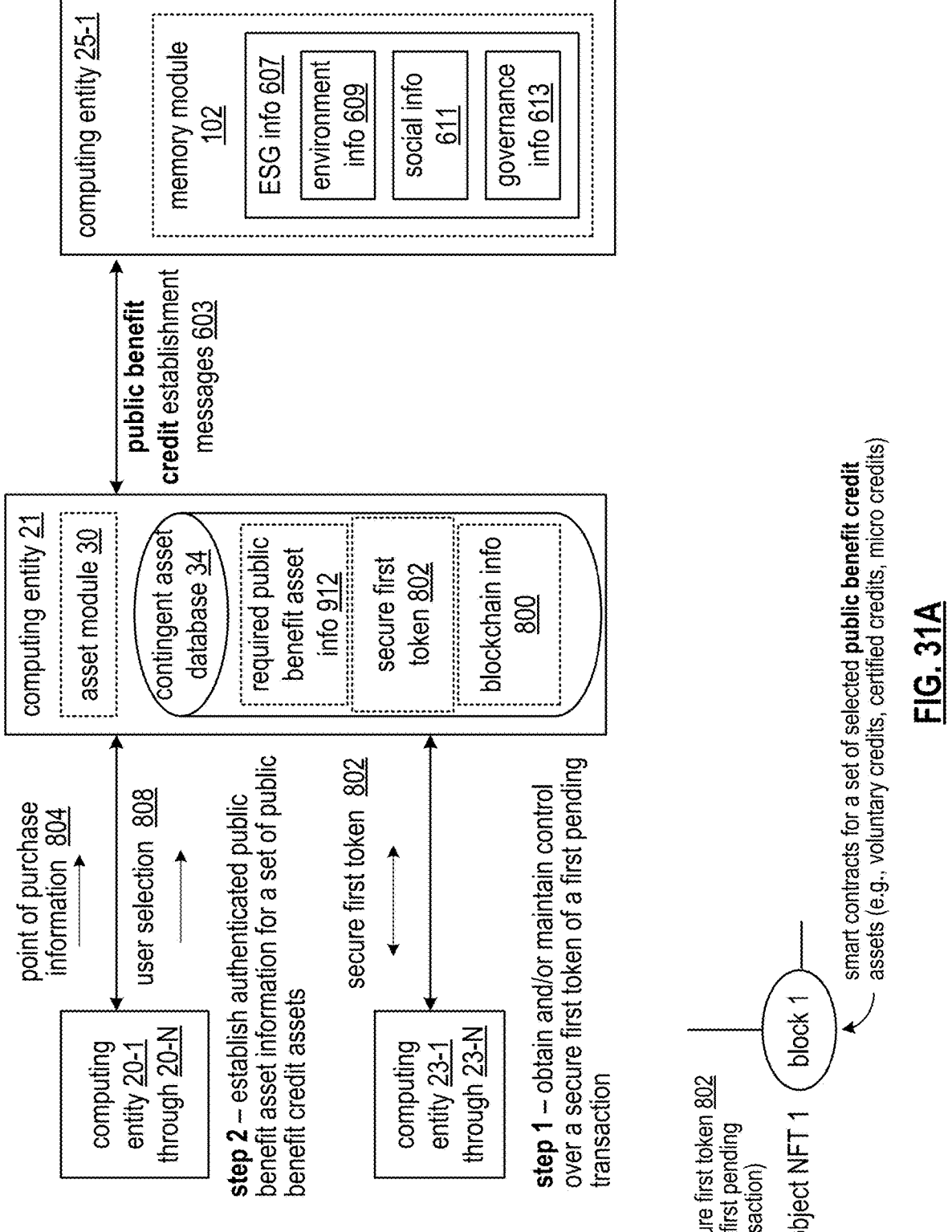
Figure 31B:
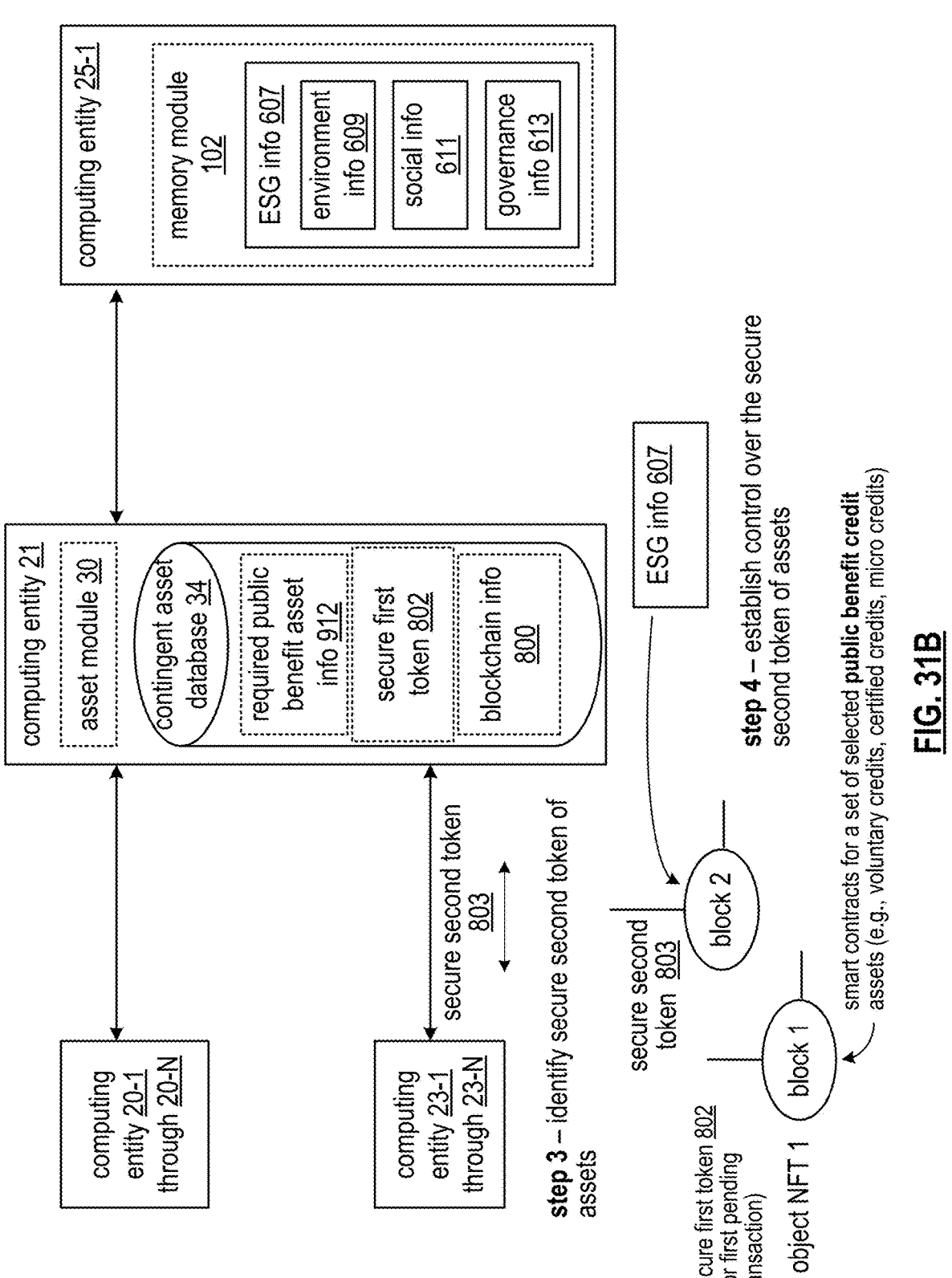
Figure 32A:
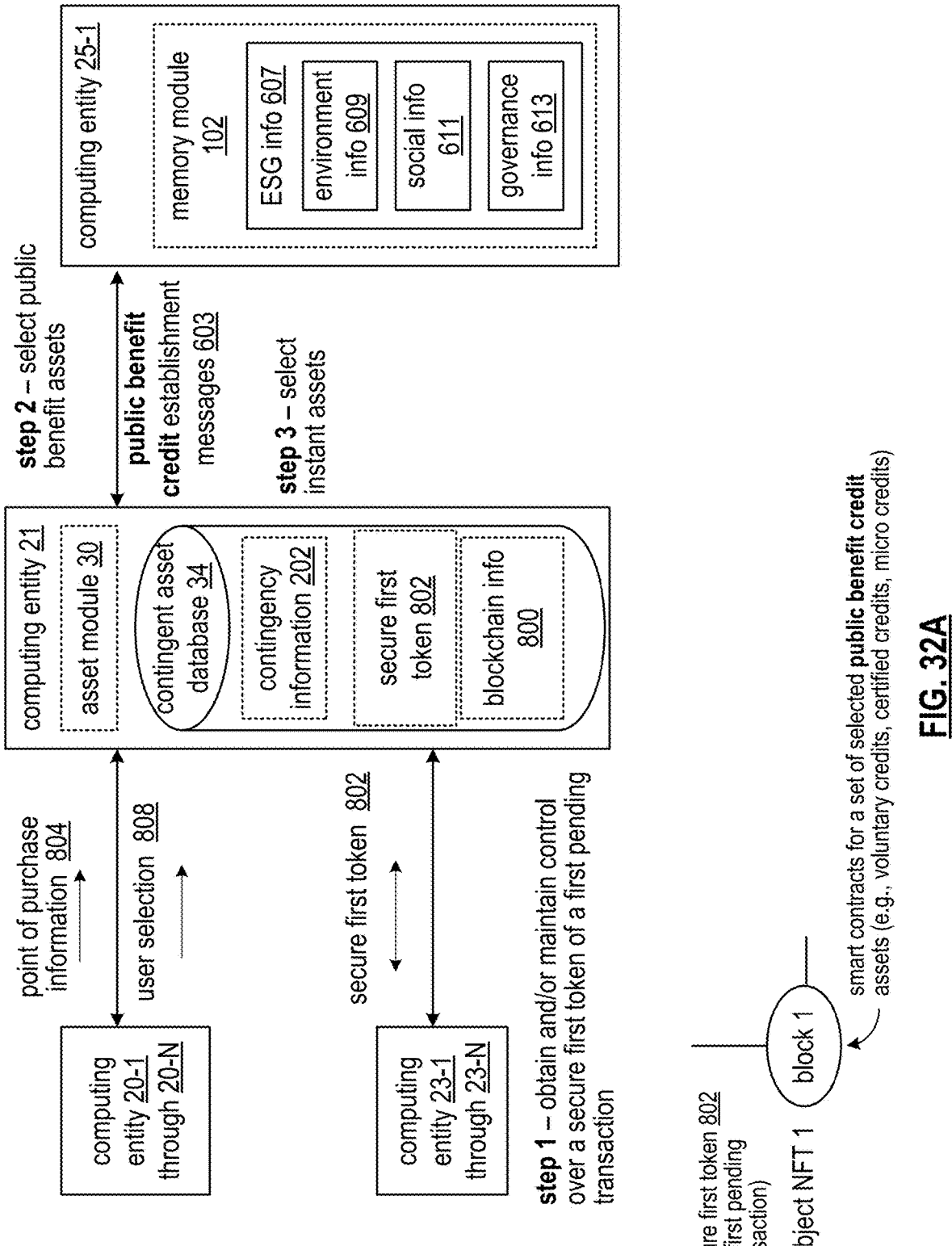
Figure 32B:
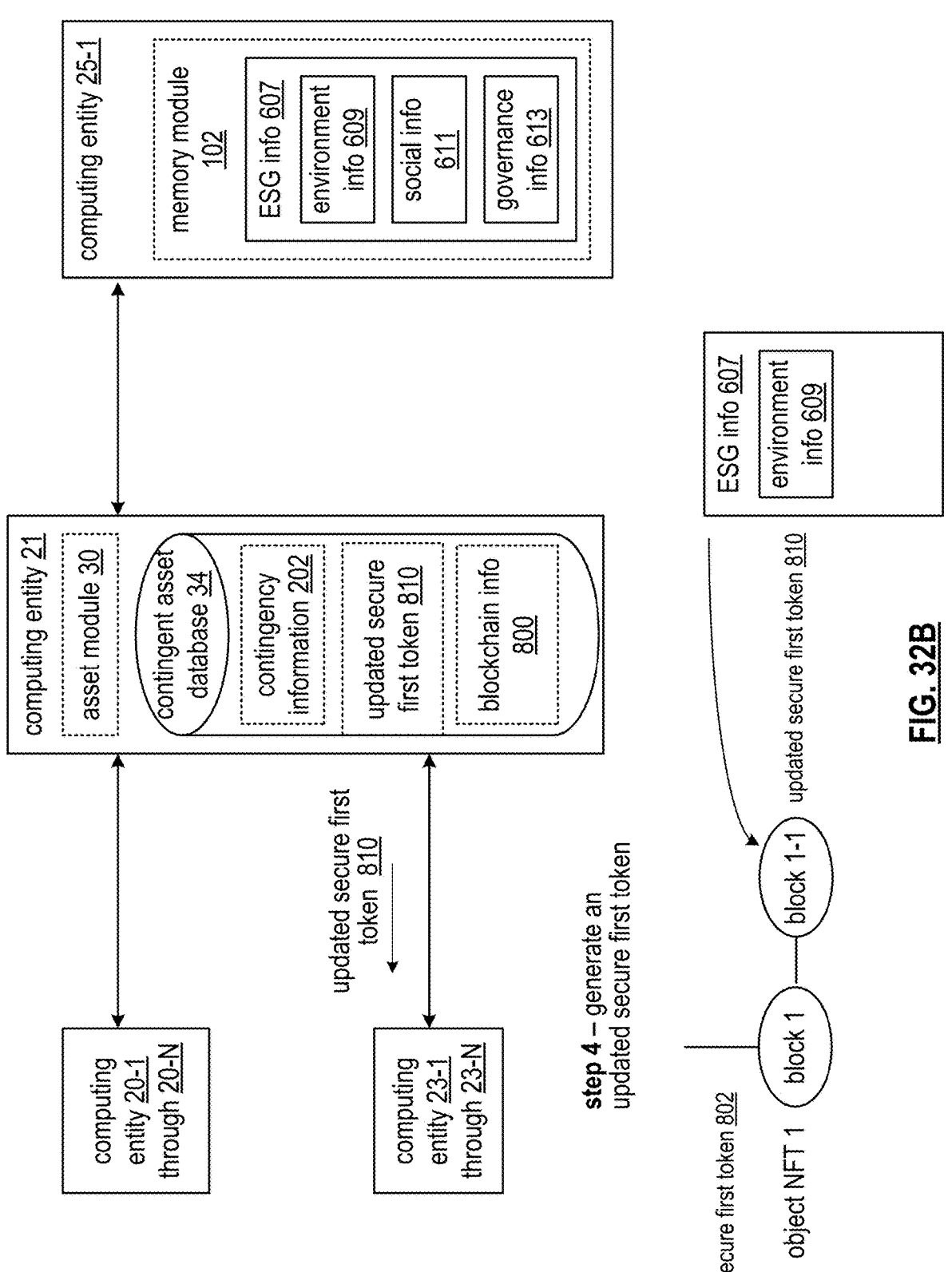

FIGS. 18G-18H are schematic block diagrams of an embodiment of a computing system illustrating an example of securely converting a contingent asset into an instant asset at a point of purchase in accordance with the present invention; and FIGS. 19A-19D are schematic block diagrams of another embodiment of a computing system and a contingent asset risk chart illustrating an example of utilizing a contingent asset for conversion into an instant asset at a point of purchase in accordance with the present invention;

FIGS. 19E-19F are schematic block diagrams of an embodiment of a computing system illustrating an example of updating a secure token of a contingent asset in accordance with the present invention;

FIGS. 20A-20B are schematic block diagrams of an embodiment of a computing system illustrating an example of updating a secure token of a carbon credit asset in accordance with the present invention;

FIGS. 21A-21B are schematic block diagrams of an embodiment of a computing system illustrating an example of updating a secure token of a set of public benefit assets in accordance with the present invention;

FIGS. 22A-22B are schematic block diagrams of an embodiment of a computing system illustrating an example of utilizing a secure token of a set of public benefit assets in accordance with the present invention;

FIGS. 23A-23B are schematic block diagrams of an embodiment of a computing system illustrating an example of generating a secure token of a set of public benefit assets in accordance with the present invention;

FIGS. 24A-24B are schematic block diagrams of an embodiment of a computing system illustrating an example of identifying a secure token of a set of public benefit assets in accordance with the present invention;

FIGS. 25A-25B are schematic block diagrams of an embodiment of a computing system illustrating an example of identifying a secure token of a set of public benefit assets in accordance with the present invention;

FIGS. 26A-26B are schematic block diagrams of an embodiment of a computing system illustrating an example of using and identifying a secure token of a set of public benefit assets in accordance with the present invention;

FIGS. 27A-27B are schematic block diagrams of an embodiment of a computing system illustrating an example of using a secure token of a set of public benefit assets in accordance with the present invention;

FIGS. 28A-28B are schematic block diagrams of an embodiment of a computing system illustrating an example of using a secure token of a set of public benefit assets in accordance with the present invention;

FIGS. 29A-29B are schematic block diagrams of an embodiment of a computing system illustrating an example of using a secure token of a set of public benefit assets in accordance with the present invention;

FIGS. 30A-30B are schematic block diagrams of an embodiment of a computing system illustrating an example of using a secure token of a set of public benefit assets in accordance with the present invention;

FIGS. 31A-31B are schematic block diagrams of an embodiment of a computing system illustrating an example of using a secure token of a set of public benefit assets in accordance with the present invention; and FIGS. 32A-32B are schematic block diagrams of an embodiment of a computing system illustrating an example of using a secure token of a set of public benefit assets in accordance with the present invention.

DETAILED DESCRIPTION OF THE INVENTION

Figure 1:
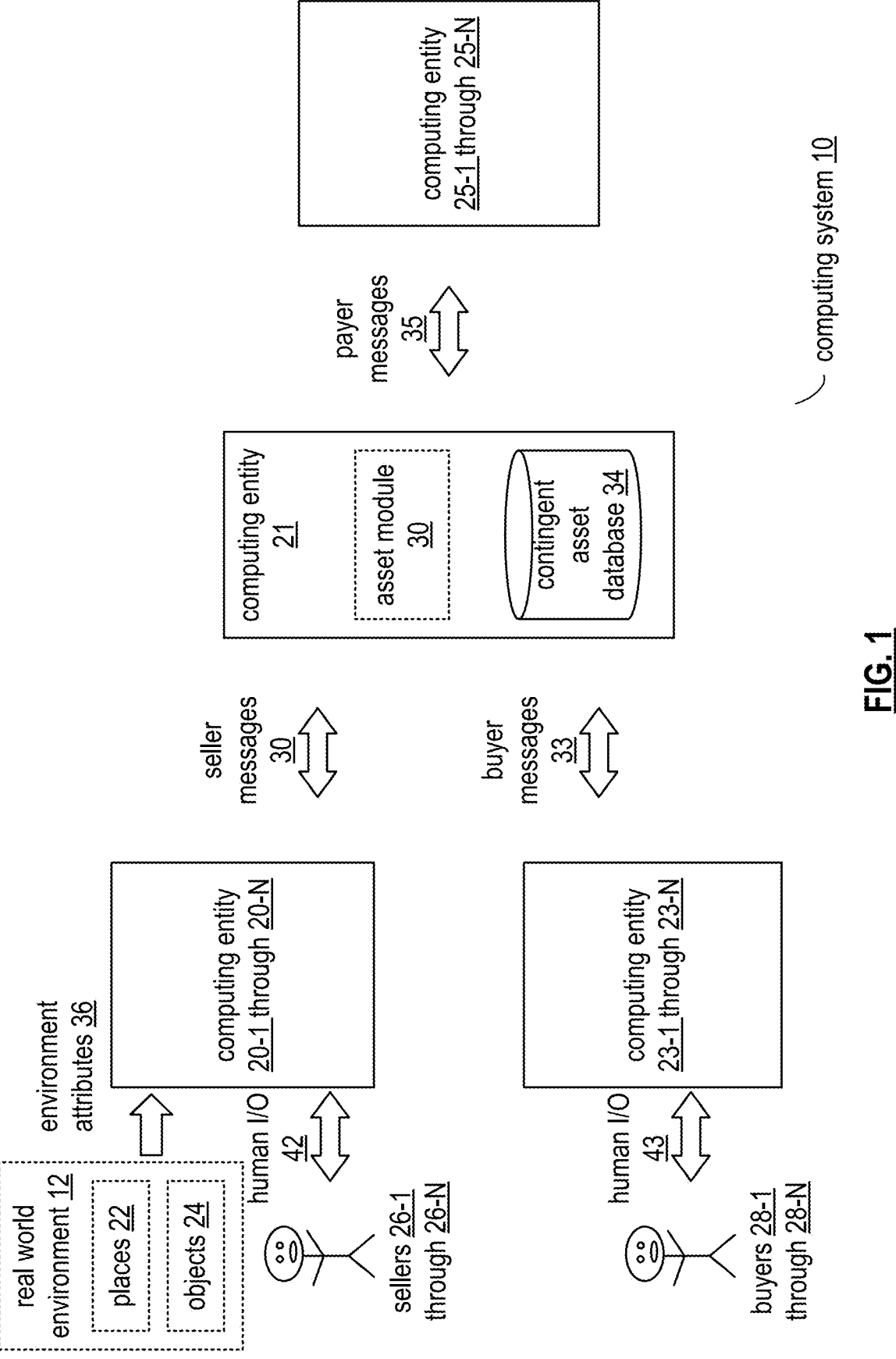
FIG. 1 is a schematic block diagram of an embodiment of a computing system in accordance with the present invention.

FIG. 1 is a schematic block diagram of an embodiment of a computing system 10 that includes a real world environment 12, computing entities 20-1 through 20-N, a computing entity 21, computing entities 23-1 through 23-N, and computing entities 25-1 through 25-N. The real-world environment 12 includes places 22 and objects 24. The computing entity 21 includes an asset module 30, and a contingent asset database 34. In an embodiment, the computing entity 21 serves as an exchange computing entity. In another embodiment, the computing entity 21 serves as a marketplace computing entity and/or device. In an embodiment, the computing entities 25-1 through 25-N serve as an asset authenticity computing entity (e.g., where tasks include authenticating validity and information with regards to a contingent asset). In an embodiment, the computing entities 23-1 through 23-N serve as blockchain nodes and/or as object ledger computing entities and/or object ledger computing devices of an object distributed ledger and/or computing entities associating with buyers of contingent assets.

The places 22 includes any physical area. Examples of places 22 includes a room, a series of rooms, an entire building, a portion of a building, an outdoor space, a neighborhood, a city, etc. The objects 24 includes things within the places. Examples of objects 24 includes people, equipment, lights, heating and air conditioning systems, building materials, furniture, personal items, tools, and representations of information (i.e., video recordings, audio recordings, captured text, etc.).

In an example of operation of the computing system 10, the computing entity 20-1 communicates with seller 26-1 of a plurality of sellers 26-1 through 26-N utilizing human input/output (I/O) 42. The computing entity 20-1 (e.g., an object owner computing entity) interprets the human I/O 42 and environment attributes 36 from the real world environment 12 to produce a seller message 30, where the seller message 30 is associated with a request to sell a contingent asset. The contingent asset includes a potential liability for a payer to pay an owner of the contingent asset subsequent to a contingency aspect of the contingent asset being satisfied. The contingency aspect includes an approval requirement for the contingent asset. For example, when unapproved the payer is not yet fully liable to pay the owner. As another example, when approved, the payer is liable to pay the owner with regards to the liability in accordance with terms of the liability.

The environment attributes 36 includes detectable measures of the real-world environment 12 to facilitate generation of a multi-dimensional (e.g., including time) representation of the real-world environment 12 in a virtual reality and/or augmented reality environment. For example, the environment attributes 36 includes XYZ position information, place information of the places 22, and object information of the objects 24 (i.e., background, foreground, homeowner, contractor, etc.). The XYZ position information includes portrayal in a world space industry standard format (e.g., with reference to an absolute position). For instance, the environment attributes 36 portrays a representation of recent energy efficiency improvements made to a house.

Having generated the seller message 30, the computing entity 20-1 sends the seller message 30 to the computing entity 21. The asset module 30 of the computing entity 21 generates a contingent asset record associated with the contingent asset. The asset module 30 issues a payer message 35 to the computing entity 25-1, where the payer message 35 includes a request to authenticate the contingent asset.

Having received the payer message 35, the computing entity 25-1 authenticates the contingent asset (e.g., verifies that the contingent asset has been created). The computing entity 25-1 issues another payer message 35 to the computing entity 21, where the other payer message 35 indicates that the contingent asset is favorably authenticated.

When the contingent asset has been favorably authenticated, the computing entity 21 determines a risk level associated with a contingent asset lifecycle of the contingent asset for at least a portion of the lifecycle. The contingent asset lifecycle starts when the contingent asset is created and ends when the liability associated with the contingent asset has been paid out in accordance with the terms of the liability. The contingent asset lifecycle is discussed in greater detail with reference to FIG. 5A.

The determining of the risk level associated with the contingent asset is based on numerous parameters and will ultimately be utilized to determine fair valuation of the contingent asset at any time during the contingent asset lifecycle. As it is the intention of the computing entity 21 to facilitate sale of the contingent asset from the seller 26-1 to at least one buyer of buyers 28-1 through 28-N via the computing entities 23-1 through 23-N, the determining of the risk level associated with the contingent asset includes an aggregate of a plurality of estimated risk levels. The plurality of estimated risk levels includes various risks associated with the seller 26-1, with the buyer, with a payer associated with the computing entity 25-1, and with the contingent asset itself. The determining of the risk level associated with a contingent asset will be discussed in greater detail with reference to FIGS. 5A-5H.

Having determined the risk level associated with the condition asset, the computing entity 21 negotiates aspects of a listing for the contingent asset with the computing entity 20-1 via further seller messages 30 on behalf of the seller 26-1 (e.g., agreed-upon listing price, timeframe, restrictions, etc.). The computing entity 21 communicates a listing for the contingent asset via a buyer messages 33 with the computing entities 23-1 through 23-N associated with the buyers 28-1 through 28-N.

Having received a buyer message 33 with regards to the listing of the contingent asset, the computing entity 23-1 determines whether to offer a bid for the contingent asset on behalf of the buyer 28-1. Alternatively, the computing entity 21 determines whether to offer the bid on behalf of one of the buyers. For example, the buyer 28-1 provides human I/O

43 to the computing entity 23-1 with a bid price and a maximum price to initiate making an offer for the condition asset.

When making a bid, the computing entity 23-1 issues a further buyer message 33 to the computing entity 21 that includes information associated with the bid for the contingent asset. When successful, the computing entity 21 updates the record for the contingent asset to indicate that the buyer 28-1 is now the owner for the contingent asset (e.g., and not the seller 26-1). The updating the record includes disassociating the computing entity 20-1 with the contingent asset and associating the computing entity 23-1 with the contingent asset.

When the computing entity 21 detects that the contingency aspect of the contingent asset has been satisfied, the computing entity 21 updates the record associated with the contingent asset to indicate that a status has changed from contingent to noncontingent for the asset associated with the original contingent asset. For example, the asset module 30 receives another payer message 35 from the computing entity 25-1 that includes the indication that the status has changed to noncontingent, updates the record for the contingent asset, and stores the updated record in the contingent asset database 34. Alternatively, or in addition to, the computing entity 21 publishes the updated status to the computing entities associated with the buyers utilizing the updated record when the asset is available and has not been purchased by one of the buyers.

When the computing entity 21 detects the end of the contingent asset lifecycle (e.g., receiving a payer message 35 from the computing entity 25-1 that indicates that the payer liability is now to be settled), the computing entity 21 facilitates payment to one or more current owners (e.g., the buyer 28-1). For example, the computing entity 21 receives another payer message 35 from the computing entity 25-1 that includes payment information. The computing entity determines payoff information based on the payment information and issues another buyer message 33 to the computing entity 23-1 that includes the payoff information.

Figure 2A:
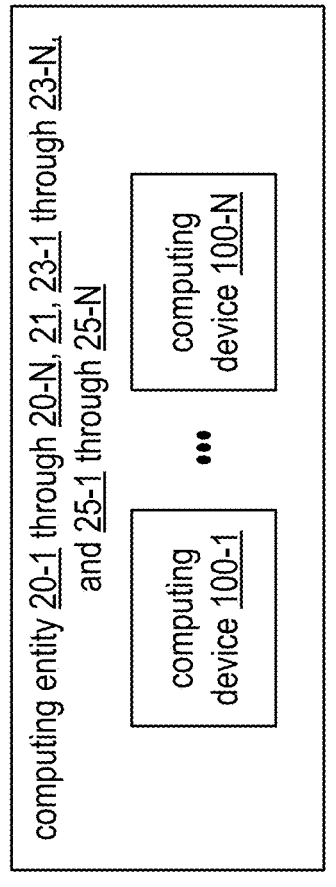
FIG. 2A is a schematic block diagram of an embodiment of a computing entity of a computing system in accordance with the present invention.

FIG. 2A is a schematic block diagram of an embodiment of the computing entity (e.g., 20-1 through 20-N; 21; 23-1 through 23-N; and 25-1 through 25-N) of the computing system 10 of FIG. 1. The computing entity includes one or more computing devices 100-1 through 100-N. A computing device is any electronic device that communicates data, processes data, represents data (e.g., user interface) and/or stores data.

Computing devices include portable computing devices and fixed computing devices. Examples of portable computing devices include an embedded controller, a smart sensor, a social networking device, a gaming device, a smart phone, a laptop computer, a tablet computer, a video game controller, and/or any other portable device that includes a computing core. Examples of fixed computing devices includes a personal computer, a computer server, a cable set-top box, a fixed display device, an appliance, and industrial controller, a video game counsel, a home entertainment controller, a critical infrastructure controller, and/or any type of home, office or cloud computing equipment that includes a computing core.

Figure 2B:
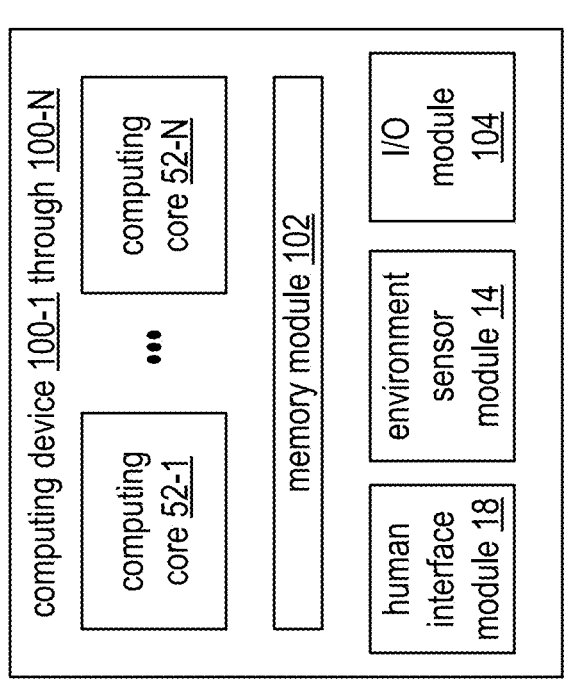
FIG. 2B is a schematic block diagram of an embodiment of a computing device of a computing system in accordance with the present invention.

FIG. 2B is a schematic block diagram of an embodiment of a computing device (e.g., 100-1 through 100-N) of the computing entity of FIG. 2A that includes one or more computing cores 52-1 through 52-N, a memory module 102, a human interface module 18, an environment sensor module 14, and an input/output (I/O) module 104. In alternative embodiments, the human interface module 18, the environment sensor module 14, the I/O module 104, and the memory module 102 may be standalone (e.g., external to the computing device). An embodiment of the computing device is discussed in greater detail with reference to FIG. 3.

Figure 3:
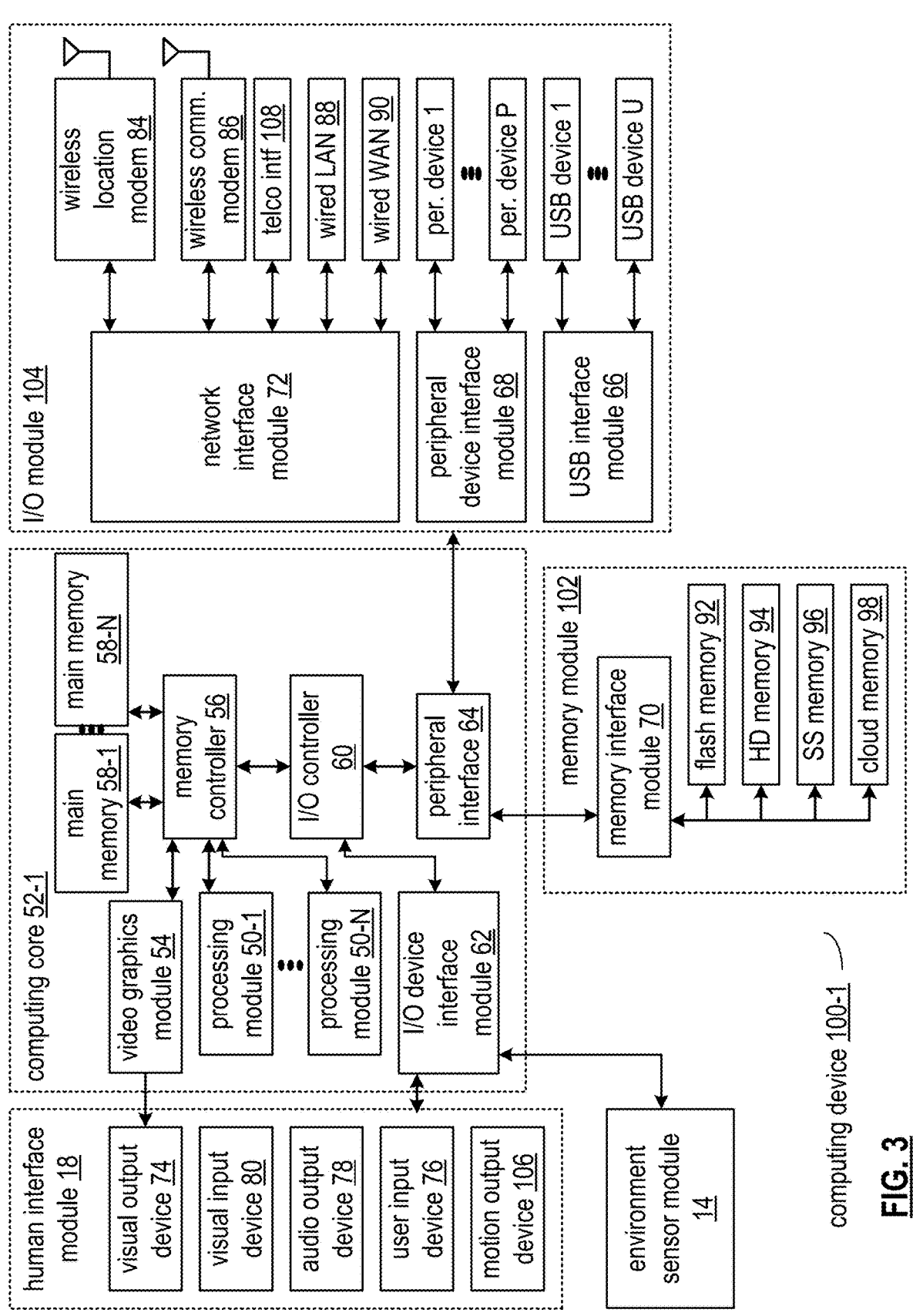
FIG. 3 is a schematic block diagram of another embodiment of a computing device of a computing system in accordance with the present invention.

FIG. 3 is a schematic block diagram of another embodiment of the computing device 100-1 of the computing system 10 that includes the human interface module 18, the environment sensor module 14, the computing core 52-1, the memory module 102, and the I/O module 104. The human interface module 18 includes one or more visual output devices 74 (e.g., video graphics display, 3-D viewer, touchscreen, LED, etc.), one or more visual input devices 80 (e.g., a still image camera, a video camera, a 3-D video camera, photocell, etc.), and one or more audio output devices 78 (e.g., speaker(s), headphone jack, a motor, etc.). The human interface module 18 further includes one or more user input devices 76 (e.g., keypad, keyboard, touchscreen, voice to text, a push button, a microphone, a card reader, a door position switch, a biometric input device, etc.) and one or more motion output devices 106 (e.g., servos, motors, lifts, pumps, actuators, anything to get real-world objects to move).

The computing core 52-1 includes a video graphics module 54, one or more processing modules 50-1 through 50-N, a memory controller 56, one or more main memories 58-1 through 58-N (e.g., RAM), one or more input/output (I/O) device interface modules 62, an input/output (I/O) controller 60, and a peripheral interface 64. A processing module is as defined at the end of the detailed description.

The memory module 102 includes a memory interface module 70 and one or more memory devices, including flash memory devices 92, hard drive (HD) memory 94, solid state (SS) memory 96, and cloud memory 98. The cloud memory 98 includes an on-line storage system and an on-line backup system.

The I/O module 104 includes a network interface module 72, a peripheral device interface module 68, and a universal serial bus (USB) interface module 66. Each of the I/O device interface module 62, the peripheral interface 64, the memory interface module 70, the network interface module 72, the peripheral device interface module 68, and the USB interface modules 66 includes a combination of hardware (e.g., connectors, wiring, etc.) and operational instructions stored on memory (e.g., driver software) that are executed by one or more of the processing modules 50-1 through 50-N and/or a processing circuit within the particular module.

The I/O module 104 further includes one or more wireless location modems 84 (e.g., global positioning satellite (GPS), Wi-Fi, angle of arrival, time difference of arrival, signal strength, dedicated wireless location, etc.) and one or more wireless communication modems 86 (e.g., a cellular network transceiver, a wireless data network transceiver, a Wi-Fi transceiver, a Bluetooth transceiver, a 315 MHz transceiver, a zig bee transceiver, a 60 GHz transceiver, etc.). The I/O module 104 further includes a telco interface 108 (e.g., to interface to a public switched telephone network), a wired local area network (LAN) 88 (e.g., optical, electrical), and a wired wide area network (WAN) 90 (e.g., optical, electrical). The I/O module 104 further includes one or more peripheral devices (e.g., peripheral devices 1-P) and one or more universal serial bus (USB) devices (USB devices 1-U). In other embodiments, the computing device 100-1 may include more or less devices and modules than shown in this example embodiment.

Figure 4:
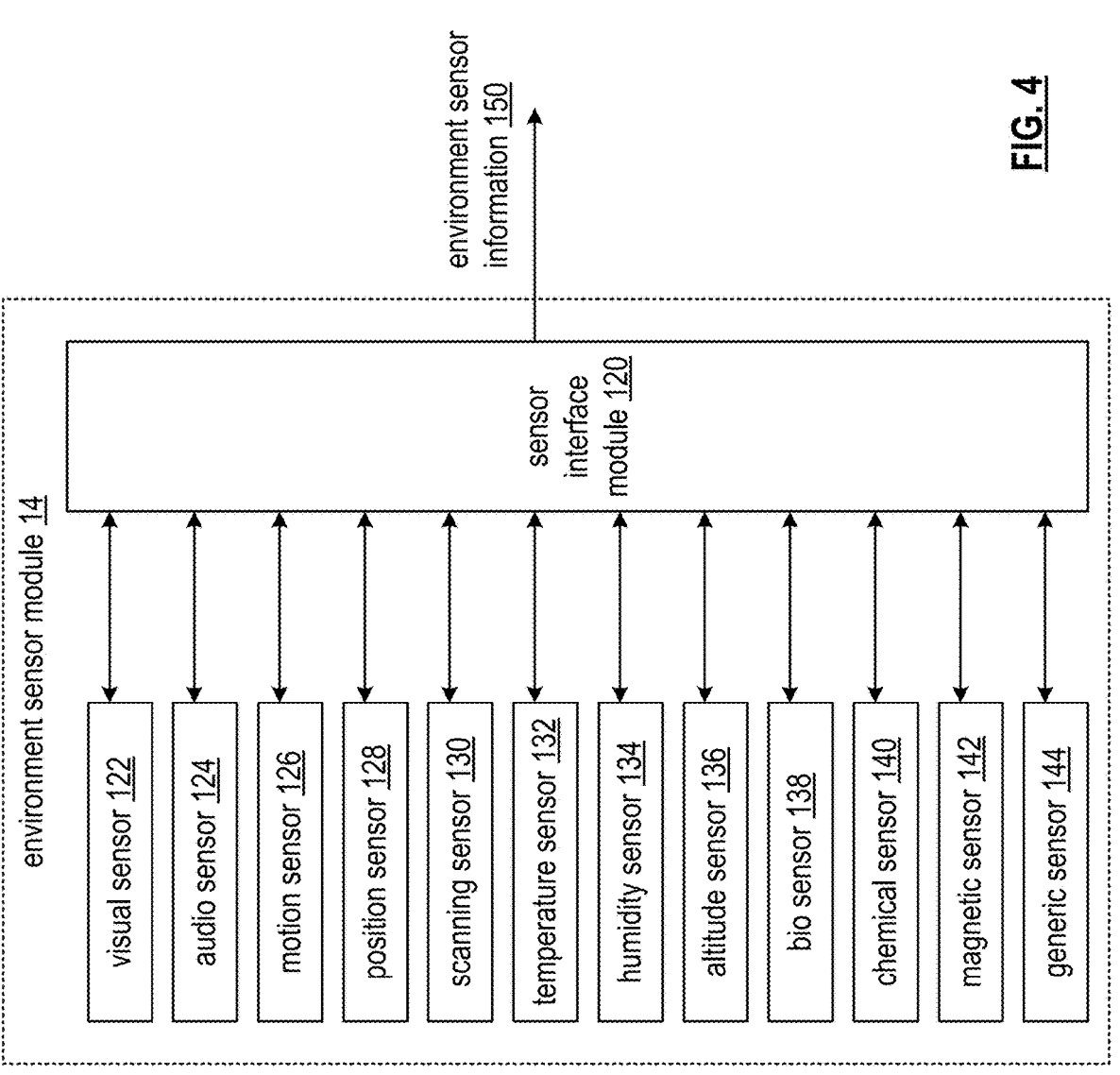
FIG. 4 is a schematic block diagram of an embodiment of an environment sensor module of a computing system in accordance with the present invention.

FIG. 4 is a schematic block diagram of an embodiment of the environment sensor module 14 of the computing device of FIG. 2B that includes a sensor interface module 120 to output environment sensor information 150 based on information communicated with a set of sensors. The set of sensors includes a visual sensor 122 (e.g., to the camera, 3-D camera, 360° view camera, a camera array, an optical spectrometer, etc.) and an audio sensor 124 (e.g., a microphone, a microphone array). The set of sensors further includes a motion sensor 126 (e.g., a solid-state Gyro, a vibration detector, a laser motion detector) and a position sensor 128 (e.g., a Hall effect sensor, an image detector, a GPS receiver, a radar system).

The set of sensors further includes a scanning sensor 130 (e.g., CAT scan, MRI, x-ray, ultrasound, radio scatter, particle detector, laser measure, further radar) and a temperature sensor 132 (e.g., thermometer, thermal coupler). The set of sensors further includes a humidity sensor 134 (resistance based, capacitance based) and an altitude sensor 136 (e.g., pressure based, GPS-based, laser-based).

The set of sensors further includes a biosensor 138 (e.g., enzyme, microbial) and a chemical sensor 140 (e.g., mass spectrometer, gas, polymer). The set of sensors further includes a magnetic sensor 142 (e.g., Hall effect, piezo electric, coil, magnetic tunnel junction) and any generic sensor 144 (e.g., including a hybrid combination of two or more of the other sensors).

FIGS. 5A-5H are schematic block diagrams of another embodiment of a computing system and a contingent asset risk chart illustrating an example of listing a contingent asset for sale. The computing system includes the computing entity 20-1 of FIG. 1, the computing entity 21 of FIG. 1, computing entities 23-1 through 23-N of FIG. 1, and the computing entity 25-1 of FIG. 1.

Figures 5A, 5B:
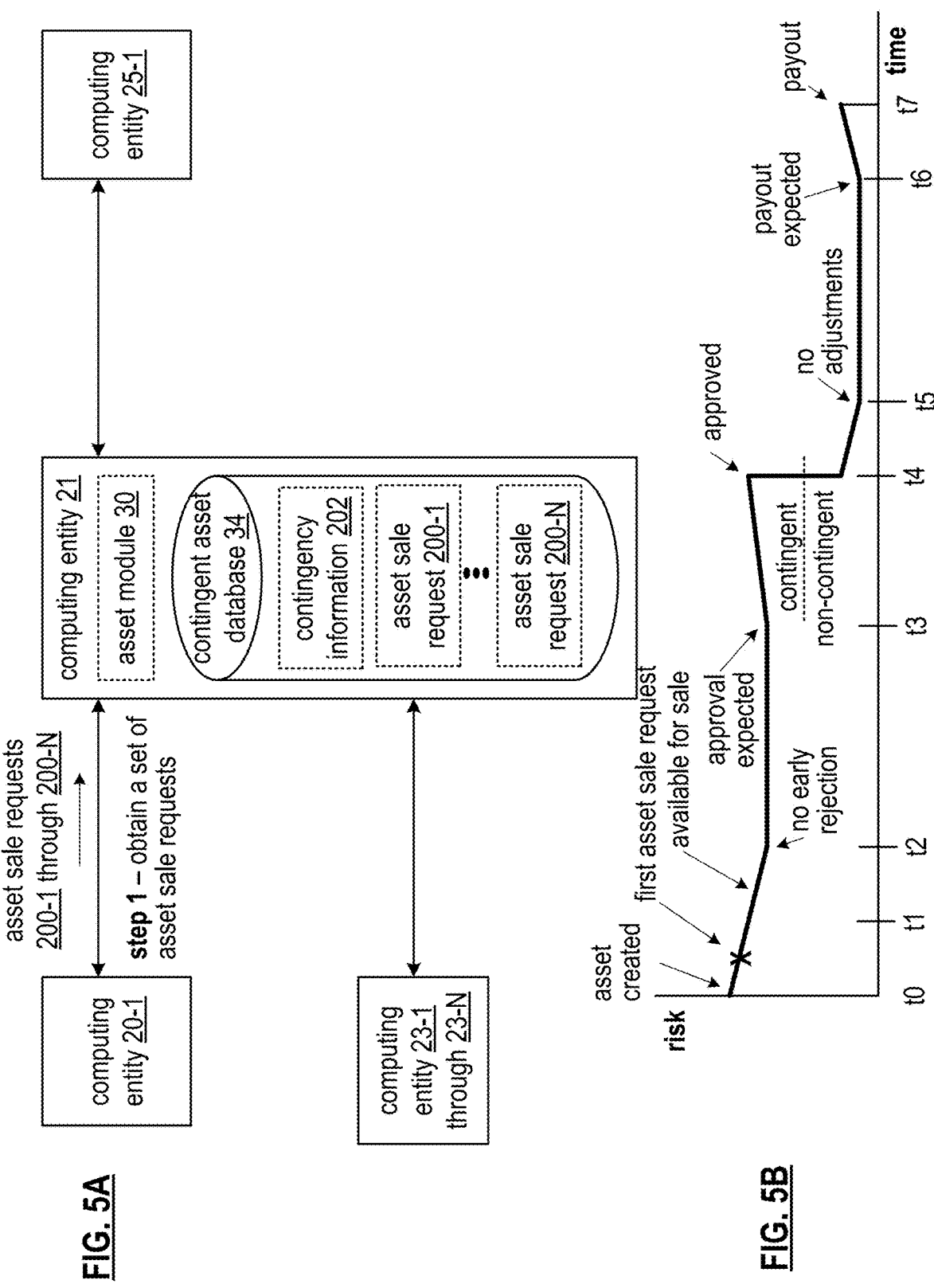

FIG. 5A illustrates an example method of operation of the listing of the contingent asset for sale where in a first step the asset module 30 obtains a set of asset sale requests 200-1 through 200-N from the computing entity 20-1. A first asset of a first asset sale request of the set of asset sale requests assigns a face value level of a potential first liability of a first payer to a first seller associated with the first asset. At least a portion of the face value of the potential first liability is to be paid by the first payer to the first seller in accordance with contingency information and subsequent to completion of a first asset lifecycle of the first asset. The set of asset sale requests are generated within a sales timeframe.

Turning to FIG. 5B where a risk chart represents a portrayal of overall risk of the contingent asset over the lifecycle of the contingent asset, the lifecycle begins at time t0 when the asset is created. For example, the seller requests that the payer acknowledge the potential liability of the payer to the seller in the form of the contingent asset.

The overall risk level is based on an aggregate of risks of all of the entities involved in transactions of the asset or even other associated assets (e.g., assets associated with other asset sale requests within the sales timeframe) and the asset itself. The risks of the asset itself include one or more of a contingent asset program type associated with the payer, a history of payouts for similar assets of similar program types, a face value amount of the asset (e.g., an original requested amount of the potential liability by the seller), and an age of the asset (e.g., time since asset creation along the asset lifecycle).

Subsequent to creation of the asset, the seller generates an asset sale request with the hopes to receive at least some payment in exchange for the asset far before the end of the lifecycle. Subsequent to the asset sale request, the asset becomes available for sale. In the example of the risk level, the risk is gradually decreasing as time goes on since no early rejection by the payer has been generated. Subsequent to the asset sale request, the payer approves the potential liability such that the contingency of approval has been removed and the asset is now associated with the noncontingent status at t4. Prior to approval, the example indicates that the risk is gradually increasing since approval is expected but not yet received.

The example indicates that the risk level drops significantly upon approval of the contingency since the liability has greater certainty of a subsequent payout. The example indicates that the risk is gradually falling after approval since no adjustments to an amount of the payout have been received yet from the payer. The example indicates a gradual increase in the risk just prior to the payout when the payout is expected at t7. Lifecycle ends when the payer facilitates the payout of the liability (e.g., from the payer to one or more owners of the asset).

Alternatively, at any time during the lifecycle, the risk jumps significantly when the payer rejects the potential liability of the payer. Further alternatively, the asset is sold such that the seller is disassociated from ownership and that one or more buyers are associated with ownership of the asset. The transitioning of ownership is possible at any time during the lifecycle of the asset but more likely after the asset is made available for sale and before the approval of the liability.

Returning to FIG. 5A, the contingency information for each asset includes a variety of elements that are maintained in the contingent asset database 34 by the asset module 30. The contingency information includes an asset identifier (ID), an ask price (e.g., what the seller would like to receive), a reserve price (e.g., a minimum price that is acceptable), a lifecycle status indicator (e.g., indicating a current association of the asset to the lifecycle such as contingent, noncontingent, pending payment, payment approved, rejected and closed, payment completed and closed, etc.), and ownership information (e.g., one or more identifiers associated with current owners which may include the seller, percentage ownership levels by owner).

The contingency information further includes at least one payer identifier, a percentage of the potential liability assigned to each payer, a payer program identifier (e.g., an energy efficiency rebate program ID, a four new tire purchase rebate program ID, etc.), and time stamp information (e.g., dates and times for each step of any information transfer or transaction associated with the asset). The contingency information further includes a face value of the potential liability (e.g., a rebate amount when 100% of the liability is to be paid), an estimated payout level (e.g., a value less than or equal to the face value which is a function of available funds and/or compliance to the program etc.), an estimated payout timeframe (e.g., t7 of the lifecycle), and bid information (e.g., bid amount, bid timestamp, entity ID associated with the bid). The contingency information further includes risk information (e.g., the overall risk level associated with the asset and component risk levels that make up the overall risk level such as asset risk, seller risk, payer risk, and buyer risk).

The contingency information further includes related asset information, an authenticity indicator, and asset split information. The related asset information includes other asset identifiers associated with the asset, relationships between the asset and the other assets (e.g., same seller, same program, same payer, same buyer, similar risk information, etc.). The authenticity indicator includes an indication of when the asset is deemed authentic (e.g., a verified payer agrees to the potential liability), and unknown authenticity, and a not authentic (e.g., no payer agrees to the potential liability implied by the asset).

The asset split information includes a number of portions of the asset, a percentage of each portion, portion options (e.g., any additional terms to do with transactions associated with the asset such as recourse where the seller agrees to pay to cover downside associated with a rejection of the request for the potential liability from the payer), and pricing information proportion. The pricing information proportion of the asset includes an ask price, a bid price, a bid-ask spread, and a reserve price.

Returning to the first step of the example method of operation, where the computing entity 21 obtains the asset sale request 200-1 associated with the first asset, the asset module 30 obtains the asset sale request 200-1 by at least one of identifying desired assets associated with the computing entity 20-1 (e.g., identify what a seller associated with the computing entity 20-1 should offer for sale), requesting that the computing entity 20-1 issue the sale request, and receiving the sale request from the computing entity 20-1. In an embodiment the computing entity 20-1 is associated with a third party representing one or more sellers.

The asset sale request 200-1 includes one or more of an ask price, a reserve price, recourse information (e.g., terms of the recourse, a credit card number, etc.), an asset ID (e.g., of the first asset), a face value of the potential liability, a payer identifier, and a percentage liability of each of one or more payers when more than one payer is associated with the potential liability. The asset sale request further includes one or more of the lifecycle status, the ownership information, the payer program ID, the timestamp information, the related asset information, and the asset split information.

Each asset sale request of the asset sale request 200-1 through 200-N include similar attributes as described above. In an instance, the set of asset sale requests are related by an intention to sell a block of assets that are all associated with the same payer and same payer program. The risk level associated with the block of similar assets is lower than the individual risk levels if sold separately since the block is generally viewed as more legitimate, especially when the payer actively supports larger blocks of assets.

FIG. 5C further illustrates the example method of operation of the listing of the contingent asset for sale where, having obtained the set of asset sale requests, in a second step the computing entity 21 selects a first asset sale request of the set of asset sale requests based on a first authenticity indicator associated with the first asset sale request. The selecting includes obtaining the first authenticity indicator (e.g., requesting from the payer, determining the authenticity indicator, extracting the authenticity indicator from the first asset sale request when the payer provided the authenticity indicator to the seller, and receiving the authenticity indicator from the payer). For example, the asset module 30 receives a first authenticity indicator 204 from the computing entity 25-1. The selecting further includes interpreting the first authenticity indicator. For instance, the asset module 30 interprets the first authenticity indicator 204 to indicate that the first asset is authentic.

The selecting the first asset sale request further includes determining that the first asset has not yet been listed for sale and identifying an asset of the set of asset sale requests as the first asset when the asset is a most desired asset of assets of the set of asset sale requests. The identifying includes identifying a best fit for the seller to sell, detecting an asset risk level below a maximum risk threshold level, determining that other sales by the seller are associated with risk levels below a maximum seller risk threshold level, verifying that the payer is associated with a risk level below a maximum payer risk threshold level, and verifying that the seller has sold an aggregate of assets that is below a maximum seller cap.

Having selected the first asset sale request, in a third step of the example method of operation of the listing of the contingent asset for sale, the computing entity 21 determines whether a first asset risk level of the first asset of the first asset sale request is greater than a contingency risk threshold level as illustrated in FIG. 5D. The first asset is created by a computing entity associated with the first payer (e.g., the computing entity 25-1, the computing entity 20-1 on behalf of the computing entity 25-1, the computing entity 21 on behalf of the computing entity 25-1).

The determining includes one or more of obtaining risk levels of relevant attributes, calculating the first asset risk level based on the risk levels of the relevant attributes, and comparing the first asset risk level to the contingency risk threshold level. For example, the asset module 30 obtains the risk levels of the relevant attributes to include risks associated with the payer, the seller, the type of asset, parameters of the sale request, and status of the contingent asset (e.g., contingent versus noncontingent and lifecycle status). As a further example, the asset module 30 maps the risk levels of the relevant attributes to the first asset risk level for comparison to the contingency risk threshold level to determine that the first asset risk level is greater than the contingency risk threshold level.

FIG. 5E further illustrates the example method of operation of the listing of the contingent asset for sale where, having determined whether the first asset risk level is greater than the contingency risk threshold level, in a fourth step, when the first asset risk level of the first asset of the first asset sale request is greater than the contingency risk threshold level, the computing entity 21 establishes a first contingent asset based on the first asset of the first asset sale request. The establishing the first contingent asset includes a series of sub-steps.

A first sub-step includes generating a record for the first contingent asset to include the first asset ID, the seller ID, the payer ID, and seller desired pricing and or timing. A second sub-step includes determining pricing information based on risks and the seller desired pricing. For example, the asset module 30 generates the pricing information based on one or more of a desired sale price from the seller, an estimated probability of payer approval, expected payment timeframe, and expected payment level, an expected rate of return either on the asset or on an annualized basis, recent bid prices for similar assets, and recent bid-ask spreads for pools of similar assets.

Having determined the pricing information, a third sub-step includes verifying the pricing information with the seller. For example, the asset module 30 receives a first contingent asset pricing approval indicator 208 from the computing entity 20-1 to verify the pricing information with the seller.

A fourth sub-step includes updating the record for the first contingent asset to further include the pricing information. For example, the asset module 30 modifies the first contingent asset 206 within the contingent asset database 34 to include the updated record.

Having established the first contingent asset, a fifth step of the example method of operation of listing of a contingent asset for sale includes the computing entity 21 publishing availability of the first contingent asset to a plurality of other computing entities (e.g., to a plurality of potential buyers).

The publishing includes one or more of generating first contingent asset information 210 (e.g., an exchange listing) utilizing the updated record, posting the listing on an exchange (e.g., storing the updated record in the contingent asset database 34 and making that portion of the database available to potential buyers), and sending the first contingent asset information 210 to at least some of the computing entities 23-1 through 23-N to reach buyers with the listing.

FIG. 5F illustrates the risk chart where the first contingent asset has been established in step 4 of the example. The chart further illustrates availability of the first contingent asset upon publishing in step 5 of the example.

Figures 5G, 5H:
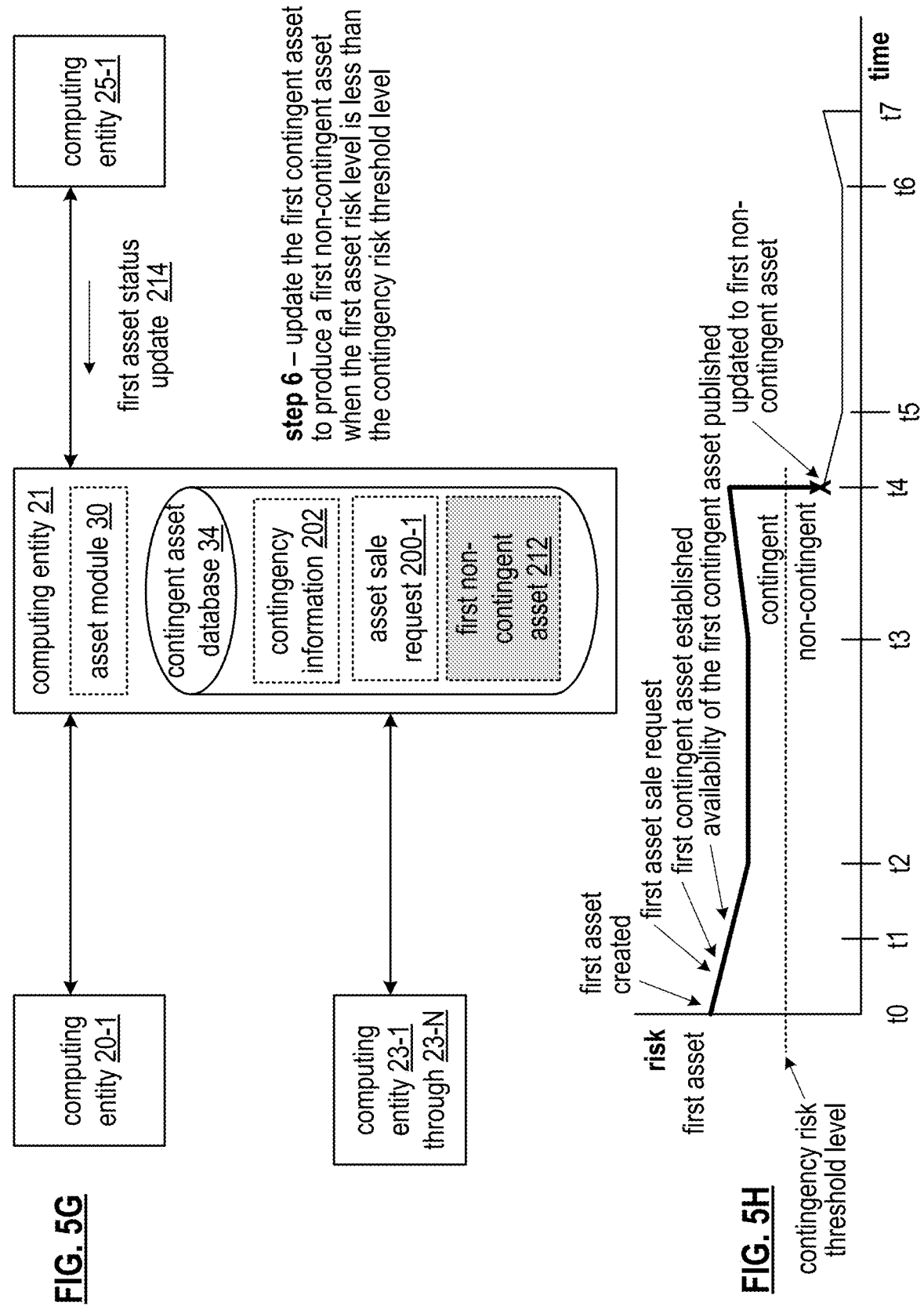

FIG. 5G further illustrates the example method of operation of the listing of the contingent asset for sale where, having published availability of the first contingent asset, in a sixth step the computing entity 21 updates the first contingent asset to produce a first non-contingent asset as illustrated on the risk chart of FIG. 5H, when the first asset risk level of the first contingent asset is less than the contingency risk threshold level providing desired certainty for parties associated with ownership of the first asset during the first asset lifecycle. The updating includes determining the first asset risk level, comparing the first asset risk level to the contingency risk threshold level, and updating the record associated with the first contingent asset to indicate the first non-contingent asset has been created.

The determining of the first asset risk level includes obtaining the status of the first asset. The obtaining includes one or more of interpreting a first asset status update 214 from the computing entity 25-1 (e.g., indicating one of a payment approval status, approval pending, or approval rejected), receipt has seen the risk information associated with the first asset including updating a probability that the payer will pay at the end of the asset lifecycle.

The updating of the record associated with the first contingent asset includes one or more of changing a status from contingent to non-contingent, determining an updated price (e.g., raising the price when the asset is unsold and the payer has approved a subsequent payout), and generating a first non-contingent asset 212 to include the updated record. Alternatively, or in addition to, the asset module 30 further publishes the updated record by sending the first non-contingent asset 212 to the computing entities 23-1 through 23-N when the first asset has not been sold.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 6A-6F are schematic block diagrams of another embodiment of a computing system and a contingent asset risk chart illustrating an example of updating a listing of a contingent asset for sale. The computing system includes the computing entity 20-1 of FIG. 1, the computing entity 21 of FIG. 1, computing entities 23-1 through 23-N of FIG. 1, and the computing entity 25-1 of FIG. 1.

Figures 6A, 6B:
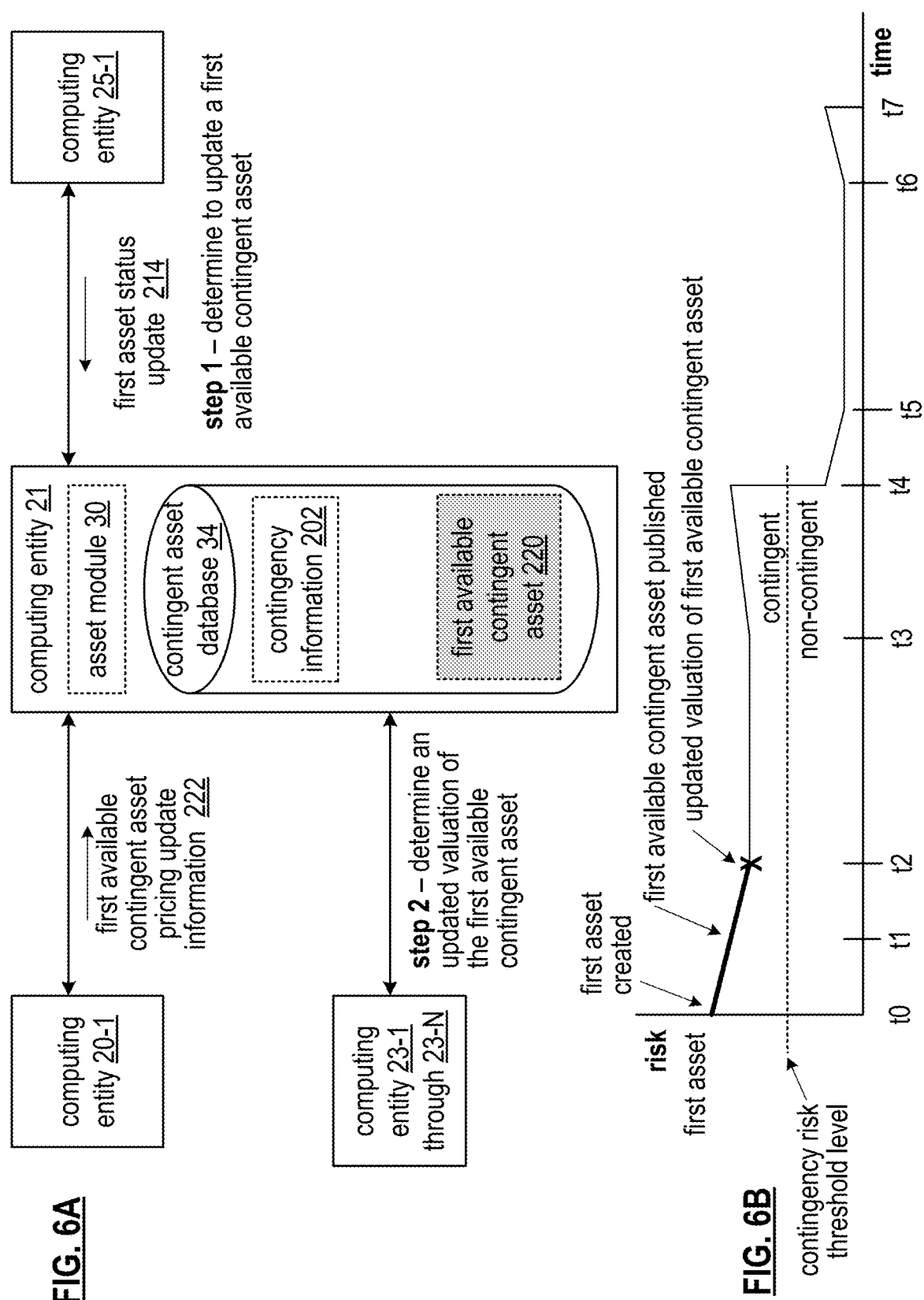
FIGS. 6A-6F are schematic block diagrams of another embodiment of a computing system and a contingent asset risk chart illustrating an example of updating a listing of a contingent asset for sale in accordance with the present invention.

FIG. 6A illustrates an example method of operation of the updating of the listing of the contingent asset for sale where a first step includes the computing entity 21 determining to update a first available contingent asset 220 of a multitude of available contingent assets. The first available contingent asset 220 assigns a potential first liability of a first payer to a first seller associated with the first available contingent asset. At least a portion of the potential first liability is to be paid by the first payer to the first seller in accordance with contingency information 202 and subsequent to completion of a first asset lifecycle, as illustrated in FIG. 6B, of the first available contingent asset.

The determining to update the first available contingent asset 220 includes a variety of approaches. A first approach includes the asset module 30 detecting that an update time frame has elapsed. A second approach includes the asset module 30 interpreting a first asset status update 214 from the computing entity 25-1 (e.g., from the payer). A third approach includes the asset module 30 interpreting first available contingent asset pricing update information 222 from the computing entity 20-1 (e.g., from the seller). For instance, the seller requests a lower asking price. As another instance, the seller requests more time to sell the first asset.

A fourth approach includes the asset module 30 detecting that value has changed on a pool of related assets. A fifth approach includes the asset module 30 determining that a price change for the first asset is required to hit a desired rate of return. A sixth approach includes the asset module 30 detecting that bids for the first asset are under the asking price by more than a maximum difference threshold level (e.g., suggesting the first asset has been overpriced).

Having determined to update the first available contingent asset, a second step of the example method of operation of the updating of the listing of a contingent asset for sale includes the computing entity 21 determining an updated valuation of the first available contingent asset as depicted at t2 on the risk chart of FIG. 6B. The determining includes the asset module 30 reassessing the risk associated with the first asset and recalculating the value of the first available contingent asset based on one or more of a new estimate of the probability of payer approval, an updated expected payment, updated expected payment timing, an updated expected rate of return, recent bid prices for the first asset, and recent bid-ask spreads for other pools of similar assets.

Figures 6C, 6D:
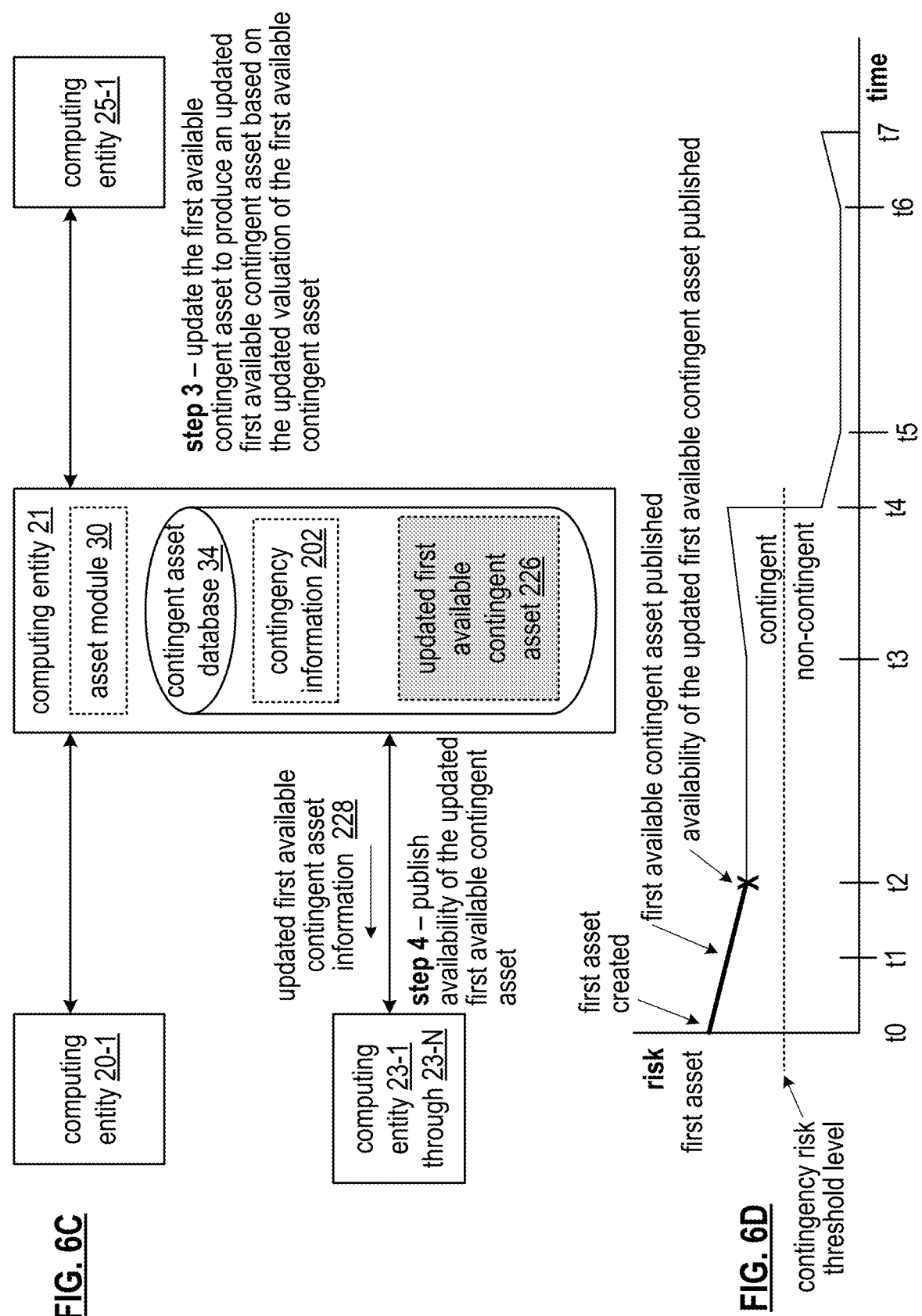

FIG. 6C further illustrates the example method of operation of the updating of the listing of the contingent asset for sale where, having determined the updated valuation of the first available contingent asset, the computing entity 21 updates the first available contingent asset to produce an updated first available contingent asset 226 based on the updated valuation of the first available contingent asset. For example, the asset module 30 updates the record of the first available contingent asset to produce the updated first available contingent asset 226 utilizing the updated valuation. Alternatively, or in addition to, the asset module 30 updates aspects of the contingency information 202 as a function of the new valuation.

Having updated the first available contingent asset, a fourth step of the example method of operation of the updating of the listing of the contingent asset for sale includes the computing entity 21 publishing availability of the updated first available contingent asset 226 to a plurality of other computing entities 23-1 through 23-N (e.g., to buyers) as illustrated in FIG. 6D. The publishing includes the asset module 30 performing one or more of generating an exchange listing, posting the exchange listing on an exchange, generating a record that includes updated first contingent asset information as updated first available contingent asset information 228, sending the updated first available contingent asset information 228 (e.g., the record of the updated first contingent asset) to a plurality of other computing entities (e.g., to the computing entities 23-1 through 23-N).

Figures 6E, 6F:
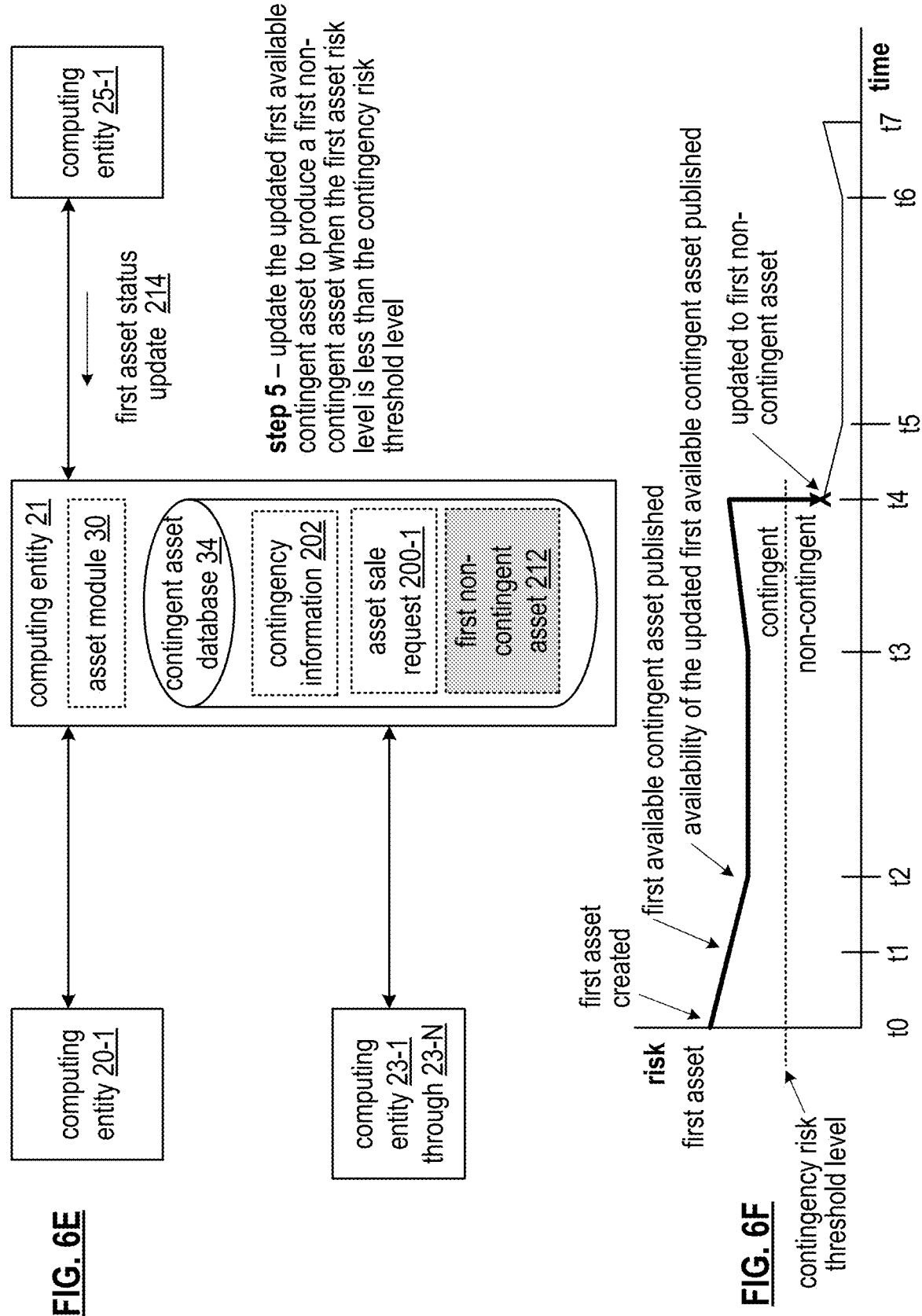

FIG. 6E further illustrates the example method of operation of the updating of the listing of the contingent asset for sale where, having published the availability of the updated first available contingent asset, the computing entity 21 updates the updated first available contingent asset to produce a first non-contingent asset 212 when a first asset risk level of the updated first available contingent asset is less than a contingency risk threshold level. The transitioning to the non-contingent status provides desired certainty for parties associated with ownership of the first asset during and later portion of first asset lifecycle as illustrated in FIG. 6F.

The updating of the updated first available contingent asset to produce the first non-contingent asset 212 by the computing entity 21 includes a series of sub-steps. In a first sub-step the asset module 30 obtains status of the first asset (e.g., interpret a first asset status update 214 from the computing entity 25-1). In a second sub-step the asset module 30 reassesses risk information of the contingency information 202 to produce an updated probability of the payer paying the payout at the end of the asset lifecycle even when the payer has approved the payment. A third sub-step includes the asset module 30 modifying status of the record of the first asset to indicate the non-contingent status. A fourth sub-step includes the asset module 30 repricing the first asset when the first asset is still for sale (e.g., at least the portion of the first asset is still for sale during the asset lifecycle). A fifth sub-step includes the asset module 30 republishing the record for the first non-contingent asset 212 (e.g., to the computing entities 23-1 through 23-N) when the first asset is still available for sale.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 7A-7H are schematic block diagrams of another embodiment of a computing system and a contingent asset risk chart illustrating an example of executing a sale of a contingent asset to a buyer from a seller. The computing system includes the computing entity 20-1 of FIG. 1, the computing entity 21 of FIG. 1, the computing entity 23-1 of FIG. 1, and the computing entity 25-1 of FIG. 1.

Figures 7A, 7B:
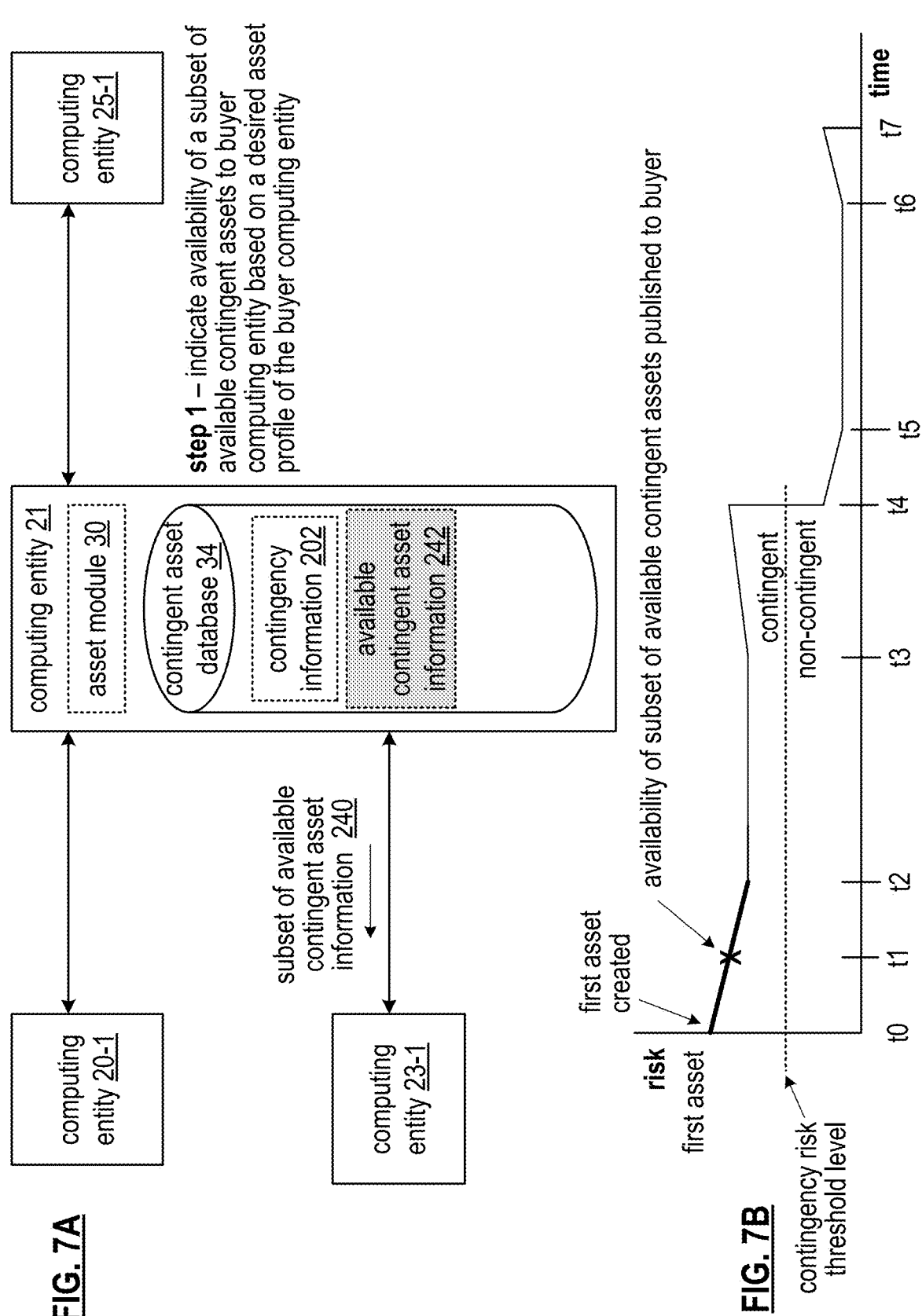

FIG. 7A illustrates an example method of operation of the executing of the sale of the contingent asset to the buyer from the seller, where a first step includes the computing entity 21 indicating availability of a subset of available contingent assets of a multitude of available contingent assets to the computing entity 23-1 at t1 of the risk chart for the asset lifecycle in FIG. 7B, based on a desired asset profile of the computing entity 23-1. A first available contingent asset of the subset of available contingent assets assigns a potential first liability of a first payer to a first seller associated with the first available contingent asset. At least a portion of the potential first liability is to be paid by the first payer to the first seller in accordance with contingency information and subsequent to completion of a first asset lifecycle of the first available contingent asset.

The indicating availability of the subset of available contingent assets includes a series of sub steps. A first sub-step includes the asset module 30 identifying assets desired by the computing entity 23-1 (e.g., the buyer) as the subset of available contingent assets. For example, the asset module 30 compares the desired asset profile of the computing entity 23-1 to assets of available contingent asset information 242 to select those assets that substantially satisfy the desired asset profile. A second sub-step includes the asset module 30 generating subset of available contingent asset information 240 utilizing the selected assets. A third sub-step includes the asset module 30 sending the subset of available contingent asset information 242 the computing entity 23-1. Alternatively, or in addition to, the asset module 30 publishes the available contingent asset information 242 on an exchange and/or sends the available contingent asset information 242 to other computing entities associated with even more buyers.

FIG. 7C further illustrates the example method of operation of the executing of the sale of the contingent asset to the buyer from the seller, where, having indicated the availability of the subset of available contingent assets to the buyer computing entity, in a second step the computing entity 21 obtains a set of contingent asset purchase requests 244 from the computing entity 23-1 (e.g., the buyer). The set of contingent asset purchase requests 244 includes a first contingent asset purchase request 246 with regards to a bid for the first available contingent asset. The set of contingent asset purchase requests are generated within a purchase timeframe as illustrated near t2 of the timeline of the risk chart of the first asset lifecycle of FIG. 7D.

The first contingent asset purchase request 246 includes one or more of the identifier (ID) of the first asset, a buyer ID, a bid price for the first asset, a bid price range as a function of one or more conditions (e.g., higher and of the range when risk of the first asset is lower), and settlement information (e.g., an account to debit upon purchase, a credit instrument to utilize for payment, payment timing, etc.). The conditions of the bid price range include risk, number of similar assets currently available for sale, number of similar assets currently held by the buyer, number of similar assets associated with the payer that still have an active lifecycle, or any other condition that can reasonably affect pricing to create an efficient market.

The obtaining of the set of contingent asset purchase requests 244 by the computing entity 21 includes a variety of approaches. A first approach includes the asset module 30 issuing a request for a bid message to the computing entity 23-1 (e.g., that includes an indication that assets of the subset of available contingent asset information 240 includes assets that substantially satisfied the desired asset profile of the buyer of the computing entity 23-1). A second approach includes the asset module 30 receiving the set of contingent asset purchase request 244 from the computing entity 23-1.

A third approach includes the asset module 30 determining an auto-order outcome based on the desired asset profile of the buyer computing entity. For example, the asset module 30 interprets the desired asset profile to identify the assets to include in auto-generating the contingent asset purchase request 244 on behalf of the buyer computing entity. A fourth approach includes the asset module receiving one or more contingent asset purchase requests from one or more other computing entities.

FIG. 7E further illustrates the example method of operation of the executing of the sale of the contingent asset to the buyer from the seller, where, having obtained the set of contingent asset purchase requests from the buyer computing entity, a third step includes the computing entity 21 determining whether to approve the first contingent asset purchase request based on at least some of the set of contingent asset purchase requests and a risk profile during the purchase timeframe after t2 of the risk chart for the asset lifecycle of FIG. 7F. The asset module 30 determines whether to approve the first contingent asset purchase requests based on one or more of face value of the first asset, a listed price by the seller, a minimum acceptable bid price set by the seller, a bid price from the buyer, a history of bid-ask spreads, other bid acceptances of the set of contingent asset purchase requests, a risk profile associated with the buyer, the risk level of the asset, an assessment to the impact of the buyer's portfolio, and an assessment of the impact to the available contingent assets.

As an example of the determining whether to approve the first contingent asset purchase request, the asset module 30 indicates approval when the risk level of the asset is below a maximum desired asset risk level, the risk profile associated with the buyer is below a buyer maximum risk threshold level, and the bid price from the buyer is greater than the minimum acceptable bid price set by the seller. As another example, the asset module 30 indicates disapproval when the risk level of the buyer is greater than the buyer maximum risk threshold level. As yet another example, the asset module indicates approval when the risk level of the buyer is greater than the buyer maximum risk threshold level and the bid price from the buyer is greater than the listed price by the seller by more than a minimum difference bid-ask spread level.

When the first contingent asset purchase request is approved, a fourth step of the example method of operation to execute the sale of a contingent asset includes the computing entity 21 obtaining payment for purchase of the first available contingent asset from a first buyer associated with the first contingent asset purchase request 246. The obtaining of the payment for purchase includes a series of sub-steps. A first sub-step includes the asset module 30 determining an execution price based on the approval. The determining includes one or more of establishing a base selling price at the bid price and making an adjustment associated with risk and/or transaction fees.

A second sub-step includes the asset module 30 issuing a request for payment to the computing entity 23-1, where the request for payment includes the execution price. A third sub-step includes the asset module 30 receiving purchase information 248 from the computing entity 23-1, where the purchase information 248 includes information to execute the sale including payment (e.g., including instructions such as immediate payment and/or deducting payment from an account associated with the buyer).

Figures 7G, 7H:
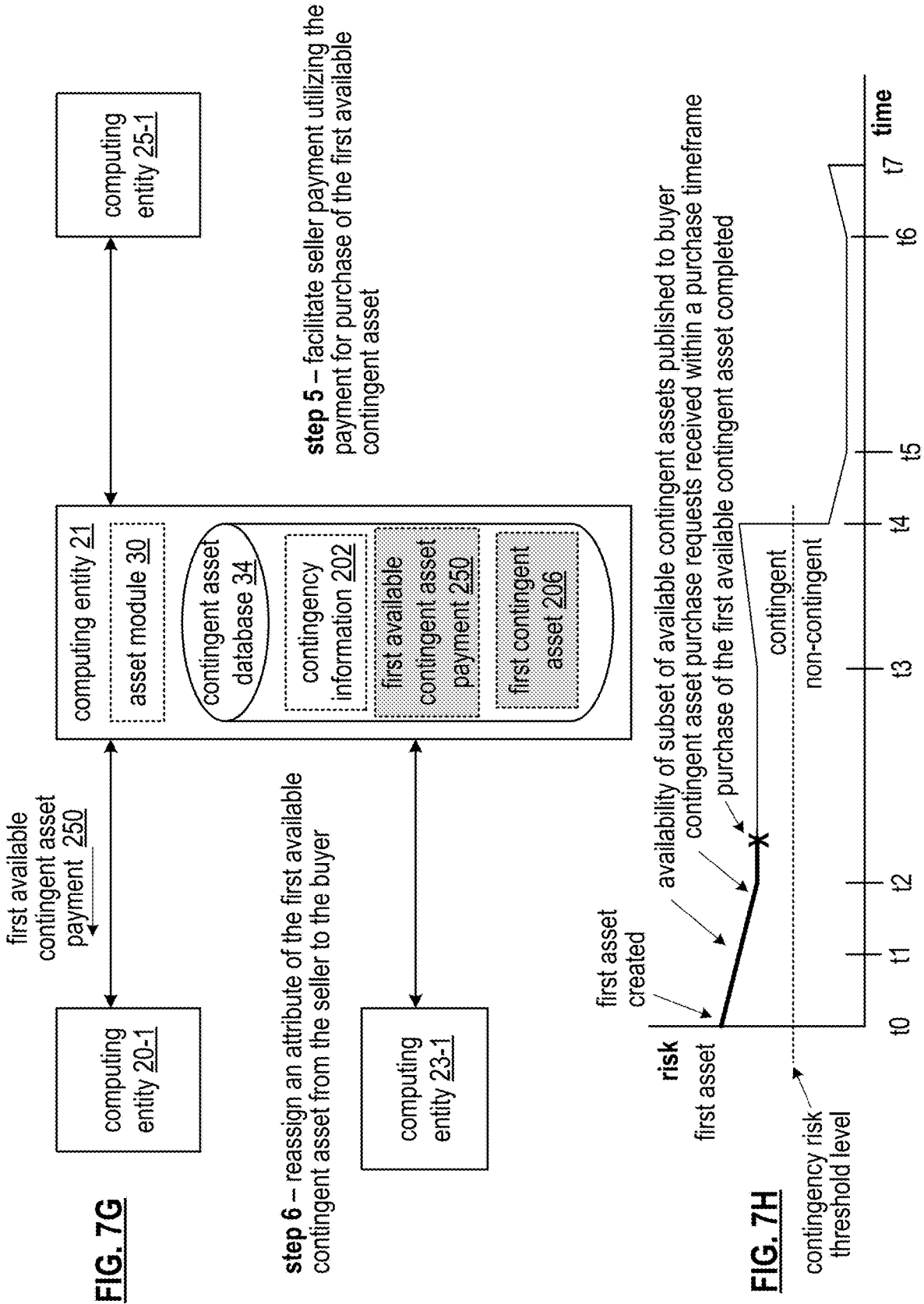

FIG. 7G further illustrates the example method of operation of the executing of the sale of the contingent asset to the buyer from the seller, where, having obtained the payment for the purchase of the first available contingent asset 206, a fifth step includes the computing entity 21 facilitating seller payment utilizing the payment for purchase of the first available contingent asset to complete the purchase as illustrated in the risk chart of the asset timeline of FIG. 7H.

The facilitating includes the asset module 30 determining a seller payment amount from the payment for purchase and based on the contingency information 202 (e.g., recourse, fees, etc.). The facilitating further includes the asset module 30 issuing a first available contingent asset payment 250 to the computing entity 20-1 to satisfy payment to the seller. Alternatively, or in addition to, the asset module 30 updates a seller account with a credit for the seller payment amount.

Having facilitated the seller payment, a sixth step of the example method of operation of the executing of the sale of a contingent asset to the buyer from the seller includes the computing entity 21 reassigning the potential first liability of the first available contingent asset from the first seller to an entity associated with the first buyer of the first contingent asset purchase request. For example, the asset module 30 updates the first contingent asset 206 within the contingent asset database 34 to associate an identifier of the buyer with the first contingent asset 206. Alternatively, or in addition to, a risk level associated with the buyer is updated based on the buyer now holding the first contingent asset 206.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 8A-8D are schematic block diagrams of another embodiment of a computing system and a contingent asset risk chart illustrating an example of facilitating payment from a payer to a buyer for a contingent asset. The computing system includes the computing entity 20-1 of FIG. 1, the computing entity 21 of FIG. 1, the computing entity 23-1 of FIG. 1, and the computing entity 25-1 of FIG. 1.

FIG. 8A illustrates an example method of operation of the facilitating payment from the payer to the buyer for the contingent asset, where a first step includes the computing entity 21 obtaining a lifecycle status for a first contingent asset 206 of a multitude of contingent assets. The first contingent asset 206 assigns a potential first liability of a first payer to an owner entity associated with the first contingent asset 206. At least a portion of the potential first liability is to be paid by the first payer to the owner entity in accordance with contingency information and subsequent to completion of a first asset lifecycle of the first contingent asset 206. The lifecycle status includes pending approval, approval for payment (e.g., pending payment at t7 of FIG. 8B), and rejected.

The obtaining of the lifecycle status for the first contingent asset 206 includes a variety of approaches. A first approach includes the asset module 30 detecting a change in a risk level associated with the first contingent asset. A second approach includes the asset module 30 detecting that a transition time frame has elapsed. A third approach includes the asset module 30 receiving a request for an updated status. A fourth approach includes the asset module 30 issuing a status update to the computing entity 25-1 (e.g., the payer). A fifth approach includes the asset module 30 interpreting a first asset status update 214 from the computing entity 25-1.

Having obtained the lifecycle status for the first contingent asset, when the lifecycle status of the first contingent asset has transitioned to pending payment, a second step of the example method of operation to facilitate payment from the payer to the buyer of the contingent asset includes the computing entity 21 obtaining a payout for the first contingent asset from the first payer in accordance with the contingency information 202. The obtaining of the payout includes a series of sub-steps. A first sub-step includes the asset module 30 determining an expected payout based on the contingency information 202 and payout information of the first contingent asset 206. For example, the asset module 30 determines the expected payout to be a committed payout level from the computing entity 25-1.

A second sub-step includes the asset module 30 issuing a payout request to the computing entity 25-1 of the payer, where the payout request includes the expected payout. A third sub-step includes the asset module 30 receiving a first contingent asset payout 260 from the computing entity 25-1. Alternatively, or in addition to, the first contingent asset payout 260 is included in a batch payment from the computing entity 25-1 for a multitude of asset payouts.

Figures 8C, 8D:
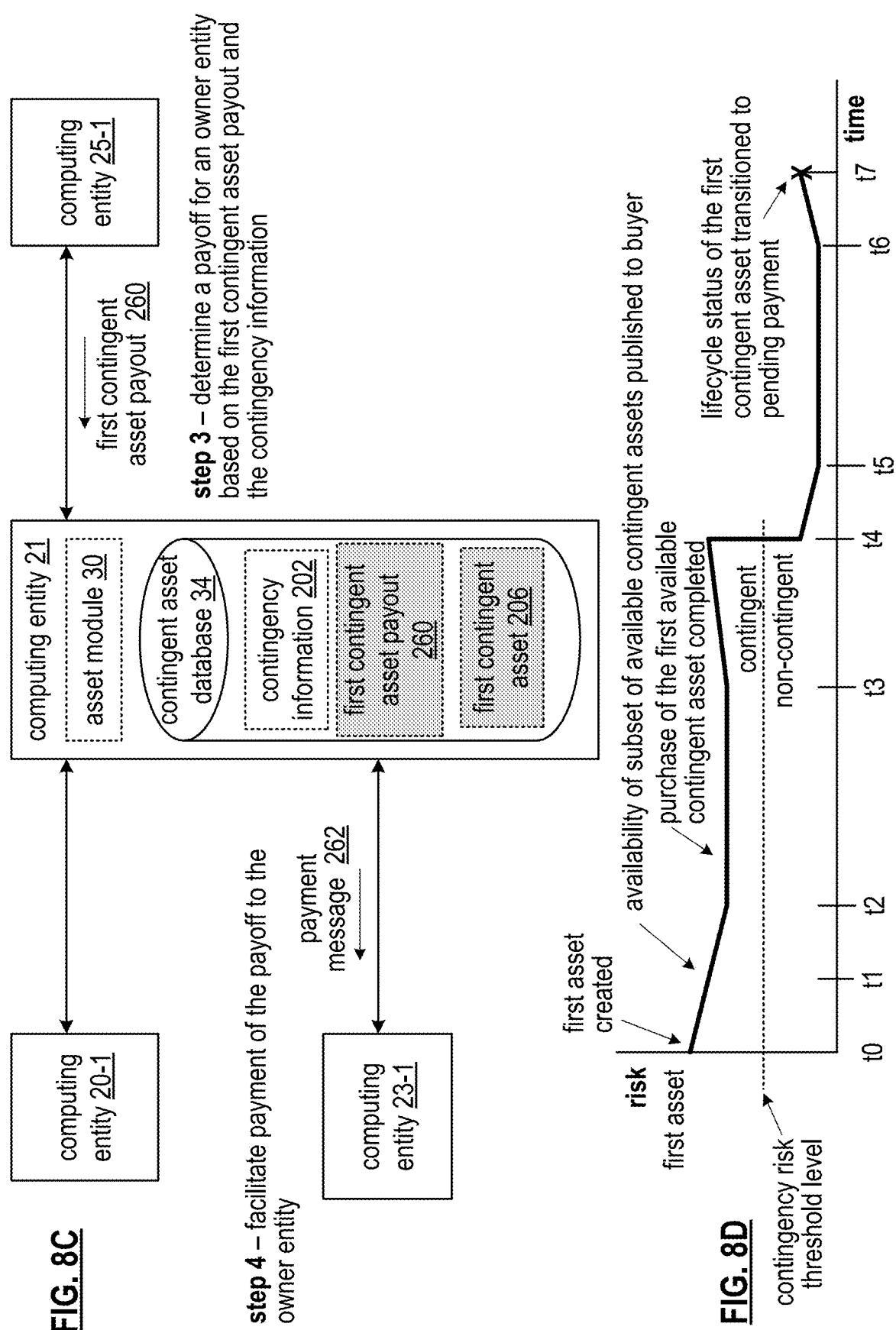

FIG. 8C further illustrates the example method of operation of the facilitating payment from the payer to the buyer for the contingent asset, where, when the lifecycle status of the first contingent asset has transitioned to pending payment as illustrated at t7 in FIG. 8D, and having obtained the payout for the first contingent asset from the first payer, a third step includes the computing entity 21 determining a payoff for the owner entity based on the payout and the contingency information 202. For example, when the payout is less than a face value, the asset module 30 calculates the payoff to be the payout minus any fees (e.g., a transaction fee). As another example, when the payout is greater than the face value, the asset module 30 calculates the payoff to be the payout minus the fees and further disposes of an overage (e.g., a difference between the payout and the face value) in accordance with the contingency information 202 (e.g., transfer funds to an account associated with an exchange, credit the buyer for a portion of a future purchase, credit the seller for repurchase of a future sale).

Having determined the payoff for the owner entity, a fourth step of the example method of operation of the facilitating payment from the payer to the buyer includes the computing entity 21 facilitating payment of the payoff to the owner entity. For example, the asset module 30 generates a payment message 262 that includes payment information in accordance with the first contingent asset payout 260. The asset module 30 sends the payment message 262 to the computing entity 23-1 associated with the owner entity. Alternatively, or in addition to, the asset module 30 credits an account associated with the owner entity for the amount of the payoff.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

Figure 9A:
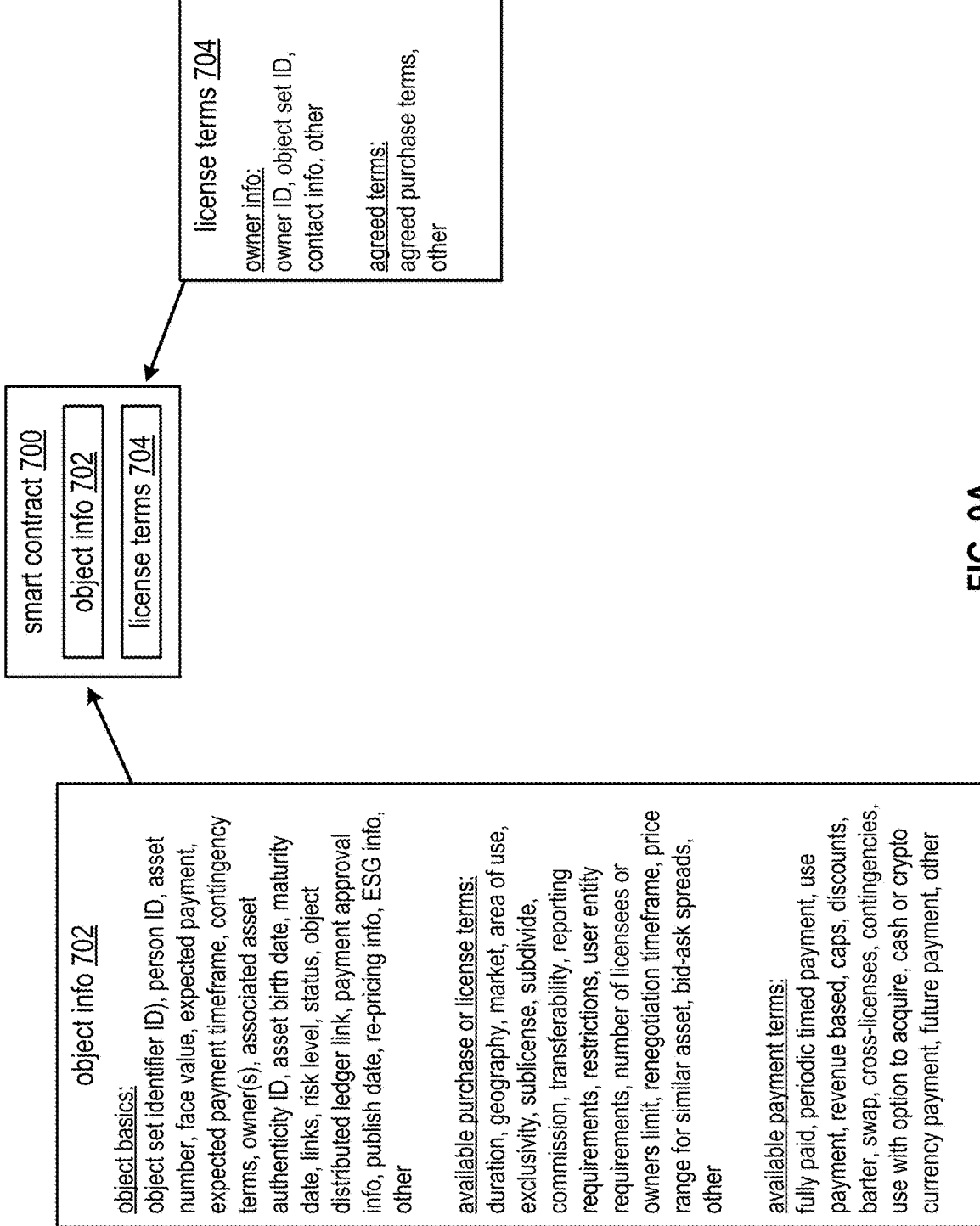
FIG. 9A is a schematic block diagram of a data structure for a smart contract in accordance with the present invention.

FIG. 9A is a schematic block diagram of a data structure for a smart contract 700 that includes object information 702 and. The object information 702 includes object basics (e.g., including links to blockchains and electronic assets), available purchase and/or license terms, and available patent terms. FIG. 9A illustrates examples of each category of the object information 702. Examples of an object of the object information 702 that are associated with contingent asset offerings include an object set identifier (e.g., of one or more contingent assets), a face value of a contingent asset, and expected payment timeframe of the contingent asset and further parameters associated with contingent assets as illustrated in FIG. 9A.

The further parameters include the environment, social, governance (ESG) information. ESG information includes negative factors caused by an entity with respect to environment, society, and entity governance. The ESG information is utilized by participants in an ESG system. The participants include investors, entities causing the negative factors, exchanges, regulatory entities, certification entities, management entities, metrics tracking entities, government entities, and ESG solution implementation entities. The ESG information further includes environment information, social information, and governance information. The ESG information broadly includes a description and metrics around the negative factors and descriptions and metrics around abatement of the negative factors.

The abatement of the negative factors includes recognizing metric levels associated with certain offsets for the negative factors. The offsetting metrics include credits from public benefit assets. Hereafter the terms public benefit assets, public benefit credits, and public benefit asset credits may be used interchangeably. In an embodiment, a public benefit asset has a net positive impact or credit (e.g., to offset a negative factor). In another embodiment, another public benefit asset has a net negative impact or debit (e.g., not a credit), where the debit actually makes the negative factor more negative. A public benefit credit includes an array of tangible offsets to abate the negative factors of any of the components of the ESG information, utilizing a public benefit asset (e.g., in a good "credit" way). For example, a carbon credit, a set of micro-carbon credits, and/or a carbon offset serves to offset a negative factor associated with the environment information. As another example, a diversity credit offsetting negative factors associated with the social information. As yet another example, a Board of Directors composition credit offsetting negative factors associated with the governance information.

As an instance of a negative environment factor, air pollution produced by a particular entity in terms of tons of carbon per year. As an associated instance of an abatement factor, a one time carbon credit granted for an environmental project to offset the air pollution where the carbon credit is associated with a metric of tons of carbon.

An instance of a negative social factor includes a low management team diversity score associated with an entity. An instance of an associated abatement factor, a one-time diversity credit to offset a negative diversity factor.

An ecosystem for creating, trading, and utilizing public benefit credits to offset the negative factors is supported by utilization of smart contracts 700, tokens, blocks, and block chains as is further discussed. Numerous embodiments of inventions are described to support creation of digital representations of the smart contracts and tokens. Numerous inventions are further described to securely support an immutable public and/or nonpublic ledger to represent the smart contracts and tokens facilitating interest and support of addressing the negative factors with projects and programs there are credited with offsets of the negative factors.

The license terms 704 includes owner information and agreed terms for a sale of a contingent asset associated with the smart contract. FIG. 9A further illustrates examples of each of the categories of the license terms 704. Further examples are referenced below.

Figures 9B, 9C:
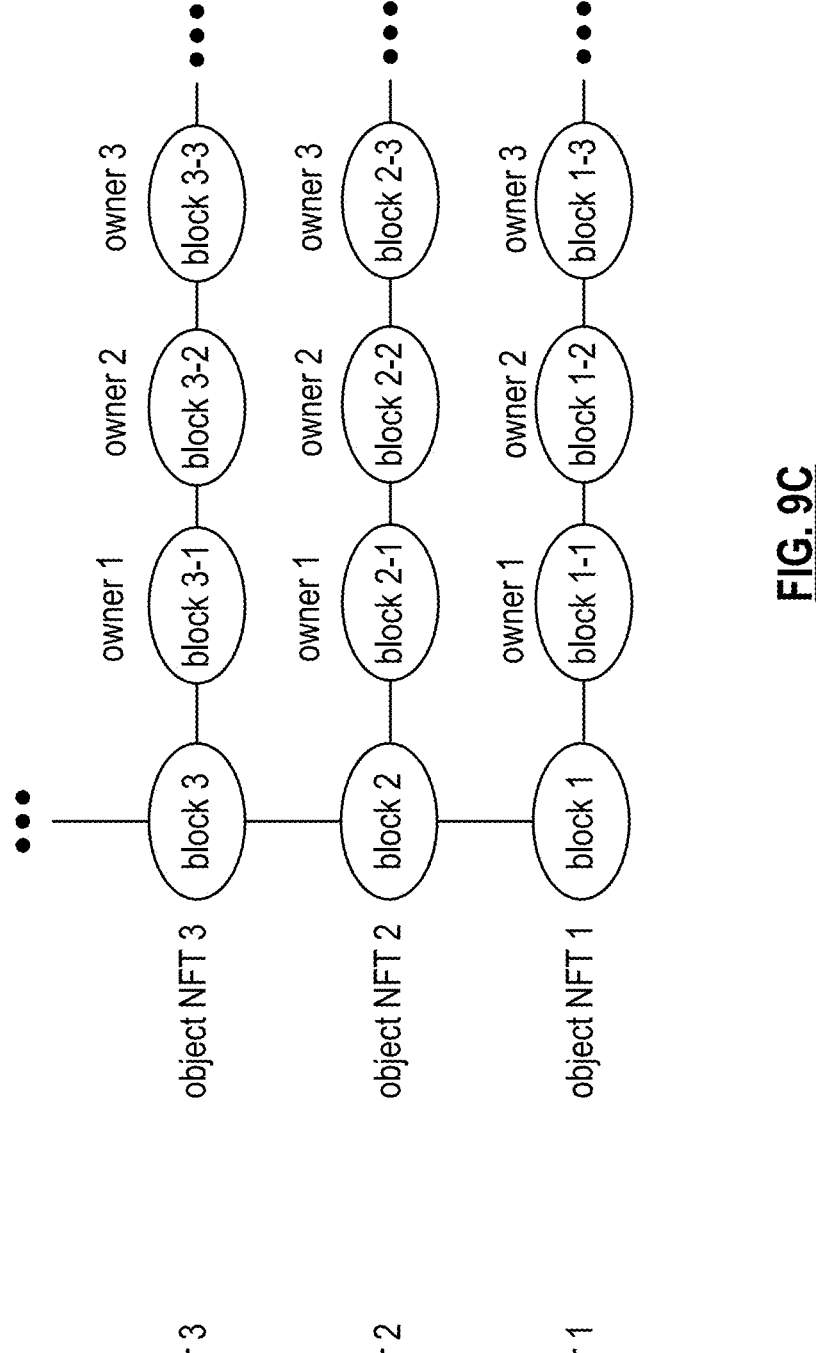
FIGS. 9B and 9C are schematic block diagrams of organization of object distributed ledgers in accordance with the present invention.

FIGS. 9B and 9C are schematic block diagrams of organization of object distributed ledgers. FIG. 9B illustrates an example where a single blockchain serves as the object distributed ledger linking a series of blocks of the blockchain, where each block is associated with a different owner (e.g., different owners over time for a particular contingent asset represented by a nonfungible token). FIG. 9C illustrates another example where a first blockchain links a series of blocks of different non-fungible tokens for different sets of contingent assets. Each block forms a blockchain of its own where each further block (e.g., to the right) of its own is associated with a different owner over time for the set of contingent asset objects associated with the non-fungible token.

Figure 9D:
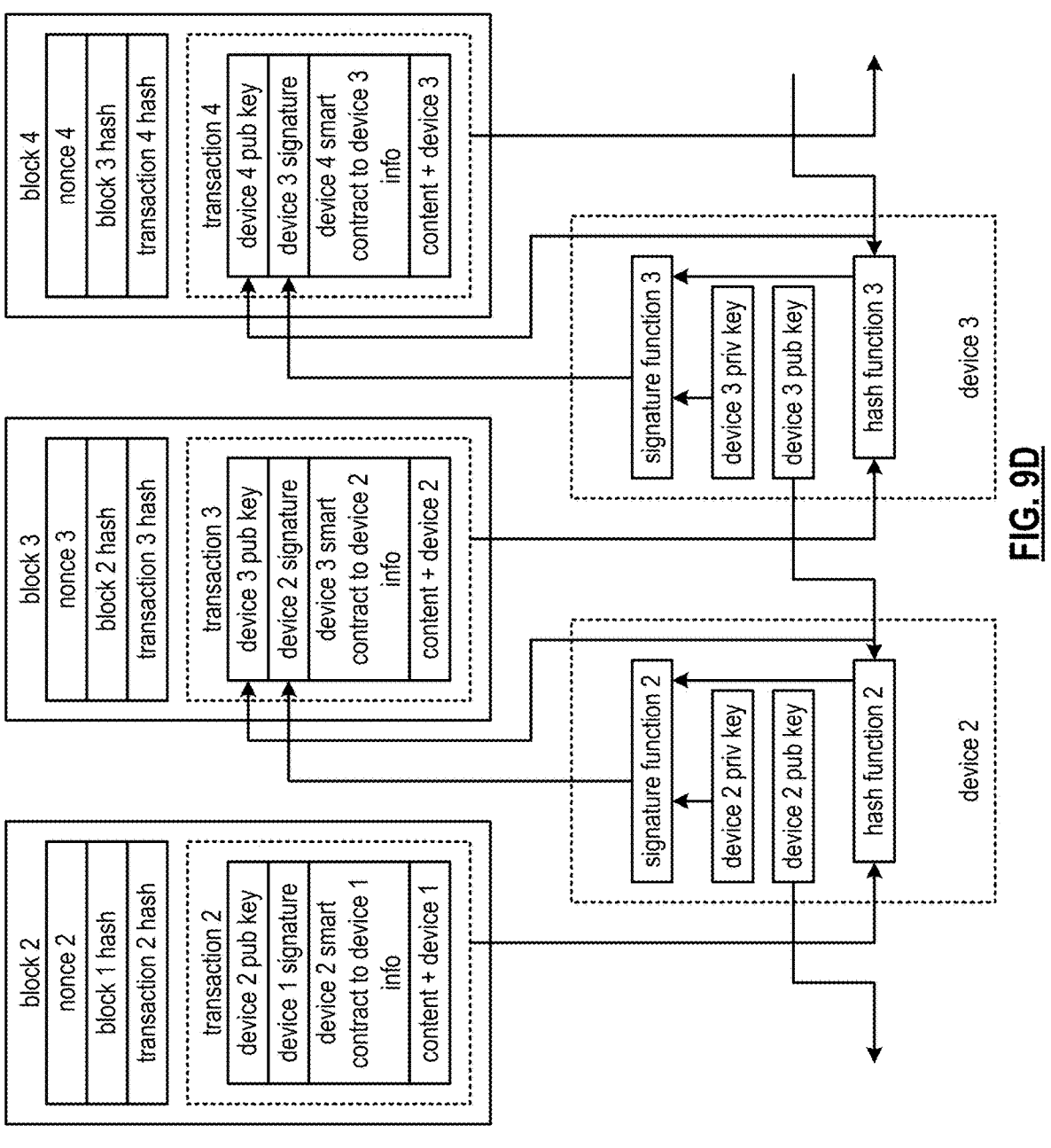
FIG. 9D is a schematic block diagram of an embodiment of a blockchain associated with an object distributed ledger in accordance with the present invention.

FIG. 9D is a schematic block diagram of an embodiment of content blockchain of an object distributed ledger, where the content includes the smart contract as previously discussed. The content blockchain includes a plurality of blocks 2-4. Each block includes a header section and a transaction section. The header section includes one or more of a nonce, a hash of a preceding block of the blockchain, where the preceding block was under control of a preceding device (e.g., a broker computing device, a user computing device, a blockchain node computing device, etc.) in a chain of control of the blockchain, and a hash of a current block (e.g., a current transaction section), where the current block is under control of a current device in the chain of control of the blockchain.

The transaction section includes one or more of a public key of the current device, a signature of the preceding device, smart contract content, change of control from the preceding device to the current device, and content information from the previous block as received by the previous device plus content added by the previous device when transferring the current block to the current device.

FIG. 9D further includes devices 2-3 to facilitate illustration of generation of the blockchain. Each device includes a hash function, a signature function, and storage for a public/private key pair generated by the device.

An example of operation of the generating of the blockchain, when the device 2 has control of the blockchain and is passing control of the blockchain to the device 3 (e.g., the device 3 is transacting a transfer of content from device 2), the device 2 obtains the device 3 public key from device 3, performs a hash function 2 over the device 3 public key and the transaction 2 to produce a hashing resultant (e.g., preceding transaction to device 2) and performs a signature function 2 over the hashing resultant utilizing a device 2 private key to produce a device 2 signature.

Having produced the device 2 signature, the device 2 generates the transaction 3 to include the device 3 public key, the device 2 signature, device 3 content request to 2 information, and the previous content plus content from device 2. The device 3 content request to device 2 information includes one or more of a detailed content request, a query request, background content, and specific instructions from device 3 to device 2 for access to a patent license. The previous content plus content from device 2 includes one or more of content from an original source, content from any subsequent source after the original source, an identifier of a source of content, a serial number of the content, an expiration date of the content, content utilization rules, and results of previous blockchain validations.

Having produced the transaction 3 section of the block 3 a processing module (e.g., of the device 2, of the device 3, of a transaction mining server, of another server), generates the header section by performing a hashing function over the transaction section 3 to produce a transaction 3 hash, performing the hashing function over the preceding block (e.g., block 2) to produce a block 2 hash. The performing of the hashing function may include generating a nonce such that when performing the hashing function to include the nonce of the header section, a desired characteristic of the resulting hash is achieved (e.g., a desired number of preceding zeros is produced in the resulting hash).

Having produced the block 3, the device 2 sends the block 3 to the device 3, where the device 3 initiates control of the blockchain. Having received the block 3, the device 3 validates the received block 3. The validating includes one or more of verifying the device 2 signature over the preceding transaction section (e.g., transaction 2) and the device 3 public key utilizing the device 2 public key (e.g., a re-created signature function result compares favorably to device 2 signature) and verifying that an extracted device 3 public key of the transaction 3 compares favorably to the device 3 public key held by the device 3. The device 3 considers the received block 3 validated when the verifications are favorable (e.g., the authenticity of the associated content is trusted).

FIGS. 9E-9M are schematic block diagrams of another embodiment of a computing system, contingent asset risk charts, and a blockchain record illustrating an example of listing a contingent asset for sale utilizing an object distributed ledger. The computing system includes the computing entity 20-1 of FIG. 1, the computing entity 21 of FIG. 1, computing entities 23-1 through 23-N of FIG. 1, and the computing entity 25-1 of FIG. 1.

FIG. 9E illustrates an example method of operation of the listing of the contingent asset for sale utilizing the blockchain record where in a first step the asset module 30 obtains a set of asset sale requests 200-1 through 200-N from the computing entity 20-1 as depicted prior to t3 on the risk vs. time chart of FIG. 9F. A first asset of a first asset sale request of the set of asset sale requests assigns a face value level of a potential first liability of a first payer to a first seller associated with the first asset. At least a portion of the face value of the potential first liability is to be paid by the first payer to the first seller in accordance with contingency information and subsequent to completion of a first asset lifecycle of the first asset. The set of asset sale requests are generated within a sales timeframe.

The computing entity 21 obtains the asset sale request 200-1 associated with the first asset by at least one of identifying desired assets associated with the computing entity 20-1 (e.g., identify what a seller associated with the computing entity 20-1 should offer for sale), requesting that the computing entity 20-1 issue the sale request, and receiving the sale request from the computing entity 20-1. Alternatively, or in addition to, the asset sale request 200-1 includes a blockchain record associated with the first asset. In an embodiment the computing entity 20-1 is associated with a third party representing one or more sellers.

The first step further includes the computing entity 21 interpreting a set of digital records representing a multitude of contingent assets to produce a set of contingent asset sale requests. A first contingent asset of a first contingent asset sale request of the set of contingent asset sale requests assigns a potential first liability of a first payer to a first seller associated with the first contingent asset. For example, the asset module 30 interprets the digital record of asset sale request 200-1 to produce the first contingent asset sale request for the first contingent asset. The asset module 30 stores the asset sale requests in the contingent asset database 34.

Figure page further illustrates the example method of operation of the listing of the contingent asset for sale utilizing the blockchain record where, having produced the set of contingent asset sale requests, in a second step the computing entity 21 interpreting a first authenticity indicator 204 associated with the first contingent asset sale request to produce a first contingent asset risk level of the first contingent asset of the first contingent asset sale request. The interpreting of the first authenticity indicator 204 associated with the first contingent asset sale request to produce the first contingent asset risk level of the first contingent asset of the first contingent asset sale request includes a series of sub-steps.

A first sub-step includes identifying an asset authenticity computing entity based on an identifier of the first seller. For example, the asset module 30 interprets the asset sale request 200-1 to extract an identifier of the asset authenticity computing entity as computing entity 25-1.

A second sub-step includes obtaining authenticity information from the asset authenticity computing entity for the first contingent asset. For example, the asset module 30 issues a request for the authenticity information for the first contingent asset to the computing entity 25-1 and receives a response from the computing entity 25-1 that includes the first authenticity indicator 204.

A third sub-step includes the computing entity 21 indicating that the first contingent asset is valid when the authenticity information validates that the potential first liability of the first payer is to the first seller associated with the first contingent asset and that the first payer has not disapproved payment of the potential first liability. For example, the asset module 30 interprets the first authenticity indicator 204 to determine a status of the first contingent asset where the status indicates that the potential first liability of the asset sale request 200-1 is confirmed as associated with the first payer. The asset module 30 further interprets the first authenticity indicator 204 to determine that the status indicates that the potential first liability of the first payer is to be made to the first seller of the asset sale request 200-1. The asset module 30 further interprets the first authenticity indicator 204 to determine that the status indicates that the first payer has not disapproved payment of the potential first liability (e.g., status is either approved or pending approval but not denied).

When the first contingent asset is valid and the authenticity information indicates approval of the payment of the potential first liability by the first payer, a fourth sub-step includes the computing entity 21 establishing the first contingent asset risk level to be less than the contingency risk threshold level. For example, the asset module 30 updates contingency information 202 in the contingent asset database 34 to indicate that the first contingent asset risk level is less than the contingency risk threshold level since the first payer has approved the payment.

Alternatively, when the first contingent asset is valid and the authenticity information indicates pending approval of the payment of the potential first liability by the first payer, a fifth sub-step includes the computing entity 21 establishing the first contingent asset risk level to be greater than the contingency risk threshold level since the first payer has not yet approved the payment implying that it is possible that payment will never be made.

Having produced the first contingent asset risk level, a third step of the example method of operation includes the computing entity 21 determines whether the first contingent asset risk level of the first contingent asset is greater than the contingency risk threshold level as illustrated in FIG. 9H. In an embodiment, the computing entity 21 updates the first contingent asset risk level as interpreted from the first authenticity indicator 204 by obtaining risk levels of relevant attributes, re-calculating the first contingent asset risk level based on the risk levels of the relevant attributes, and comparing the first contingent asset risk level to the contingency risk threshold level. For example, the asset module 30 obtains the risk levels of the relevant attributes to include risks associated with the payer, the seller, the type of contingent asset, parameters of the sale request, and status of the first contingent asset (e.g., contingent versus noncontingent and lifecycle status). As a further example, the asset module 30 maps the risk levels of the relevant attributes to the first contingent asset risk level for comparison to the contingency risk threshold level to determine that the first contingent asset risk level is greater than the contingency risk threshold level. As yet another example, the asset module 30 indicates that the first contingent asset risk level is greater than the contingency risk threshold level when a blockchain record of the first asset (e.g., as received in the asset sale request 200-1 and/or the first authenticity indicator 204) indicates that the payer has not approved the potential liability yet.

When the first contingent asset risk level of the first contingent asset of the first contingent asset sale request is greater than a contingency risk threshold level, the third step of the example method of operation further includes the computing entity 21 establishing first available terms for the first contingent asset based on the first contingent asset sale request. The establishing the first available terms for the first contingent asset based on the first contingent asset sale request includes a series of sub-steps.

A first sub-step includes determining proposed pricing of the first contingent asset based on one or more of a desired sale price from the first seller, an estimated probability of first payer approval, an expected payment timeframe, an expected payment level, an expected rate of return for the first seller, recent bid prices for other contingent assets, and recent bid-ask spreads for the other contingent assets. For example, the asset module 30 determines the proposed pricing of the first contingent asset as the same as the desired sale price from the first seller as indicated in the asset sale request 200-1.

A second sub-step includes determining whether the proposed pricing is acceptable to the first seller. For example, the asset module 30 issues a query to the computing entity 20-1 and receives a query response indicating whether the proposed pricing is acceptable to the first seller. As another example, the asset module 30 recovers acceptable pricing range information for the first seller from the contingency information 202 and indicates whether the proposed pricing is acceptable to the first seller based on interpreting the acceptable pricing range information.

A third sub-step includes establishing the first available license terms to include the proposed pricing of the first contingent asset when the proposed pricing is acceptable to the first seller. For example, the asset module 30 updates the contingency information 202 for the first contingent asset to include the proposed pricing as approved by the first seller.

Figures 9I, 9J:
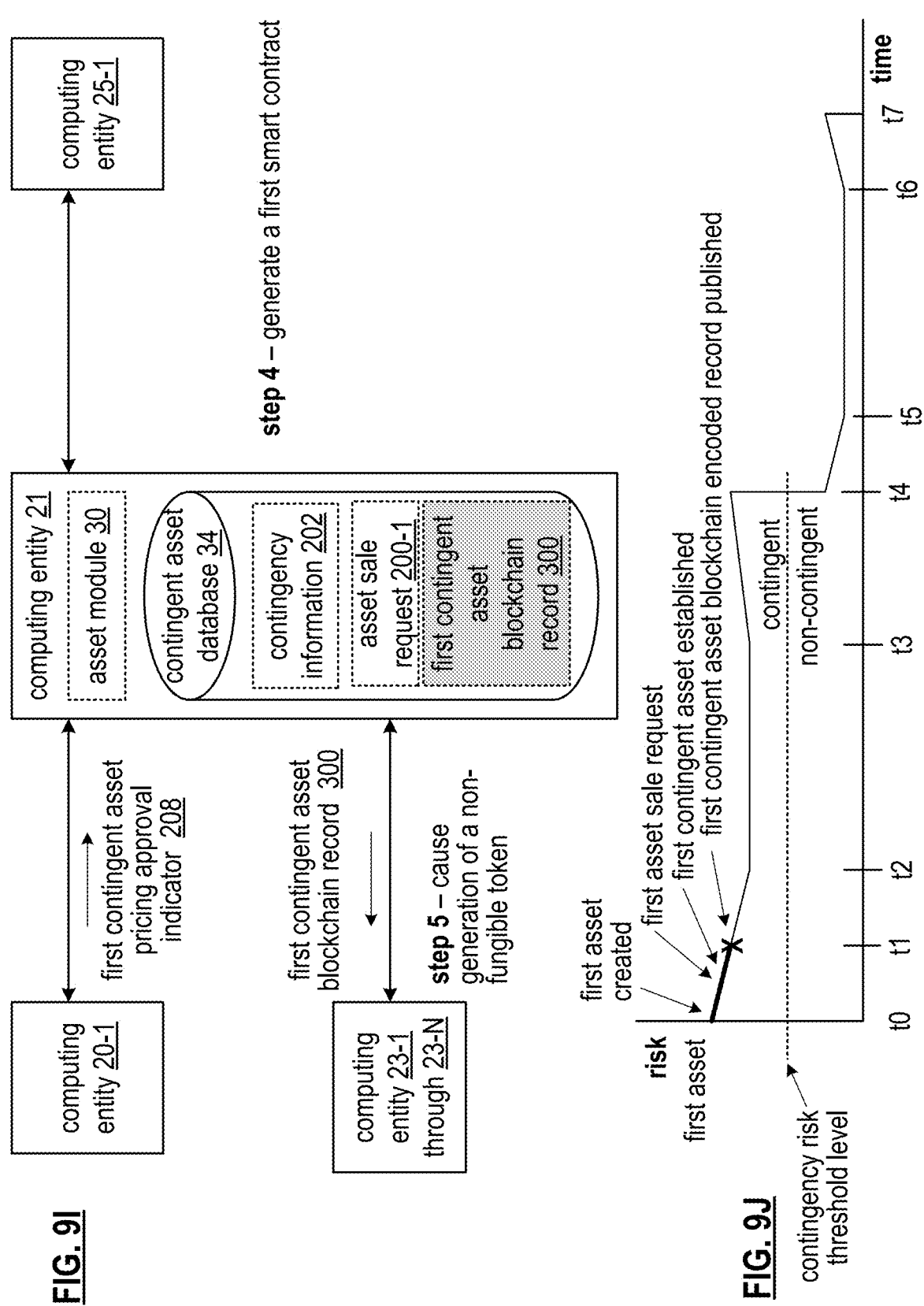

FIG. 9I further illustrates the example method of operation of the listing of the contingent asset for sale utilizing the blockchain record where, having established the first available terms for the first contingent asset, a fourth step includes the computing entity 21 generating a first smart contract to indicate availability of the first contingent asset to include the first available terms and a contingent status. For example, the asset module 30 generates the smart contract 700 as discussed previously to include an indication of availability of the first contingent asset, the first available terms, and a status indicator indicating that the payment by the first payer is still contingent (e.g., not approved yet).

Having generated the first smart contract, a fifth step of the example method of operation includes the computing entity 21 causing generation of a non-fungible token to represent the first smart contract in the object distributed ledger as illustrated in a publishing step along the lifecycle in FIG. 9J. The causing the generation of the non-fungible token associated with the first smart contract in the object distributed ledger includes determining whether to indirectly or directly update the object distributed ledger. For example, the computing entity 21 determines to indirectly update the object distributed ledger when the computing entity 21 does not have a satisfactory direct access to the object distributed ledger (e.g., the computing entity 21 does not serve as a blockchain node). As another example, the computing entity 21 determines to directly update the object distributed ledger when a predetermination stored in the contingent asset database 34 indicates to directly access the object distributed ledger when possible (e.g., a copy of the blockchain is stored in the contingent asset database 34 of the computing entity 21).

When indirectly updating the object distributed ledger, the causing the generation includes the computing entity 21 issuing a non-fungible token generation request to an object ledger computing device serving as a blockchain node of the object distributed ledger. The non-fungible token generation request includes the first smart contract. For example, the computing entity 21 issues a first contingent asset blockchain record 300 to the computing entity 23-1, where the contingent asset blockchain record 300 includes the request and the first smart contract. In response, the computing entity 23-1 adds a new non-fungible token listing to the object distributed ledger (e.g., as illustrated by FIGS. 9B and 9C).

Figure 9K:
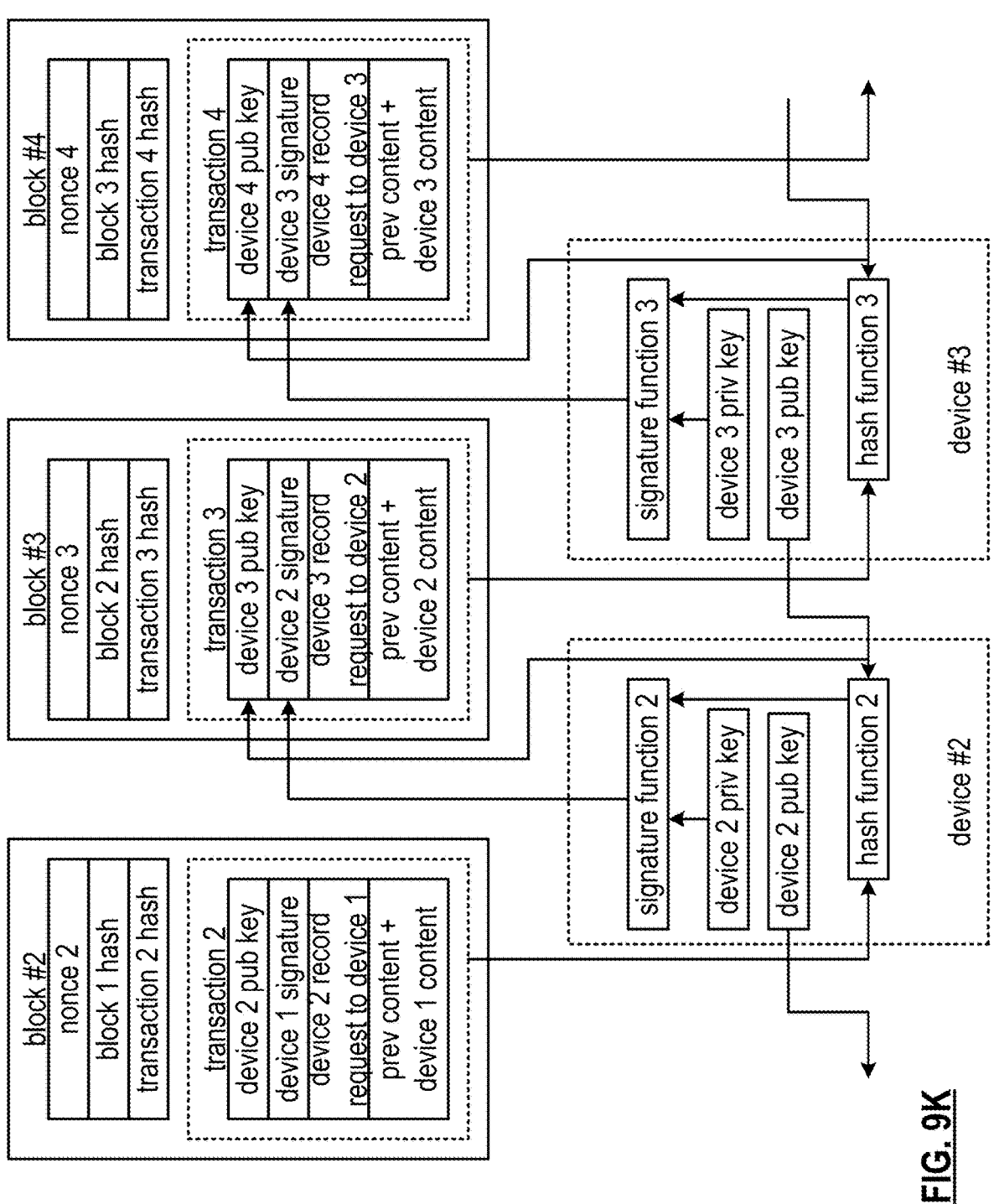

When directly updating the object distributed ledger, the causing the generation includes the computing entity 21 performing a series of sub-steps previously discussed in FIG. 9D and as also discussed in FIG. 9K. A first sub-step includes obtaining a copy of the object distributed ledger. For example, the computing entity 21 extracts the object distributed ledger from a message from computing entity 23-1. As another example, the computing entity 21 recovers the object distributed ledger from the contingent asset database 34.

A second sub-step includes hashing the first smart contract utilizing a receiving public key of the object distributed ledger to produce a next transaction hash value. For example, the computing entity 21 obtains a suitable receiving public key (e.g., from a current version of the blockchain, from a blockchain node, from the computing entity 23-1) and performs the hashing function to produce the next transaction hash value.

A third sub-step includes encrypting the next transaction hash value utilizing a private key of the computing entity 21 to produce a next transaction signature. For example, the computing entity 21 recovers a private key associated with the computing entity 21 and utilizes the recovered private key to encrypt the next transaction hash value to produce the next transaction signature.

A fourth sub-step includes generating a next block of a blockchain of the object distributed ledger to include the first smart contract and the next transaction signature. For example, the computing entity 21 generates the next block as previously discussed with regards to FIG. 9D to include the first smart contract and the next transaction signature.

A fifth sub-step includes causing inclusion of the next block as the non-fungible token in the object distributed ledger. For example, the computing entity 21 appends the next block of the blockchain in the object distributed ledger as previously discussed with reference to FIG. 9D to update the object distributed ledger as illustrated in FIGS. 9B and 9C.

Alternatively, when the first contingent asset risk level of the first contingent asset of the first contingent asset sale request is less than the contingency risk threshold level, the example method of operation includes the computing entity 21 establishing the first available terms for the first contingent asset based on the first contingent asset sale request. The example method of operation further includes the computing entity 21 generating first smart contract to indicate the availability of the first contingent asset to include the first available terms and a non-contingent status (e.g., the first payer has approved the payment). The example method of operation further includes the computing entity 21 causing generation of the non-fungible token to represent the first smart contract in the object distributed ledger as previously discussed.

FIG. 9K illustrates an example of generating, using a securely passing process, a contingent asset blockchain record (e.g., for the first contingent asset blockchain record 300) for secure passing of a token between a previous "owner" and a "new owner." A technological improvement is provided over prior art communication and computing systems associated with data management since only the device possessing control over the token may modify the token as part of such a tightly integrated overall digital records process described in this section for the present invention. Only a present trusted device may pass the control to a next trusted device that is part of the overall records management process.

Such blockchain-encoded records are utilized to securely represent contingent assets through the contingent asset lifecycle of FIG. 5B. In particular, a blockchain of blockchain-encoded records is utilized to record transactions and updates associated with a particular contingent asset. For instance, a new blockchain is created when a contingent asset is created by an associated computing entity on behalf of an initial owner. As another instance, the blockchain is updated when the contingent asset is sold by the original owner to a buyer. As yet another instance, the blockchain is updated when the contingent asset is sold by the buyer to another buyer. As a still further instance, the blockchain is updated when a liability of the contingent asset is paid by a payer to a current owner.

Each block of the blockchain includes various fields associated with the blockchain and a transaction field that includes content associated with the corresponding contingent asset as previously discussed. The content includes anything related to the contingent asset including contingency information and transaction information associated with a current event prompting updating of the blockchain.

The example blockchain includes blocks 2-4. Each block includes a header section and a transaction section. The header section includes one or more of a nonce, a hash of a preceding block of the blockchain, where the preceding block was under control of a preceding computing device (e.g., a computing device of a seller) in a chain of control of the blockchain, and a hash of a current block (e.g., a current transaction section). The current block is under control of a current computing device in the chain of control of the blockchain.

The transaction section includes one or more of a public key of the current computing device, a signature of the preceding computing device, request information regarding a record request and change of control from the preceding computing device to the current computing device, and content information from the previous block as received by the previous computing device plus content added by the previous computing device when transferring the current block to the current computing device.

The example further includes computing devices 2-3 (e.g., devices #2 and #3) to facilitate illustration of generation of the blockchain. Each computing device includes a hash function, a signature function, and storage for a public/private key pair generated by the device.

In an example of operation of the generating of the blockchain, when the device 2 has control of the blockchain and is passing control of the blockchain to the device 3 (e.g., the device 3 is transacting a transfer of content from device 2), the device 2 obtains the device 3 public key from device 3, performs a hash function 2 over the device 3 public key and the transaction 2 to produce a hashing resultant (e.g., preceding transaction to device 2) and performs a signature function 2 over the hashing resultant utilizing a device 2 private key to produce a device 2 signature.

Having produced the device 2 signature, the device 2 generates the transaction 3 to include the device 3 public key, the device 2 signature, device 3 record request to device 2 information, and the previous content plus content from device 2. The device 3 record request to device 2 information includes one or more of the actual record request, a query request, background content, and routing instructions from device 3 to device 2 for access to the content. The previous content plus content from device 2 includes one or more of content from an original source, content from any subsequent source after the original source, an identifier of a source of content, a serial number of the content, an expiration date of the content, content utilization rules, and results of previous blockchain validations.

Having produced the transaction 3 section of the block 3 a processing module (e.g., of the device 2, of the device 3, of a transaction mining computing entity, of a computing device), generates the header section by performing a hashing function over the transaction section 3 to produce a transaction 3 hash, performing the hashing function over the preceding block (e.g., block 2) to produce a block 2 hash. The performing of the hashing function may include generating a nonce such that when performing the hashing function to include the nonce of the header section, a desired characteristic of the resulting hash is achieved (e.g., a desired number of zero's).

Having produced the block 3, the device 2 sends the block 3 to the device 3, where the device 3 initiates control of the blockchain. Having received the block 3, the device 3 validates the received block 3. The validating includes one or more of verifying the device 2 signature over the preceding transaction section (e.g., transaction 2) and the device 3 public key utilizing the device 2 public key (e.g., a re-created signature function result compares favorably to device 2 signature) and verifying that an extracted device 3 public key of the transaction 3 compares favorably to the device 3 public key held by the device 3. The device 3 considers the received block 3 validated when the verifications are favorable (e.g., the authenticity of the associated content is trusted). For instance, the device considers the records intact, valid, and usable to facilitate listing, selling, buying, and paying off the contingent asset of the contingent asset blockchain record.

FIG. 9L further illustrates the example method of operation of the listing of the contingent asset for sale utilizing the blockchain record where, having published availability of the first contingent asset utilizing the first contingent asset blockchain encoded record and a nonfungible token, and when subsequent to the generation of the non-fungible token that represents the first smart contract in the object distributed ledger, a sixth step includes the computing entity 21, when the first contingent asset risk level of the first contingent asset of the first contingent asset sale request is less than the contingency risk threshold level (e.g., the first payer approves payment), establishing updated first available terms for the first contingent asset based on the first contingent asset risk level. For example, the asset module 30 redetermines the first contingent asset risk level and establishes repricing information for the smart contract (e.g., a higher price since the risk is lower from the payment approval).

The re-determining of the first contingent asset risk level includes one or more of interpreting a first asset status update 214 from the computing entity 25-1 (e.g., indicating one of a payment approval status, approval pending, or approval rejected), reassess the risk information associated with the first asset including updating a probability that the payer will pay at the end of the asset lifecycle, and interpreting risk information of the content of the blockchain record. In an embodiment, the first asset status update 214 includes a status blockchain. The asset module 30 indicates the first contingent asset risk level to be less than the contingency risk threshold level when the status blockchain from the first asset status update 214 indicates that the payer has approved the potential liability of the first asset when the status blockchain has been verified as previously discussed. The new lowered risk level along the lifecycle is indicated in FIG. 9M.

The sixth step further includes the computing entity 21 generating an updated first smart contract to indicate the availability of the first contingent asset to include the updated first available terms and a non-contingent status (e.g., to include the re-pricing information). The sixth step further includes the computing entity 21 causing modification of the non-fungible token to represent the updated first smart contract in the object distributed ledger and/or updating of the blockchain record.

The updating of the blockchain record associated with the first contingent asset includes one or more of changing a status from contingent to non-contingent, determining an updated price (e.g., raising the price when the asset is unsold and the payer has approved a subsequent payout), and generating the first noncontingent asset blockchain record 302 to include the updated record. Alternatively, or in addition to, the asset module 30 further publishes the updated record by sending the first noncontingent asset blockchain record 302 to the computing entities 23-1 through 23-N when the first asset has not been sold and the computing entities 23-1 through 23-N are associated with potential buyers of the first contingent asset.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 10A-10F are schematic block diagrams of another embodiment of a computing system and a contingent asset risk chart illustrating an example of updating a listing for a contingent asset for sale utilizing a blockchain record. The computing system includes the computing entity 20-1 of FIG. 1, the computing entity 21 of FIG. 1, computing entities 23-1 through 23-N of FIG. 1, and the computing entity 25-1 of FIG. 1.

FIG. 10A illustrates an example method of operation of the updating of the listing of the contingent asset for sale utilizing the blockchain record where a first step includes the computing entity 21 determining to update a first available contingent asset blockchain encoded record 320 representing the first available contingent asset of a multitude of available contingent assets. The first available contingent asset assigns a potential first liability of a first payer to a first seller associated with the first available contingent asset. At least a portion of the potential first liability is to be paid by the first payer to the first seller in accordance with contingency information 202 and subsequent to completion of a first asset lifecycle, as illustrated in FIG. 10B, of the first available contingent asset.

The determining to update the first available contingent asset blockchain encoded record includes a variety of approaches. A first approach includes the asset module 30 detecting that an update time frame has elapsed. A second approach includes the asset module 30 interpreting a first asset status update 214 from the computing entity 25-1 (e.g., from the payer). In an embodiment, the first asset status update to 14 includes a status blockchain. A third approach includes the asset module 30 interpreting first available contingent asset pricing update information 222 from the computing entity 20-1 (e.g., from the seller). For instance, the seller requests a higher asking price and more time to sell the first asset.

A fourth approach includes the asset module 30 detecting that value has changed on a pool of related assets. A fifth approach includes the asset module 30 determining that a price change for the first asset is required to hit a desired rate of return. A sixth approach includes the asset module 30 detecting that bids for the first asset are over the asking price by more than a maximum overage threshold level (e.g., suggesting the first asset has been underpriced).

Having determined to update the first available contingent asset blockchain encoded record, a second step of the example method of operation of the updating of the listing of a contingent asset for sale utilizing the blockchain record includes the computing entity 21 determining an updated valuation of the first available contingent asset as depicted at t2 on the risk chart of FIG. 10B to produce an updated first available contingent asset. The determining includes the asset module 30 reassessing the risk associated with the first asset and recalculating the value of the first available contingent asset based on one or more of a new estimate of the probability of payer approval, an updated expected payment, updated expected payment timing, an updated expected rate of return, recent bid prices for the first asset, and recent bid-ask spreads for other pools of similar assets.

Figures 10C, 10D:
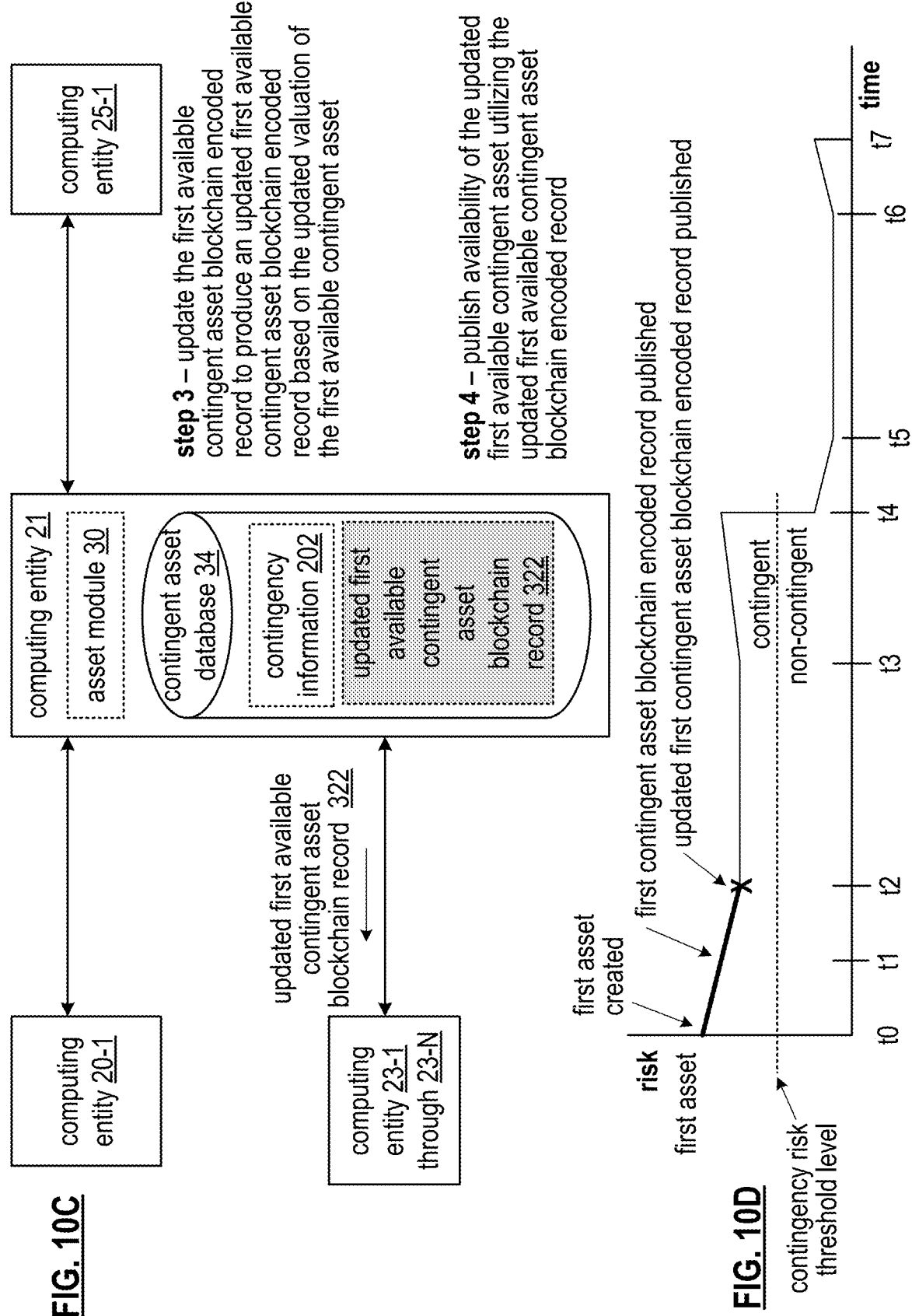

FIG. 10C further illustrates the example method of operation of the updating of the listing of the contingent asset for sale utilizing the blockchain record where, having determined the updated valuation of the first available contingent asset, the computing entity 21 updates the first available contingent asset to produce an updated first available contingent asset blockchain record 322 based on the updated valuation of the first available contingent asset. For example, the asset module 30 updates the blockchain record, as discussed with reference to FIG. 9K, of the first available contingent asset to produce the updated first available contingent asset blockchain record 322 utilizing the updated valuation. Alternatively, or in addition to, the asset module 30 updates aspects of the contingency information 202 as a function of the updated valuation.

Having updated the first available contingent asset blockchain encoded record, a fourth step of the example method of operation of the updating of the listing of the contingent asset for sale utilizing the blockchain record includes the computing entity 21 publishing availability of the updated first available contingent asset to a plurality of other computing entities 23-1 through 23-N (e.g., to buyers) as illustrated in FIG. 10D utilizing the updated first available contingent asset blockchain record 322. The publishing includes the asset module 30 performing one or more of generating an exchange listing utilizing that includes the updated first available contingent asset blockchain record 322, posting the exchange listing on an exchange, and sending the updated first available contingent asset blockchain record 322 to a plurality of other computing entities (e.g., to the computing entities 23-1 through 23-N).

FIG. 10E further illustrates the example method of operation of the updating of the listing of the contingent asset for sale utilizing the blockchain record where, having published the availability of the updated first available contingent asset, the computing entity 21 updates the updated first available contingent asset blockchain record to produce a first non-contingent asset blockchain record 324 when a first asset risk level of the updated first available contingent asset is less than a contingency risk threshold level. The transitioning to the non-contingent status provides desired certainty for parties associated with ownership of the first asset during and later portion of first asset lifecycle as illustrated in FIG. 10F.

The updating of the updated first available contingent asset to produce the first non-contingent asset blockchain record 324 by the computing entity 21 includes a series of sub-steps. In a first sub-step the asset module 30 obtains status of the first asset (e.g., interpret a first asset status update 214 from the computing entity 25-1). In a second sub-step the asset module 30 reassesses risk information of the contingency information 202 to produce an updated probability of the payer paying the payout at the end of the asset lifecycle even when the payer has approved the payment. A third sub-step includes the asset module 30 modifying status of the blockchain record, as discussed with reference to FIG. 9K, of the first asset to indicate the non-contingent status. A fourth sub-step includes the asset module 30 repricing the first asset when the first asset is still for sale (e.g., at least the portion of the first asset is still for sale during the asset lifecycle). A fifth sub-step includes the asset module 30 publishing a first noncontingent asset blockchain record 302 (e.g., to the computing entities 23-1 through 23-N) when the first asset is still available for sale.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 11A-11H are schematic block diagrams of another embodiment of a computing system and a contingent asset risk chart illustrating an example of executing a sale of a contingent asset to a buyer from a seller utilizing a blockchain record. The computing system includes the computing entity 20-1 of FIG. 1, the computing entity 21 of FIG. 1, computing entities 23-1 through 23-N of FIG. 1, and the computing entity 25-1 of FIG. 1.

FIG. 11A illustrates an example method of operation of the executing of the sale of the contingent asset to the buyer from the seller utilizing the blockchain record, where a first step includes the computing entity 21 indicating availability of a subset of available contingent assets of a multitude of available contingent assets to the computing entity 23-1 at t1 of the risk chart for the asset lifecycle in FIG. 11B, based on a desired asset profile of the computing entity 23-1 and utilizing a subset of available contingent asset blockchain encoded records that represent the subset of available contingent assets. A first available contingent asset of the subset of available contingent assets assigns a potential first liability of a first payer to a first seller associated with the first available contingent asset. At least a portion of the potential first liability is to be paid by the first payer to the first seller in accordance with contingency information and subsequent to completion of a first asset lifecycle of the first available contingent asset.

The indicating availability of the subset of available contingent assets includes a series of sub steps. A first sub-step includes the asset module 30 identifying assets desired by the computing entity 23-1 (e.g., the buyer) as the subset of available contingent assets. For example, the asset module 30 compares the desired asset profile of the computing entity 23-1 to assets of available contingent asset information 242 to select those assets that substantially satisfy the desired asset profile. A second sub-step includes the asset module 30 generating available contingent asset blockchain records 330 utilizing the selected assets (e.g., recovering individual blockchain records for each of the subset of available contingent assets from the contingent asset database 34). A third sub-step includes the asset module 30 sending the available contingent asset blockchain records 330 to the computing entity 23-1. Alternatively, or in addition to, the asset module 30 publishes the available contingent asset blockchain records 330 on an exchange and/or sends the available contingent asset blockchain records 330 to other computing entities associated with even more buyers.

FIG. 11C further illustrates the example method of operation of the executing of the sale of the contingent asset to the buyer from the seller utilizing the blockchain record, where, having indicated the availability of the subset of available contingent assets using the available contingent asset blockchain records 330 to the buyer computing entity, in a second step the computing entity 21 obtains a set of contingent asset purchase requests 244 from the computing entity 23-1 (e.g., the buyer). The set of contingent asset purchase requests 244 includes a first contingent asset purchase request 246 with regards to a bid for the first available contingent asset. The set of contingent asset purchase requests are generated within a purchase timeframe as illustrated near t2 of the timeline of the risk chart of the first asset lifecycle of FIG. 11D.

The first contingent asset purchase request 246 includes one or more of the identifier (ID) of the first asset, an identifier for a corresponding blockchain record, a buyer ID, a bid price for the first asset, a bid price range as a function of one or more conditions (e.g., higher and of the range when risk of the first asset is lower), and settlement information (e.g., an account to debit upon purchase, a credit instrument to utilize for payment, payment timing, etc.). In an embodiment, the contingent asset purchase request 244 includes modified blockchain records for corresponding contingent assets (e.g., to include purchase request content). The conditions of the bid price range include risk, a blockchain record verification requirement (e.g., bid only valid when a corresponding blockchain record can be verified), number of similar assets currently available for sale, number of similar assets currently held by the buyer, number of similar assets associated with the payer that still have an active lifecycle, or any other condition that can reasonably affect pricing to create an efficient market.

The obtaining of the set of contingent asset purchase requests 244 by the computing entity 21 includes a variety of approaches. A first approach includes the asset module 30 issuing a request for a bid message to the computing entity 23-1 (e.g., that includes an indication that assets of the subset of available contingent asset includes assets that substantially satisfies the desired asset profile of the buyer of the computing entity 23-1). A second approach includes the asset module 30 receiving the set of contingent asset purchase request 244 from the computing entity 23-1.

A third approach includes the asset module 30 determining an auto-order outcome based on the desired asset profile of the buyer computing entity. For example, the asset module 30 interprets the desired asset profile to identify the assets to include in auto-generating the contingent asset purchase requests 244 on behalf of the buyer computing entity. A fourth approach includes the asset module receiving one or more contingent asset purchase requests from one or more other computing entities.

FIG. 11E further illustrates the example method of operation of the executing of the sale of the contingent asset to the buyer from the seller utilizing the blockchain record, where, having obtained the set of contingent asset purchase requests from the buyer computing entity, a third step includes the computing entity 21 determining whether to approve the first contingent asset purchase request 246 based on at least some of the set of contingent asset purchase requests and a risk profile during the purchase timeframe after t2 of the risk chart for the asset lifecycle of FIG. 11F. The asset module 30 determines whether to approve the first contingent asset purchase request 246 based on one or more of verification of a blockchain record associated with the first contingent asset purchase request, face value of the first asset, a listed price by the seller, a minimum acceptable bid price set by the seller, and a bid price from the buyer, a history of bid-ask spreads. The approval determination is further based on one or more of other bid acceptances of the set of contingent asset purchase requests, a risk profile associated with the buyer, the risk level of the asset, an assessment to the impact of the buyer's portfolio, and an assessment of the impact to the available contingent assets.

As an example of the determining whether to approve the first contingent asset purchase request 246, the asset module 30 indicates approval when the risk level of the asset is below a maximum desired asset risk level in the blockchain record has been verified, the risk profile associated with the buyer is below a buyer maximum risk threshold level, and the bid price from the buyer is greater than the minimum acceptable bid price set by the seller. As another example, the asset module 30 indicates disapproval when the risk level of the buyer is greater than the buyer maximum risk threshold level and/or when the blockchain record does not verify. As yet another example, the asset module indicates approval when the risk level of the buyer is greater than the buyer maximum risk threshold level and the bid price from the buyer is greater than the listed price by the seller by more than a minimum difference bid-ask spread level.

When the first contingent asset purchase request is approved, a fourth step of the example method of operation to execute the sale of the contingent asset to the buyer from the seller utilizing the blockchain record includes the computing entity 21 obtaining payment for purchase of the first available contingent asset from a first buyer associated with the first contingent asset purchase request 246. The obtaining of the payment for purchase includes a series of substeps. A first sub-step includes the asset module 30 determining an execution price based on the approval. The determining includes one or more of establishing a base selling price at the bid price and making an adjustment associated with risk and/or transaction fees.

A second sub-step includes the asset module 30 issuing a request for payment to the computing entity 23-1, where the request for payment includes the execution price within the blockchain record for the first asset. A third sub-step includes the asset module 30 receiving purchase information 248 from the computing entity 23-1, where the purchase information 248 includes an updated blockchain record including information to execute the sale including payment (e.g., including instructions such as immediate payment and/or deducting payment from an account associated with the buyer).

FIG. 11G further illustrates the example method of operation of the executing of the sale of the contingent asset to the buyer from the seller utilizing the blockchain record, where, having obtained the payment for the purchase of the first available contingent asset, a fifth step includes the computing entity 21 facilitating seller payment utilizing the payment for purchase of the first available contingent asset to complete the purchase as illustrated in the risk chart of the asset timeline of FIG. 11H. The facilitating includes the asset module 30 determining a seller payment amount from the payment for purchase and based on the contingency information 202 (e.g., recourse, fees, etc.). The facilitating further includes the asset module 30 issuing a first available contingent asset payment 250 to the computing entity 20-1 to satisfy payment to the seller. In an embodiment, the first available contingent asset payment 250 includes the blockchain record associated with the first asset to provide payment. Alternatively or in addition to, the asset module 30 updates a seller account with a credit for the seller payment amount.

Having facilitated the seller payment, a sixth step of the example method of operation of the executing of the sale of a contingent asset to the buyer from the seller utilizing the blockchain record includes the computing entity 21 updating the first available contingent asset blockchain encoded record of the subset of available contingent asset blockchain encoded records that corresponds to the first available contingent asset to indicate reassignment the potential first liability of the first available contingent asset from the first seller to an entity associated with the first buyer of the first contingent asset purchase request. For example, the asset module 30 updates the first available contingent asset blockchain record 332 as illustrated in FIG. 9K within the contingent asset database 34 to associate an identifier of the buyer with the first contingent asset. Alternatively, or in addition to, a risk level associated with the buyer is updated within the blockchain record based on the buyer now holding the first contingent asset.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 12A-12D are schematic block diagrams of another embodiment of a computing system and a contingent asset risk chart illustrating an example of facilitating payment from a payer to a buyer for a contingent asset utilizing a blockchain record. The computing system includes the computing entity 20-1 of FIG. 1, the computing entity 21 of FIG. 1, computing entities 23-1 through 23-N of FIG. 1, and the computing entity 25-1 of FIG. 1.

FIG. 12A illustrates an example method of operation of the facilitating payment from the payer to the buyer for the contingent asset utilizing the blockchain record, where a first step includes the computing entity 21 obtaining a lifecycle status for a first contingent asset of a multitude of contingent assets. The first contingent asset assigns a potential first liability of a first payer to an owner entity associated with the first contingent asset. At least a portion of the potential first liability is to be paid by the first payer to the owner entity in accordance with contingency information and subsequent to completion of a first asset lifecycle of the first contingent asset as illustrated in FIG. 12B. The lifecycle status includes pending approval, approval for payment (e.g., pending payment at t7 of FIG. 12B), and rejected.

The obtaining of the lifecycle status for the first contingent asset includes a variety of approaches. A first approach includes the asset module 30 detecting a change in a risk level associated with the first contingent asset. A second approach includes the asset module 30 detecting that a transition time frame has elapsed. A third approach includes the asset module 30 receiving a request for an updated status. A fourth approach includes the asset module 30 issuing a status update request to the computing entity 25-1 (e.g., the payer). A fifth approach includes the asset module 30 interpreting a first asset status update 214 from the computing entity 25-1. In an embodiment the first asset status update to 14 includes a blockchain record associated with the first contingent asset.

Having obtained the lifecycle status for the first contingent asset, when the lifecycle status of the first contingent asset has transitioned to pending payment, a second step of the example method of operation to facilitate payment from the payer to the buyer of the contingent asset utilizing the blockchain record includes the computing entity 21 updating a first contingent asset blockchain encoded record 340 to indicate the lifecycle status of the first contingent asset has transitioned to pending payment. The updating includes the asset module 30 modifying the content of the blockchain record as discussed in FIG. 9K.

Having updated the first contingent asset blockchain encoded record 340, a third step of the example method of operation to facilitate payment from the payer to the buyer of the contingent asset utilizing the blockchain record includes the computing entity 21 obtaining a payout for the first contingent asset from the first payer in accordance with the contingency information 202 and utilizing the first contingent asset blockchain encoded record 340. The obtaining of the payout includes a series of sub-steps. A first sub-step includes the asset module 30 determining an expected payout based on the contingency information 202 and payout information of content of the first contingent asset blockchain record 340. For example, the asset module 30 determines the expected payout to be a committed payout level from the computing entity 25-1.

A second sub-step includes the asset module 30 issuing a payout request to the computing entity 25-1 of the payer, where the asset module 30 modifies the first contingent asset blockchain record 340 to include the expected payout and includes the first contingent asset blockchain record 340 in the payout request. A third sub-step includes the asset module 30 receiving a first contingent asset payout 260 from the computing entity 25-1. In an embodiment, the first contingent asset payout 260 includes a further updated first contingent asset blockchain record that includes payout information. Alternatively, or in addition to, the first contingent asset payout 260 is included in a batch payment from the computing entity 25-1 for a multitude of asset payouts, where a multitude of contingent asset blockchain records include a multitude of payouts.

FIG. 12C further illustrates the example method of operation of the facilitating payment from the payer to the buyer for the contingent asset utilizing the blockchain record, where, when the lifecycle status of the first contingent asset has transitioned to pending payment as illustrated at t7 in FIG. 12D, and having obtained the payout for the first contingent asset from the first payer, a fourth step includes the computing entity 21 determining a payoff for the owner entity based on the payout and the contingency information 202. For example, when the payout is less than a face value, the asset module 30 calculates the payoff to be the payout minus any fees (e.g., a transaction fee). As another example, when the payout is greater than the face value, the asset module 30 calculates the payoff to be the payout minus the fees and further disposes of an overage (e.g., a difference between the payout and the face value) in accordance with the contingency information 202 (e.g., transfer funds to an account associated with an exchange, credit the buyer for a portion of a future purchase, credit the seller for repurchase of a future sale).

Having determined the payoff for the owner entity, a fifth step of the example method of operation of the facilitating payment from the payer to the buyer utilizing the blockchain record includes the computing entity 21 facilitating payment of the payoff to the owner entity. For example, the asset module 30 generates a payment message 262 that includes payment information in accordance with the first contingent asset payout 260. In an embodiment, the asset module 30 generates the payment message 262 to include the first contingent asset blockchain record 340, where the first contingent asset blockchain record 340 includes the payment information. The asset module 30 sends the payment message 262 to the computing entity 23-1 associated with the owner entity. Alternatively, or in addition to, the asset module 30 credits an account associated with the owner entity for the amount of the payoff.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 13A-13F are schematic block diagrams of another embodiment of a computing system and a contingent asset risk chart illustrating an example of updating a listing for a contingent asset for sale utilizing a split blockchain record. The computing system includes the computing entity 20-1 of FIG. 1, the computing entity 21 of FIG. 1, computing entities 23-1 through 23-N of FIG. 1, and the computing entity 25-1 of FIG. 1.

A split blockchain record enables ownership and transfer of ownership transactions to occur for two or more portions (e.g., sub-assets) of a common contingent asset throughout the lifecycle of the contingent asset. For example, a split blockchain record supports two ownership entities. As another example, another split blockchain record supports 1,000 ownership entities of the common contingent asset.

A split blockchain record includes several approaches. A first approach includes utilizing one blockchain record for a corresponding contingent asset, where different content portions of the blockchain record correspond to the different ownership entities. A second approach includes generating a separate new blockchain record for each ownership entity to accompany the original blockchain record for the contingent asset, where content of all of the blockchain records includes references to all other blockchain records associated with the original blockchain record. A third approach includes replacing the original blockchain record with a separate new blockchain record for each ownership entity, where content from the original blockchain record is transferred to each of the separate new blockchain records. A fourth approach includes utilizing the original blockchain record for a first ownership entity and creating a separate new blockchain record for each ownership entity beyond the first ownership entity of a multitude of ownership entities. As is further discussed below, use of the term split blockchain record may refer to any of the approaches.

FIG. 13A illustrates an example method of operation of the updating of the listing of the contingent asset for sale utilizing the split blockchain record where a first step includes the computing entity 21 determining to update a first available contingent asset blockchain encoded record set 400 corresponding to a set of first available contingent sub-assets of a first available contingent asset of a multitude of available contingent assets. The first available contingent asset assigns a potential first liability of a first payer to a first seller associated with the first available contingent asset. At least a portion of the potential first liability is to be paid by the first payer to the first seller in accordance with contingency information 202 and subsequent to completion of a first asset lifecycle, as illustrated in FIG. 13B, of the first available contingent asset. Each first available contingent asset blockchain encoded record of the first available contingent asset blockchain encoded record set 400 is mapped to a corresponding first available contingent sub-asset of the set of first available contingent sub-assets of the first available contingent asset.

The determining to update the first available contingent asset blockchain encoded record set 400 includes a variety of approaches. A first approach includes the asset module 30 detecting that an update time frame has elapsed. A second approach includes the asset module 30 interpreting a first asset status update 214 from the computing entity 25-1 (e.g., from the payer). In an embodiment, the first asset status update to 14 includes a status blockchain. A third approach includes the asset module 30 interpreting first available contingent asset pricing update information 222 from the computing entity 20-1 (e.g., from the seller). For instance, the seller requests a higher asking price for each sub-asset. As another instance, the seller requests that more sub-assets be created.

A fourth approach includes the asset module 30 detecting that value has changed on a pool of related assets. A fifth approach includes the asset module 30 determining that a price change for the first asset is required to hit a desired rate of return. A sixth approach includes the asset module 30 detecting that bids for a majority of the sub-assets are under corresponding asking prices by more than a maximum underage threshold level (e.g., suggesting the set of first available contingent sub-assets has been overpriced).

Having determined to update the first available contingent asset blockchain record set 400, a second step of the example method of operation of the updating of the listing of a contingent asset for sale utilizing the split blockchain record includes the computing entity 21 determining an updated valuation of each first available contingent sub-asset of the set of first available contingent sub-assets of the first available contingent asset to produce an updated set of first available contingent sub-assets and an updated first available contingent asset as depicted at t2 on the risk chart of FIG. 13B. The determining includes the asset module 30 reassessing the risk associated with the first asset and recalculating the value of each sub-asset based on one or more of a percentage of the sub-assets that have been sold, a new estimate of the probability of payer approval, an updated expected payment, updated expected payment timing, an updated expected rate of return, recent bid prices for the first asset, and recent bid-ask spreads for other pools of similar assets.

FIG. 13C further illustrates the example method of operation of the updating of the listing of the contingent asset for sale utilizing the split blockchain record where, having produced the updated set of first available contingent sub-assets and the updated first available contingent asset, a third step includes the computing entity 21 updating the first available contingent asset blockchain encoded record set to produce an updated first available contingent asset blockchain encoded record set 402 based on the updated valuation of each first available contingent sub-asset of the set of first available contingent sub-assets. For example, the asset module 30 updates the first available contingent asset blockchain record set 400, as discussed with reference to FIG. 9K, to modify content of each record to indicate the updated valuation of each first available contingent sub-asset. Alternatively, or in addition to, the asset module 30 updates aspects of the contingency information 202 as a function of the updated valuations.

Having produced the updated first available contingent asset blockchain record set 402, a fourth step of the example method of operation of the updating of the listing of the contingent asset for sale utilizing the split blockchain record includes the computing entity 21 publishing availability of the updated first available contingent asset to a plurality of other computing entities 23-1 through 23-N (e.g., to buyers) as illustrated in FIG. 13D utilizing the updated first available contingent asset blockchain record set 402. The publishing includes the asset module 30 performing one or more of generating an exchange listing utilizing that includes the updated first available contingent asset blockchain record set 402, posting the exchange listing on an exchange, and sending the updated first available contingent asset blockchain record set 402 to a plurality of other computing entities (e.g., to the computing entities 23-1 through 23-N).

FIG. 13E further illustrates the example method of operation of the updating of the listing of the contingent asset for sale utilizing the split blockchain record where, having published the availability of the updated first available contingent asset, the computing entity 21 updates the updated first available contingent asset blockchain encoded record set to produce a first non-contingent asset blockchain encoded record set 404 when a first asset risk level of the updated first available contingent asset is less than a contingency risk threshold level. The transitioning to the non-contingent status provides desired certainty for parties associated with ownership of the portions of the first asset throughout the first asset lifecycle as illustrated in FIG. 13F.

The updating of the updated first available contingent asset to produce the first non-contingent asset blockchain record set 404 by the computing entity 21 includes a series of sub-steps. In a first sub-step the asset module 30 obtains status of the first asset (e.g., interpret a first asset status update 214 from the computing entity 25-1). In a second sub-step the asset module 30 reassesses risk information of the contingency information 202 to produce an updated probability of the payer paying the payout at the end of the asset lifecycle even when the payer has approved the payment. A third sub-step includes the asset module 30 modifying status of the blockchain record, as discussed with reference to FIG. 9K, of the first asset (e.g., and sub-assets) to indicate the non-contingent status. A fourth sub-step includes the asset module 30 repricing at least some of the sub-assets of the first asset when the first asset is still for sale (e.g., at least the portion of the first asset is still for sale during the asset lifecycle, setting a proportionally higher price for larger portions). A fifth sub-step includes the asset module 30 publishing the first non-contingent asset blockchain record set 404 (e.g., to the computing entities 23-1 through 23-N) when at least some of the first asset is still available for sale.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 14A-14H are schematic block diagrams of another embodiment of a computing system and a contingent asset risk chart illustrating an example of executing a sale of a portion of a contingent asset to a buyer from a seller utilizing a split blockchain record. The computing system includes the computing entity 20-1 of FIG. 1, the computing entity 21 of FIG. 1, computing entities 23-1 through 23-N of FIG. 1, and the computing entity 25-1 of FIG. 1.

FIG. 14A illustrates an example method of operation of the executing the sale of the portion of the contingent asset to the buyer from the seller utilizing the split blockchain record, where a first step includes the computing entity 21 indicates availability of a subset of available contingent assets of a multitude of available contingent assets to the computing entity 23-1 at t1 of the risk chart for the asset lifecycle in FIG. 14B, based on a desired asset profile of the computing entity 23-1 and utilizing a plurality of available contingent asset blockchain encoded record sets 500 that represent the subset of available contingent assets. Each available contingent asset blockchain encoded record of a corresponding available contingent asset blockchain encoded record set is mapped to a corresponding available contingent sub-asset of an available contingent asset of the subset of available contingent assets.

A first available contingent asset of the subset of available contingent assets assigns a potential first liability of a first payer to a first seller associated with the first available contingent asset. At least a portion of the potential first liability is to be paid by the first payer to the first seller in accordance with contingency information and subsequent to completion of a first asset lifecycle of the first available contingent asset. Each first available contingent asset blockchain encoded record of a first available contingent asset blockchain encoded record set is mapped to a corresponding first available contingent sub-asset of a set of first available contingent sub-assets of a first available contingent asset.

The indicating availability of the subset of available contingent assets includes a series of sub-steps. A first sub-step includes the asset module 30 identifying assets desired by the computing entity 23-1 (e.g., the buyer) as the subset of available contingent assets. For example, the asset module 30 compares the desired asset profile of the computing entity 23-1 to assets of the available contingent asset blockchain record sets 500 and/or of assets listed in the contingent asset database 34 to select those assets that substantially satisfy the desired asset profile. A second sub-step includes the asset module 30 generating the available contingent asset blockchain record sets 500 utilizing the selected assets (e.g., recovering individual blockchain records for each of the subset of available contingent assets from the contingent asset database 34). A third sub-step includes the asset module 30 sending the available contingent asset blockchain record sets 500 to the computing entity 23-1. Alternatively, or in addition to, the asset module 30 publishes the available contingent asset blockchain record sets 500 on an exchange and/or sends the available contingent asset blockchain record sets 500 to other computing entities associated with even more buyers as illustrated at t1 of the risk chart for the asset lifecycle in FIG. 14B.

FIG. 14C further illustrates the example method of operation of the executing of the sale of the portion of the contingent asset to the buyer from the seller utilizing the split blockchain record, where, having indicated the availability of the subset of available contingent assets using the available contingent asset blockchain record sets 500 to the buyer computing entity, in a second step the computing entity 21 obtains a set of contingent asset purchase requests 244 from the computing entity 23-1 (e.g., the buyer). The set of contingent asset purchase requests 244 includes a first contingent asset purchase request 246 with regards to a bid for a portion of the first available contingent asset. The set of contingent asset purchase requests are generated within a purchase timeframe as illustrated near t2 of the timeline of the risk chart of the first asset lifecycle of FIG. 14D.

The first contingent asset purchase request 246 includes one or more of the identifier (ID) of the first asset, an identifier of the portion of the first asset, an identifier for a corresponding blockchain record, a buyer ID, a bid price for the portion of the first asset, the bid price for combinations of two or more portions, a bid price in a strike price for a first right purchase option on one or more portions, a bid price and a strike price for at least one put option on the portion if purchased, a bid price range as a function of one or more conditions (e.g., higher and of the range when risk of the first asset is lower), and settlement information (e.g., an account to debit upon purchase, a credit instrument to utilize for payment, payment timing, etc.). In an embodiment, the contingent asset purchase request 244 includes modified blockchain records for portions of corresponding contingent assets (e.g., to include purchase request content). The conditions of the bid price range include risk, a blockchain record verification requirement (e.g., bid only valid when a corresponding blockchain record can be verified), number of portions of similar assets currently available for sale, number of portions of similar assets currently held by the buyer, number portions of similar assets associated with the payer that still have an active lifecycle, or any other condition that can reasonably affect pricing to create an efficient market.

The obtaining of the set of contingent asset purchase requests 244 by the computing entity 21 includes a variety of approaches. A first approach includes the asset module 30 issuing a request for a bid message to the computing entity 23-1 (e.g., that includes an indication that assets of the subset of available contingent asset includes portions of assets that substantially satisfies the desired asset profile of the buyer of the computing entity 23-1). A second approach includes the asset module 30 receiving the set of contingent asset purchase request 244 from the computing entity 23-1.

A third approach includes the asset module 30 determining an auto-order outcome based on the desired asset profile of the buyer computing entity. For example, the asset module 30 interprets the desired asset profile to identify the portions of assets to include in auto-generating the contingent asset purchase requests 244 on behalf of the buyer computing entity. A fourth approach includes the asset module receiving one or more contingent asset purchase requests from one or more other computing entities.

FIG. 14E further illustrates the example method of operation of the executing of the sale of the portion of the contingent asset to the buyer from the seller utilizing the split blockchain record, where, having obtained the set of contingent asset purchase requests from the buyer computing entity, a third step includes the computing entity 21 determining whether to approve the first contingent asset purchase request 246 based on at least some of the set of contingent asset purchase requests and a risk profile during the purchase timeframe after t2 of the risk chart for the asset lifecycle of FIG. 14F. The asset module 30 determines whether to approve the first contingent asset purchase request 246 based on one or more of verification of a blockchain record associated with the portion of the first contingent asset purchase request, face value of the first asset, a listed price by the seller for the portion, a minimum acceptable bid price set by the seller, and a bid price from the buyer, a history of bid-ask spreads. The approval determination is further based on one or more of other bid acceptances of the set of contingent asset purchase requests, a risk profile associated with the buyer, the risk level of the asset, an assessment to the impact of the buyer's portfolio, and an assessment of the impact to the available contingent assets.

As an example of the determining whether to approve the first contingent asset purchase request 246, the asset module 30 indicates approval when the risk level of the asset is below a maximum desired asset risk level in the corresponding blockchain record has been verified, the risk profile associated with the buyer is below a buyer maximum risk threshold level, and the bid price from the buyer is greater than the minimum acceptable bid price set by the seller for the portion. As another example, the asset module 30 indicates disapproval when the risk level of the buyer is greater than the buyer maximum risk threshold level and/or when the corresponding blockchain record does not verify. As yet another example, the asset module indicates approval when the risk level of the buyer is greater than the buyer maximum risk threshold level and the bid price from the buyer is greater than the listed price by the seller by more than a minimum difference bid-ask spread level.

When the first contingent asset purchase request 246 is approved for the portion, a fourth step of the example method of operation to execute the sale of the portion of the contingent asset to the buyer from the seller utilizing the split blockchain record includes the computing entity 21 obtaining payment for purchase of the portion of the first available contingent asset from a first buyer associated with the first contingent asset purchase request 246. The obtaining of the payment for purchase includes a series of sub-steps. A first sub-step includes the asset module 30 determining an execution price based on the approval. The determining includes one or more of establishing a base selling price at the bid price and making an adjustment associated with risk and/or transaction fees.

A second sub-step includes the asset module 30 issuing a request for payment to the computing entity 23-1, where the request for payment includes the execution price within the blockchain record for the portion of the first asset. A third sub-step includes the asset module 30 receiving purchase information 248 from the computing entity 23-1, where the purchase information 248 includes an updated blockchain record including information to execute the sale including payment for the portion (e.g., including instructions such as immediate payment and/or deducting payment from an account associated with the buyer).

FIG. 14G further illustrates the example method of operation of the executing of the sale of the portion of the contingent asset to the buyer from the seller utilizing the split blockchain record, where, having obtained the payment for the purchase of the portion of the first available contingent asset, a fifth step includes the computing entity 21 facilitating seller payment utilizing the payment for purchase of the portion of the first available contingent asset to complete the purchase as illustrated in the risk chart of the asset timeline of FIG. 14H. The facilitating includes the asset module 30 determining a seller payment amount from the payment for purchase and based on the contingency information 202 (e.g., recourse, fees, etc.). The facilitating further includes the asset module 30 issuing a payment for portion of first available contingent asset 502 to the computing entity 20-1 to satisfy payment to the seller. In an embodiment, the payment for portion of first available contingent asset 502 includes the corresponding split blockchain record associated with the portion of the first asset to provide payment. Alternatively, or in addition to, the asset module 30 updates a seller account with a credit for the seller payment amount.

Having facilitated the seller payment, a sixth step of the example method of operation of the executing of the sale of the portion of the contingent asset to the buyer from the seller utilizing the split blockchain record includes the computing entity 21 identifying a selected first available contingent asset blockchain encoded record of the first available contingent asset blockchain encoded record set 500 that corresponds to the portion of the first available contingent asset. For example, the asset module 30 selects a split blockchain record of the available contingent asset blockchain encoded record sets 500 that maps to the portion of the first available contingent asset.

Having identified the first available contingent asset blockchain encoded record that corresponds to the portion, a seventh step of the example method of operation of the executing of the sale of the portion of the contingent asset to the buyer from the seller utilizing the split blockchain record includes the computing entity 21 updating at least some of the first available contingent asset blockchain encoded record set 500 based on the portion of the first available contingent asset to indicate reassignment of at least a portion of the potential first liability of the first available contingent asset from the first seller to an entity associated with the first buyer of the first contingent asset purchase request. For example, the asset module 30 updates the identified first available contingent asset blockchain encoded record (e.g., split blockchain record) as illustrated in FIG. 9K within the contingent asset database 34 to associate an identifier of the buyer with the first contingent asset. Alternatively, or in addition to, a risk level associated with the buyer is updated within the blockchain record based on the buyer now holding the first contingent asset.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 15A-15H are schematic block diagrams of another embodiment of a computing system and a contingent asset risk chart illustrating an example of listing a contingent asset for sale utilizing a split blockchain record. The computing system includes the computing entity 20-1 of FIG. 1, the computing entity 21 of FIG. 1, computing entities 23-1 through 23-N of FIG. 1, and the computing entity 25-1 of FIG. 1.

Figures 15A, 15B:
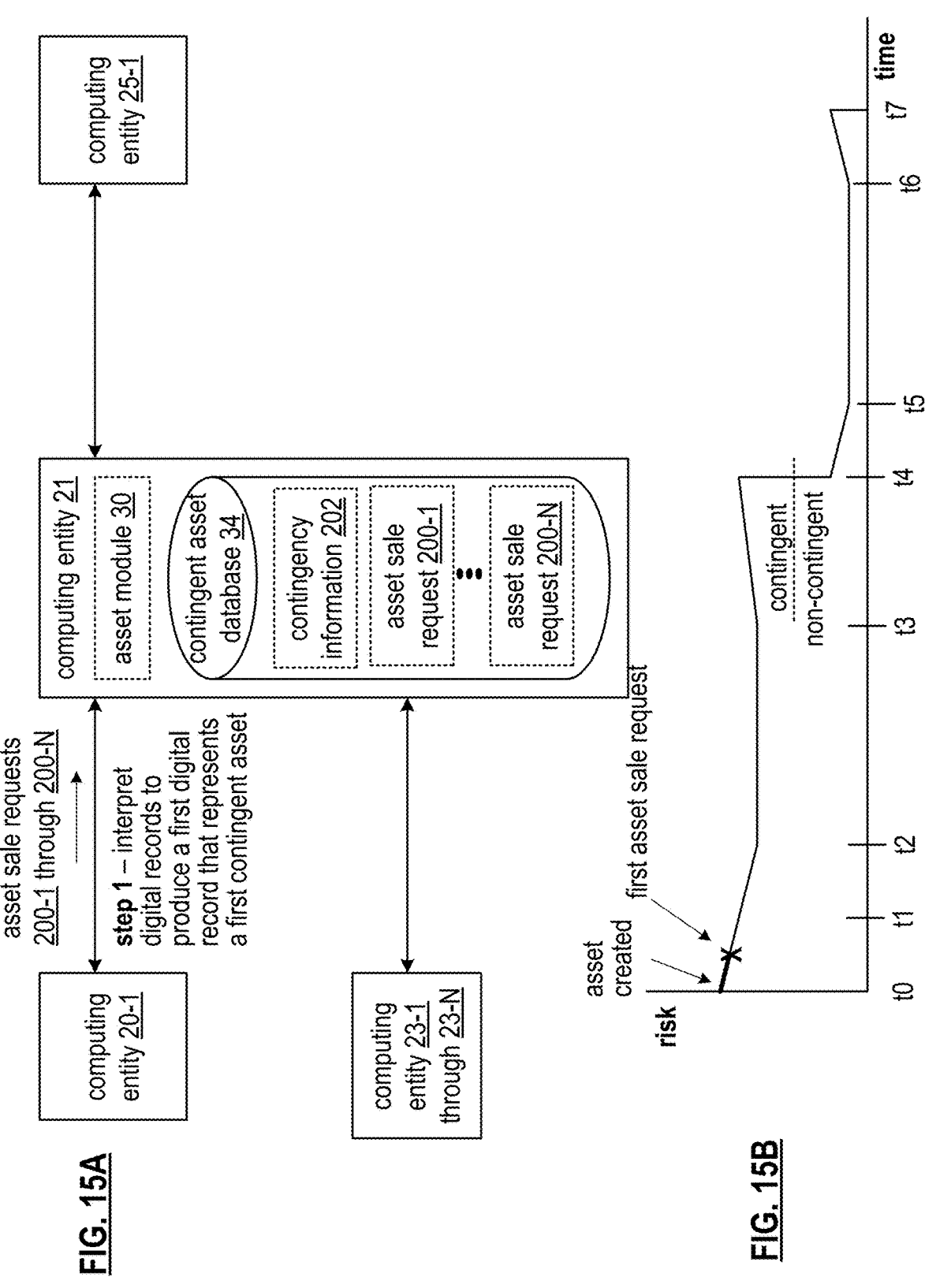

FIG. 15A illustrates an example method of operation of the listing of the contingent asset for sale utilizing the split blockchain record where a first step includes the computing entity 21 interpreting a multitude of digital records representing a multitude of contingent assets to produce a first digital record of the multitude of digital records. The first digital record of the multitude of digital records represents a first contingent asset (e.g., a first asset) of the multitude of contingent assets and assigns a potential first liability of a first payer identifier to a first seller identifier associated with the first contingent asset. For example, the asset module 30 obtains a set of asset sale requests 200-1 through 200-N from the computing entity 20-1 as depicted prior to t3 on the risk vs. time chart of FIG. 15B. At least a portion of the face value of the potential first liability is to be paid by a first payer associated with the first payer identifier to a first seller associated with the first seller identifier in accordance with contingency information 202 and subsequent to completion of a first asset lifecycle of the first asset. The set of asset sale requests are generated within a sales timeframe.

The computing entity 21 produces the first digital record of the asset sale request 200-1 associated with the first asset by at least one of identifying desired assets associated with the computing entity 20-1 (e.g., identify what a seller associated with the computing entity 20-1 should offer for sale), requesting that the computing entity 20-1 issue the sale request, and receiving the sale request from the computing entity 20-1. Alternatively, or in addition to, the asset sale request 200-1 includes a blockchain record associated with the first asset. In an embodiment the computing entity 20-1 is associated with a third party representing one or more sellers.

Figures 15C, 15D:
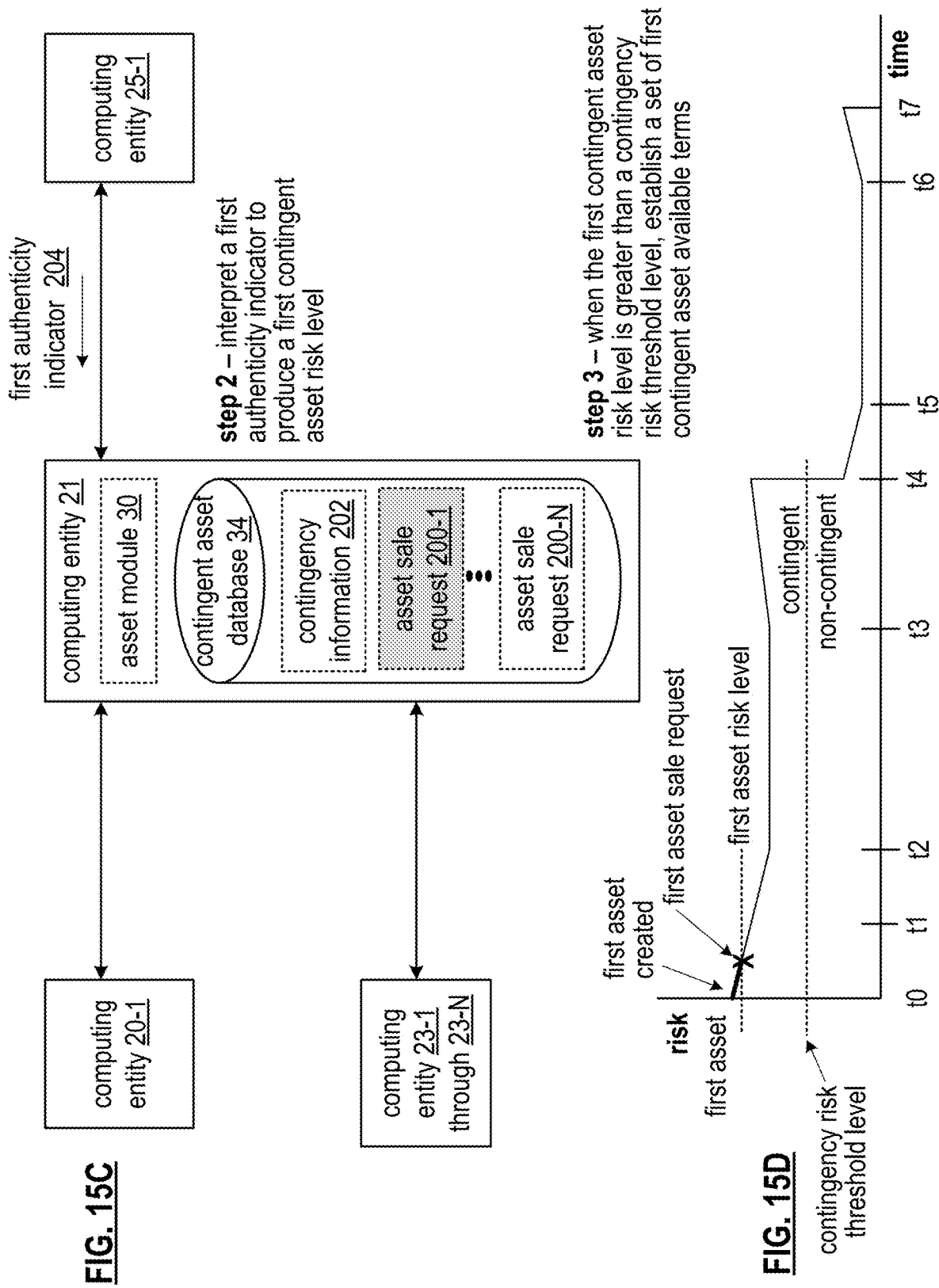

FIG. 15C further illustrates the example method of operation of the listing of the contingent asset for sale utilizing the split blockchain record where, having obtained the set of asset sale requests and produced the first digital record, a second step includes the computing entity 21 interpreting a first authenticity indicator associated with the first digital record to produce a first contingent asset risk level of the first contingent asset. The interpreting the first authenticity indicator associated with the first digital record that represents the first contingent asset to produce the first contingent asset risk level of the first contingent asset includes a series of sub-steps.

A first sub-step includes the asset module 30 extracting an identifier of an asset authenticity computing entity from the first digital record that represents the first contingent asset based on the first seller identifier. For example, the asset module 30 extracts the identifier of the computing entity 25-1 from the asset sale request 200-1.

A second sub-step includes the asset module 30 obtaining authenticity information from the asset authenticity computing entity for the first contingent asset utilizing the identifier of the asset authenticity computing entity. For example, the asset module 30 receives the authenticity information from the computing entity 25-1 (e.g., via a first authenticity indicator 204).

A third sub-step includes the asset module 30 indicating that the first contingent asset is valid when the authenticity information validates that the potential first liability of the first payer identifier is to the first seller identifier associated with the first contingent asset and indicates that the first payer identifier has not disapproved payment of the potential first liability. For example, the asset module 30 interprets the first authenticity indicator 204 to determine a status of the first contingent asset where the status indicates that the potential first liability of the asset sale request 200-1 is confirmed as associated with the first payer. The asset module 30 further interprets the first authenticity indicator 204 to determine that the status indicates that the potential first liability of the first payer is to be made to the first seller of the asset sale request 200-1. The asset module 30 further interprets the first authenticity indicator 204 to determine that the status indicates that the first payer has not disapproved payment of the potential first liability (e.g., status is either approved or pending approval but not denied).

When the first contingent asset is valid and the authenticity information indicates approval of the payment of the potential first liability, a fourth sub-step includes the computing entity 21 establishing the first contingent asset risk level to be less than a contingency risk threshold level. For example, the asset module 30 updates the contingency information 202 in the contingent asset database 34 to indicate that the first contingent asset risk level is less than the contingency risk threshold level since the first payer has approved the payment.

Alternatively, when the first contingent asset is valid and the authenticity information indicates pending approval of the payment of the potential first liability, a fifth sub-step includes the computing entity 21 establishing the first contingent asset risk level to be greater than the contingency risk threshold level since the first payer has not yet approved the payment implying that it is possible that payment will never be made. For example, the asset module 30 updates the contingency information 202 to indicate that the first contingent asset risk level is greater than the contingency risk threshold level as illustrated in FIG. 15D.

Having produced the first contingent asset risk level, when the first contingent asset risk level of the first contingent asset is greater than a contingency risk threshold level, a third step of the example method of operation includes the computing entity 21 establishing a set of first contingent asset available terms for a corresponding set of portions of the first contingent asset based on the first contingent asset risk level.

The establishing the set of first contingent asset available terms for the corresponding set of portions of the first contingent asset based on the first contingent asset risk level includes a series of sub-steps. A first sub-step includes the asset module 30 determining proposed pricing of the portions of the first contingent asset based on one or more of a desired set of sale prices from the first seller associated with the first seller identifier, an estimated probability of first payer approval, an expected payment timeframe, an expected payment level, an expected rate of return for the first seller, recent bid prices for other contingent assets, and recent bid-ask spreads for the other contingent assets. For example, the asset module 30 determines the proposed pricing of the set of portions of the first contingent asset as the same as the desired set of sale prices from the first seller as indicated in the asset sale request 200-1.

A second sub-step includes the asset module 30 determining whether the proposed pricing is acceptable to the first seller. For example, the asset module 30 issues a query to the computing entity 20-1 and receives a query response that includes a first contingent asset pricing approval indicator 208 indicating whether the proposed pricing of the set of portions is acceptable to the first seller. As another example, the asset module 30 recovers acceptable pricing range information for the first seller from the contingency information 202 and indicates whether the proposed pricing of the set of portions is acceptable to the first seller based on interpreting the acceptable pricing range information.

A third sub-step includes establishing the set of first contingent asset available terms to include the proposed pricing of the portions of the first contingent asset when the proposed pricing is acceptable to the first seller. For example, the asset module 30 updates the contingency information 202 for the first contingent asset to include the proposed pricing of the set of portions as approved by the first seller.

FIG. 15E further illustrates the example method of operation of the listing of the contingent asset for sale utilizing the split blockchain record where, having determined that the first contingent asset risk level is greater than the contingency risk threshold level as illustrated in FIG. 15F, in a fourth step, when the first asset risk level of the first contingent asset is greater than the contingency risk threshold level, the computing entity 21 generates a set of first smart contracts to represent the set of portions of the first contingent asset to include the set of first contingent asset available terms and a contingent status. Each first smart contract of the set of first smart contracts includes a corresponding first contingent asset available terms of a corresponding portion of the set of portions of the first contingent asset. For example, the asset module 30 generates the set of smart contracts as discussed previously for smart contract 700 to include an indication of availability of a portion of the first contingent asset, first available terms, and a status indicator indicating that the payment by the first payer is still contingent (e.g., not approved yet).

Having generated the set of first smart contracts, a fifth step of the example method of operation includes the computing entity 21 causing generation of a non-fungible token (NFT) to represent the set of first smart contracts in the object distributed ledger. The generating of the NFT to represent the set of first smart contracts in the object distributed ledger includes determining whether to indirectly or directly update the object distributed ledger. For example, the computing entity 21 determines to indirectly update the object distributed ledger when the computing entity 21 does not have a satisfactory direct access to the object distributed ledger (e.g., the computing entity 21 does not serve as a blockchain node). As another example, the computing entity 21 determines to directly update the object distributed ledger when a predetermination stored in the contingent asset database 34 indicates to directly access the object distributed ledger when possible (e.g., a copy of the blockchain is stored in the contingent asset database 34 of the computing entity 21).

When indirectly updating the object distributed ledger, the causing the generation includes the computing entity 21 issuing a non-fungible token generation request to an object ledger computing device serving as a blockchain node of the object distributed ledger. The non-fungible token generation request includes the set of first smart contracts. For example, the computing entity 21 issues a first available contingent asset blockchain record set 301 to the computing entity 23-1, where the first available contingent asset blockchain record set 301 includes the request and the set of first smart contracts. In response, the computing entity 23-1 adds a new non-fungible token listing to the object distributed ledger (e.g., as illustrated by FIGS. 9B and 9C).

When directly updating the object distributed ledger, the causing the generation includes the computing entity 21 performing a series of sub-steps previously discussed in FIG. 9D and as also discussed in FIG. 9K. A first sub-step includes obtaining a copy of the object distributed ledger. For example, the computing entity 21 extracts the object distributed ledger from a message from computing entity 23-1. As another example, the computing entity 21 recovers the object distributed ledger from the contingent asset data-base 34.

A second sub-step includes hashing the set of first smart contracts utilizing a receiving public key of the object distributed ledger to produce a next transaction hash value. For example, the computing entity 21 obtains a suitable receiving public key (e.g., from a current version of the blockchain, from a blockchain node, from the computing entity 23-1) and performs the hashing function to produce the next transaction hash value.

A third sub-step includes encrypting the next transaction hash value utilizing a private key of the computing entity 21 to produce a next transaction signature. For example, the computing entity 21 recovers a private key associated with the computing entity 21 and utilizes the recovered private key to encrypt the next transaction hash value to produce the next transaction signature.

A fourth sub-step includes generating a next block of a blockchain of the object distributed ledger to include the set of first smart contracts and the next transaction signature. For example, the computing entity 21 generates the next block as previously discussed with regards to FIG. 9D to include the set of first smart contracts and the next transaction signature.

A fifth sub-step includes causing inclusion of the next block as the non-fungible token in the object distributed ledger. For example, the computing entity 21 appends the next block of the blockchain in the object distributed ledger as previously discussed with reference to FIG. 9D to update the object distributed ledger as illustrated in FIGS. 9B and 9C.

Alternatively, when the first contingent asset risk level of the first contingent asset is less than the contingency risk threshold level, the example method of operation includes the computing entity 21 establishing the set of first contingent asset available terms for the corresponding set of portions of the first contingent asset to include the set of first contingent asset available terms and a non-contingent status. The example method of operation further includes the computing entity 21 causing generation of the non-fungible token to represent the set of first smart contracts in the object distributed ledger as previously discussed.

Having generated the first contingent asset blockchain record set 301 as the NFT, the example method further includes the computing entity 21 publishing availability of the portions of first available contingent asset utilizing the first available contingent asset blockchain record set 301 to a plurality of other computing entities (e.g., to a plurality of potential buyers). The publishing includes one or more of generating a message that includes the first available contingent asset blockchain record set 301, posting the message on an exchange (e.g., storing the blockchain record set in the contingent asset database 34 and making that portion of the database available to potential buyers), and sending the message to at least some of the computing entities 23-1 through 23-N to reach buyers with the listing as illustrated in the risk versus time chart of FIG. 15F.

Figures 15G, 15H:
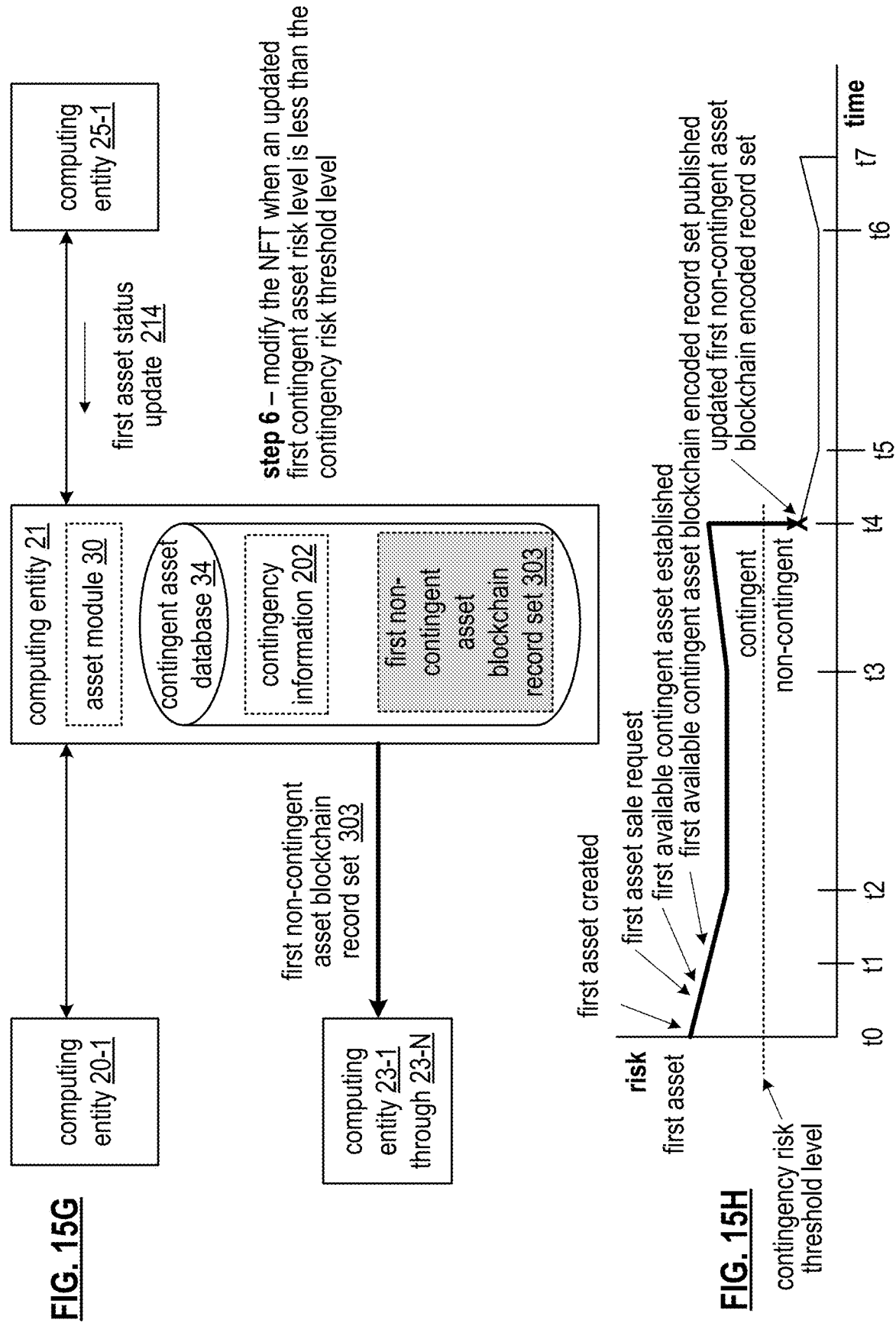

FIG. 15G further illustrates the example method of operation of the listing of the contingent asset for sale utilizing the split blockchain record where, having published availability of the first available contingent asset utilizing the first available contingent asset blockchain encoded record set, in a sixth step the computing entity 21 updates the first available contingent asset blockchain encoded record set to produce a first non-contingent asset blockchain encoded record set 303 as a modification to the NFT as illustrated on the risk chart of FIG. 15H, subsequent to the generation of the non-fungible token that represents the set of first smart contracts in the object distributed ledger when the first contingent asset risk level of the first contingent asset is greater than the contingency risk threshold level.

The producing of the modification of the NFT includes a series of sub-steps. A first sub-step includes the computing entity 21 detecting that an updated first contingent asset risk level of the first contingent asset is less than the contingency risk threshold level. For example, the asset module 30 obtains status of the first contingent asset by interpreting a first asset status update 214 from the computing entity 25-1 (indicating one of a payment approval status, approval pending, or approval rejected), reassess the risk information associated with the portions of the first contingent asset including updating a probability that the payer will pay at the end of the asset lifecycle, and interpreting risk information of the content of the blockchain record set. In an embodi-ment, the first asset status update 214 includes a status blockchain. The asset module 30 indicates the first asset risk level to be less than the contingency risk threshold level when the status blockchain from the first asset status update 214 indicates that the payer has approved the potential liability of the first asset when the status blockchain has been verified as previously discussed.

A second sub-step includes establishing an updated set of first contingent asset available terms for the corresponding set of portions of the first contingent asset based on the updated first contingent asset risk level. For example, the asset module 30 changes a status from contingent to non-contingent, determines an updated price and/or set of prices for the portions (e.g., raising prices when the portions are unsold and the payer has approved a subsequent payout).

A third sub-step includes generating an updated set of first smart contracts to represent the set of portions of the first contingent asset to include the updated set of first contingent asset available terms and a non-contingent status. A fourth sub-step includes causing modification of the non-fungible token to represent the updated set of first smart contracts in the object distributed ledger. Alternatively, or in addition to, the asset module 30 further publishes the updated records by sending the first noncontingent asset blockchain record set 303 to the computing entities 23-1 through 23-N when at least one portion of the first contingent asset is still available.

The method described above in conjunction with a pro-cessing module of any computing entity of the computing system 10 can alternatively be performed by other modules of the computing system 10 of FIG. 1 or by other devices. In addition, at least one memory section that is non-transi-tory (e.g., a non-transitory computer readable storage medium, a non-transitory computer readable memory orga-nized into a first memory element, a second memory ele-ment, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 16A-16D are schematic block diagrams of another embodiment of a computing system and a contingent asset risk chart illustrating an example of facilitating payment from a payer to a buyer for a contingent asset utilizing a split blockchain record. The computing system includes the computing entity 20-1 of FIG. 1, the computing entity 21 of FIG. 1, computing entities 23-1 through 23-N of FIG. 1, and the computing entity 25-1 of FIG. 1. In an embodiment, the buyer includes a plurality of owner entities.

FIG. 16A illustrates an example method of operation of the facilitating payment from the payer to the buyer for the contingent asset utilizing the split blockchain record, where a first step includes the computing entity 21 obtaining a lifecycle status for a first contingent asset of a multitude of contingent assets. The first contingent asset assigns a potential first liability of a first payer to an owner entity associated with the first contingent asset. At least a portion of the potential first liability is to be paid by the first payer to the owner entity in accordance with contingency information and subsequent to completion of a first asset lifecycle of the first contingent asset as illustrated in FIG. 16B. The lifecycle status includes pending approval, approval for payment (e.g., pending payment at t7 of FIG. 16B), and rejected.

The obtaining of the lifecycle status for the first contingent asset includes a variety of approaches. A first approach includes the asset module 30 detecting a change in a risk level associated with the first contingent asset. A second approach includes the asset module 30 detecting that a transition time frame has elapsed. A third approach includes the asset module 30 receiving a request for an updated status. A fourth approach includes the asset module 30 issuing a status update request to the computing entity 25-1 (e.g., the payer). A fifth approach includes the asset module 30 interpreting a first asset status update 214 from the computing entity 25-1. In an embodiment the first asset status update 214 includes a blockchain record associated with the first contingent asset.

Having obtained the lifecycle status for the first contingent asset, when the lifecycle status of the first contingent asset has transitioned to pending payment, a second step of the example method of operation to facilitate payment from the payer to the buyer of the contingent asset utilizing the split blockchain record includes the computing entity 21 updating a first contingent asset blockchain encoded record set 341 to indicate the lifecycle status of the first contingent asset has transitioned to pending payment.

The first contingent asset blockchain-encoded record set 341 corresponds to a set of first contingent sub-assets of the first contingent asset. Each first contingent asset blockchain-encoded record of the first contingent asset blockchain-encoded record set is mapped to a corresponding first contingent sub-asset of the set of first contingent sub-assets of the first contingent asset. The updating further includes the asset module 30 modifying the content of each blockchain record of the blockchain record set as discussed in FIG. 9K.

Having updated the first contingent asset blockchain encoded record set 341, a third step of the example method of operation to facilitate payment from the payer to the buyer of the contingent asset utilizing the split blockchain record includes the computing entity 21 obtaining a payout for the first contingent asset from the first payer in accordance with the contingency information 202 and utilizing the first contingent asset blockchain encoded record set 341. The obtaining of the payout includes a series of sub-steps. A first sub-step includes the asset module 30 determining an expected payout based on the contingency information 202 and payout information of content of the first contingent asset blockchain record set 341. For example, the asset module 30 determines the expected payout to be a committed payout level from the computing entity 25-1.

A second sub-step includes the asset module 30 issuing a payout request to the computing entity 25-1 of the payer, where the asset module 30 modifies the first contingent asset blockchain record set 341 to include the expected payout and includes the first contingent asset blockchain record set 341 in the payout request. A third sub-step includes the asset module 30 receiving a first contingent asset payout 260 from the computing entity 25-1. In an embodiment, the first contingent asset payout 260 includes a further updated first contingent asset blockchain record set that includes payout information. Alternatively, or in addition to, the first contingent asset payout 260 is included in a batch payment from the computing entity 25-1 for a multitude of asset payouts, where a multitude of contingent asset blockchain records include a multitude of payouts associated with at least the set of first contingent sub-assets of the first contingent asset.

Figures 16C, 16D:
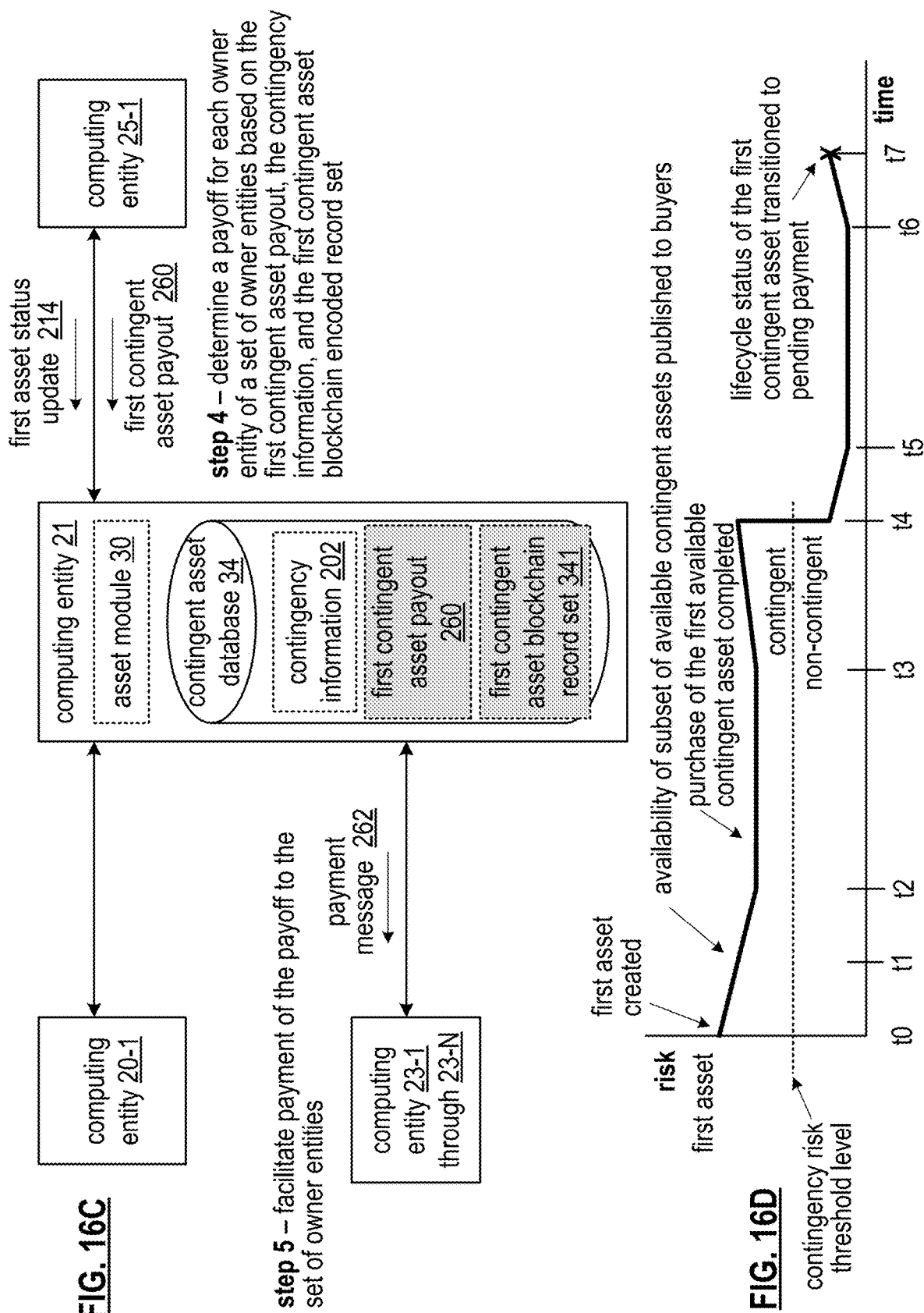

FIG. 16C further illustrates the example method of operation of the facilitating payment from the payer to the buyer for the contingent asset utilizing the blockchain record, where, when the lifecycle status of the first contingent asset has transitioned to pending payment as illustrated at t7 in FIG. 16D, and having obtained the payout for the first contingent asset from the first payer, a fourth step includes the computing entity 21 determining a payoff for each owner entity of a set of owner entities based on the payout, the contingency information 202, and the first contingent asset blockchain encoded record set 341. For example, when the payout is less than a face value, the asset module 30 calculates the payoff to be a total payout minus any fees (e.g., a transaction fee). As another example, when the payout is greater than the face value, the asset module 30 calculates the total payoff to be the payout minus the fees and further disposes of an overage (e.g., a difference between the payout and the face value) in accordance with the contingency information 202 (e.g., transfer funds to an account associated with an exchange, credit the buyer for a portion of a future purchase, credit the seller for repurchase of a future sale). As yet another example, the asset module 30 calculates each payout for each owner based on ownership levels indicated by the first contingent asset blockchain record set 341.

Having determined the payoff for the set of owner entities, a fifth step of the example method of operation of the facilitating payment from the payer to the buyer utilizing the split blockchain record includes the computing entity 21 facilitating payment of the payoff to the set of owner entities. For example, the asset module 30 generates a payment message 262 for each owner entity that includes corresponding payment information in accordance with the first contingent asset payout 260 and the first contingent asset blockchain record set 341. In an embodiment, the asset module 30 generates a first payment message 262 for an owner entity associated with the computing entity 23-1 to include a corresponding record of the first contingent asset blockchain record set 341, where the corresponding record of the first contingent asset blockchain record set 341 includes the payment information. The asset module 30 sends the payment message 262 to the computing entity 23-1 associated with the owner entity. Alternatively, or in addition to, the asset module 30 credits an account associated with the owner entity for the amount of the payoff.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 17A-17F are schematic block diagrams of another embodiment of a computing system and a contingent asset risk chart illustrating an example of creating a contingent asset for conversion into an instant asset at a point of purchase. The computing system includes computing entities 20-1 through 20-N of FIG. 1, the computing entity 21 of FIG. 1, computing entities 23-1 through 23-N of FIG. 1, and the computing entity 25-1 of FIG. 1. In an embodiment, the computing entities 20-1 through 20-N are associated with a multitude of consumers in a point of purchase scenario. For example, computing entity 20-1 is associated with retail processing for a first retailer of a multitude of retailers (e.g., at a point of sale terminal, on a smart phone of the consumer, on a home computer associated with the consumer). As another example, computing entity 20-2 is associated with a first consumer of the multitude of consumers. As yet another example, computing entity 20-3 is associated with a first merchant bank of a multitude of merchant banks (e.g., a debit or credit processing facility).

Figures 17A, 17B:
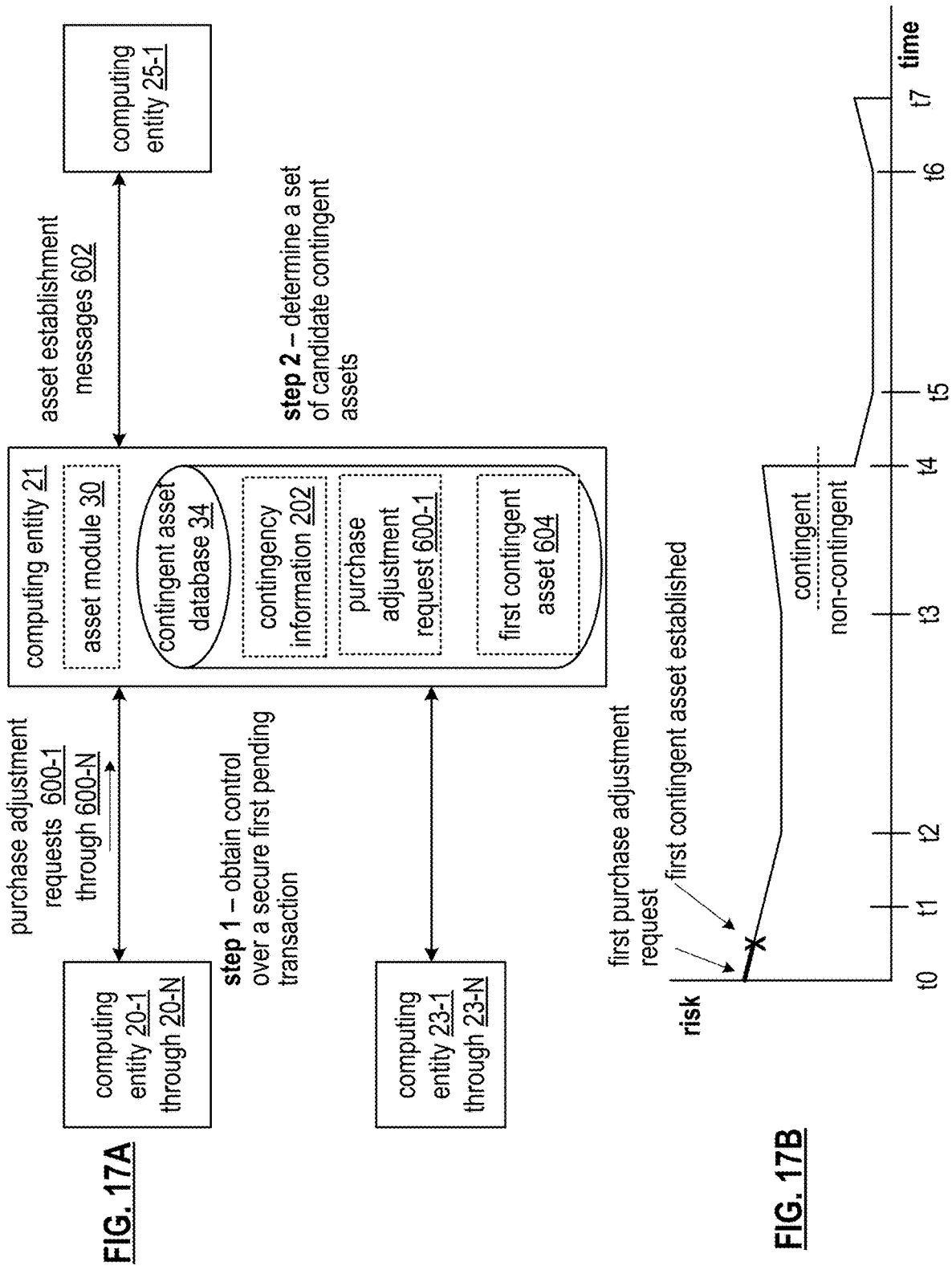
FIGS. 17A-17F are schematic block diagrams of another embodiment of a computing system and a contingent asset risk chart illustrating an example of creating a contingent asset for conversion into an instant asset at a point of purchase in accordance with the present invention.

FIG. 17A illustrates an example method of operation of the creating the contingent asset for conversion into the instant asset at the point of purchase, where a first step includes the computing entity 21 obtaining, from a requesting computing entity of the computing system in accordance with a securely passing process, control over a secure first pending transaction associated with a transaction item. The secure first pending transaction includes identity of the transaction item (e.g., identity of a good, identity of a service, an element of an agreement, etc.), identity of the requesting computing entity (e.g., computing entity 20-1), identity of the computing entity (e.g., computing entity 21), and an authenticated value of the transaction item (e.g., a purchase price associated with the good).

Only a device possessing control over the secure first pending transaction may modify the secure first pending transaction. The secure first pending transaction includes a header section and a transaction section. The header section includes routing identifiers and common information for a block of the transaction (e.g., security information, a hash of the block, etc.). The transaction section includes specific content associated with unique aspects of the secure first pending transaction (e.g., the identity of the transaction item, the authenticated value of the transaction item, and security information for the transaction). The security information for the transaction includes a signature over the transaction section utilizing a private key of the device in control of the transaction and a public key of a next designated device to have the control over the transaction. In an embodiment, the header section and the transaction section for the block is arranged as previously discussed with reference to FIG. 9D.

The securely passing process includes obtaining control as either an originator of the first pending transaction and being authorized as to possess control from a current entity that possesses the control. The current owner includes a public key of the next owner in the transaction section of the block and generates the signature over the transaction section utilizing both the private key of the current owner device and the public key of the next owner device as discussed in greater detail with reference to FIG. 9D.

The obtaining, in accordance with the securely passing process, the control over the secure first pending transaction includes a series of sub-steps. A first sub-step includes the asset module 30 of the computing entity 21 receiving an indication of the control over the secure first pending transaction from the requesting computing entity. For example, the asset module 30 receives a purchase adjustment request 600-1 from the computing entity 20-1, where the purchase adjustment request 600-number one includes the secure first pending transaction that includes the private key associated with the computing entity 20-1.

A second sub-step includes establishing the identity of the computing entity to have control over the secure first pending transaction. For example, the asset module 30 modifies the secure first pending transaction to include the identity of the computing entity 21 as having the control over the secure first pending transaction.

In another embodiment, the asset module 30 selects the first purchase adjustment request 600-1 of a multitude of purchase adjustment requests 600-1 through 600-N with regards to the secure first pending transaction associated with a first consumer of a multitude of consumers. The first purchase adjustment request 600-1 includes first preliminary adjustment option selections (e.g., simple rebate in 90 days, a desired discount level, a desired payment scheme). A first payer of a multitude of payers is associated with at least one component of the first pending purchase transaction. For example, a big-ticket item (e.g., as indicated by the identity of the transaction item) of the first pending purchase transaction is an item provided by the first payer to the associated retailer for sale to the first consumer.

The asset module 30 selects the first purchase adjustment request 600-1 based on one or more of matching the big-ticket item of the first pending purchase transaction to the first payer, determining that the big-ticket item is associated with a purchase price greater than a minimum purchase price wrestled level, and determining that the big-ticket item is likely to be eligible for a purchase adjustment. The purchase adjustment includes one or more of a rebate (e.g., a portion of the purchase price is returned to the first consumer), an instant discount (e.g., the price of the big-ticket item is reduced right away), and a custom payment plan (e.g., four equal payments over 4 time periods, ramping payments over several time periods, etc.).

The purchase adjustment request 600-1 further includes one or more of an identifier of the point of purchase provider (e.g., retailer, etc.), an identifier of the consumer, and a list of items and quantities associated with the purchase request. In an embodiment, the purchase adjustment request further includes an identifier of one or more payers known to be associated with one or more of the items of the list of items, indications of specific items of the list of items that are known to be eligible for a purchase adjustment, and an indication of a desired purchase adjustment (e.g., rebate versus discount now versus a custom payment plan, or a combination thereof).

Having selected the first purchase adjustment request, the example of operation of the creating the contingent asset for conversion into the instant asset at the point of purchase further includes a second step where the computing entity 21 determines a set of candidate contingent assets for the secure first pending transaction based the identity of the transaction item, the identity of the requesting computing entity, and the authenticated value of the transaction item. Each candidate contingent asset of the set of candidate contingent assets includes a proposed unique smart contract between the identifier of the requesting computing entity and an identifier of a provider of the proposed unique smart contract.

The determining the set of candidate contingent assets for the secure first pending transaction based the identity of the transaction item, the identity of the requesting computing entity, and the authenticated value of the transaction item includes a variety of approaches. A first approach includes, when utilizing the identity of the transaction item, identifying a subset of the set of candidate contingent assets based on the identity of the transaction item and the authenticated value of the transaction item. For example, the asset module 30 of the computing entity 21 interprets an asset establishment message 602 from the computing entity 25-1 (e.g., a payer associated with the transaction item) to identify one or more candidate contingent assets associated with the transaction item. For instance, the asset module 30 identifies one or more rebate programs from the manufacturer of a refrigerator when the refrigerator is the transaction item and stores such information as contingency information 202 and the contingency asset database 34.

A second approach includes, when utilizing the identity of the requesting computing entity, a first sub-step that includes the asset module 30 determining a transaction profile for the identity of the requesting computing entity. The transaction profile includes, for the identity of the requesting computing entity, a history of purchases, a participation history in previous rebate programs, overall purchasing patterns, and demographics of an individual associated with the identity of the requesting computing entity.

A second sub-step of the second approach includes the asset module 30 identifying another subset of the set of candidate contingent assets based on the profile for the identity of the requesting computing entity. For example, the asset module 30 matches characteristics of the profile for the identity of the requesting computing entity to characteristics of the other subset of the set of candidate contingent assets from further asset establishment message is 602 from computing entity 25-1.

Alternatively, or in addition to, when determining the set of candidate contingent assets, the asset module 30 establishes a first contingent asset 604 with the first payer in accordance with the first preliminary adjustment option selections as illustrated in the risk chart of FIG. 17B. The first contingent asset 604 assigns a potential first liability of the first payer to the first consumer associated with the first purchase adjustment request. At least a portion of the potential first liability is to be paid by the first payer to the first consumer in accordance with contingency information of the first contingent asset and subsequent to completion of a first asset lifecycle of the first contingent asset as illustrated in FIG. 17B.

The establishing of the first contingent asset 604 includes exchanging asset establishment message 602 with the computing entity 25-1 associated with the first payer. For example, the asset module 30 issues a first asset establishment message to the computing entity 25-1 that includes the first purchase adjustment request 600-1. The computing entity 25-1 issues a second asset establishment message to the computing entity 21 that includes the first contingent asset 604. For instance, the computing entity 25-1 temporarily assigns the first consumer as the recipient of a 90 day rebate associated with the big-ticket item of the purchase adjustment request when the big-ticket item is associated with the first payer and is eligible for the rebate. The computing entity 20-1 and/or the computing entity 21 may place a temporary hold on a credit card associated with the first consumer to guarantee completion of the rebate process. In an embodiment, the computing entity that creates the first contingent asset also creates the blockchain record for the first contingent asset.

Figures 17C, 17D:
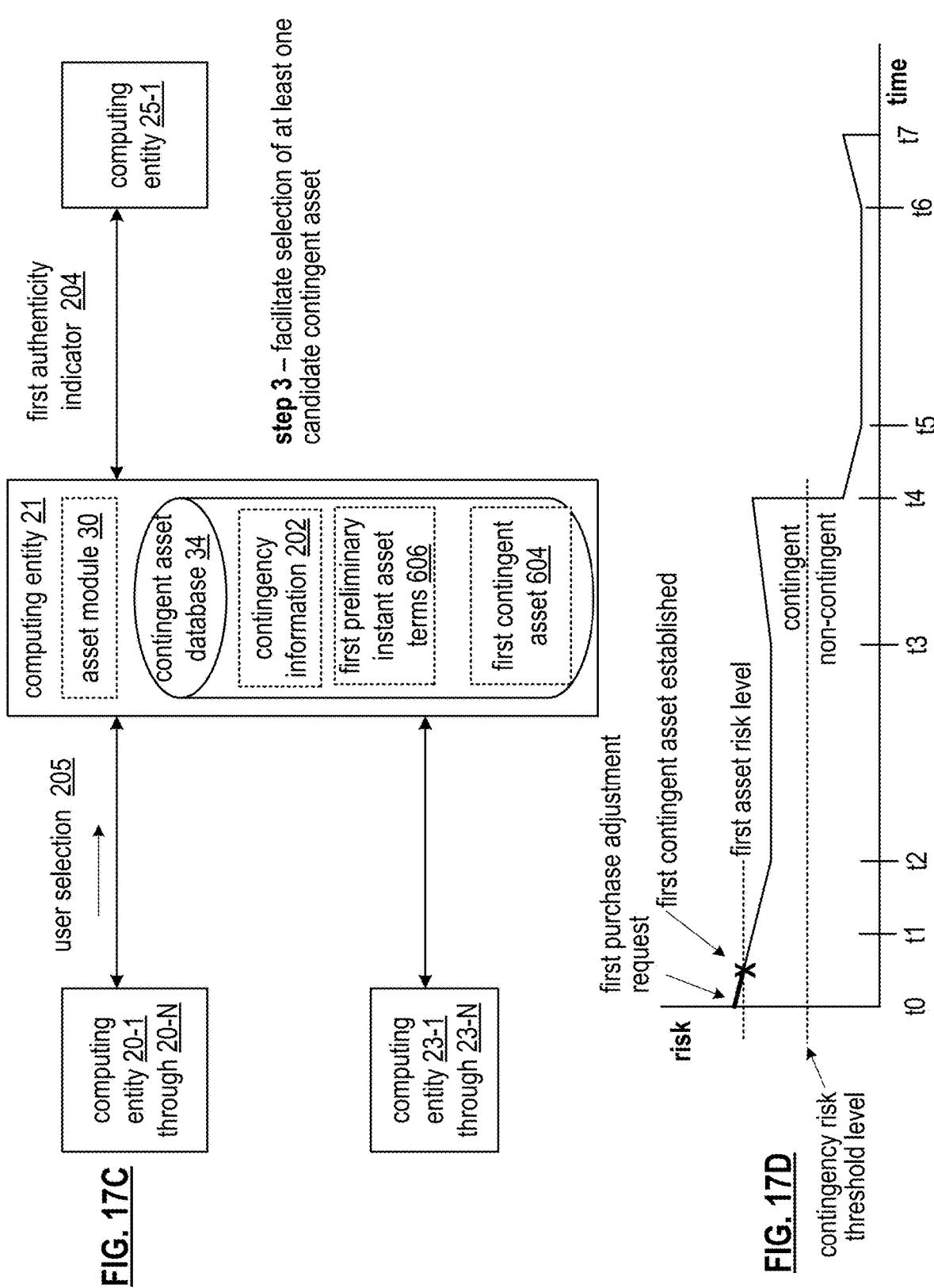

FIG. 17C further illustrates the example method of operation of the creating the contingent asset for conversion into the instant asset at the point of purchase, where, having established the set of candidate contingent assets, a third step of the example method includes the computing entity 21 facilitating selection of at least one candidate contingent asset of the set of candidate contingent assets utilizing an asset selection approach to produce a set of selected contingent assets. The facilitating the selection of the at least one candidate contingent asset of the set of candidate contingent assets utilizing the asset selection approach to produce the set of selected contingent assets includes a variety of approaches.

A first approach includes, when the asset selection approach includes a user selection, a first sub-step that includes ranking an estimated benefit to an entity associated with the identity of the requesting computing entity for each candidate contingent asset of the set of candidate contingent assets to produce an estimated benefit ranking. For example, the asset module 30 of the computing entity 21 analyzes each contingent asset to determine the estimated benefit (e.g., overall value) for an individual associated with the identity of the requesting computing entity. For instance, when Fred is buying a new refrigerator and there are two rebate programs for that refrigerator, the benefit is estimated for each rebate program for Fred based on peculiarities of the rebate programs with regards to Fred (e.g., affinity award points for Fred, an extra amount included in the rebate since it is Fred, etc.).

A second sub-step of the first approach includes obtaining the user selection of the at least one candidate contingent asset in response to the estimated benefit ranking to produce the set of selected contingent assets. For example, the asset module 30 of the computing entity 21 receives a first authenticity indicator 204 from the computing entity 25-1 to verify rebate programs associated with the secure first pending transaction that are available. The asset module 30 interprets a user selection 205 from the computing entity 20-1 to identify the at least one candidate contingent asset in response to a selection request from the asset module 30 that includes the estimated benefit ranking.

A first sub-step of a second approach includes, when the asset selection approach includes a ranked evaluation, evaluating a potential for each candidate contingent asset of the set of candidate contingent assets to produce a potential ranking. For example, the asset module 30 of the computing entity 21 computes the potential for each candidate contingent asset more broadly for any individual that may utilize each contingent asset to produce the potential ranking (e.g., by value of the candidate contingent asset).

A second sub-step of the second approach includes selecting the at least one candidate contingent asset based on the potential ranking to produce the set of selected contingent assets. For example, the asset module 30 automatically selects a top-ranked (e.g., most value) candidate asset from the set of candidate contingent assets to identify the at least one candidate contingent asset.

Alternatively, or in addition to, the facilitating of the selection of the at least one candidate contingent asset further includes basing the selection on asset risk level. The utilization of the asset risk level includes the asset module 30 determining whether a first asset risk level of a first contingent asset is greater than a contingency risk threshold level.

The determining includes one or more of obtaining risk levels of relevant attributes, calculating the first asset risk level based on the risk levels of the relevant attributes, and comparing the first asset risk level to the contingency risk threshold level. For example, the asset module 30 obtains the risk levels of the relevant attributes to include risks associated with the payer, the consumer, the type of asset, parameters of the purchase request, and status of the contingent asset by interpreting a first authenticity indicator 204 from the computing entity 25-1 on behalf of the payer (e.g., contingent versus noncontingent and lifecycle status as illustrated in FIG. 17D).

As a further example, the asset module 30 maps the risk levels of the relevant attributes to the first asset risk level for comparison to the contingency risk threshold level to determine that the first asset risk level is greater than the contingency risk threshold level. As yet another example, the asset module 30 indicates that the first asset risk level is greater than the contingency risk threshold level when the blockchain record of the first contingent asset indicates that the payer has not approved the potential liability yet.

When the first asset risk level of the first contingent asset is greater than the contingency risk threshold level, the alternative example method of operation further includes the computing entity 21 determining first preliminary instant asset terms 606 for utilization of the first contingent asset 604 as a first instant asset to support the secure first pending transaction based on the first preliminary adjustment options, the first contingent asset, and the first asset risk level. The first preliminary instant asset terms 606 includes one or more of an instant discount level, a payment scheme (e.g., payment time periods, payment levels), expected contingency asset payout information, and contingency information 202 of the first contingent asset 604. For example, the asset module 30 generates the first preliminary instant asset terms 606 to include a maximum instant discount when the first preliminary adjustment options of the purchase adjustment request indicated a desire for an instant discount.

Figures 17E, 17F:
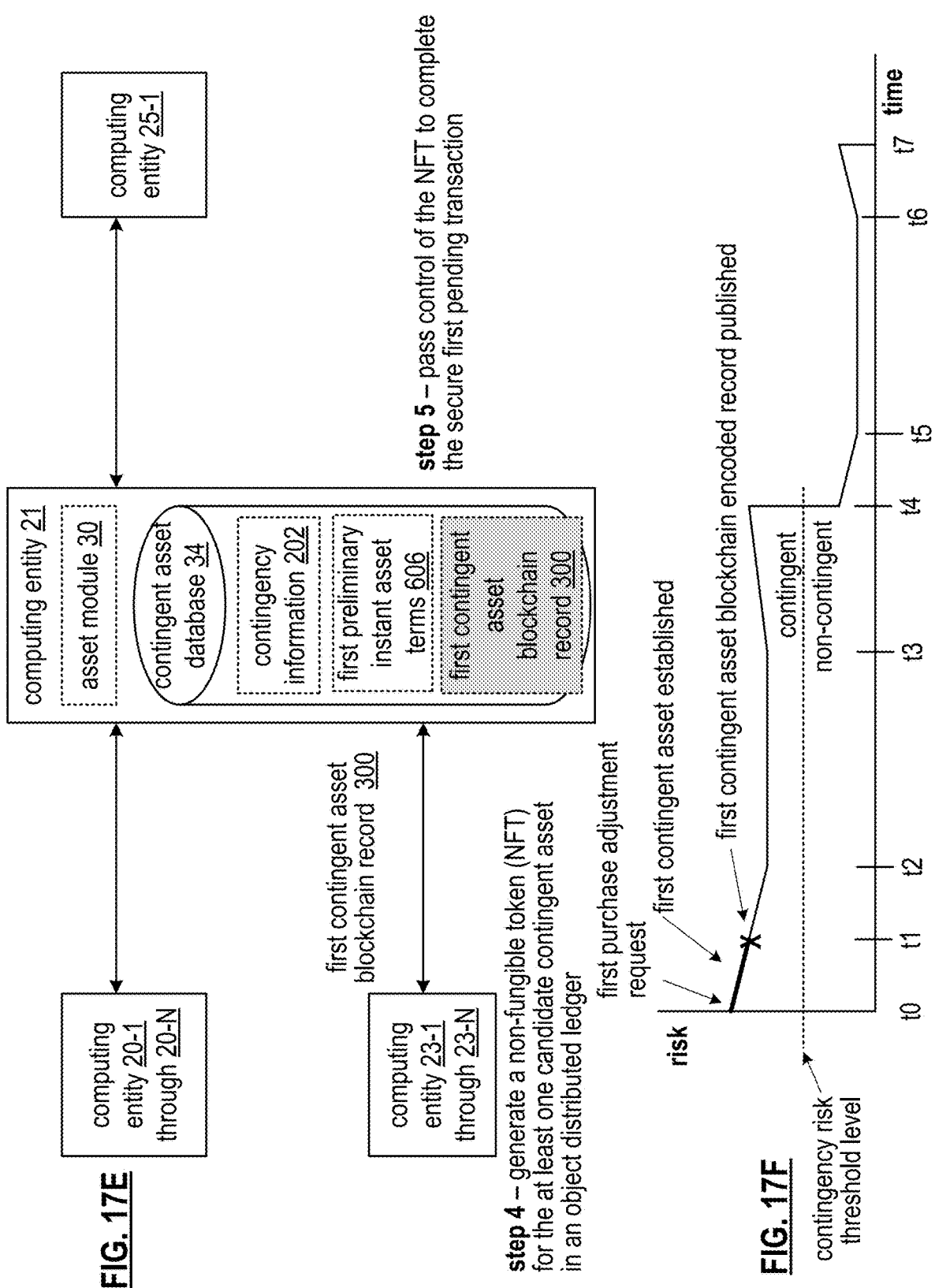

FIG. 17E further illustrates the example method of operation of the creating the contingent asset for conversion into the instant asset at the point of purchase, where, having selected the at least one candidate contingent asset, the method further includes the computing entity 21 generating a non-fungible token (NFT) in accordance with the securely passing process to represent a corresponding set of smart contracts of the set of selected contingent assets in the object distributed ledger. The NFT includes the secure first pending transaction.

The generating the NFT in accordance with the securely passing process to represent the corresponding set of smart contracts of the set of selected contingent assets in the object distributed ledger includes determining whether to indirectly or directly update the object distributed ledger. For example, the computing entity 21 determines to indirectly update the object distributed ledger when the computing entity 21 does not have a satisfactory direct access to the object distributed ledger (e.g., the computing entity 21 does not serve as a blockchain node). As another example, the computing entity 21 determines to directly update the object distributed ledger when a predetermination stored in the contingent asset database 34 indicates to directly access the object distributed ledger when possible (e.g., a copy of the blockchain is stored in the contingent asset database 34 of the computing entity 21).

When indirectly updating the object distributed ledger, the causing the generation includes the computing entity 21 issuing a non-fungible token generation request to an object ledger computing entity of the computing system serving as a blockchain node of the object distributed ledger. The non-fungible token generation request includes the set of smart contracts of the set of selected contingent assets. For example, the computing entity 21 issues a first contingent asset blockchain record 300 to the computing entity 23-1, where the first contingent asset blockchain record 300 includes the original request and the set of smart contracts. In response, the computing entity 23-1 adds a new non-fungible token listing to the object distributed ledger (e.g., as illustrated by FIGS. 9B and 9C).

When directly updating the object distributed ledger, the causing the generation includes the computing entity 21 performing a series of sub-steps previously discussed in FIG. 9D and as also discussed in FIG. 9K. A first sub-step includes obtaining a copy of the object distributed ledger. For example, the computing entity 21 extracts the object distributed ledger from a message from computing entity 23-1 (e.g., acting as a blockchain node). As another example, the computing entity 21 recovers the object distributed ledger from the contingent asset database 34.

A second sub-step includes hashing the set of smart contracts utilizing a receiving public key of the object distributed ledger to produce a next transaction hash value. For example, the computing entity 21 obtains a suitable receiving public key (e.g., from a current version of the blockchain, from a blockchain node, from the computing entity 23-1, from a computing entity to be next in control) and performs the hashing function to produce the next transaction hash value.

A third sub-step includes encrypting the next transaction hash value utilizing a private key of the computing entity 21 to produce a next transaction signature. For example, the computing entity 21 recovers a private key associated with the computing entity 21 and utilizes the recovered private key to encrypt the next transaction hash value to produce the next transaction signature.

A fourth sub-step includes generating a next block of a blockchain of the object distributed ledger to include the set of smart contracts and the next transaction signature. For example, the computing entity 21 generates the next block as previously discussed with regards to FIG. 9D to include the set of smart contracts and the next transaction signature.

A fifth sub-step includes causing inclusion of the next block as the non-fungible token in the object distributed ledger. For example, the computing entity 21 appends the next block of the blockchain in the object distributed ledger as previously discussed with reference to FIG. 9D to update the object distributed ledger as illustrated in FIGS. 9B and 9C.

Alternatively, when the first contingent asset risk level of the first contingent asset is less than the contingency risk threshold level, the example method of operation includes the computing entity 21 establishing the set of contingent asset available terms for the corresponding set of portions of the first contingent asset to include the set of first contingent asset available terms and a non-contingent status. The example method of operation further includes the computing entity 21 causing generation of the non-fungible token to represent the set of first smart contracts in the object distributed ledger as previously discussed.

Having generated the first contingent asset blockchain record 300 as the NFT, a fifth step of the example method further includes the computing entity 21 securely passing control over the NFT via the object distributed ledger when the NFT is selected to complete the secure first pending transaction. For example, the computing entity 21 receives an indication that the contingent asset of the newly created NFT on the blockchain is to be utilized for conversion into an instant asset to facilitate completion of the secure first pending transaction. After receiving the indication, the computing entity 21 identifies a computing entity associated with the completion of the transaction to turnover control of the NFT. The computing entity 21 generates another block for the blockchain as discussed with reference to FIG. 9D to complete passing of the control to the identified computing entity associated with the completion of the transaction.

In an alternative embodiment, the computing entity 21 determines first preliminary instant asset terms and generates the first contingent asset blockchain record 300 for the first contingent asset to be utilized as the first instant asset in accordance with first preliminary instant asset terms. For example the asset module 30 generates instant asset content to include the first preliminary instant asset terms and generates the first contingent asset blockchain record 300 as described in FIG. 9K for the instant asset content.

Having generated the first contingent asset blockchain encoded record for the first contingent asset to be utilized as the first instant asset, the example of operation of the creating the contingent asset for conversion into the instant asset at the point of purchase further includes the computing entity 21 publishing availability of the first contingent asset utilizing the first contingent asset blockchain record 300 as illustrated in FIG. 17F. For example, the asset module 30 sends the first contingent asset blockchain encoded record 300 to a plurality of other computing entities 23-1 through 23-N. As another example, the asset module 30 sends the first contingent asset blockchain record 300 to another process within the computing entity 21 (e.g., where and exchange process subsequently purchases the contingent asset for supporting utilization of the instant asset).

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 18A-18F are schematic block diagrams of another embodiment of a computing system and a contingent asset risk chart illustrating an example of executing a sale of a contingent asset for conversion into an instant asset at a point of purchase. The computing system includes computing entities 20-1 through 20-N of FIG. 1, the computing entity 21 of FIG. 1, computing entities 23-1 through 23-N of FIG. 1, and the computing entity 25-1 of FIG. 1. In an embodiment, the computing entities 20-1 through 20-N are associated with a multitude of consumers in a point of purchase scenario.

FIG. 18A illustrates an example method of operation of the executing the sale of the contingent asset for conversion into the instant asset at the point of purchase, where a first step includes the computing entity 21 indicating availability of a first contingent asset for subsequent utilization as a first instant asset to one or more other computing entities utilizing a first contingent asset blockchain encoded record 300 for the first contingent asset. The subsequent utilization as the first instant asset supports a first purchase adjustment request of a multitude of purchase adjustment requests with regards to a first pending purchase transaction associated with a first consumer of a multitude of consumers. A first payer of a multitude of payers is associated with at least one component of the first pending purchase transaction. The first contingent asset assigns a potential first liability of the first payer to the first consumer associated with the first contingent asset. At least a portion of the potential first liability is to be paid by the first payer to the first consumer in accordance with contingency information 202 of the first contingent asset and subsequent to completion of a first asset lifecycle of the first contingent asset as illustrated with regards to FIG. 18B. First preliminary instant asset terms of the first contingent asset blockchain encoded record specify the subsequent utilization of the first contingent asset as the first instant asset to support the first pending purchase transaction.

The indicating of the availability of the first contingent asset includes the asset module 30 sending the first contingent asset blockchain record 300 to the computing entities 23-1 through 23-N (e.g., buyers). The indicating of the availability of the first contingent asset further includes identifying one or more computing entities to target solicitation of purchasing the first contingent asset. For example, identifying computing entity 23-1 as a most likely computing entity to purchase the first contingent asset when the computing entity 23-1 has historically purchased contingent assets for conversion to instant assets.

Having indicated the availability of the first contingent asset, a second step of the example method of operation of the executing the sale of the contingent asset for conversion into the instant asset at the point of purchase includes the computing entity 21 obtaining a set of contingent asset purchase requests 244 from one or more of the other computing entities. The set of contingent asset purchase requests 244 includes a first contingent asset purchase request 246 with regards a bid for the first contingent asset. A bid includes first offered instant asset terms based on the first preliminary instant asset terms. The set of contingent asset purchase requests are generated within a purchase timeframe as illustrated in FIG. 18B. The first offered instant asset terms includes one or more of a discount range, a payment plan approach, payment plan values (e.g., how much to be paid when), guarantees required (e.g., a hold on a credit card of the consumer for an amount comparable to value of the instant asset), and a time frame of validity of the purchase request.

FIG. 18C further illustrates the example method of operation of the executing the sale of the contingent asset for conversion into the instant asset at the point of purchase, where, having obtained the first contingent asset purchase request 246, a third step of the example method includes the computing entity 21 determining whether to approve the first contingent asset purchase request 246 based on a comparison of the first offered instant asset terms to the first preliminary instant asset terms and a first asset risk level of the first contingent asset as illustrated in FIG. 18D. The determining whether to approve the first contingent asset purchase request is based on one or more of identifying a difference in terms, a listed price, a bid price, a history of bid-ask spreads, a history of other acceptances of a set of purchase requests, a comparison to other instant assets of a buyer associated with the purchase request, and an impact to one or more contingent asset portfolios. For example, the asset module 30 determines to approve the first contingent asset purchase request 246 when the bid price for the first contingent asset for conversion is greater than a minimum required bid price and an assessment of the risk is less than a maximum risk threshold level for conversion.

Having determined to approve the first contingent asset purchase request, a fourth step of the example method of operation of the executing the sale of the contingent asset for conversion into the instant asset at the point of purchase includes the computing entity 21 obtaining payment for purchase of the first contingent asset from the first buyer associated with the first contingent asset purchase request 246. For example, the asset module 30 obtains purchase information 248 from the computing entity 23-1, where the purchase information 248 includes payment enabling information. For instance, the purchase information 248 includes a blockchain payment message including information to complete payment.

FIG. 18E further illustrates the example method of operation of the executing the sale of the contingent asset for conversion into the instant asset at the point of purchase, where, having obtained the payment for the purchase of the first contingent asset, a fifth step of the example method includes the computing entity 21 determining first final instant asset terms 620 for utilization of the first contingent asset as the first instant asset. The asset module 30 determines the first final instant asset terms 620 based on one or more of the first offered instant asset terms and the first preliminary instant asset terms and utilizing a terms rationalization approach. The terms rationalization approach includes, selecting one term or another, averaging terms, and ranking terms for selection of terms ranked high or low. For example, the asset module 30 determines the first final instant asset terms 620 to include exactly the terms offered by the buyer when the terms rationalization approach indicates to utilize offered terms when the offer terms are within acceptable ranges included in the first preliminary instant asset terms.

Having determined the first final instant asset terms 620, a sixth step of the example method of operation of the executing the sale of the contingent asset for conversion into the instant asset at the point of purchase includes the computing entity 21 updating first contingent asset blockchain encoded record 300 to indicate reassignment of the potential first liability of the first contingent asset from the first consumer to an entity associated with the first buyer of the first contingent asset purchase request and to indicate availability for the subsequent utilization of the first contingent asset as the first instant asset by the first consumer in accordance with the first final instant asset terms 620 as illustrated in FIG. 18F. For example, the asset module 30 modifies the content and security aspects of the first contingent asset blockchain record 300 as discussed with reference to FIG. 9K. In an example, the entity associated with the first buyer is the first computing entity 23-1. In another example, the entity associated with the first buyer is the computing entity 21 when the exchange is to purchase the first contingent asset for conversion to the instant access.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 18G-18H are schematic block diagrams of an embodiment of a computing system illustrating an example of securely converting a contingent asset into an instant asset at a point of purchase. The computing system includes computing entities 20-1 through 20-N of FIG. 1, the computing entity 21 of FIG. 1, computing entities 23-1 through 23-N of FIG. 1, and the computing entity 25-1 of FIG. 1. In an embodiment, the computing entities 20-1 through 20-N are associated with a multitude of consumers in a point of purchase scenario.

FIG. 18G illustrates an example method of operation of the securely converting the contingent asset into the instant asset at the point of purchase, where a first step includes the computing entity 21 generating a secure first token 802 in accordance with a securely passing process to represent utilization of a selected contingent asset for a first pending transaction associated with a transaction item. For example, the asset module 30 of the computing entity 21, in response to point of purchase information 804 from the computing entity 20-1 (e.g., in an example where the computing entity 20-1 is utilized by a first consumer performing a point of purchase of the transaction item within the first pending transaction), wraps a contingent asset (e.g., a rebate offered by a payer associated with the computing entity 25-1) into a block of a blockchain, stored, from time to time, as blockchain information 800 in the contingent asset database 34, as discussed with reference to FIG. 9K. In an embodiment, block of the blockchain is securely stored in an object distributed ledger maintained by one or more of the computing entities 23-1 through 23-N as illustrated in FIG. 18G as block 1.

The point of purchase information 804 includes one or more of a first pending transaction identifier, a secure first token identifier, a selected contingent asset identifier, identity of the computing entity 20-1 (e.g., a requesting computing entity), and an identity of the transaction item. The selection and generation of the contingent asset is discussed in greater detail with reference to FIGS. 17A-17F.

Having generated the secure first token, either currently as described above or previously and placed on the blockchain, a second step of the example method of operation includes the computing entity 21 obtaining, in accordance with a securely passing process, control over the secure first token 802 representing a first pending transaction associated with the transaction item. The secure first token 802 includes a set of smart contracts of the first pending transaction (e.g., rebate terms between parties as previously discussed). The set of smart contracts pertains to a selected contingent asset of a set of candidate contingent assets for the first pending transaction. The secure first pending transaction includes identity of the transaction item, identity of a requesting computing entity, identity of the computing entity, and an authenticated value of the transaction item. The selected contingent asset assigns a potential first liability of a first payer identifier (ID) to a first owner ID associated with the selected contingent asset. Only a device possessing control over the secure first token may modify the secure first token.

The obtaining, in accordance with the securely passing process, the control over the secure first token includes a series of sub-steps. A first sub-step includes receiving an indication of the control over the secure first token from the requesting computing entity. For example, the computing entity 21 receives the secure first token 802 from the computing entity 23-1 with an indication that the computing entity 21 is to take control of the secure first token. A second sub-step includes establishing the identity of the computing entity to have control over the secure first token. For example, the computing entity 21 notifies the computing entity 23-1 to establish the control with computing entity 21 as discussed in greater detail with reference to FIG. 9K.

FIG. 18H further illustrates the example method of operation of the securely converting the contingent asset into the instant asset at the point of purchase, where, having obtained control over the secure first token, a third step of the example method includes the computing entity 21 obtaining, in accordance with an instant asset selection approach, a selection of a first instant asset of a set of candidate instant assets that may be utilized to subsequently provide conversion of the selected contingent asset to complete the first pending transaction. At least one candidate instant asset of the set of candidate instant assets pertains to satisfying a portion of another liability associated with a delinquently paying consumer to the first payer ID (e.g., the purchaser has an option to donate a portion of rebate value associated with the contingent asset to an anonymous person that is behind in paying their electric bill when the first payer ID is the electric company).

The instant asset selection approach includes a user selection and a rank evaluation. The user selection allows the purchaser to select from a series of alternatives to convert the contingent asset to an instant asset. Examples of the set of candidate instant assets includes an instant rebate now, a gift card, an extended warranty from a manufacturer associated with the transaction item, affinity points with a retail chain associated with the purchase or with the manufacturer of the transaction item, a donation to one or more individuals or entities (e.g., the anonymous person behind in paying their electric bill), and a combination of any selections.

The obtaining the selection of the first instant asset of the set of candidate instant assets includes a series of sub-steps for the selection approach scenarios of the user selection and the rank evaluation. When the instant asset selection approach includes the user selection, a first sub-step includes ranking an estimated benefit to an entity associated with the identity of the requesting computing entity for each candidate instant asset of the set of candidate instant assets to produce an estimated benefit ranking. For example, the asset module 30 of the computing entity 21 identifies the set of candidate instant assets (e.g., a list, receive, determine for the purchaser, etc.) and evaluates upside for the purchaser for each of the candidate instant assets.

A second sub-step includes identifying the at least one candidate instant asset of the set of candidate instant assets that pertains to satisfying a portion of another liability associated with a delinquently paying consumer to the first payer ID. For example, the asset module 30 of the computing entity 21 obtains candidate instant asset 806 that includes a list of consumers that are behind in paying their electric bill from the computing entity 25-1.

A third sub-step includes obtaining the user selection of the first instant asset in response to at least one of the estimated benefit ranking and the identifying of the at least one candidate instant asset of the set of candidate instant assets that pertains to satisfying the portion of another liability associated with the delinquently paying consumer to the first payer ID to produce the selection of the first instant asset of the set of candidate instant assets. For example, the asset module 30 receives a user selection 808 that includes identification of the first instant asset.

When the instant asset selection approach includes the rank evaluation, a first sub-step includes evaluating a potential for each candidate instant asset of the set of candidate instant assets to produce a potential ranking. For example, the asset module 30 of the computing entity 21 calculates a benefit for the purchaser for each of the candidate instant assets.

A second sub-step includes selecting the first instant asset based on the potential ranking to produce the selection of the first instant asset of the set of candidate instant assets. For example, the asset module 30 selects a candidate instant asset associated with the best benefit to the purchaser.

Having selected the first instant asset, a fourth step of the example method of operation includes generating an updated secure first token 810 in accordance with the securely passing process, as discussed with reference to FIG. 9K, to represent the selection of the first instant asset to subsequently provide the conversion of the selected contingent asset to complete the first pending transaction. The generating the updated secure first token in accordance with the securely passing process to represent the selection of the first instant asset includes a series of sub-steps.

A first sub-step includes determining whether to indirectly or directly update an object distributed ledger as previously discussed (e.g., directly update the blockchain or request that the computing entity 23-1 update the blockchain). When indirectly updating the object distributed ledger, a second sub-step includes issuing a secure first token update request to an object ledger computing entity of the computing system serving as a blockchain node of the object distributed ledger. The secure first token update request includes an updated set of smart contracts of the first pending transaction based on the first instant asset. For example, the asset module 30 of the computing entity 21 issues the secure first token update request to the computing entity 23-1 that is serving as the blockchain node.

When directly updating the object distributed ledger, the second sub-step includes obtaining a copy of the object distributed ledger (e.g., the asset module 30 recovers blockchain information 800 from the contingent asset database 34). A third sub-step includes hashing the updated set of smart contracts utilizing a receiving public key of the object distributed ledger to produce a next transaction hash value. For example, the asset module 30 hashes the updated set of smart contracts utilizing a public key of the computing entity 23-1 to produce the next transaction hash value. A fourth sub-step includes encrypting the next transaction hash value utilizing a private key of the computing entity to produce a next transaction signature. For example, the asset module 30 encrypts the next transaction hash value utilizing the private key of the computing entity 21 to produce the next transaction signature. A fifth sub-step includes generating a next block of a blockchain of the object distributed ledger to include the updated set of smart contracts and the next transaction signature. For example, the asset module 30 generates the updated secure first token 810 to include the updated set of smart contracts and the next transaction signature. A sixth sub-step includes causing inclusion of the next block as the updated secure first token in the object distributed ledger. For example, the asset module 30 updates the blockchain as discussed with reference to FIG. 9K to include the updated secure token 810 represented in FIG. 18H as block 1-1.

Having generated the updated secure first token, a fifth step of the example method of operation includes securely passing control over the updated secure first token via the object distributed ledger when the secure first token is processed to complete the first pending transaction.

For example, the asset module 30 modifies the content and security aspects of updated secure first token 810 as discussed with reference to FIG. 9K. The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 19A-19D are schematic block diagrams of another embodiment of a computing system and a contingent asset risk chart illustrating an example of utilizing a contingent asset for conversion into an instant asset at a point of purchase. The computing system includes computing entities 20-1 through 20-N of FIG. 1, the computing entity 21 of FIG. 1, computing entities 23-1 through 23-N of FIG. 1, and the computing entity 25-1 of FIG. 1. In an embodiment, the computing entities 20-1 through 20-N are associated with a multitude of consumers in a point of purchase scenario.

FIG. 19A illustrates an example method of operation of the utilizing the contingent asset for conversion into the instant asset at the point of purchase, where a first step includes the computing entity 21 validating a first contingent asset blockchain encoded record 300 for utilization of a first contingent asset as a first instant asset to support a first purchase adjustment request of a multitude of purchase adjustment requests with regards to a first pending purchase transaction associated with a first consumer of a multitude of consumers. A first payer of a multitude of payers is associated with at least one component of the first pending purchase transaction. The first contingent asset assigns a potential first liability of the first payer to an owner entity currently associated with the first contingent asset. At least a portion of the potential first liability is to be paid by the first payer to the owner entity in accordance with contingency information of the first contingent asset and subsequent to completion of a first asset lifecycle of the first contingent asset as illustrated with regards to FIG. 19B. First final instant asset terms 620 of the first contingent asset blockchain encoded record 300 specify the subsequent utilization of the first contingent asset as the first instant asset to support the first pending purchase transaction.

The validating of the first contingent asset blockchain encoded record 300 includes the asset module 30 validating security aspects of the blockchain itself as discussed with FIG. 9K. The validating further includes verifying that the owner entity owns the first contingent asset (e.g., validating an ownership portion of the first contingent asset blockchain encoded record 300). The validating further includes verifying that the first final instant asset terms comply with an instant asset utilization approach (e.g., terms are within acceptable ranges for all parties).

Having determined the first final instant asset terms 620, a second step of the example method of operation of the utilizing the contingent asset for conversion into the instant asset at the point of purchase includes the computing entity 21 updating the first final instant asset terms based on the first final instant asset terms 620 and an instant asset utilization approach as illustrated in FIG. 19B. For example, the asset module 30 queries the first consumer to obtain any final allowed changes to the first final instant asset terms. As another example, the asset module 30 applies a final application of the instant asset to a discount and/or one or more payments of the terms.

FIG. 19C further illustrates the example method of operation of the utilizing the contingent asset for conversion into the instant asset at the point of purchase, where, having updated the first final instant asset terms 620, a third step of the example method includes the computing entity 21 updating the first contingent asset blockchain encoded record 300 with the first final instant asset terms 620 utilizing updated first final instant asset terms when the updated first final instant asset terms are different than the first final instant asset terms as illustrated in FIG. 19D. For example, the asset module 30 extracts terms content from the first contingent asset blockchain encoded record 300, modifies the content in accordance with the updated first final instant asset terms, and recalculates security aspects of the blockchain to update the first contingent asset blockchain record 300.

Having updated the first contingent asset blockchain record 300, a second step of the example method of operation of the utilizing the contingent asset for conversion into the instant asset at the point of purchase includes the computing entity 21 facilitating completion of the first pending purchase transaction utilizing the first instant asset of the first contingent asset blockchain encoded record. The first pending purchase transaction is executed in accordance with the first final instant asset terms. The facilitating completion of the first pending purchase transaction includes exchanging transaction completion message 640 with the computing entity 20-1 associated with the first purchaser. For example, the asset module 30 applies a discount to the pending purchase transaction when a discount is included in the first final instant asset terms and sends an associated transaction completion message 640 to the computing entity 20-1. As another example, the asset module 30 establishes a payment plan that includes payments and payment dates associated with the payments in accordance with the first final instant asset terms and issues a corresponding transaction completion message 640 to the computing entity 20-1.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 19E-19F are schematic block diagrams of an embodiment of a computing system illustrating an example of updating a secure token of a contingent asset in accordance with the present invention. The computing system includes computing entities 20-1 through 20-N of FIG. 1, the computing entity 21 of FIG. 1, computing entities 23-1 through 23-N of FIG. 1, and the computing entity 25-1 of FIG. 1. In an embodiment, the computing entities 20-1 through 20-N are associated with a multitude of consumers in a point of purchase scenario.

FIG. 19E illustrates an example method of operation of the updating the secure token of the contingent asset, where a first step includes the computing entity 21 generating a secure first token 802 in accordance with a securely passing process to represent utilization of a selected contingent asset for a first pending transaction associated with a transaction item. For example, the asset module 30 of the computing entity 21, in response to point of purchase information 804 from the computing entity 20-1 (e.g., in an example where the computing entity 20-1 is utilized by a first consumer performing a point of purchase of the transaction item within the first pending transaction), wraps a contingent asset (e.g., a rebate offered by a payer associated with the computing entity 25-1) into a block of a blockchain, stored, from time to time, as blockchain information 800 in the contingent asset database 34, as discussed with reference to FIG. 9K. In an embodiment, a block of the blockchain is securely stored in an object distributed ledger maintained by one or more of the computing entities 23-1 through 23-N as illustrated in FIG. 19E as block 1.

The point of purchase information 804 includes one or more of a first pending transaction identifier, a secure first token identifier, a selected contingent asset identifier, identity of the computing entity 20-1 (e.g., a requesting computing entity), and an identity of the transaction item. The selection and generation of the contingent asset is discussed in greater detail with reference to FIGS. 17A-17F.

Having generated the secure first token, either currently as described above or previously and placed on the blockchain, a second step of the example method of operation includes the computing entity 21 obtaining, in accordance with a securely passing process, control over the secure first token 802 representing a first pending transaction associated with the transaction item. The secure first token 802 includes a set of smart contracts of the first pending transaction (e.g., rebate terms between parties as previously discussed). The set of smart contracts pertains to a selected contingent asset of a set of candidate contingent assets for the first pending transaction. The secure first pending transaction includes identity of the transaction item, identity of a requesting computing entity, identity of the computing entity, and an authenticated value of the transaction item. The selected contingent asset assigns a potential first liability of a first payer identifier (ID) to a first owner ID associated with the selected contingent asset. Only a device possessing control over the secure first token may modify the secure first token.

The obtaining, in accordance with the securely passing process, the control over the secure first token includes a series of sub-steps. A first sub-step includes receiving an indication of the control over the secure first token from the requesting computing entity. For example, the computing entity 21 receives the secure first token 802 from the computing entity 23-1 with an indication that the computing entity 21 is to take control of the secure first token. A second sub-step includes establishing the identity of the computing entity to have control over the secure first token. For example, the computing entity 21 notifies the computing entity 23-1 to establish the control with computing entity 21 as discussed in greater detail with reference to FIG. 9K.

FIG. 19F further illustrates the example method of operation of the updating the secure token of the contingent asset, where, having obtained control over the secure first token, a third step of the example method includes the computing entity 21 determining, in accordance with an instant asset determination approach, a set of candidate instant assets that may be utilized to subsequently provide conversion of the selected contingent asset to complete the first pending transaction. The determining, in accordance with the instant asset determination approach, the set of candidate instant assets that may be utilized to subsequently provide conversion of the selected contingent asset to complete the first pending transaction includes a series of sub-steps. A first sub-step includes, when the instant asset determination approach includes a ranked evaluation, identifying potential candidate instant assets based on the secure first token. The potential candidate instant assets includes one or more of an instant rebate now, a gift card, an extended warranty from a manufacturer associated with the transaction item, affinity points with a retailer associated with the pending first transaction, other affinity points with the manufacturer associated with the transaction item, a donation to one or more individuals, a donation to one or more entities, and a payment to satisfy a portion of another liability associated with a delinquently paying consumer to the first payer ID.

For example, the asset module 30 of the computing entity 21 interprets candidate instant assets 806 from the computing entity 25-1 to produce the potential candidate instant assets. As another example, the asset module 30 recovers contingency information 202 from the contingent asset database 34 to produce the potential candidate instant assets. As yet another example, the asset module 30 identifies candidate instant assets associated with the identifier of the requesting entity (e.g., affinity programs for the consumer at the point of sale).

A second sub-step includes ranking an estimated benefit to an entity associated with the identity of the requesting computing entity for each potential candidate instant asset of the potential candidate instant assets to produce an estimated benefit ranking of a set of estimated benefit rankings. For example, the asset module 30 produces estimated benefits for each of the potential candidate instant assets as associated with the consumer and rank orders the estimated benefits to produce the set of estimated benefit rankings.

A third sub-step includes selecting the set of candidate instant assets of the potential candidate instant assets based on the estimated benefit ranking of the set of estimated benefit rankings. For example, the asset module 30 identifies potential candidate instant assets that are ranked the highest (e.g., most beneficial to the consumer) to produce the set of candidate instant assets.

Having determined the set of candidate instant assets, a fourth step of the example method of operation includes obtaining, in accordance with an instant asset selection approach, a selection of a first subset of instant assets of the set of candidate instant assets to be utilized to subsequently provide the conversion of the selected contingent asset to complete the first pending transaction. For example, the asset module 30 of the computing entity 21 selects the subset of instant assets that are potentially the most beneficial to the consumer. As another example, the asset module 30 interprets user selection 808 to identify the subset of instant assets as selected by the consumer.

Having selected the first subset of instant assets of the set of candidate instant assets, a fifth step of the example method of operation includes generating an updated secure first token 810 in accordance with the securely passing process, as discussed with reference to FIG. 9K, to represent the selection of the first subset of instant assets to subsequently provide the conversion of the selected contingent asset to complete the first pending transaction. The generating the updated secure first token in accordance with the securely passing process to represent the selection of the first subset of instant assets includes a series of sub-steps.

A first sub-step includes determining whether to indirectly or directly update an object distributed ledger as previously discussed (e.g., directly update the blockchain or request that the computing entity 23-1 update the blockchain). When indirectly updating the object distributed ledger, a second sub-step includes issuing a secure first token update request to an object ledger computing entity of the computing system serving as a blockchain node of the object distributed ledger. The secure first token update request includes an updated set of smart contracts of the first pending transaction based on the first subset of instant assets. For example, the asset module 30 of the computing entity 21 issues an updated secure first token 810 as the secure first token update request to the computing entity 23-1 that is serving as the blockchain node.

When directly updating the object distributed ledger, the second sub-step includes obtaining a copy of the object distributed ledger (e.g., the asset module 30 recovers blockchain information 800 from the contingent asset database 34). A third sub-step includes hashing the updated set of smart contracts utilizing a receiving public key of the object distributed ledger to produce a next transaction hash value. For example, the asset module 30 hashes the updated set of smart contracts utilizing a public key of the computing entity 23-1 to produce the next transaction hash value. A fourth sub-step includes encrypting the next transaction hash value utilizing a private key of the computing entity 21 to produce a next transaction signature. For example, the asset module 30 encrypts the next transaction hash value utilizing the private key of the computing entity 21 to produce the next transaction signature.

A fifth sub-step includes generating a next block of a blockchain of the object distributed ledger to include the updated set of smart contracts and the next transaction signature. For example, the asset module 30 generates the updated secure first token 810 to include the updated set of smart contracts and the next transaction signature. A sixth sub-step includes causing inclusion of the next block as the updated secure first token in the object distributed ledger. For example, the asset module 30 updates the blockchain as discussed with reference to FIG. 9K to include the updated secure token 810 represented in FIG. 19F as block 1-1.

Having generated the updated secure first token, a sixth step of the example method of operation includes securely passing control over the updated secure first token via the object distributed ledger when the secure first token is processed to complete the first pending transaction. For example, the asset module 30 modifies the content and security aspects of updated secure first token 810 as discussed with reference to FIG. 9K.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 20A-20B are schematic block diagrams of an embodiment of a computing system illustrating an example of updating a secure token of a carbon credit asset. The computing system includes computing entities 20-1 through 20-N of FIG. 1, the computing entity 21 of FIG. 1, computing entities 23-1 through 23-N of FIG. 1, and the computing entity 25-1 of FIG. 1. In an embodiment, the computing entities 20-1 through 20-N are associated with a multitude of consumers in a point of purchase scenario.

The carbon credit asset represents a tradable certificate or permit representing the right to emit a set amount of carbon dioxide or the equivalent amount of a different greenhouse gas (GHG). Carbon credits and carbon markets are a component of national and international attempts to mitigate the growth in concentrations of GHGs. 1 carbon credit=1 ton of carbon dioxide or carbon dioxide equivalent gases.

FIG. 20A illustrates an example method of operation of the updating the secure token of the carbon credit asset, where a first step includes the computing entity 21 generating a secure first token 802 in accordance with a securely passing process to represent utilization of a selected carbon credit asset for a first pending transaction associated with a transaction item. The generating the secure first token includes a series of sub-steps.

A first sub-step includes determining a first credit level of the selected carbon credit based on the identity of a transaction item. For example, the computing entity 21 determines the first credit level (e.g., energy savings) for an appliance when the appliance is the transaction item (e.g., interpret a query response, perform a lookup, etc.). As another example, the computing entity 21 determines the first credit level for a banked carbon credit (e.g., acquired previously and saved) and/or a new carbon credit based on the transaction item.

A second sub-step includes generating the selected carbon credit asset to assign the first credit level of from the first payer ID to the first owner ID associated with the selected carbon credit asset. For example, the computing entity 21 exchanges asset establishment messages 602 with computing entity 25-1 to obtain approval and issuance of the carbon credit for the first credit level from the first payer ID (e.g., an entity desiring to pay for the energy efficiency) to the first owner ID (e.g., an entity performing the transaction) when the computing entity 25-1 is associated with issuing and/or exchanging digital representations of carbon credits.

A third sub-step includes generating the secure token itself. For example, the asset module 30 of the computing entity 21, in response to point of purchase information 804 from the computing entity 20-1 (e.g., in an example where the computing entity 20-1 is utilized by a first consumer performing a point of purchase of the transaction item within the first pending transaction), wraps the carbon credit asset into a block of a blockchain, stored, from time to time, as blockchain information 800 in the contingent asset database 34, as discussed with reference to FIG. 9K. In an embodiment, a block of the blockchain is securely stored in an object distributed ledger maintained by one or more of the computing entities 23-1 through 23-N as illustrated in FIG. 20A as block 1.

The point of purchase information 804 includes one or more of a first pending transaction identifier, a secure first token identifier, a selected carbon credit asset identifier, identity of the computing entity 20-1 (e.g., a requesting computing entity), and an identity of the transaction item.

Having generated the secure first token, either currently as described above or previously and placed on the blockchain, a second step of the example method of operation includes the computing entity 21 obtaining, in accordance with a securely passing process, control over the secure first token 802 representing a first pending transaction associated with the transaction item. The secure first token 802 includes a set of smart contracts of the first pending transaction. The set of smart contracts pertains to the selected carbon credit asset of a set of candidate contingent assets (e.g., amongst rebates and other carbon credits not affiliated with the transaction item, etc.) for the first pending transaction. The secure first pending transaction includes identity of the transaction item, identity of a requesting computing entity, identity of the computing entity, and an authenticated value of the transaction item. The selected carbon credit asset assigns the first credit level of the first payer identifier (ID) to a first owner ID associated with the selected carbon credit asset. Only a device possessing control over the secure first token may modify the secure first token.

The obtaining, in accordance with the securely passing process, the control over the secure first token includes a series of sub-steps. A first sub-step includes receiving an indication of the control over the secure first token from the requesting computing entity. For example, the computing entity 21 receives the secure first token 802 from the computing entity 23-1 with an indication that the computing entity 21 is to take control of the secure first token. A second sub-step includes establishing the identity of the computing entity to have control over the secure first token. For example, the computing entity 21 notifies the computing entity 23-1 to establish the control with computing entity 21 as discussed in greater detail with reference to FIG. 9K.

FIG. 20B further illustrates the example method of operation of the updating the secure token of the carbon credit asset, where, having obtained control over the secure first token, a third step of the example method includes the computing entity 21 determining, in accordance with an instant asset determination approach, a set of candidate instant assets that may be utilized to subsequently provide conversion of the selected carbon credit asset to complete the first pending transaction. The determining, in accordance with the instant asset determination approach, the set of candidate instant assets that may be utilized to subsequently provide conversion of the selected carbon credit asset to complete the first pending transaction includes a series of sub-steps. A first sub-step includes, when the instant asset determination approach includes a ranked evaluation, identifying potential candidate instant assets based on the secure first token. The potential candidate instant assets includes one or more of an instant rebate now, a gift card, an extended warranty from a manufacturer associated with the transaction item, affinity points with a retailer associated with the pending first transaction, other affinity points with the manufacturer associated with the transaction item, a donation to one or more individuals, a donation to one or more entities, a lottery ticket, and a payment to satisfy a portion of another liability associated with a delinquently paying consumer to the first payer ID.

For example, the asset module 30 of the computing entity 21 interprets candidate instant assets 806 from the computing entity 25-1 to produce the potential candidate instant assets. As another example, the asset module 30 recovers contingency information 202 from the contingent asset database 34 to produce the potential candidate instant assets. As yet another example, the asset module 30 identifies candidate instant assets associated with the identifier of the requesting entity (e.g., affinity programs for the consumer at the point of sale).

A second sub-step includes ranking an estimated benefit to an entity associated with the identity of the requesting computing entity for each potential candidate instant asset of the potential candidate instant assets to produce an estimated benefit ranking of a set of estimated benefit rankings. For example, the asset module 30 produces estimated benefits for each of the potential candidate instant assets as associated with the consumer and rank orders the estimated benefits to produce the set of estimated benefit rankings.

A third sub-step includes selecting the set of candidate instant assets of the potential candidate instant assets based on the estimated benefit ranking of the set of estimated benefit rankings. For example, the asset module 30 identifies potential candidate instant assets that are ranked the highest (e.g., most beneficial to the consumer) to produce the set of candidate instant assets.

Having determined the set of candidate instant assets, a fourth step of the example method of operation includes obtaining, in accordance with an instant asset selection approach, a selection of a first subset of instant assets of the set of candidate instant assets to be utilized to subsequently provide the conversion of the selected carbon credit asset to complete the first pending transaction. For example, the asset module 30 of the computing entity 21 selects the subset of instant assets that are potentially the most beneficial to the consumer. As another example, the asset module 30 interprets user selection 808 to identify the subset of instant assets as selected by the consumer.

Having selected the first subset of instant assets of the set of candidate instant assets, a fifth step of the example method of operation includes generating an updated secure first token 810 in accordance with the securely passing process, as discussed with reference to FIG. 9K, to represent the selection of the first subset of instant assets to subsequently provide the conversion of the selected carbon credit asset to complete the first pending transaction. The generating the updated secure first token in accordance with the securely passing process to represent the selection of the first subset of instant assets includes a series of sub-steps.

A first sub-step includes determining whether to indirectly or directly update an object distributed ledger as previously discussed (e.g., directly update the blockchain or request that the computing entity 23-1 update the blockchain). When indirectly updating the object distributed ledger, a second sub-step includes issuing a secure first token update request to an object ledger computing entity of the computing system serving as a blockchain node of the object distributed ledger. The secure first token update request includes an updated set of smart contracts of the first pending transaction based on the first subset of instant assets. For example, the asset module 30 of the computing entity 21 issues an updated secure first token 810 as the secure first token update request to the computing entity 23-1 that is serving as the blockchain node.

When directly updating the object distributed ledger, the second sub-step includes obtaining a copy of the object distributed ledger (e.g., the asset module 30 recovers blockchain information 800 from the contingent asset database 34). A third sub-step includes hashing the updated set of smart contracts utilizing a receiving public key of the object distributed ledger to produce a next transaction hash value. For example, the asset module 30 hashes the updated set of smart contracts utilizing a public key of the computing entity 23-1 to produce the next transaction hash value. A fourth sub-step includes encrypting the next transaction hash value utilizing a private key of the computing entity 21 to produce a next transaction signature. For example, the asset module

30 encrypts the next transaction hash value utilizing the private key of the computing entity 21 to produce the next transaction signature.

A fifth sub-step includes generating a next block of a blockchain of the object distributed ledger to include the updated set of smart contracts and the next transaction signature. For example, the asset module 30 generates the updated secure first token 810 to include the updated set of smart contracts and the next transaction signature. A sixth sub-step includes causing inclusion of the next block as the updated secure first token in the object distributed ledger. For example, the asset module 30 updates the blockchain as discussed with reference to FIG. 9K to include the updated secure token 810 represented in FIG. 20B as block 1-1.

Having generated the updated secure first token, a sixth step of the example method of operation includes securely passing control over the updated secure first token via the object distributed ledger when the secure first token is processed to complete the first pending transaction. For example, the asset module 30 modifies the content and security aspects of updated secure first token 810 as discussed with reference to FIG. 9K.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 21A-21B are schematic block diagrams of an embodiment of a computing system illustrating an example of updating a secure token of a set of public benefit credit assets. The computing system includes computing entities 20-1 through 20-N of FIG. 1, the computing entity 21 of FIG. 1, computing entities 23-1 through 23-N of FIG. 1, and the computing entity 25-1 of FIG. 1. In an embodiment, the computing entities 20-1 through 20-N are associated with a multitude of consumers in a point of purchase scenario.

The set of public benefit credit assets represents a set of tradable certificates or permits representing the right to continue to do deeds of negative factors in one area but yet be offset by facilitating abatement in another area. For example, when the public benefit credit is associated with a carbon credit, the public benefit credit asset represents the right to emit a set amount of carbon dioxide or the equivalent amount of a different greenhouse gas (GHG). Carbon credits and carbon markets are a component of national and international attempts to mitigate the growth in concentrations of GHGs. 1 carbon credit=1 ton of carbon dioxide or carbon dioxide equivalent gases. The set of carbon credit assets includes micro-carbon credits (e.g., household) and/or a portion of one or more of voluntary carbon credits and certified carbon credits (e.g., vetted through a registration entity and process).

FIG. 21A illustrates an example method of operation of the updating the secure token of the set of public benefit credit assets, where a first step includes the computing entity 21 generating a secure first token 802 in accordance with a securely passing process to represent utilization of the set of public benefit credit assets for a first pending transaction associated with a transaction item. The generating of the secure first token includes a series of sub-steps.

A first sub-step includes determining a first credit level of the set of public benefit credit assets based on the identity of the transaction item. For example, the computing entity 21 determines the first credit level (e.g., energy savings) for an appliance when the appliance is the transaction item (e.g., interpret a query response, perform a lookup, etc.) and the set of public benefit credit assets (e.g., carbon credits) shall include a micro carbon credit due to the appliance when the public benefit credit includes a micro carbon credit category. As another example, the computing entity 21 determines the first credit level for a banked carbon credit (e.g., acquired previously and saved for numerous micro carbon credits) and/or a new carbon credit based on the transaction item.

A second sub-step includes generating the set of public benefit credit assets to assign a first credit level of from a first payer identifier (ID) to a first owner ID associated with the set of public benefit credit assets. For example, the computing entity 21 exchanges public benefit credit establishment messages 603 with computing entity 25-1 to obtain approval and issuance of micro carbon credits as part of the environment information 609 of ESG information 607 stored within a memory module 102 of the computing entity 25-1. A first credit level is established by the environment information 609 from the first payer ID (e.g., an entity desiring to pay for the energy efficiency) to the first owner ID (e.g., an entity performing the transaction) when the computing entity 25-1 is associated with issuing and/or exchanging digital representations of carbon credits (e.g., a vetting agency). Another embodiment includes trading in abatements associated with social factors as part of social information 611. A yet another embodiment includes trading in abatements associated with governance factors as part of governance information 613.

A third sub-step includes generating the secure first token 802 in accordance with a securely passing process to represent utilization of the set of selected public benefit credit assets for the first pending transaction associated with the transaction item. For example, the asset module 30 of the computing entity 21, in response to point of purchase information 804 from the computing entity 20-1 (e.g., in an example where the computing entity 20-1 is utilized by a first consumer performing a point of purchase of the transaction item within the first pending transaction), wraps the public benefit credit asset into a block of a blockchain, stores, from time to time, as blockchain information 800 in the contingent asset database 34, as discussed with reference to FIG. 9K. In an embodiment, a block of the blockchain is securely stored in an object distributed ledger maintained by one or more of the computing entities 23-1 through 23-N as illustrated in FIG. 21A as block 1 (secure first token 802).

The point of purchase information 804 includes one or more of a first pending transaction identifier, a secure first token identifier, a set of public benefit credit asset identifiers, identity of the computing entity 20-1 (e.g., a requesting computing entity), and an identity of the transaction item. In an embodiment, the point of purchase information 804 further includes an authenticated value of the transaction item (e.g., a hash over the value is verified).

Having generated the secure first token, either currently as described above or previously and placed on the blockchain, a second step of the example method of operation includes the computing entity 21 obtaining, in accordance with a securely passing process, control over the secure first token 802 representing the first pending transaction associated with the transaction item. The secure first token 802 includes a set of smart contracts of the first pending transaction. The set of smart contracts pertains to the set of public benefit credit assets (e.g., amongst rebates and other public benefit credits not affiliated with the transaction item, etc.) for the first pending transaction. The secure first pending transaction includes identity of the transaction item, identity of a requesting computing entity, identity of the computing entity 21, and the authenticated value of the transaction item. A particular public benefit credit asset of the set of selected public benefit credit assets assigns a corresponding credit level from a corresponding payer identifier (ID) to a corresponding owner ID associated with the particular public benefit credit asset. Only a device possessing control over the secure first token may modify the secure first token.

The obtaining, in accordance with the securely passing process, the control over the secure first token includes a series of sub-steps. A first sub-step includes receiving an indication of the control over the secure first token from the requesting computing entity. For example, the computing entity 21 receives the secure first token 802 from the computing entity 23-1 with an indication that the computing entity 21 is to take control of the secure first token. A second sub-step includes establishing the identity of the computing entity to have control over the secure first token. For example, the computing entity 21 notifies the computing entity 23-1 to establish the control with computing entity 21 as discussed in greater detail with reference to FIG. 9K.

FIG. 21B further illustrates the example method of operation of the updating the secure token of the public benefit credit asset, where, having obtained control over the secure first token, a third step of the example method includes the computing entity 21 determining, in accordance with an instant asset determination approach, a set of candidate instant assets that may be utilized to subsequently provide conversion of the set of public benefit credit assets to complete the first pending transaction. The determining, in accordance with the instant asset determination approach, the set of candidate instant assets that may be utilized to subsequently provide conversion of the set of public benefit credit assets to complete the first pending transaction includes a series of sub-steps. A first sub-step includes, when the instant asset determination approach includes a ranked evaluation, identifying potential candidate instant assets based on the secure first token. The potential candidate instant assets includes one or more of an instant rebate now, a gift card, an extended warranty from a manufacturer associated with the transaction item, affinity points with a retailer associated with the pending first transaction, other affinity points with the manufacturer associated with the transaction item, a donation to one or more individuals, a donation to one or more entities, a lottery ticket, and a payment to satisfy a portion of another liability associated with a delinquently paying consumer to the first payer ID.

For example, the asset module 30 of the computing entity 21 interprets candidate instant assets 806 from the memory module 102 of the computing entity 25-1 to produce the potential candidate instant assets from ESG information 607 (e.g., public benefit credits associated with one or more of the environment information 609, the social information 611, and the governance information 613). As another example, the asset module 30 recovers contingency information 202 from the contingent asset database 34 to produce the potential candidate instant assets. As yet another example, the asset module 30 identifies candidate instant assets associated with the identifier of the requesting entity (e.g., affinity programs for the consumer at the point of sale).

A second sub-step includes ranking an estimated benefit to an entity associated with the identity of the requesting computing entity for each potential candidate instant asset of the potential candidate instant assets to produce an estimated benefit ranking of a set of estimated benefit rankings. For example, the asset module 30 produces estimated benefits for each of the potential candidate instant assets as associated with the consumer and rank orders the estimated benefits to produce the set of estimated benefit rankings.

A third sub-step includes selecting the set of candidate instant assets of the potential candidate instant assets based on the estimated benefit ranking of the set of estimated benefit rankings. For example, the asset module 30 identifies potential candidate instant assets that are ranked the highest (e.g., most beneficial to the consumer) to produce the set of candidate instant assets.

Having determined the set of candidate instant assets, a fourth step of the example method of operation includes obtaining, in accordance with an instant asset selection approach, a selection of a first subset of instant assets of the set of candidate instant assets to be utilized to subsequently provide the conversion of the set of public benefit credit assets to complete the first pending transaction. For example, the asset module 30 of the computing entity 21 selects the subset of instant assets that are potentially the most beneficial to the consumer. As another example, the asset module 30 interprets user selection 808 to identify the subset of instant assets as selected by the consumer.

Having selected the first subset of instant assets of the set of candidate instant assets, a fifth step of the example method of operation includes generating an updated secure first token 810 in accordance with the securely passing process, as discussed with reference to FIG. 9K, to represent the selection of the first subset of instant assets to subsequently provide the conversion of the set of public benefit credit assets to complete the first pending transaction. The generating the updated secure first token in accordance with the securely passing process to represent the selection of the first subset of instant assets includes a series of sub-steps.

A first sub-step includes determining whether to indirectly or directly update an object distributed ledger as previously discussed (e.g., directly update the blockchain or request that the computing entity 23-1 update the blockchain). When indirectly updating the object distributed ledger, a second sub-step includes issuing a secure first token update request to an object ledger computing entity of the computing system serving as a blockchain node of the object distributed ledger. The secure first token update request includes an updated set of smart contracts of the first pending transaction based on the first subset of instant assets. For example, the asset module 30 of the computing entity 21 issues an updated secure first token 810 as the secure first token update request to the computing entity 23-1 that is serving as the blockchain node.

When directly updating the object distributed ledger, the second sub-step includes obtaining a copy of the object distributed ledger (e.g., the asset module 30 recovers blockchain information 800 from the contingent asset database 34). A third sub-step includes hashing the updated set of smart contracts utilizing a receiving public key of the object distributed ledger to produce a next transaction hash value. For example, the asset module 30 hashes the updated set of smart contracts utilizing a public key of the computing entity 23-1 to produce the next transaction hash value. A fourth sub-step includes encrypting the next transaction hash value utilizing a private key of the computing entity 21 to produce a next transaction signature. For example, the asset module 30 encrypts the next transaction hash value utilizing the private key of the computing entity 21 to produce the next transaction signature.

A fifth sub-step includes generating a next block of a blockchain of the object distributed ledger to include the updated set of smart contracts and the next transaction signature. For example, the asset module 30 generates the updated secure first token 810 to include the updated set of smart contracts and the next transaction signature. A sixth sub-step includes causing inclusion of the next block as the updated secure first token in the object distributed ledger. For example, the asset module 30 updates the blockchain as discussed with reference to FIG. 9K to include the updated secure token 810 represented in FIG. 21B as block 1-1 for the updated secure first token 810.

Having generated the updated secure first token, a sixth step of the example method of operation includes securely passing control over the updated secure first token via the object distributed ledger when the secure first token is processed to complete the first pending transaction. For example, the asset module 30 modifies the content and security aspects of updated secure first token 810 as discussed with reference to FIG. 9K.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 22A-22B are schematic block diagrams of an embodiment of a computing system illustrating an example of utilizing a secure token of a set of public benefit credit assets. The computing system includes computing entities 20-1 through 20-N of FIG. 1, the computing entity 21 of FIG. 1, computing entities 23-1 through 23-N of FIG. 1, and the computing entity 25-1 of FIG. 1. In an embodiment, the computing entities 20-1 through 20-N are associated with a multitude of consumers in a point of purchase scenario.

The set of public benefit credit assets represents a set of tradable certificates or permits representing the right to continue to do deeds of negative factors in one area but yet be offset by facilitating abatement in another area. The negative factors include associations with one or more of environmental factors, social factors, and governance factors. For example, when the public benefit credit is associated with a carbon credit, the public benefit credit asset represents the right to emit a set amount of carbon dioxide or the equivalent amount of a different greenhouse gas (GHG). Carbon credits and carbon markets are a component of national and international attempts to mitigate the growth in concentrations of GHGs. 1 carbon credit=1 ton of carbon dioxide or carbon dioxide equivalent gases. The set of carbon credit assets includes micro-carbon credits (e.g., household) and/or a portion of one or more of voluntary carbon credits and certified carbon credits (e.g., vetted through a registration entity and process).

FIG. 22A illustrates an example method of operation of the utilizing the secure token of the set of public benefit credit assets, where a first step includes the computing entity 21 obtaining, in accordance with a securely passing process, control over a secure first token 802 representing a first pending transaction associated with a transaction item. The secure first token 802 includes a set of smart contracts of the first pending transaction. The set of smart contracts is established to pertain to a set of selected public benefit credit assets for the first pending transaction. The first pending transaction includes identity of the transaction item, identity of a requesting computing entity, identity of the computing entity 21, and an authenticated value of the transaction item.

A particular public benefit credit asset of the set of selected public benefit credit assets assigns a corresponding credit level from a corresponding payer identifier (ID) to a corresponding owner ID associated with the particular public benefit credit asset. The secure first token 802 is generated in accordance with the securely passing process to represent utilization of the set of selected public benefit credit assets for the first pending transaction associated with the transaction item. Only a device possessing control over the secure first token may modify the secure first token 802 as previously discussed with reference to FIGS. 9D and 9K.

The obtaining the control over the secure first token 802 includes interpreting point of purchase information 804 received from the computing entity 20-1 to identify the transaction item associated with the first pending transaction. The obtaining further includes selecting the set of selected public benefit credit assets from a group of candidate public benefit credit assets based on the identity of the transaction item and an associated credit level of each candidate public benefit credit asset of the group of candidate public benefit credit assets. The selecting the set of selected public benefit credit assets includes a series of sub-steps. A first sub-step includes the computing entity 21 determining a first credit level of the set of selected public benefit credit assets based on the identity of the transaction item and the associated credit level of at least one candidate public benefit credit asset of the group of candidate public benefit credit assets interpreted from the public benefit credit establishment messages 603 from the computing entity 25-1. For example, the computing entity 21 interprets ESG information 607 to extract one or more of the environment information 609, social information 611, and governance information 613.

A second sub-step includes the computing entity 21 generating the set of selected public benefit credit assets to include assignment of a first credit level from a first payer ID to a first owner ID associated with the set of selected public benefit credit assets as previously discussed. For example, the asset module 30 interprets public benefit credit establishment messages 603 from the computing entity 25-1 to identify candidate public benefit credit assets associated with the identity of the transaction item. For instance, the asset module 30 identifies environment information 609 to locate an environment public benefit credit such as a carbon credit when the identity of the transaction item is associated with machinery within improved energy efficiency level and that have desirable associated credit levels. The asset module 30 further selects those associated candidate public benefit credit assets that have sufficient associated credit levels.

Having selected the set of selected public benefit credit assets, in an embodiment, the obtaining of the secure first token further includes generating the secure first token in accordance with a securely passing process to represent utilization of the set of selected public benefit credit assets for the pending first transaction associated with the transaction item. For example, the asset module 30 of the computing entity 21 establishes a set of smart contracts that includes a portion of the point of purchase information 804 and contingency information 202 that includes a portion of the selected assets from the public benefit credit establishment message is 603. Having established the smart contracts, the asset module 30 generates the secure first token 802 to include the set of smart contracts as previously discussed.

Having obtained the secure first token for the first pending transaction, a second step of the example method of operation includes obtaining, in accordance with the securely passing process, control over the secure first token representing the first pending transaction associated with the transaction item. The secure first token includes a set of smart contracts of the first pending transaction. The set of smart contracts is established to pertain to the set of selected public benefit credit assets for the first pending transaction. The first pending transaction includes identity of the transaction item, identity of a requesting computing entity, identity of the computing entity, and an authenticated value of the transaction item. A particular public benefit credit asset of the set of selected public benefit credit assets assigns a corresponding credit level from a corresponding payer identifier (ID) to a corresponding owner ID associated with the particular public benefit credit asset. Only a device possessing control over the secure first token may modify the secure first token.

The asset module 30 of the computing entity 21 obtains and/or maintains control over the secure first token of a first pending transaction as previously discussed. For instance, the computing entity 21 sends the secure first token 802 to the computing entity 23-1 that is serving as a blockchain node associated with an object distributed ledger utilizing a blockchain. For instance, the asset module 30 of the computing entity 21 utilizes blockchain information 800 recovered from the contingent asset database 34 associated with the blockchain accessed via the computing entity 23-1 to place the secure first token 802 on the blockchain as an object nonfungible token block 1 as depicted in FIG. 22A as previously discussed.

FIG. 22B further illustrates the example method of operation of the utilizing the secure token of the set of public benefit credit assets, where a third step includes the computing entity 21 determining, in accordance with an instant asset determination approach, a set of candidate instant assets that may be utilized to subsequently provide conversion of the set of selected public benefit credit assets to complete the first pending transaction. When the instant asset determination approach includes a ranked evaluation, the computing entity 21 identifies potential candidate instant assets based on the secure first token. The potential candidate instant assets includes one or more of an instant rebate now, a gift card, an extended warranty from a manufacturer associated with the transaction item, affinity points with a retailer associated with the pending first transaction, other affinity points with the manufacturer associated with the transaction item, a donation to one or more individuals, a donation to one or more entities, a lottery ticket, and a payment to satisfy a portion of liability associated with a delinquently paying consumer.

Having identified the potential candidate instant assets, the computing entity 21 produces a ranking of an estimated benefit to an entity associated with the identity of the requesting computing entity for each potential candidate instant asset of the potential candidate instant assets to produce an estimated benefit ranking of a set of estimated benefit rankings. Having produced the ranking, the computing entity 21 selects the set of candidate instant assets of the potential candidate instant assets based on the estimated benefit ranking of the set of estimated benefit rankings.

Having determined the set of candidate instant assets, the computing entity 21 obtains, in accordance with an instant asset selection approach, a selection of a first subset of instant assets of the set of candidate instant assets to be utilized to subsequently provide the conversion of the set of selected public benefit credit assets to complete the first pending transaction. Having obtained the selection of the first subset of instant assets, the computing entity 21 generates an updated secure first token in accordance with the securely passing process as previously discussed to represent the selection of the first subset of instant assets to subsequently provide the conversion of the set of selected public benefit credit assets to complete the first pending transaction.

As an example, the asset module 30 of the computing entity 21 interprets candidate instant asset information 806 from the computing entity 25-1 to produce the set of instant assets. Having produced the set of instant assets, a fourth step of the example method of operation includes the asset module 30 selecting a first subset of instant assets. In another instance, the asset module 30 selects the first subset of instant assets based on smart contract content of the first pending transaction (e.g., selects assets to meet a purchase price of the transaction item).

Having selected the first subset of instant assets, a fifth step of the example method of operation includes the computing entity 21 generating an updated secure first token in accordance with the securely passing process as previously discussed to represent the selection of the selected set of public benefit credit assets to subsequently provide the conversion of the set of selected public benefit credit assets to complete the first pending transaction.

Having generated the updated secure first token, a 6 step of the example method of operation includes the computing entity 21 securely passing control over the updated secure first token via an object distributed ledger when the secure first token is processed to complete the first pending transaction. Alternatively, or in addition to, the computing entity 21 generates, the secure first token in accordance with the securely passing process to represent utilization of the set of selected public benefit credit assets for the first pending transaction associated with the transaction item.

For example, the asset module 30 issues updated secure first token 810 to the computing entity 23-1 to facilitate placing a block 1-1 on the object distributed ledger utilizing the blockchain information 800. The block 1-1 includes ESG information 607 associated with the updated smart contracts (e.g., to include environment information 609 and/or social information 611).

The generating of the updated secure first token in accordance with the securely passing process to represent the selection of the selected set of public benefit credit assets includes the computing entity 21 determining whether to indirectly or directly update an object distributed ledger as previously discussed. When indirectly updating the object distributed ledger, the computing entity 21 issues a secure first token update request to an object ledger computing entity of the computing system (e.g., computing entity 23-1) serving as a blockchain node of the object distributed ledger. The secure first token update request includes an updated set of smart contracts of the first pending transaction based on the set of selected public benefit credit assets.

In another example, when directly updating the object distributed ledger, the computing entity 21 obtains a copy of the object distributed ledger and hashes the updated set of smart contracts utilizing a receiving public key of the object distributed ledger to produce a next transaction hash value. The computing entity 21 encrypts the next transaction hash value utilizing a private key of the computing entity 21 to produce a next transaction signature and generates a next block of a blockchain of the object distributed ledger to include the updated set of smart contracts and the next transaction signature. The computing entity 21 causes inclusion of the next block as the updated secure first token in the object distributed ledger as illustrated as updated secure first token 810 (e.g., block 1-1) in FIG. 22B.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 23A-23B are schematic block diagrams of an embodiment of a computing system illustrating an example of generating a secure token of a set of public benefit credit assets. The computing system includes computing entities 20-1 through 20-N of FIG. 1, the computing entity 21 of FIG. 1, computing entities 23-1 through 23-N of FIG. 1, and the computing entity 25-1 of FIG. 1. In an embodiment, the computing entities 20-1 through 20-N are associated with a multitude of consumers in a point of purchase scenario.

The set of public benefit credit assets represents a set of tradable certificates or permits representing the right to continue to do deeds of negative factors in one area but yet be offset by facilitating abatement in another area. The negative factors include associations with one or more of environmental factors, social factors, and governance factors. For example, when the public benefit credit is associated with a carbon credit, the public benefit credit asset represents the right to emit a set amount of carbon dioxide or the equivalent amount of a different greenhouse gas (GHG). Carbon credits and carbon markets are a component of national and international attempts to mitigate the growth in concentrations of GHGs. 1 carbon credit=1 ton of carbon dioxide or carbon dioxide equivalent gases. The set of carbon credit assets includes micro-carbon credits (e.g., household) and/or a portion of one or more of voluntary carbon credits and certified carbon credits (e.g., vetted through a registration entity and process).

FIG. 23A illustrates an example method of operation of the generating the secure token of the set of public benefit credit assets, where a first step includes the computing entity 21 establishing a set of cryptography-authenticated public benefit asset information for a selected set of public benefit credit assets of a set of candidate public benefit credit assets of a request to generate the selected set of public benefit credit assets. A particular public benefit credit asset of the selected set of public benefit credit assets assigns a corresponding credit level from a corresponding payer identifier (ID) to a corresponding owner ID associated with the particular public benefit credit asset.

The establishing the set of cryptography-authenticated public benefit asset information for the selected set of public benefit credit assets of the set of candidate public benefit credit assets of the request to generate the selected set of public benefit credit assets includes a series of sub-steps. A first sub-step includes the computing entity 21 interpreting the request to generate the selected set of public benefit credit assets to identify the particular public benefit credit asset of the selected set of public benefit credit assets and to identify the corresponding credit level from the corresponding payer ID to the corresponding owner ID associated with the particular public benefit credit asset. For example, the computing entity 21 interprets unauthenticated public benefit asset information 902 from the computing entity 20-1 to produce the request to generate the set of public benefit credit assets. For instance, an individual makes a request to apply for environmental carbon credits associated with a set of more energy-efficient appliances being installed at a residence.

A second sub-step includes the computing entity 21 applying a cryptography test to a public benefit credit establishment message associated with the particular public benefit credit asset. For example, the asset module 30 exchanges public benefit credit establishment message is 603 with the computing entity 25-1 to verify and validate the request (e.g., matching to categories of the ESG information 607, and/or matching to public or private registries utilized to eliminate duplication of credits granted for similar abatements and to enter the requested assets into an associated registry, and comparing a calculated hash value to a stored hash value for content of the public benefit credit establishment message).

When a result of the cryptography test indicates that the particular public benefit credit asset has an authenticated status, a third sub-step includes the computing entity 21 generating a smart contract based on the particular public benefit credit asset as a portion of the set of cryptography-authenticated public benefit asset information. For example, the computing entity 21 produces the set of public benefit credit assets associated with the unauthenticated public benefit asset information 902.

Having established the set of cryptography-authenticated public benefit asset information, a second step of the example method of operation includes generating, in accordance with a securely passing process, a secure first token representing the selected set of public benefit credit assets based on the set of cryptography-authenticated public benefit asset information. The generating, in accordance with the securely passing process, the secure first token representing the selected set of public benefit credit assets based on the set of cryptography-authenticated public benefit asset information includes a series of sub-steps. A first sub-step includes the computing entity 21 obtaining a set of smart contracts associated with the selected set of public benefit credit assets (e.g., extracting from the unauthenticated public benefit asset information 902).

A second sub-step includes the computing entity 21 hashing the set of smart contracts associated with the selected set of public benefit credit assets utilizing a receiving public key of the object distributed ledger to produce a next transaction hash value as previously discussed with reference to FIG. 9K. A third sub-step includes the computing entity 21 encrypting the next transaction hash value utilizing a private key of the computing entity 21 to produce a next transaction signature as previously discussed with reference to FIG. 9K. A fourth sub-step includes the computing entity 21 generating the secure first token to include the set of smart contracts and the next transaction signature as previously discussed with reference to FIG. 9K.

FIG. 23B further illustrates the example method of operation of the generating the secure token of the set of public benefit credit assets, where a third step of the example method of operation includes the computing entity 21 establishing, in accordance with the securely passing process, control over the secure first token representing the selected set of public benefit credit assets on an object distributed ledger. Only a device possessing control over the secure first token may modify the secure first token.

The establishing, in accordance with the securely passing process, the control over the secure first token representing the selected set of public benefit credit assets on the object distributed ledger includes a series of sub-steps.

A first sub-step includes the computing entity 21 determining whether to indirectly or directly establish the secure first token on the object distributed ledger as previously discussed. For example, the computing entity 21 indirectly establishes the secure first token when the blockchain information 800 does not need to include the secure first token. As another example, the computing entity 21 directly establishes the secure first token when the computing entity 21 communicates directly with computing entity 23-1 serving as a blockchain node.

When indirectly establishing the secure first token on the object distributed ledger, a second sub-step includes the computing entity 21 issuing a secure first token establishment request that includes the secure first token 802 to an object ledger computing entity (e.g., computing entity 23-1) of the computing system serving as the blockchain node of the object distributed ledger. The secure first token establishment request includes a set of smart contracts associated with the selected set of public benefit credit assets. The computing entity 23-1 forms the secure first token 802 as a block 1 on the object distributed ledger to include ESG information 607 as represented in FIG. 23B.

When directly establishing the secure first token on the object distributed ledger, the second sub-step includes the computing entity 21 obtaining a copy of the object distributed ledger (e.g., from blockchain information 800 stored within the contingent asset database 34 of the computing entity 21. A third sub-step includes the computing entity 21 hashing the set of smart contracts utilizing a receiving public key of the object distributed ledger to produce a next transaction hash value.

A fourth sub-step includes the computing entity 21 encrypting the next transaction hash value utilizing a private key of the computing entity 21 to produce a next transaction signature. A fifth sub-step includes the computing entity 21 generating a next block of a blockchain of the object distributed ledger to include the set of smart contracts and the next transaction signature. A sixth sub-step includes the computing entity 21 causing inclusion of the next block as the secure first token on the object distributed ledger (e.g., the asset module 30 sends the secure first token 802 to the computing entity 23-1 for inclusion on a blockchain as the ESG information 607 as illustrated in FIG. 23B.

In an embodiment, alternatively or in addition to, the computing entity 21 securely passes control over the secure first token via the object distributed ledger to another computing entity when the secure first token is to be processed to execute a transfer of selected set of public benefit credit assets. For example, the computing entity 21 utilizes the process as previously discussed with reference to FIG. 9K to handoff the secure first token 802 2 the other computing entity.

In yet another embodiment, alternatively or in addition to, the computing entity 21 securely passes control over the secure first token via the object distributed ledger to an exchange computing entity when approval is detected from a secure message associated with the corresponding owner ID associated with the particular public benefit credit asset. For example, the computing entity 21 interprets an approval message from the computing entity 20-1 (e.g., associated with a corresponding owner ID) to post the secure first token on an exchange that facilitates further transfer of the secure first token. Upon approval, the computing entity 21 utilizes the process described previously with reference to FIG. 9K to reestablish control of the secure first token with the exchange computing entity (e.g., of the exchange to facilitate the further transfer).

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 24A-24B are schematic block diagrams of an embodiment of a computing system illustrating an example of identifying a secure token of a set of public benefit credit assets. The computing system includes computing entities 20-1 through 20-N of FIG. 1, the computing entity 21 of FIG. 1, computing entities 23-1 through 23-N of FIG. 1, and the computing entity 25-1 of FIG. 1. In an embodiment, the computing entities 20-1 through 20-N are associated with a multitude of consumers in a point of purchase scenario.

The set of public benefit credit assets represents a set of tradable certificates or permits representing the right to continue to do deeds of negative factors in one area but yet be offset by facilitating abatement in another area. The negative factors include associations with one or more of environmental factors, social factors, and governance factors. For example, when the public benefit credit is associated with a carbon credit, the public benefit credit asset represents the right to emit a set amount of carbon dioxide or the equivalent amount of a different greenhouse gas (GHG). Carbon credits and carbon markets are a component of national and international attempts to mitigate the growth in concentrations of GHGs. 1 carbon credit=1 ton of carbon dioxide or carbon dioxide equivalent gases. The set of carbon credit assets includes micro-carbon credits (e.g., household) and/or a portion of one or more of voluntary carbon credits and certified carbon credits (e.g., vetted through a registration entity and process).

FIG. 24A illustrates an example method of operation of the identifying the secure token of the set of public benefit credit assets, where a first step includes the computing entity 21 establishing a set of required cryptography-authenticated public benefit asset information 906 for subsequent selection of a set of public benefit credit assets based on a request to identify the set of public benefit credit assets. A particular public benefit credit asset of the set of public benefit credit assets assigns a corresponding credit level from a corresponding payer identifier (ID) to a corresponding owner ID associated with the particular public benefit credit asset. For example, the asset module 30 of the computing entity 21 interprets a public benefit credit asset request 904 from the computing entity 20-1 with regards to acquiring the set of public benefit credit assets to produce the set of required cryptography-authenticated benefit asset information (e.g., identity of the assets, parameters of the assets).

The establishing the set of required cryptography-authenticated public benefit asset information for subsequent selection of the selected set of public benefit credit assets based on the request to identify the set of public benefit credit assets includes a series of sub-steps. A first sub-step includes the computing entity 21 interpreting the request to identify the set of public benefit credit assets to identify the particular public benefit credit asset of the set of public benefit credit assets and to identify the corresponding credit level from the corresponding payer ID to the corresponding owner ID associated with the particular public benefit credit asset. For example, the asset module 30 interprets the public benefit credit asset request 904 to identify the particular public benefit credit asset.

A second sub-step includes the computing entity 21 applying a cryptography test to a public benefit credit establishment message 603 associated with the particular public benefit credit asset as previously discussed. When a result of the cryptography test indicates that the particular public benefit credit asset has an authenticated status, a third sub-step includes the computing entity 21 identifying a smart contract based on the particular public benefit credit asset as a portion of the set of required cryptography-authenticated public benefit asset information.

Having produced the set of required cryptography-authenticated benefit asset information, the asset module 30 of the computing entity 21 exchanges public benefit credit establishment message is 603 with the computing entity 25-1 to interpret ESG information 607 to validate the set of required benefit asset information (e.g., valid asset categories, valid asset value ranges, etc.). When valid, the asset module 30 indicates that the set of required benefit asset information is valid.

Having established the set of required cryptography-authenticated benefit asset information, a second step of the example method of operation includes identifying, in accordance with a securely passing process, a secure first token 802 on an object distributed ledger representing the set of public benefit credit assets based on the set of required cryptography-authenticated public benefit asset information.

The identifying, in accordance with the securely passing process, the secure first token 802 on the object distributed ledger representing the set of public benefit credit assets based on the set of required cryptography-authenticated public benefit asset information includes a series of sub-steps. A first sub-step includes accessing content of the object distributed ledger to obtain a candidate token. For example, the asset module 30 accesses the computing entity 23-1 to identify a block 1 that includes ESG information 607.

A second sub-step includes the computing entity 21 applying a cryptography test of the securely passing process to the candidate token. For example, the asset module 30 verifies that a calculated hash over a portion of the block 1 compares favorably to a stored hash for the block 1.

When a result of the cryptography test indicates that the candidate token has an authenticated status (e.g., calculated and stored hash is match), a third sub-step includes the computing entity 21 determining whether the candidate token includes a smart contract that matches the required cryptography-authenticated public benefit asset information (e.g., favorable credit level). A fourth sub-step includes the computing entity 21 indicating the candidate token is the secure first token 802 when the candidate token includes the smart contract that matches the required cryptography-authenticated public benefit asset information. For instance, the asset module 30 indicates that the block 1 is the secure first token 802.

FIG. 24B further illustrates the example method of operation of the identifying the secure token of the set of public benefit credit assets, where a third step includes the computing entity 21 establishing, in accordance with the securely passing process, control over the secure first token 802 representing the set of public benefit credit assets on the object distributed ledger to produce an updated secure first token 810.

Only a device possessing control over the secure first token may modify the secure first token. The establishing, in accordance with the securely passing process, control over the secure first token representing the set of public benefit credit assets on the object distributed ledger to produce the updated secure first token includes a series of sub-steps. A first sub-step includes the computing entity 21 determining whether to indirectly or directly update the object distributed ledger as previously discussed (e.g., directly modifying the blockchain or utilizing another computing entity).

When indirectly updating the object distributed ledger, a second sub-step includes the computing entity 21 issuing a secure first token update request (e.g., updated secure first token 810) to an object ledger computing entity (e.g., computing entity 23-1) of the computing system serving as a blockchain node of the object distributed ledger. The secure first token update request includes an updated set of smart contracts associated with the selected set of public benefit credit assets.

When directly updating the object distributed ledger, the second sub-step includes the computing entity 21 obtaining a copy of the object distributed ledger. For example, the asset module 30 recovers block 1 from the object distributed ledger. A third sub-step includes the computing entity 21 hashing the updated set of smart contracts utilizing a receiving public key of the object distributed ledger to produce a next transaction hash value as previously discussed.

A fourth sub-step includes the computing entity 21 encrypting the next transaction hash value utilizing a private key of the computing entity 21 to produce a next transaction signature as previously discussed with reference to FIG. 9K. A fifth sub-step includes the computing entity 21 generating a next block of a blockchain of the object distributed ledger to include the updated set of smart contracts and the next transaction signature. A sixth sub-step includes the computing entity 21 causing inclusion of the next block as the updated secure first token in the object distributed ledger. For instance, the computing entity 23-1 adds block 1-1 that includes the ESG information 607 as the updated secure first token 810 on the blockchain.

In an embodiment, alternatively or in addition to, the computing entity 21 securely passes control over the secure first token via the object distributed ledger to another computing entity when the secure first token is to be processed to execute a transfer of selected set of public benefit credit assets. For example, the computing entity 21 utilizes the process as previously discussed with reference to FIG. 9K to handoff the secure first token 802 to the other computing entity.

In yet another embodiment, alternatively or in addition to, the computing entity 21 securely passes control over the secure first token via the object distributed ledger to an exchange computing entity when approval is detected from a secure message associated with the corresponding owner ID associated with the particular public benefit credit asset. For example, the computing entity 21 interprets an approval message from the computing entity 20-1 (e.g., associated with a corresponding owner ID) to post the secure first token on an exchange that facilitates further transfer of the secure first token. Upon approval, the computing entity 21 utilizes the process described previously with reference to FIG. 9K to re-establish control of the secure first token with the exchange computing entity (e.g., of the exchange to facilitate the further transfer).

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 25A-25B are schematic block diagrams of an embodiment of a computing system illustrating an example of identifying a secure token of a set of public benefit credit assets. The computing system includes computing entities 20-1 through 20-N of FIG. 1, the computing entity 21 of FIG. 1, computing entities 23-1 through 23-N of FIG. 1, and the computing entity 25-1 of FIG. 1. In an embodiment, the computing entities 20-1 through 20-N are associated with a multitude of consumers, including, in a point of purchase scenario.

The set of public benefit credit assets represents a set of tradable certificates or permits representing the right to continue to do deeds of negative factors in one area but yet be offset by facilitating abatement in another area. The negative factors include associations with one or more of environmental factors, social factors, and governance factors. For example, when the public benefit credit is associated with a carbon credit, the public benefit credit asset represents the right to emit a set amount of carbon dioxide or the equivalent amount of a different greenhouse gas (GHG). Carbon credits and carbon markets are a component of national and international attempts to mitigate the growth in concentrations of GHGs. 1 carbon credit=1 ton of carbon dioxide or carbon dioxide equivalent gases. The set of carbon credit assets includes micro-carbon credits (e.g., household) and/or a portion of one or more of voluntary carbon credits and certified carbon credits (e.g., vetted through a registration entity and process).

As a high-level point-of-purchase example, a consumer obtains a public benefit credit asset that has a type or geographic location affinity with the consumer will to bolster impact at a local level. A type includes a direct power association (e.g., purchasing a new appliance that saves energy, or adding home insulation to save heating and cooling energy) and others like helping with regards to social and diversity topics (e.g., buying from a veteran or minority-owned business, etc.). A geographic location affinity includes economic help for a business that is within a geographic proximal distance to the consumer to help the local ecosystem. For example, bolstering credit for simply buying local.

FIG. 25A illustrates an example method of operation of the identifying the secure token of the set of public benefit credit assets, where a first step includes the computing entity 21 determining selection criteria for the token utilizing one or more of a variety of approaches. The determining the selection criteria includes establishing buyer affinity information for a set of public benefit credit assets. A first approach includes identifying a buyer entity type affinity of a buyer entity (e.g., a consumer desiring to buy a public benefit asset at least temporarily) to a public benefit project type. For example, the asset module 30 interprets a public benefit credit asset request 904 from the computing entity 20-1 (e.g., from a buyer) to identify the public benefit project type (e.g., environment, social, governance).

A second approach includes extracting the selection criteria from a secure first token associated with the buyer entity. The association with the buyer includes tokens that are presented to the buyer, buyer identified tokens, and third-party suggested tokens. For example, the asset module 30 extracts the selection criteria from a particular (e.g., secure first token) token is recovered from one or more of a public benefit credit exchange, a verification server, a computing entity affiliated with a public ledger that includes a blockchain to list public benefit assets. The recovery of the token is discussed with greater detail below.

A third approach includes identifying a buyer entity geographic location affinity to the public benefit project geographic location. For example, the asset module 30 extracts buyer entity geographic location parameters from the public benefit credit asset request 904 (e.g., location within 50 miles of a city).

A fourth approach includes extracting the selection criteria from a secure second token associated with the buyer entity. For example, the asset module 30 extracts the selection criteria from another secure token as is discussed in greater detail below.

Having established the buyer affinity information (e.g., geographic location, type), a second step of the example method of operation includes the computing entity 21 identifying, in accordance with a securely passing process and based on at least one of the public benefit project type and the public benefit project geographic location of selection criteria for a set of public benefit credit assets, the secure first token on an object distributed ledger representing the set of public benefit credit assets. A particular public benefit credit asset of the set of public benefit credit assets includes a smart contract that assigns a corresponding credit level from a corresponding payer identifier (ID) to a corresponding owner ID associated with the particular public benefit credit asset.

The identifying the secure first token includes a series of sub-steps. A first sub-step includes the asset module 30 obtaining the secure first token 802 from at least one of the contingent asset database 34 the computing entity 21, recovering the secure first token 802 from the computing entity 23-1 that serves as a blockchain node, and interpreting public benefit credit establishment message is 603 from the computing entity 25-1 that includes the secure first token 802 and/or verification of authenticity of the secure first token 802. For example, the asset module 30 receives the secure first token 802 via the computing entity 23-1 from the blockchain, where the secure first token 802 includes a block that includes the ESG information 607. The ESG information 607 includes the environment information 609 in the social information 611 associated with the secure first token as previously discussed. Alternatively or in addition to, the asset module 30 applies the securely passing process, as described with reference to FIG. 9D, to validate content of the secure first token.

A second sub-step of the identifying the secure first token includes determining whether an aspect of the selection criteria for the set of public benefit credit assets matches a corresponding portion of the secure first token representing the set of public benefit credit assets. For example, the asset module 30 matches a power savings type of a purchase by the buyer to the energy type of the secure first token. As another example, the asset module 30 matches a social impact type of a purchase from a minority-owned store to the social type of the secure first token. As yet another example, the asset module 30 matches the buyer entity geographic location affinity (e.g., 25 miles within the buyer's home) to the public benefit project geographic location of the secure first token (e.g., local business).

A third sub-step of the identifying the secure first token includes indicating selection of the secure first token when the aspect of the selection criteria for the set of public benefit credit assets matches the corresponding portion of the secure first token representing the set of public benefit credit assets. For example, the asset module 30 indicates the selection of the secure first token when the local businesses within 25 miles of the buyer's home. As another example, the asset module 30 indicates the selection of the secure first token when the green energy type of the secure first token matches the energy savings purchased type of the buyer.

FIG. 25B further illustrates the example method of operation of the identifying the secure token of the set of public benefit credit assets, where a third step includes the computing entity 21 establishing, in accordance with the securely passing process, control over the secure first token representing the set of public benefit credit assets. Only device possessing control over the secure first token may modify the secure first token. A establishing the control over the secure first token includes a series of sub-steps. A first sub-step includes determining whether to indirectly or directly update the object distributed ledger as previously discussed.

When indirectly updating the object distributed ledger, a second sub-step includes issuing a secure first token update request to an object ledger computing entity of the computing system serving as a blockchain node of the object distributed ledger. The secure first token update request includes an identifier of the computing entity establishing the control over the secure first token. For example, the asset module 30 of the computing entity 21 accesses the computing entity 23-1 with the secure first token update request that includes an ID of the computing entity 21.

Alternatively, when directly updating the object distributed ledger, a second sub-step includes obtaining a copy of the object distributed ledger. For example, the asset module 30 recovers the secure first token 802 from the contingent asset database 34 (e.g., after receiving the secure first token 802 from the computing entity 23-1). The asset module 30 hashes the identifier of the computing entity utilizing a receiving public key of the object distributed ledger to produce a next transaction hash value. For example, the asset module 30 hashes the ID of the computing entity 21 utilizing a receiving public key of the computing entity 23-1 to produce the next transaction hash value. The asset module 30 encrypts the next transaction hash value utilizing a private key of the computing entity 21 to produce a next transaction signature. The asset module 30 generates a next block of a blockchain of the object distributed ledger to include the identifier of the computing entity 21 and the next transaction signature. The asset module 30 causes inclusion of the next block as an updated secure first token in the object distributed ledger. For example, the asset module sends an updated secure first token 810 to the computing entity 23-1 to include as either a replacement for block 1 or as a block 1-1 on the blockchain.

Having established the control over the secure first token, a fourth step of the example method of operation includes generating the updated secure first token 810 in accordance with the securely passing process to represent selection of the set of public benefit credit assets. The generating the updated secure first token includes a series of sub-steps. A first sub-step includes determining whether to indirectly or directly update the object distributed ledger as previously discussed.

A second sub-step includes, when indirectly updating the object distributed ledger, issuing a secure first token update request to an object ledger computing entity of the computing system serving as a blockchain node of the object distributed ledger a secure first token update request includes an updated smart contract to represent assignment of a corresponding credit level from a corresponding buyer identifier (ID) to a corresponding current owner ID associated with the set of public benefit credit assets. For example, the asset module 30 updates the smart contract portion of the secure first token 802 to produce the updated secure first token 810 to indicate that the present buyer is obtaining the public benefit credit asset. The asset module 30 further issues the updated secure first token 810 to the computing entity 23-1 for placement of the block 1-1 on the blockchain, where the updated secure first token 810 includes ESG information 607 including the environment information 609 in the energy savings example as previously discussed.

Alternatively, the second sub-step includes, when directly updating the object distributed ledger, the asset module 30 obtaining a copy of the object distributed ledger (e.g., from the contingent asset database 34) and hashing the updated smart contract utilizing a receiving public key of the object distributed ledger of the computing entity 23-1) to produce the next transaction hash value. The asset module 30 encrypts the next transaction hash value utilizing the private key of the computing entity 21 to produce the next transaction signature. The asset module 30 generates the next block (e.g., 1-1) of the blockchain of the object distributed ledger to include the updated smart contract and the next transaction signature. The asset module 30 causes inclusion of the next block as the updated secure first token in the object distributed ledger. For example, the block 1-1 is linked to the block 1 on the blockchain as discussed with reference to FIG. 9D.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 26A-26B are schematic block diagrams of an embodiment of a computing system illustrating an example of using and identifying a secure token of a set of public benefit assets. The computing system includes computing entities 20-1 through 20-N of FIG. 1, the computing entity 21 of FIG. 1, computing entities 23-1 through 23-N of FIG. 1, and the computing entity 25-1 of FIG. 1. In an embodiment, the computing entities 20-1 through 20-N are associated with a multitude of consumers, including, in a point of purchase scenario.

The set of public benefit credit assets represents a set of tradable certificates or permits representing the right to continue to do deeds of negative factors in one area but yet be offset by facilitating abatement in another area. The negative factors include associations with one or more of environmental factors, social factors, and governance factors. For example, when the public benefit credit is associated with a carbon credit, the public benefit credit asset represents the right to emit a set amount of carbon dioxide or the equivalent amount of a different greenhouse gas (GHG). Carbon credits and carbon markets are a component of national and international attempts to mitigate the growth in concentrations of GHGs. 1 carbon credit=1 ton of carbon dioxide or carbon dioxide equivalent gases. The set of carbon credit assets includes micro-carbon credits (e.g., household) and/or a portion of one or more of voluntary carbon credits and certified carbon credits (e.g., vetted through a registration entity and process).

FIG. 26A illustrates an example method of operation of the using and identifying the secure token of the set of public benefit credit assets, a first step includes the computing entity 21 obtaining a transaction token representing a first pending transaction associated with a transaction item. For example, the asset module 30 of the computing entity 21 receives point of purchase information 804 from the computing entity 20-1 that includes the transaction token representing the first pending transaction with regards to purchase of a refrigerator at a retail outlet. For instance, the transaction item includes the refrigerator. The first pending transaction includes one or more of identity of the transaction item (e.g., and identifier for a refrigerator model), identity of a requesting computing entity (e.g., identifier of the computing entity 20-1, for instance a point of sale terminal at a retail outlet, as another instance a home computer when purchasing a refrigerator online), and an authenticated value of the transaction item (e.g., a purchase price of the refrigerator).

In an embodiment, the obtaining of the transaction token representing the first pending transaction further includes obtaining the transaction token from a transaction distributed object ledger (e.g., a blockchain organized with regards to retail purchases etc.) utilizing a securely passing process as described with reference to FIG. 9D. For instance, the computing entity 21 takes control of a block of the blockchain of the transaction distributed object ledger that includes the secure token for further processing.

Having obtained the transaction token, a second step of the example method of operation includes the computing entity 21 establishing a set of required public benefit asset information 912 for subsequent acquisition of a set of public benefit credit assets based on the first pending transaction. A public benefit credit asset of the set of public benefit credit assets assigns a corresponding credit level from a corresponding payer identifier (ID) to a corresponding owner ID associated with the particular public benefit credit asset.

The establishing the set of required public benefit asset information for subsequent acquisition of the set of public benefit credit assets based on the first pending transaction includes utilization of one or more approaches. A first approach includes determining an asset type of the required public benefit asset information based on the identity of the transaction item. For example, the asset module 30 of the computing entity 21 exchanges public benefit credit establishment messages 603 with the computing entity 25-1 to access the ESG information 607 with regards to the identifier of the transaction item to produce the asset type of the environment based on environment information 609.

A second approach includes determining the asset type of the required public benefit asset information based on the identity of the requesting computing entity. For example, the asset module 30 determines that the identity of the computing entity 20-1 is associated with a retail outlet that sells appliances associated with saving energy to produce the asset type of the environment.

A third approach includes determining an asset level of the required public benefit asset information based on the authenticated value of the transaction item. For example, the asset module 30 establishes the asset level of the required public benefit asset information to be less than or equal to the purchase price from the transaction token.

Having established the set of required public benefit asset information 912, a third step of the example method of operation includes identifying, in accordance with a securely passing process, a secure first token on an object distributed ledger representing the set of public benefit credit assets based on the set of required public benefit asset information. For example, the asset module 30 exchanges further public benefit credit establishment messages 603 with the computing entity 25-1 when the computing entity 25-1 and functions as a public benefit credit exchange. As another example, the asset module 30 accesses the computing entity 23-1 to identify the secure first token when the computing entity 23-1 is serving as a blockchain node of the blockchain of the object distributed ledger that includes the secure first token. For example, the asset module 30 uses the required public benefit asset information 912 in a request to the computing entity 23-1 to locate the secure first token 802 on the blockchain. The asset module 30 receives the secure first token 802 from the computing entity 23-1 as the computing entity 23-1 accesses a block 1 of the object distributed ledger that includes the secure first token 802. Alternatively, the asset module 30 extracts the secure first token 802 from blockchain information 800 recovered from the contingent asset database 34 when the computing entity 21 maintains a copy of the blockchain in the contingent asset database 34.

FIG. 26B further illustrates the example method of operation of the identifying the secure token of the set of public benefit credit assets, where, having identified the secure first token, in an embodiment a fourth step includes the computing entity 21 satisfying the first pending transaction utilizing a combination of the set of public benefit credit assets and a set of instant assets. When utilizing the set of instant assets, the satisfying of the first pending transaction includes a series of sub-steps. A first sub-step includes determining, in accordance with an instant asset determination approach, a set of candidate instant assets that may be utilized to subsequently supplement utilization of the set of selected public benefit credit assets to complete the first pending transaction. The determining of the set of candidate instant assets is discussed in greater detail below.

A second sub-step includes obtaining, in accordance with an instant asset selection approach (e.g., as previously discussed), a selection of a first subset of instant assets of the set of candidate instant assets to be utilized to subsequently supplement the utilization of the set of selected public benefit credit assets to complete the first pending transaction. For example, the asset module 30 determines a level of supplemental assistance by the first subset of instant assets to complement the set of selected public benefit credit assets (e.g., to cover a desired portion of the first pending transaction). When selecting the set of selected public benefit credit assets, the computing entity 21 determines a first credit level of the set of selected public benefit credit assets based on the identity of the transaction item. For example, the asset module 30 identifies a level for an asset for the environment. Having determined the first credit level, the computing entity 21 generates the set of selected public benefit credit assets to include assignment of the first credit level from a first payer ID to a first owner ID associated with the set of selected public benefit credit assets. For example, the asset module 30 assigns the first credit level to the refrigerator purchaser from the owner of the selected public benefit credit assets.

A third sub-step includes generating an updated secure first token in accordance with the securely passing process to represent the selection of the first subset of instant assets (e.g., as previously discussed) to subsequently supplement the utilization of the set of selected public benefit credit assets to complete the first pending transaction. The generating of the updated secure first token includes a combination of the set of selected public benefit credit assets and the first subset of instant assets.

The determining, in accordance with the instant asset determination approach, the set of candidate instant assets that may be utilized to subsequently supplement the utilization of the set of selected public benefit credit assets to complete the first pending transaction includes a series of sub-steps when the instant asset determination approach includes a ranked evaluation. A first sub-step includes identifying potential candidate instant assets based on the transaction token (e.g., identifying a fit). For example, the asset module 30 interprets candidate instant assets 806 from the computing entity 25-1 and identifies candidate instant assets associated with the environment when the environment type was previously identified.

The potential candidate instant assets includes one or more of an instant rebate now, a gift card, an extended warranty from a manufacturer associated with the transaction item, affinity points with a retailer associated with the pending first transaction, other affinity points with the manufacturer associated with the transaction item, a donation to one or more individuals, a donation to one or more entities, a lottery ticket, and a payment to satisfy a portion of liability associated with a delinquently paying consumer.

A second sub-step of the determining the set of candidate instant assets includes ranking an estimated benefit to an entity associated with the identity of the requesting computing entity for each potential candidate instant asset of the potential candidate instant assets to produce an estimated benefit ranking of a set of estimated benefit rankings. For example, the asset module 30 ranks candidate assets with regards to impact to a buyer associated with the first pending transaction.

A third sub-step includes selecting the set of candidate instant assets of the potential candidate instant assets based on the estimated benefit ranking of the set of estimated benefit rankings. For example, the asset module 30 selects the candidate assets with the greatest impact to the buyer (e.g., best value, lowest price, fastest delivery, best fit with an ESG category for the buyer, etc.).

Having determined the set of instant assets, a fifth step of the example method of operation includes establishing, in accordance with the securely passing process, control over the secure first token representing the set of public benefit credit assets to produce an updated secure first token 810. Only a device possessing control over the secure first token may modify the secure first token. For example, the asset module 30 exchanges messages with the computing entity 23-1, as previously discussed with reference to FIG. 9D, to take control of the secure first token.

The establishing, in accordance with the securely passing process, control over the secure first token representing the set of public benefit credit assets to produce the updated secure first token includes a series of sub-steps. A first sub-step includes the asset module 30 of the computing entity 21 determining whether to indirectly or directly update the object distributed ledger as previously discussed.

When indirectly updating the object distributed ledger, a second sub-step includes the computing entity 21 issuing a secure first token update request to an object ledger computing entity of the computing system serving as a blockchain node of the object distributed ledger. The secure first token update request includes an updated set of smart contracts of the first pending transaction based on the set of public benefit credit assets (e.g., a smart contract provide at least a portion of payment for the first pending transaction utilizing a combination of the instant assets and the public benefit asset credits). For example, the asset module 30 issues and updated secure first token 810 as the secure first token update request to the computing entity 23-1 to facilitate placement of the updated secure first token 810 on the blockchain of the object distributed ledger.

When directly updating the object distributed ledger, a second sub-step includes the computing entity 21 obtaining a copy of the object distributed ledger (e.g., from blockchain information 800 of the contingent asset database 34). The asset module 30 hashes the updated set of smart contracts utilizing a receiving public key of the object distributed ledger to produce a next transaction hash value. The asset module 30 encrypts the next transaction hash value utilizing a private key of the computing entity 21 to produce a next transaction signature. The asset module 30 generates a next block of a blockchain of the object distributed ledger to include the updated set of smart contracts and the next transaction signature. The asset module 30 causes inclusion of the next block as the updated secure first token in the object distributed ledger. For example, the asset module 30 links a block 1-1 that includes the updated secure first token 810 to the block 1 of the distributed object ledger as previously discussed with reference to FIG. 9D.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 27A-27B are schematic block diagrams of an embodiment of a computing system illustrating an example of using and identifying a secure token of a set of public benefit assets. The computing system includes computing entities 20-1 through 20-N of FIG. 1, the computing entity 21 of FIG. 1, computing entities 23-1 through 23-N of FIG. 1, and the computing entity 25-1 of FIG. 1. In an embodiment, the computing entities 20-1 through 20-N are associated with a multitude of consumers, including, in a point of purchase scenario. In an embodiment, the computing entity 25-1 is associated with one or more of an artificial intelligence (AI) computing entity, a public benefit credit exchange computing entity, and a verification server computing entity. In an embodiment, the computing entities 23-1 through 23-N are associated with computing entities facilitating operation of a distributed ledger that includes support for one or more blockchains. Such block chains can be private or public.

The set of public benefit credit assets represents a set of tradable certificates or permits representing the right to continue to do deeds of negative factors in one area but yet be offset by facilitating abatement in another area. The negative factors include associations with one or more of environmental factors, social factors, and governance factors (ESG). For example, when the public benefit credit is associated with a carbon credit, the public benefit credit asset represents the right to emit a set amount of carbon dioxide or the equivalent amount of a different greenhouse gas (GHG). Carbon credits and carbon markets are a component of national and international attempts to mitigate the growth in concentrations of GHGs. 1 carbon credit=1 ton of carbon dioxide or carbon dioxide equivalent gases. The set of carbon credit assets includes micro-carbon credits (e.g., household) and/or a portion of one or more of voluntary carbon credits and certified carbon credits (e.g., vetted through a registration entity and process).

FIG. 27A illustrates an example method of operation of the using and identifying the secure token of the set of public benefit credit assets, a first step includes the computing entity 21 issuing requirements information for public benefit credit assets to an artificial intelligence (AI) computing entity of the computing system. The requirements information includes descriptions of requirements for the public benefit credit assets. Example requirements includes a benefit category (e.g., ESG), a credit level, timing associated with the credit, and any other factor associated with a public benefit credit asset. For example, the asset module 30 interprets unauthenticated public benefit asset information 902 from the computing entity 20-1 to extract the requirements and sends the requirements as public benefit credit establishment messages 603 to an AI computing entity 25-1 to initiate searching for such public benefit credit assets.

Alternatively, first step includes the computing entity 21 issuing to computing entity 25-1 serving as an asset authenticity computing entity, a public benefit credit establishment message 603 that includes a digital record representing a hypothetical public benefit credit asset. The digital record includes an asset identifier, a lifecycle status indictor (e.g., an unused and dormant public benefit credit asset, an active and/or available public benefit credit asset, and a fully utilized public benefit credit asset), a potential payer liability level (e.g., what cost the payer must bear), a payer identifier, a negative factor area identifier (e.g., a type of the bad deed), a negative factor area level (e.g., an economic impact value of the bad deed), an offsetting area identifier (e.g., a type of a good deed that offsets the bad deed), an offsetting area level (e.g., a cost level to do the good deed), a seller identifier, and an owner identifier.

The digital record further includes a representation that the payer identifier is obligated for the potential payer liability level to at least one of the seller identifier and the owner identifier in consideration for activities of the offsetting area identifier in accordance with the offsetting area level providing a right to facilitate activities associated with the negative factor area identifier in accordance with the negative factor area level.

The issuing of the digital record representing the hypothetical public benefit credit asset further includes the computing entity 21 identifying the asset authenticity computing entity based on at least one of the asset identifier, the payer identifier, the seller identifier, a negative factor area identifier, and the offsetting area identifier. For example, the computing entity 21 selects the computing entity 25-1 when the negative factor area identifier is associated with creating pollution. In an embodiment, the computing entity 21 interprets the digital record representing the hypothetical public benefit credit to extract an identifier of the asset authenticity computing entity.

The issuing of the digital record representing the hypothetical public benefit credit asset further includes the computing entity 21 issuing a request to select and authenticate a digital record that represents an available public benefit credit asset based on the digital record representing the hypothetical public benefit credit asset to produce a selected public benefit credit asset.

In an embodiment, the AI computing entity 25-1 interprets a multitude of ingested data to produce time-varying and time-sensitive evaluation data for the public benefit credit assets. The time-varying nature describes changes in such things as value over a time frame. The time-sensitive nature describes a priority or urgency level associated with the timeframe (e.g., special pricing expires in 10 minutes).

In an embodiment to produce the selected public benefit credit asset, the computing entity 25-1 interprets the multitude of ingested data to produce the time-varying and time-sensitive evaluation data associated with a multitude of public benefit credit assets that includes the available public benefit credit asset. The computing entity 25-1 compares the digital record representing the hypothetical public benefit credit asset to the time-varying and time-sensitive evaluation data to produce a level of match for each of the multitude of public benefit credit assets. The computing entity 25-1 selects the available public benefit credit asset as the selected public benefit credit asset when a level of match associated with the available public benefit credit asset has reached a threshold level to trigger declaration of a favorable match.

In another embodiment to produce the selected public benefit credit asset, the computing entity 21 receives the multitude of time-varying and time-sensitive evaluation data associated with the multitude of public benefit credit assets that includes the available public benefit credit asset from the computing entity 25-1. The computing entity 21 compares the digital record representing the hypothetical public benefit credit asset to the time-varying and time-sensitive evaluation data to produce a level of match for each of the multitude of public benefit credit assets. The computing entity 21 selects the available public benefit credit asset as the selected public benefit credit asset when a level of match associated with the available public benefit credit asset has reached a threshold level to trigger declaration of a favorable match.

In another embodiment to produce the selected public benefit credit asset, the computing entity 21 updates a generative artificial intelligence (GAI) knowledge base with a multitude of time-varying and time-sensitive evaluation data associated with a multitude of public benefit credit assets that includes the available public benefit credit asset. The computing entity 21 accesses the GAI knowledge base using the digital record representing the hypothetical public benefit credit asset to identify the available public benefit credit asset as the selected public benefit credit asset.

Having issued the requirements information for the public benefit credit assets to the asset authenticity computing entity and/or AI computing entity 25-1, a second step of the example method of operation includes the computing entity 25-1 issuing, to the computing entity 21, a digital record of the selected public benefit credit asset that includes authenticity information associated with the selected public benefit credit asset utilizing the at least one of the asset identifier, the payer identifier, the seller identifier, the negative factor area identifier, and the offsetting area identifier.

In a third step of the example method of operation, the computing entity 21 determines that the authenticity information associated with the selected public benefit credit asset indicates that the selected public benefit credit asset matches the hypothetical public benefit credit asset to satisfy requirements.

Having facilitated the selection of the one or more public benefit credit assets, the third step of the example method of operation further includes the computing entity 21 establishing a set of cryptography-authenticated public benefit asset information for the selected set of public benefit credit assets.

The establishing the set of cryptography-authenticated public benefit asset information for the selected set of public benefit credit assets includes a series of sub-steps. A first sub-step includes the computing entity 21 interpreting a request to generate the selected set of public benefit credit assets to identify the particular public benefit credit asset of the selected set of public benefit credit assets and to identify the corresponding credit level from the corresponding payer ID to the corresponding owner ID associated with the particular public benefit credit asset. For example, the computing entity 21 interprets unauthenticated public benefit asset information 902 from the computing entity 20-1 to produce the request to generate the set of public benefit credit assets. For instance, an individual makes a request to apply for environmental carbon credits associated with a set of more energy-efficient appliances being installed at a residence.

A second sub-step includes the computing entity 21 applying a cryptography test to a public benefit credit establishment message associated with the particular public benefit credit asset. For example, the asset module 30 exchanges public benefit credit establishment message is 603 with the AI computing entity 25-1 to verify and validate the request (e.g., matching to categories of the ESG information 607, and/or matching to public or private registries utilized to eliminate duplication of credits granted for similar abatements and to enter the requested assets into an associated registry, and comparing a calculated hash value to a stored hash value for content of the public benefit credit establishment message).

When a result of the cryptography test indicates that the particular public benefit credit asset has an authenticated status, a fourth step of the example method of operation includes the computing entity 21 generating a smart contract based on the particular selected public benefit credit asset as a portion of the set of cryptography-authenticated public benefit asset information and produces a secure first token. For example, the computing entity 21 produces the set of public benefit credit assets associated with the unauthenticated public benefit asset information 902. In another embodiment, the computing entity 21 generates the smart contract to indicate availability of the selected public benefit credit asset to include the authenticity information.

In an embodiment, the computing entity 21 establishes selected public benefit credit asset available terms when the authenticity information includes an available lifecycle status indictor and updates the smart contract to include the selected public benefit credit asset available terms.

Having established the set of cryptography-authenticated public benefit asset information, the computing entity 21 generates, in accordance with a securely passing process, a secure first token representing the selected set of public benefit credit assets based on the set of cryptography-authenticated public benefit asset information. The generating, in accordance with the securely passing process, the secure first token representing the selected set of public benefit credit assets based on the set of cryptography-authenticated public benefit asset information includes a series of sub-steps. A first sub-step includes the computing entity 21 obtaining the portion of a copy of the object distributed ledger (e.g., recovering from memory, recovering from one or more computing entities operating as blockchain nodes) and in an embodiment, obtaining a set of smart contracts associated with the selected set of public benefit credit assets (e.g., extracting from the on authenticated public benefit asset information 902).

A second sub-step includes the computing entity 21 hashing the set of smart contracts associated with the selected set of public benefit credit assets utilizing a receiving public key of the object distributed ledger to produce a next transaction hash value as previously discussed with reference to FIG. 9K. A third sub-step includes the computing entity 21 encrypting the next transaction hash value utilizing a private key of the computing entity 21 to produce a next transaction signature as previously discussed with reference to FIG. 9K. A fourth sub-step includes the computing entity 21 generating the secure first token 902 as a next block of the blockchain of the object distributed ledger to include the set of smart contracts and the next transaction signature as previously discussed with reference to FIG. 9K.

FIG. 27B further illustrates the example method of operation where, having generated the secure first token, a fifth step includes the computing entity 21 establishing, in accordance with the securely passing process, control over the secure first token representing the selected set of public benefit credit assets on an object distributed ledger. Only a device possessing control over the secure first token may modify the secure first token.

The establishing, in accordance with the securely passing process, the control over the secure first token representing the selected set of public benefit credit assets on the object distributed ledger includes generating a next block of the blockchain of the object distributed ledger to include the smart contract and the next transaction signature and an instance further includes a series of sub-steps. A first sub-step includes the computing entity 21 determining whether to indirectly or directly establish the secure first token on the object distributed ledger as previously discussed. For example, the computing entity 21 indirectly establishes the secure first token when the blockchain information 800 does not need to include the secure first token. As another example, the computing entity 21 directly establishes the secure first token when the computing entity 21 communicates directly with computing entity 23-1 serving as a blockchain node.

When indirectly establishing the secure first token on the object distributed ledger, a second sub-step includes the computing entity 21 issuing a secure first token establishment request that includes the secure first token 802 to an object ledger computing entity (e.g., computing entity 23-1) of the computing system serving as the blockchain node of the object distributed ledger. The secure first token establishment request includes a set of smart contracts associated with the selected set of public benefit credit assets. The computing entity 23-1 forms the secure first token 802 as a block 1 on the object distributed ledger to include ESG information 607 as represented in FIG. 27B.

When directly establishing the secure first token on the object distributed ledger, the second sub-step includes the computing entity 21 obtaining a copy of the object distributed ledger (e.g., from blockchain information 800 stored within the contingent asset database 34 of the computing entity 21. A third sub-step includes the computing entity 21 hashing the set of smart contracts utilizing a receiving public key of the object distributed ledger to produce a next transaction hash value.

A fourth sub-step includes the computing entity 21 encrypting the next transaction hash value utilizing a private key of the computing entity 21 to produce a next transaction signature. A fifth sub-step includes the computing entity 21 generating a next block of a blockchain of the object distributed ledger to include the set of smart contracts and the next transaction signature. A sixth sub-step includes the computing entity 21 causing inclusion of the next block as the secure first token on the object distributed ledger (e.g., the asset module 30 sends the secure first token 802 to the computing entity 23-1 for inclusion on a blockchain as the ESG information 607 as illustrated in FIG. 27B.

In an embodiment, alternatively or in addition to, the computing entity 21 securely passes control over the secure first token via the object distributed ledger to another computing entity when the secure first token is to be processed to execute a transfer of selected set of public benefit credit assets. For example, the computing entity 21 utilizes the process as previously discussed with reference to FIG. 9K to handoff the secure first token 802 to the other computing entity.

In yet another embodiment, alternatively or in addition to, the computing entity 21 securely passes control over the secure first token via the object distributed ledger to an exchange computing entity when approval is detected from a secure message associated with the corresponding owner ID associated with the particular public benefit credit asset. For example, the computing entity 21 interprets an approval message from the computing entity 20-1 (e.g., associated with a corresponding owner ID) to post the secure first token on an exchange that facilitates further transfer of the secure first token. Upon approval, the computing entity 21 utilizes the process described previously with reference to FIG. 9K to reestablish control of the secure first token with the exchange computing entity (e.g., of the exchange to facilitate the further transfer).

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 28A-28B are schematic block diagrams of an embodiment of a computing system illustrating an example of using and identifying a secure token of a set of public benefit assets. The computing system includes computing entities 20-1 through 20-N of FIG. 1, the computing entity 21 of FIG. 1, computing entities 23-1 through 23-N of FIG. 1, and the computing entity 25-1 of FIG. 1. In an embodiment, the computing entities 20-1 through 20-N are associated with a multitude of consumers, including, in a point of purchase scenario. In an embodiment, the computing entity 25-1 is associated with one or more of an artificial intelligence (AI) computing entity, a public benefit credit exchange computing entity, and a verification server computing entity. In an embodiment, the computing entities 23-1 through 23-N are associated with computing entities facilitating operation of a distributed ledger that includes support for one or more blockchains. Such block chains can be private or public.

The set of public benefit credit assets represents a set of tradable certificates or permits representing the right to continue to do deeds of negative factors in one area but yet be offset by facilitating abatement in another area. The negative factors include associations with one or more of environmental factors, social factors, and governance factors (ESG). For example, when the public benefit credit is associated with a carbon credit, the public benefit credit asset represents the right to emit a set amount of carbon dioxide or the equivalent amount of a different greenhouse gas (GHG). Carbon credits and carbon markets are a component of national and international attempts to mitigate the growth in concentrations of GHGs. 1 carbon credit=1 ton of carbon dioxide or carbon dioxide equivalent gases. The set of carbon credit assets includes micro-carbon credits (e.g., household) and/or a portion of one or more of voluntary carbon credits and certified carbon credits (e.g., vetted through a registration entity and process).

FIG. 28A illustrates an example method of operation of the using and identifying the secure token of the set of public benefit credit assets, a first step includes the computing entity 21 obtaining, in accordance with a securely passing process, control over a secure first token 802 representing a first pending transaction associated with a transaction item. The secure first token includes a set of smart contracts of the first pending transaction. The set of smart contracts is established to subsequently pertain to a set of selected public benefit credit assets for the first pending transaction. The first pending transaction includes identity of the transaction item, identity of a requesting computing entity, identity of the computing entity, and an authenticated value of the transaction item. A particular public benefit credit asset of the set of selected public benefit credit assets assigns a corresponding credit level from a corresponding payer identifier (ID) to a corresponding owner ID associated with the particular public benefit credit asset. The secure first token is generated in accordance with the securely passing process to represent utilization of the set of selected public benefit credit assets for the first pending transaction associated with the transaction item. Only a device possessing control over the secure first token may modify the secure first token.

The obtaining, in accordance with the securely passing process, the control over the secure first token includes a series of sub-steps. A first sub-step includes receiving an indication of the control over the secure first token from a requesting computing entity. For example, the computing entity 21 receives the secure first token 802 from the computing entity 23-1 with an indication that the computing entity 21 is to take control of the secure first token. A second sub-step includes establishing the identity of the computing entity to have control over the secure first token. For example, the computing entity 21 notifies the computing entity 23-1 to establish the control with computing entity 21 as previously discussed in greater detail with reference to FIG. 9K.

Having obtained the control over the secure first token, a second step of the method of operation includes the computing entity 21 issuing requirements information for the set of selected public benefit credit assets to an artificial intelligence (AI) computing entity of the computing system. The AI computing entity 25-1 interprets a multitude of ingested data to produce time-varying and time-sensitive evaluation data for the public benefit credit assets.

For example, the asset module 30 interprets unauthenticated public benefit asset information 902 from the computing entity 20-1 to extract the requirements and sends the requirements as public benefit credit establishment messages 603 to an AI computing entity 25-1 to initiate searching for such a set of public benefit credit assets.

In response, the AI computing entity 25-1 interprets a multitude of ingested data to produce time-varying and time-sensitive evaluation data for the set of public benefit credit assets. The time-varying nature describes changes in such things as value over a time frame. The time-sensitive nature describes a priority or urgency level associated with the timeframe (e.g., special pricing expires in 10 minutes).

In an alternative embodiment, the computing entity 21 generates a digital record representing a hypothetical public benefit credit asset to securely establish a public benefit credit asset solution for a secure first token representing a first pending transaction associated with a transaction item. The secure first token representing the first pending transaction includes identity of the transaction item, identity of a requesting computing entity (e.g., computing entity 20-1) associated with the secure first token, and an authenticated value of the transaction item.

The public benefit credit asset solution includes updating the secure first token to subsequently represent a selected public benefit credit asset to subsequently provide conversion of the selected public benefit credit asset to complete the first pending transaction. The digital record representing the hypothetical public benefit credit asset includes an asset identifier, a lifecycle status indictor, a potential payer liability level, a payer identifier, a negative factor area identifier, a negative factor area level, an offsetting area identifier, an offsetting area level, a seller identifier, and an owner identifier.

The digital record further includes a representation that the payer identifier is obligated for the potential payer liability level to at least one of the seller identifier and the owner identifier in consideration for activities of the offsetting area identifier in accordance with the offsetting area level providing a right to facilitate activities associated with the negative factor area identifier in accordance with the negative factor area level.

In the alternative embodiment, the second step includes the computing entity 21 identifying the asset authenticity computing entity based on at least one of the identity of the transaction item, the asset identifier, the payer identifier, the seller identifier, the negative factor area identifier, and the offsetting area identifier. For example, the computing entity 21 selects the computing entity 25-1 when the negative factor area identifier indicates pollution activities that can be offset by carbon credits associated with the offsetting area identifier.

In the alternative embodiment, the second step further includes the computing entity 21 issuing, to the asset authenticity computing entity (e.g., computing entity 25-1), a public benefit credit establishment message 603 as a request to select and authenticate a digital record that represents an available public benefit credit asset based on the digital record representing the hypothetical public benefit credit asset to produce the selected public benefit credit asset.

Having issued the requirements information for the public benefit credit assets to the AI computing entity 25-1, a third step of the example method of operation includes the computing entity 21 facilitating selection of one or more of the public benefit credit assets based on the time-varying and time-sensitive evaluation data for the public benefit credit assets to produce the selected set of public benefit credit assets. A particular public benefit credit asset of the selected set of public benefit credit assets assigns a corresponding credit level from a corresponding payer identifier (ID) to a corresponding owner ID associated with the particular public benefit credit asset. The facilitating of the selection includes at least one of the computing entity 21 performing the selection and the computing entity 25-1 performing the selection. The selection includes comparing a level of match between the requirements and the time-varying and time-sensitive evaluation data and indicating a level of match, which includes indicating when the level of match has reached a threshold level to trigger declaration of a favorable match.

In the alternative embodiment, the computing entity 25-1 issues, to the computing entity 21, a digital record of the selected public benefit credit asset that includes authenticity information associated with the selected public benefit credit asset utilizing the at least one of the asset identifier, the payer identifier, the seller identifier, the negative factor area identifier, and the offsetting area identifier.

In the alternative embodiment, the computing entity 25-1 utilizes the digital record of the interpret a multitude of ingested data to produce time-varying and time-sensitive evaluation data associated with a multitude of public benefit credit assets that includes the available public benefit credit asset. The computing entity 25-1 compares the digital record representing the hypothetical public benefit credit asset to the time-varying and time-sensitive evaluation data to produce a level of match for each of the multitude of public benefit credit assets. The computing entity 25-1 selects the available public benefit credit asset as the selected public benefit credit asset when a level of match associated with the available public benefit credit asset has reached a threshold level to trigger declaration of a favorable match. For example, the selected public benefit credit asset substantially provides a desired carbon credit.

In a further alternative embodiment, the computing entity 21 receives, from the asset authenticity computing entity (e.g., computing entity 25-1, the multitude of time-varying and time-sensitive evaluation data associated with the multitude of public benefit credit assets that includes the available public benefit credit asset. The computing entity 21 compares the digital record representing the hypothetical public benefit credit asset to the time-varying and time-sensitive evaluation data to produce a level of match (e.g., categories of the negative factor area and the offsetting area) for each of the multitude of public benefit credit assets. The computing entity 21 selects the available public benefit credit asset as the selected public benefit credit asset when a level of match associated with the available public benefit credit asset has reached a threshold level to trigger declaration of a favorable match.

In a still further alternative embodiment, the computing entity 21 updates a generative artificial intelligence (GAI) knowledge base with the multitude of time-varying and time-sensitive evaluation data associated with the multitude of public benefit credit assets that includes the available public benefit credit asset. For example, the computing entity 21 ingests data with regards to the available public benefit credit assets and converts the data into knowledge stored in the contingent asset database 34. Having updated the GAI knowledge base, the computing entity 21 accesses the GAI knowledge base using the digital record representing the hypothetical public benefit credit asset to identify the available public benefit credit asset as the selected public benefit credit asset. For example, the computing entity 21 utilizes the GAI knowledge base to find the selected public benefit credit asset based on a history of favorable matches of requirements to selected assets.

FIG. 28B illustrates the example method of operation where, having selected the set of public benefit credit assets, a fourth step includes the computing entity 21 generating an updated secure first token in accordance with the securely passing process to represent the selection of the selected set of public benefit credit assets to subsequently provide the conversion of the set of selected public benefit credit assets to complete the first pending transaction. For example, the computing entity 21 generates the updated secure first token 810 to include identifiers of the set of selected public benefit credit assets and ESG information 607 of the set of selected public benefit credit assets.

In another embodiment, the computing entity 21 updates the secure first token to include a smart contract to produce an updated secure first token and facilitates inclusion of a representation of the updated secure first token in the object distributed ledger as the public benefit credit asset solution.

Having generated the updated secure first token 810, a fifth step of the example method of operation includes the computing entity 21 passing control of the updated secure first token 810 to complete the first pending transaction. For example, the computing entity 21 facilitates the passing of controlled by sending the updated secure first token 810 to the computing entity 23-1 where the computing entity 23-1 generates a block 1-1 for appending on the blockchain to include the ESG information 607 as illustrated in FIG. 28B in accordance with the securely passing process as described with reference to FIG. 9K.

In an alternative embodiment, the computing entity 21 facilitates the final selection of the selected public benefit credit asset and memorializes the selection of that asset on a blockchain, either one affiliated with the transaction or one affiliated with the public benefit assets. In the alternative embodiment, the computing entity 21 determines that the authenticity information associated with the selected public benefit credit asset indicates that the selected public benefit credit asset matches the hypothetical public benefit credit asset (e.g., a match for the public benefit credit asset to completion of transaction).

The computing entity 21 generates a smart contract to include the authenticity information and to indicate that the selected public benefit credit asset is to facilitate completion of the first pending transaction. The computing entity 21 obtains a portion of a copy of an object distributed ledger associated with at least one of the first pending transaction and the selected public benefit credit asset. For example, when updating the secure first token, the object distributed ledger associated with the first pending transaction is utilized. As another example, when updating memorialization of utilization of the selected public benefit credit asset, the object distributed ledger associated with the multitude of public benefit credit assets is utilized.

The computing entity 21 hashes the smart contract utilizing a receiving public key associated with a receiving computing entity of the object distributed ledger to produce a next transaction hash value and encrypts the next transaction hash value utilizing a private key of one of the computing entity 21 and the requesting computing entity 20-1 to produce a next transaction signature. For example, the private key of the computing entity 21 is utilized when ownership of the block and/or token on the object distributed ledger is to be the computing entity 21. As another example, the private key of the computing entity 20-1 is utilized when ownership of the block and/or token on the object stupid ledger is to be the requesting entity (e.g., an entity associated with the transaction).

The computing entity 21 generates a next block of a blockchain of the object distributed ledger to include the smart contract and the next transaction signature. The computing entity 21 causes inclusion of the next block in the object distributed ledger as the public benefit credit asset solution as previously discussed.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 29A-29B are schematic block diagrams of an embodiment of a computing system illustrating an example of using and identifying a secure token of a set of public benefit assets. The computing system includes computing entities 20-1 through 20-N of FIG. 1, the computing entity 21 of FIG. 1, computing entities 23-1 through 23-N of FIG. 1, and the computing entity 25-1 of FIG. 1. In an embodiment, the computing entities 20-1 through 20-N are associated with a multitude of consumers, including, in a point of purchase scenario. In an embodiment, the computing entity 25-1 is associated with one or more of an artificial intelligence (AI) computing entity, a public benefit credit exchange computing entity, and a verification server computing entity. In an embodiment, the computing entities 23-1 through 23-N are associated with computing entities facilitating operation of a distributed ledger that includes support for one or more blockchains. Such block chains can be private or public.

The set of public benefit credit assets represents a set of tradable certificates or permits representing the right to continue to do deeds of negative factors in one area but yet be offset by facilitating abatement in another area. The negative factors include associations with one or more of environmental factors, social factors, and governance factors (ESG). For example, when the public benefit credit is associated with a carbon credit, the public benefit credit asset represents the right to emit a set amount of carbon dioxide or the equivalent amount of a different greenhouse gas (GHG). Carbon credits and carbon markets are a component of national and international attempts to mitigate the growth in concentrations of GHGs. 1 carbon credit=1 ton of carbon dioxide or carbon dioxide equivalent gases. The set of carbon credit assets includes micro-carbon credits (e.g., household) and/or a portion of one or more of voluntary carbon credits and certified carbon credits (e.g., vetted through a registration entity and process).

FIG. 29A illustrates an example method of operation of the using and identifying the secure token of the set of public benefit credit assets, a first step includes the computing entity 21 generating requirements information for social benefit credit assets based on social aspects affiliated with the computing entity for use by an artificial intelligence (AI) computing entity of the computing system. The requirements information pertains to one or more of a social topic, a social category, a social outcome, a social situation, a social challenge, a social injustice, a social trend, a social change outcome, an organization associated with the social topic, and an associated timeframe. The social aspects establish an affinity between a computing device (e.g., such as a consumer computing entity 20-1 and/or the computing entity 21) and the requirements information. For example, the asset module 30 interprets unauthenticated public benefit asset information 902 from the computing entity 20-1 to extract the requirements and sends the requirements as public benefit credit establishment messages 603 to an AI computing entity 25-1 to initiate searching for such social benefit credit assets.

Having generated the requirements information for the social benefit credit assets, a second step of the example method of operation includes the computing entity 21 sending the requirements information for the social benefit credit assets to the AI computing entity 25-1. In response, the AI computing entity 25-1 interprets a multitude of ingested data to produce time-varying and time-sensitive evaluation data for the social benefit credit assets. The time-varying nature describes changes in such things as value over a time frame. The time-sensitive nature describes a priority or urgency level associated with the timeframe (e.g., special pricing expires in 10 minutes).

Having issued the requirements information for the public benefit credit assets to the AI computing entity 25-1, a third step of the example method of operation includes the computing entity 21 facilitating selection of one or more of the social benefit credit assets based on the time-varying and time-sensitive evaluation data for the social benefit credit assets to produce a selected set of social benefit credit assets. A particular social benefit credit asset of the selected set of social benefit credit assets assigns a corresponding credit level from a corresponding payer identifier (ID) to a corresponding owner ID associated with the particular social benefit credit asset. The facilitating of the selection includes at least one of the computing entity 21 performing the selection and the computing entity 25-1 performing the selection. The selection includes comparing a level of match between the requirements and the time-varying and time-sensitive evaluation data and indicating a level of match, which includes indicating when the level of match has reached a threshold level to trigger declaration of a favorable match.

Having facilitated the selection of the one or more public benefit credit assets, a fourth step of the example method of operation includes the computing entity 21 establishing a set of cryptography-authenticated public social asset information for the selected set of social benefit credit assets. The establishing the set of cryptography-authenticated social benefit asset information for the selected set of social benefit credit assets includes a series of sub-steps. A first sub-step includes the computing entity 21 interpreting a request to generate the selected set of social benefit credit assets to identify the particular social benefit credit asset of the selected set of social benefit credit assets and to identify the corresponding credit level from the corresponding payer ID to the corresponding owner ID associated with the particular social benefit credit asset. For example, the computing entity 21 interprets unauthenticated public benefit asset information 902 from the computing entity 20-1 to produce the request to generate the set of social benefit credit assets. For instance, an individual makes a request to apply for social credits associated with neighborhood social justice project.

A second sub-step includes the computing entity 21 applying a cryptography test to a public benefit credit establishment message associated with the particular social benefit credit asset. For example, the asset module 30 exchanges public benefit credit establishment message is 603 with the AI computing entity 25-1 to verify and validate the request (e.g., matching to social categories of the ESG information 607, and/or matching to public or private registries utilized to eliminate duplication of credits granted for similar abatements and to enter the requested assets into an associated registry, and comparing a calculated hash value to a stored hash value for content of the public benefit credit establishment message).

When a result of the cryptography test indicates that the particular social benefit credit asset has an authenticated status, a third sub-step includes the computing entity 21 generating a smart contract based on the particular public benefit credit asset as a portion of the set of cryptography-authenticated public benefit asset information. For example, the computing entity 21 produces the set of Public benefit credit assets associated with the unauthenticated public benefit asset information 902.

Having established the set of cryptography-authenticated social benefit asset information, a fifth step of the example method of operation includes generating, in accordance with a securely passing process, a secure first token representing the selected set of social benefit credit assets based on the set of cryptography-authenticated social benefit asset information. The generating, in accordance with the securely passing process, the secure first token representing the selected set of social benefit credit assets based on the set of cryptography-authenticated social benefit asset information includes a series of sub-steps. A first sub-step includes the computing entity 21 obtaining a set of smart contracts associated with the selected set of social benefit credit assets (e.g., extracting from the unauthenticated public benefit asset information 902).

A second sub-step includes the computing entity 21 hashing the set of smart contracts associated with the selected set of social benefit credit assets utilizing a receiving public key of the object distributed ledger to produce a next transaction hash value as previously discussed with reference to FIG. 9K. A third sub-step includes the computing entity 21 encrypting the next transaction hash value utilizing a private key of the computing entity 21 to produce a next transaction signature as previously discussed with reference to FIG. 9K. A fourth sub-step includes the computing entity 21 generating the secure first token 902 to include the set of smart contracts and the next transaction signature as previously discussed with reference to FIG. 9K.

FIG. 29B further illustrates the example method of operation where, having generated the secure first token, a sixth step of the example method of operation includes the computing entity 21 establishing, in accordance with the securely passing process, control over the secure first token representing the selected set of social benefit credit assets on an object distributed ledger. Only a device possessing control over the secure first token may modify the secure first token.

The establishing, in accordance with the securely passing process, the control over the secure first token representing the selected set of social benefit credit assets on the object distributed ledger includes a series of sub-steps. A first sub-step includes the computing entity 21 determining whether to indirectly or directly establish the secure first token on the object distributed ledger as previously discussed. For example, the computing entity 21 indirectly establishes the secure first token when the blockchain information 800 does not need to include the secure first token. As another example, the computing entity 21 directly establishes the secure first token when the computing entity 21 communicates directly with computing entity 23-1 serving as a blockchain node.

When indirectly establishing the secure first token on the object distributed ledger, a second sub-step includes the computing entity 21 issuing a secure first token establishment request that includes the secure first token 802 to an object ledger computing entity (e.g., computing entity 23-1) of the computing system serving as the blockchain node of the object distributed ledger. The secure first token establishment request includes a set of smart contracts associated with the selected set of social benefit credit assets. The computing entity 23-1 forms the secure first token 802 as a block 1 on the object distributed ledger to include ESG information 607 as represented in FIG. 29B.

When directly establishing the secure first token on the object distributed ledger, the second sub-step includes the computing entity 21 obtaining a copy of the object distributed ledger (e.g., from blockchain information 800 stored within the contingent asset database 34 of the computing entity 21). A third sub-step includes the computing entity 21 hashing the set of smart contracts utilizing a receiving public key of the object distributed ledger to produce a next transaction hash value.

A fourth sub-step includes the computing entity 21 encrypting the next transaction hash value utilizing a private key of the computing entity 21 to produce a next transaction signature. A fifth sub-step includes the computing entity 21 generating a next block of a blockchain of the object distributed ledger to include the set of smart contracts and the next transaction signature. A sixth sub-step includes the computing entity 21 causing inclusion of the next block as the secure first token on the object distributed ledger (e.g., the asset module 30 sends the secure first token 802 to the computing entity 23-1 for inclusion on a blockchain as the ESG information 607 as illustrated in FIG. 29B).

In an embodiment, alternatively or in addition to, the computing entity 21 securely passes control over the secure first token via the object distributed ledger to another computing entity when the secure first token is to be processed to execute a transfer of selected set of social benefit credit assets. For example, the computing entity 21 utilizes the process as previously discussed with reference to FIG. 9K to handoff the secure first token 802 to the other computing entity.

In yet another embodiment, alternatively or in addition to, the computing entity 21 securely passes control over the secure first token via the object distributed ledger to an exchange computing entity when approval is detected from a secure message associated with the corresponding owner ID associated with the particular social benefit credit asset. For example, the computing entity 21 interprets an approval message from the computing entity 20-1 (e.g., associated with a corresponding owner ID) to post the secure first token on an exchange that facilitates further transfer of the secure first token. Upon approval, the computing entity 21 utilizes the process described previously with reference to FIG. 9K to reestablish control of the secure first token with the exchange computing entity (e.g., of the exchange to facilitate the further transfer).

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 30A-30B are schematic block diagrams of an embodiment of a computing system illustrating an example of using and identifying a secure token of a set of public benefit assets. The computing system includes computing entities 20-1 through 20-N of FIG. 1, the computing entity 21 of FIG. 1, computing entities 23-1 through 23-N of FIG. 1, and the computing entity 25-1 of FIG. 1. In an embodiment, the computing entities 20-1 through 20-N are associated with a multitude of consumers, including, in a point of purchase scenario. In an embodiment, the computing entity 25-1 is associated with one or more of an artificial intelligence (AI) computing entity, a public benefit credit exchange computing entity, and a verification server computing entity. In an embodiment, the computing entities 23-1 through 23-N are associated with computing entities facilitating operation of a distributed ledger that includes support for one or more blockchains. Such block chains can be private or public.

The set of public benefit credit assets represents a set of tradable certificates or permits representing the right to continue to do deeds of negative factors in one area but yet be offset by facilitating abatement in another area. The negative factors include associations with one or more of environmental factors, social factors, and governance factors (ESG). For example, when the public benefit credit is associated with a carbon credit, the public benefit credit asset represents the right to emit a set amount of carbon dioxide or the equivalent amount of a different greenhouse gas (GHG). Carbon credits and carbon markets are a component of national and international attempts to mitigate the growth in concentrations of GHGs. 1 carbon credit=1 ton of carbon dioxide or carbon dioxide equivalent gases. The set of carbon credit assets includes micro-carbon credits (e.g., household) and/or a portion of one or more of voluntary carbon credits and certified carbon credits (e.g., vetted through a registration entity and process).

FIG. 30A illustrates an example method of operation of the using and identifying the secure token of the set of public benefit credit assets, a first step includes the computing entity 21 generating requirements information for governance benefit credit assets based on governance aspects affiliated with the computing entity for use by an artificial intelligence (AI) computing entity of the computing system. The requirements information pertains to one or more of a governance topic, a governance category, a governance outcome, a governance situation, a governance challenge, a governance hierarchy, a governance type, a governance change outcome, an organization associated with the governance topic, and an associated timeframe. The governance aspects establish an affinity between the computing device and the requirements (e.g., such as a consumer computing entity 20-1 and/or the computing entity 21). For example, the asset module 30 interprets unauthenticated public benefit asset information 902 from the computing entity 20-1 to extract the requirements and sends the requirements as public benefit credit establishment messages 603 to an AI computing entity 25-1 to initiate searching for such governance benefit credit assets.

Having generated the requirements information for the governance benefit credit assets, a second step of the example method of operation includes the computing entity 21 sending the requirements information for the governance benefit credit assets to the AI computing entity 25-1. In response, the AI computing entity 25-1 interprets a multitude of ingested data to produce time-varying and time-sensitive evaluation data for the governance benefit credit assets. The time-varying nature describes changes in such things as value over a time frame. The time-sensitive nature describes a priority or urgency level associated with the timeframe (e.g., special pricing expires in 10 minutes).

Having issued the requirements information for the public benefit credit assets to the AI computing entity 25-1, a third step of the example method of operation includes the computing entity 21 facilitating selection of one or more of the governance benefit credit assets based on the time-varying and time-sensitive evaluation data for the governance benefit credit assets to produce a selected set of governance benefit credit assets. A particular governance benefit credit asset of the selected set of governance benefit credit assets assigns a corresponding credit level from a corresponding payer identifier (ID) to a corresponding owner ID associated with the particular governance benefit credit asset. The facilitating of the selection includes at least one of the computing entity 21 performing the selection and the computing entity 25-1 performing the selection. The selection includes comparing a level of match between the requirements and the time-varying and time-sensitive evaluation data and indicating a level of match, which includes indicating when the level of match has reached a threshold level to trigger declaration of a favorable match.

Having facilitated the selection of the one or more public benefit credit assets, a fourth step of the example method of operation includes the computing entity 21 establishing a set of cryptography-authenticated public governance asset information for the selected set of governance benefit credit assets. The establishing the set of cryptography-authenticated governance benefit asset information for the selected set of governance benefit credit assets includes a series of sub-steps. A first sub-step includes the computing entity 21 interpreting a request to generate the selected set of governance benefit credit assets to identify the particular governance benefit credit asset of the selected set of governance benefit credit assets and to identify the corresponding credit level from the corresponding payer ID to the corresponding owner ID associated with the particular governance benefit credit asset. For example, the computing entity 21 interprets unauthenticated public benefit asset information 902 from the computing entity 20-1 to produce the request to generate the set of governance benefit credit assets. For instance, an individual makes a request to apply for governance credits associated with neighborhood governance justice project.

A second sub-step includes the computing entity 21 applying a cryptography test to a public benefit credit establishment message associated with the particular governance benefit credit asset. For example, the asset module 30 exchanges public benefit credit establishment message is 603 with the AI computing entity 25-1 to verify and validate the request (e.g., matching to governance categories of the ESG information 607, and/or matching to public or private registries utilized to eliminate duplication of credits granted for similar abatements and to enter the requested assets into an associated registry, and comparing a calculated hash value to a stored hash value for content of the public benefit credit establishment message).

When a result of the cryptography test indicates that the particular governance benefit credit asset has an authenticated status, a third sub-step includes the computing entity 21 generating a smart contract based on the particular public benefit credit asset as a portion of the set of cryptography-authenticated public benefit asset information. For example, the computing entity 21 produces the set of Public benefit credit assets associated with the unauthenticated public benefit asset information 902.

Having established the set of cryptography-authenticated governance benefit asset information, a fifth step of the example method of operation includes generating, in accordance with a securely passing process, a secure first token representing the selected set of governance benefit credit assets based on the set of cryptography-authenticated governance benefit asset information. The generating, in accordance with the securely passing process, the secure first token representing the selected set of governance benefit credit assets based on the set of cryptography-authenticated governance benefit asset information includes a series of sub-steps. A first sub-step includes the computing entity 21 obtaining a set of smart contracts associated with the selected set of governance benefit credit assets (e.g., extracting from the unauthenticated public benefit asset information 902).

A second sub-step includes the computing entity 21 hashing the set of smart contracts associated with the selected set of governance benefit credit assets utilizing a receiving public key of the object distributed ledger to produce a next transaction hash value as previously discussed with reference to FIG. 9K. A third sub-step includes the computing entity 21 encrypting the next transaction hash value utilizing a private key of the computing entity 21 to produce a next transaction signature as previously discussed with reference to FIG. 9K. A fourth sub-step includes the computing entity 21 generating the secure first token 902 to include the set of smart contracts and the next transaction signature as previously discussed with reference to FIG. 9K.

FIG. 30B further illustrates the example method of operation where, having generated the secure first token, a sixth step of the example method of operation includes computing entity 21 establishing, in accordance with the securely passing process, control over the secure first token representing the selected set of governance benefit credit assets on an object distributed ledger. Only a device possessing control over the secure first token may modify the secure first token.

The establishing, in accordance with the securely passing process, the control over the secure first token representing the selected set of governance benefit credit assets on the object distributed ledger includes a series of sub-steps. A first sub-step includes the computing entity 21 determining whether to indirectly or directly establish the secure first token on the object distributed ledger as previously discussed. For example, the computing entity 21 indirectly establishes the secure first token when the blockchain information 800 does not need to include the secure first token. As another example, the computing entity 21 directly establishes the secure first token when the computing entity 21 communicates directly with computing entity 23-1 serving as a blockchain node.

When indirectly establishing the secure first token on the object distributed ledger, a second sub-step includes the computing entity 21 issuing a secure first token establishment request that includes the secure first token 802 to an object ledger computing entity (e.g., computing entity 23-1) of the computing system serving as the blockchain node of the object distributed ledger. The secure first token establishment request includes a set of smart contracts associated with the selected set of governance benefit credit assets. The computing entity 23-1 forms the secure first token 802 as a block 1 on the object distributed ledger to include ESG information 607 as represented in FIG. 30B.

When directly establishing the secure first token on the object distributed ledger, the second sub-step includes the computing entity 21 obtaining a copy of the object distributed ledger (e.g., from blockchain information 800 stored within the contingent asset database 34 of the computing entity 21). A third sub-step includes the computing entity 21 hashing the set of smart contracts utilizing a receiving public key of the object distributed ledger to produce a next transaction hash value.

A fourth sub-step includes the computing entity 21 encrypting the next transaction hash value utilizing a private key of the computing entity 21 to produce a next transaction signature. A fifth sub-step includes the computing entity 21 generating a next block of a blockchain of the object distributed ledger to include the set of smart contracts and the next transaction signature. A sixth sub-step includes the computing entity 21 causing inclusion of the next block as the secure first token on the object distributed ledger (e.g., the asset module 30 sends the secure first token 802 to the computing entity 23-1 for inclusion on a blockchain as the ESG information 607 as illustrated in FIG. 30B).

In an embodiment, alternatively or in addition to, the computing entity 21 securely passes control over the secure first token via the object distributed ledger to another computing entity when the secure first token is to be processed to execute a transfer of selected set of governance benefit credit assets. For example, the computing entity 21 utilizes the process as previously discussed with reference to FIG. 9K to handoff the secure first token 802 to the other computing entity.

In yet another embodiment, alternatively or in addition to, the computing entity 21 securely passes control over the secure first token via the object distributed ledger to an exchange computing entity when approval is detected from a secure message associated with the corresponding owner ID associated with the particular governance benefit credit asset. For example, the computing entity 21 interprets an approval message from the computing entity 20-1 (e.g., associated with a corresponding owner ID) to post the secure first token on an exchange that facilitates further transfer of the secure first token. Upon approval, the computing entity 21 utilizes the process described previously with reference to FIG. 9K to reestablish control of the secure first token with the exchange computing entity (e.g., of the exchange to facilitate the further transfer).

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 31A-31B are schematic block diagrams of an embodiment of a computing system illustrating an example of using and identifying a secure token of a set of public benefit assets. The computing system includes computing entities 20-1 through 20-N of FIG. 1, the computing entity 21 of FIG. 1, computing entities 23-1 through 23-N of FIG. 1, and the computing entity 25-1 of FIG. 1. In an embodiment, the computing entities 20-1 through 20-N are associated with a multitude of consumers, including, in a point of purchase scenario. In an embodiment, the computing entity 25-1 is associated with one or more of an artificial intelligence (AI) computing entity, a public benefit credit exchange computing entity, and a verification sever computing entity. In an embodiment, the computing entities 23-1 through 23-N are associated with computing entities facilitating operation of a distributed ledger that includes support for one or more blockchains. Such block chains can be private or public.

The set of public benefit credit assets represents a set of tradable certificates or permits representing the right to continue to do deeds of negative factors in one area but yet be offset by facilitating abatement in another area. The negative factors include associations with one or more of environmental factors, social factors, and governance factors (ESG). For example, when the public benefit credit is associated with a carbon credit, the public benefit credit asset represents the right to emit a set amount of carbon dioxide or the equivalent amount of a different greenhouse gas (GHG). Carbon credits and carbon markets are a component of national and international attempts to mitigate the growth in concentrations of GHGs. 1 carbon credit=1 ton of carbon dioxide or carbon dioxide equivalent gases. The set of carbon credit assets includes micro-carbon credits (e.g., household) and/or a portion of one or more of voluntary carbon credits and certified carbon credits (e.g., vetted through a registration entity and process).

FIG. 31A illustrates an example method of operation of the using and identifying the secure token of the set of public benefit credit assets, a first step includes the computing entity 21 obtaining, in accordance with a securely passing process, control over a secure first token 802 representing a first pending transaction associated with a transaction item. The secure first token includes a set of smart contracts of the first pending transaction. The set of smart contracts is established to subsequently pertain to a collateralized set of selected public benefit credit assets for the first pending transaction (e.g., to utilize as collateral with regards to the first pending transaction). The first pending transaction includes identity of the transaction item, identity of a requesting computing entity, identity of the computing entity, and an authenticated value of the transaction item. A particular public benefit credit asset of the collateralized set of selected public benefit credit assets assigns a corresponding credit level from a corresponding payer identifier (ID) to a corresponding owner ID associated with the particular public benefit credit asset. The secure first token is generated in accordance with the securely passing process to represent utilization of the collateralized set of selected public benefit credit assets as collateral for the first pending transaction associated with the transaction item. Only a device possessing control over the secure first token may modify the secure first token.

The obtaining, in accordance with the securely passing process, the control over the secure first token includes a series of sub-steps. A first sub-step includes receiving an indication of the control over the secure first token from a requesting computing entity. For example, the computing entity 21 receives the secure first token 802 from the computing entity 23-1 with an indication that the computing entity 21 is to take control of the secure first token. A second sub-step includes establishing the identity of the computing entity to have control over the secure first token. For example, the computing entity 21 notifies the computing entity 23-1 to establish the control with computing entity 21 as previously discussed in greater detail with reference to FIG. 9K.

Having obtained the control over the secure first token, a second step of the method of operation includes the computing entity 21 establishing a set of required cryptography-authenticated public benefit asset information for subsequent selection of the collateralized set of public benefit credit assets based on a request to identify the collateralized set of public benefit credit assets. A particular public benefit credit asset of the collateralized set of public benefit credit assets assigns a corresponding credit level from a corresponding payer identifier (ID) to a corresponding owner ID associated with the particular public benefit credit asset. For example, the asset module 30 of the computing entity 21 interprets the point of purchase information 804 from the computing entity 20-1 with regards to acquiring the set of public benefit credit assets to produce the set of required cryptography-authenticated benefit asset information (e.g., identity of the assets, parameters of the assets).

The establishing the set of required cryptography-authenticated public benefit asset information for subsequent selection of the collateralized set of public benefit credit assets based on the request to identify the collateralized set of public benefit credit assets includes a series of sub-steps. A first sub-step includes the computing entity 21 interpreting the request to identify the collateralized set of public benefit credit assets to identify the particular public benefit credit asset of the collateralized set of public benefit credit assets and to identify the corresponding credit level from the corresponding payer ID to the corresponding owner ID associated with the particular public benefit credit asset. For example, the asset module 30 interprets the point of purchase information 804 and or a user selection 808 to identify the particular public benefit credit asset.

A second sub-step includes the computing entity 21 applying a cryptography test to a public benefit credit establishment message 603 associated with the particular public benefit credit asset as previously discussed. When a result of the cryptography test indicates that the particular public benefit credit asset has an authenticated status, a third sub-step includes the computing entity 21 identifying a smart contract based on the particular public benefit credit asset as a portion of the set of required cryptography-authenticated public benefit asset information.

FIG. 31B further illustrates the example method of operation, where, having produced the set of required cryptography-authenticated benefit asset information, a third step includes the asset module 30 of the computing entity 21 identifying, in accordance with a securely passing process, a secure second token on an object distributed ledger representing the collateralized set of public benefit credit assets based on the set of required cryptography-authenticated public benefit asset information. For example, the computing entity 21 issues a request to the computing entity 23-1 to identify the secure second token 803 on a blockchain utilizing the required cryptography-authenticated public benefit asset information. For instance, the computing entity 23-1 subsequently matches the benefit asset information to ESG information 607 of an available set of public benefit credit assets to be collateralized.

Having identified the secure second token, a fourth step of the example method of operation includes the computing entity 21 establishing, in accordance with the securely passing process, control over the secure second token representing the collateralized set of public benefit credit assets on the object distributed ledger to produce an updated secure second token. Only a device possessing control over the secure second token may modify the secure second token. The computing entity 21 takes control of the second secure token 803 as previously discussed with reference to FIG. 9K and as illustrated as block 2 in FIG. 31B.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 32A-32B are schematic block diagrams of an embodiment of a computing system illustrating an example of using and identifying a secure token of a set of public benefit assets. The computing system includes computing entities 20-1 through 20-N of FIG. 1, the computing entity 21 of FIG. 1, computing entities 23-1 through 23-N of FIG. 1, and the computing entity 25-1 of FIG. 1. In an embodiment, the computing entities 20-1 through 20-N are associated with a multitude of consumers, including, in a point of purchase scenario. In an embodiment, the computing entity 25-1 is associated with one or more of an artificial intelligence (AI) computing entity, a public benefit credit exchange computing entity, and a verification server computing entity. In an embodiment, the computing entities 23-1 through 23-N are associated with computing entities facilitating operation of a distributed ledger that includes support for one or more blockchains. Such block chains can be private or public.

The set of public benefit credit assets represents a set of tradable certificates or permits representing the right to continue to do deeds of negative factors in one area but yet be offset by facilitating abatement in another area. The negative factors include associations with one or more of environmental factors, social factors, and governance factors (ESG). For example, when the public benefit credit is associated with a carbon credit, the public benefit credit asset represents the right to emit a set amount of carbon dioxide or the equivalent amount of a different greenhouse gas (GHG). Carbon credits and carbon markets are a component of national and international attempts to mitigate the growth in concentrations of GHGs. 1 carbon credit=1 ton of carbon dioxide or carbon dioxide equivalent gases. The set of carbon credit assets includes micro-carbon credits (e.g., household) and/or a portion of one or more of voluntary carbon credits and certified carbon credits (e.g., vetted through a registration entity and process).

FIG. 32A illustrates an example method of operation of the using and identifying the secure token of the set of public benefit credit assets, a first step includes the computing entity 21 obtaining, in accordance with a securely passing process, control over a secure first token 802 representing a first pending transaction associated with a transaction item. The secure first token includes a set of smart contracts of the first pending transaction. The set of smart contracts is established to pertain to a set of selected public benefit credit assets for the first pending transaction. The first pending transaction includes identity of the transaction item, identity of a requesting computing entity, identity of the computing entity, and an authenticated value of the transaction item. A particular public benefit credit asset of the set of selected public benefit credit assets assigns a corresponding credit level from a corresponding payer identifier (ID) to a corresponding owner ID associated with the particular public benefit credit asset. The secure first token is generated in accordance with the securely passing process to represent utilization of the set of selected public benefit credit assets for the first pending transaction associated with the transaction item. Only a device possessing control over the secure first token may modify the secure first token.

The obtaining, in accordance with the securely passing process, the control over the secure first token includes a series of sub-steps. A first sub-step includes receiving an indication of the control over the secure first token from a requesting computing entity. For example, the computing entity 21 receives the secure first token 802 from the computing entity 23-1 with an indication that the computing entity 21 is to take control of the secure first token. A second sub-step includes establishing the identity of the computing entity to have control over the secure first token. For example, the computing entity 21 notifies the computing entity 23-1 to establish the control with computing entity 21 as previously discussed in greater detail with reference to FIG. 9K.

Having obtained the control over the secure first token, a second step of the method of operation includes the computing entity 21 selecting the set of selected public benefit credit assets from a group of candidate public benefit credit assets based on the identity of the transaction item and an associated credit level of each candidate public benefit credit asset of the group of candidate public benefit credit assets. The selecting the set of selected public benefit credit assets includes a series of sub-steps. A first sub-step includes the computing entity 21 determining a first credit level of the set of selected public benefit credit assets based on the identity of the transaction item and the associated credit level of at least one candidate public benefit credit asset of the group of candidate public benefit credit assets interpreted from the public benefit credit establishment messages 603 from the computing entity 25-1. For example, the computing entity 21 interprets ESG information 607 to extract one or more of the environment information 609, social information 611, and governance information 613.

A second sub-step includes the computing entity 21 generating the set of selected public benefit credit assets to include assignment of a first credit level from a first payer ID to a first owner ID associated with the set of selected public benefit credit assets as previously discussed. For example, the asset module 30 interprets public benefit credit establishment messages 603 from the computing entity 25-1 to identify candidate public benefit credit assets associated with the identity of the transaction item. For instance, the asset module 30 identifies environment information 609 to locate an environment public benefit credit such as a carbon credit when the identity of the transaction item is associated with machinery within improved energy efficiency level and that have desirable associated credit levels. The asset module 30 further selects those associated candidate public benefit credit assets that have sufficient associated credit levels.

Having selected the set of selected public benefit credit assets, in an embodiment, the obtaining of the secure first token further includes generating the secure first token in accordance with a securely passing process to represent utilization of the set of selected public benefit credit assets for the pending first transaction associated with the transaction item. For example, the asset module 30 of the computing entity 21 establishes a set of smart contracts that includes a portion of the point of purchase information 804 and contingency information 202 that includes a portion of the selected assets from the public benefit credit establishment message is 603. Having established the smart contracts, the asset module 30 generates the secure first token 802 to include the set of smart contracts as previously discussed.

Having selected the set of selected public benefit credit assets, a third step of the example method of operation includes the computing entity 21 determining, in accordance with an instant asset determination approach, a set of candidate instant assets that may be utilized to subsequently provide conversion of the set of selected public benefit credit assets to complete the first pending transaction.

When the instant asset determination approach includes a ranked evaluation, the computing entity 21 identifies potential candidate instant assets based on the secure first token. The potential candidate instant assets includes one or more of an instant rebate now, a gift card, an extended warranty from a manufacturer associated with the transaction item, affinity points with a retailer associated with the pending first transaction, other affinity points with the manufacturer associated with the transaction item, a donation to one or more individuals, a donation to one or more entities, a lottery ticket, and a payment to satisfy a portion of liability associated with a delinquently paying consumer.

Having identified the potential candidate instant assets, the computing entity 21 produces a ranking of an estimated benefit to an entity associated with the identity of the requesting computing entity for each potential candidate instant asset of the potential candidate instant assets to produce an estimated benefit ranking of a set of estimated benefit rankings. Having produced the ranking, the computing entity 21 selects the set of candidate instant assets of the potential candidate instant assets based on the estimated benefit ranking of the set of estimated benefit rankings.

Having determined the set of candidate instant assets, the computing entity 21 obtains, in accordance with an instant asset selection approach, a selection of a first subset of instant assets of the set of candidate instant assets to be utilized to subsequently provide the conversion of the set of selected public benefit credit assets to complete the first pending transaction. For example, the asset module 30 interprets user selection 808 which identifies the first subset of instant assets.

Having obtained the selection of the first subset of instant assets, the computing entity 21 generates an updated secure first token in accordance with the securely passing process as previously discussed to represent the selection of the first subset of instant assets to subsequently provide the conversion of the set of selected public benefit credit assets to complete the first pending transaction.

As an example, the asset module 30 of the computing entity 21 interprets candidate instant asset information 806 from the computing entity 25-1 to produce the set of instant assets. Having produced the set of instant assets, a fourth step of the example method of operation includes the asset module 30 selecting a first subset of instant assets. In another instance, the asset module 30 selects the first subset of instant assets based on smart contract content of the first pending transaction (e.g., selects assets to meet a purchase price of the transaction item).

FIG. 32B further illustrates the example method of operation, where, having selected the instant assets, a fourth step includes the computing entity 21 generating an updated secure first token in accordance with the securely passing process as previously discussed to represent the selection of the selected set of public benefit credit assets to subsequently provide the conversion of the set of selected public benefit credit assets to complete the first pending transaction.

The computing entity 21 generates, the updated secure first token 810 in accordance with the securely passing process to represent utilization of the set of selected public benefit credit assets for the first pending transaction associated with the transaction item in conjunction with the selected instant assets. For example, the asset module 30 issues updated secure first token 810 to the computing entity 23-1 to facilitate placing a block 1-1 on the object distributed ledger utilizing the blockchain information 800. The block 1-1 includes ESG information 607 associated with updated smart contracts (e.g., to include information associated with the selected instant assets).

The generating of the updated secure first token in accordance with the securely passing process to represent the selection of the selected set of public benefit credit assets includes the computing entity 21 determining whether to indirectly or directly update an object distributed ledger as previously discussed. When indirectly updating the object distributed ledger, the computing entity 21 issues a secure first token update request to an object ledger computing entity of the computing system (e.g., computing entity 23-1) serving as a blockchain node of the object distributed ledger. The secure first token update request includes an updated set of smart contracts of the first pending transaction based on the set of selected public benefit credit assets Andy instant assets.

In another example, when directly updating the object distributed ledger, the computing entity 21 obtains a copy of the object distributed ledger as blockchain information 800 and hashes the updated set of smart contracts utilizing a receiving public key of the object distributed ledger to produce a next transaction hash value. The computing entity 21 encrypts the next transaction hash value utilizing a private key of the computing entity 21 to produce a next transaction signature and generates a next block of a blockchain of the object distributed ledger to include the updated set of smart contracts and the next transaction signature. The computing entity 21 causes inclusion of the next block as the updated secure first token in the object distributed ledger as illustrated as updated secure first token 810 (e.g., block 1-1) in FIG. 32B.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to"

indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules, and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computer-implemented method of using a computing infrastructure for utilizing an object distributed ledger, the method comprising:

generating, by a computing entity of the computing infrastructure, a digital record representing a hypothetical public benefit credit asset, the digital record comprising an asset identifier, a lifecycle status indicator, a potential payer liability level, a payer identifier, a negative factor area identifier, a negative factor area level, an offsetting area identifier, an offsetting area level, a seller identifier, and an owner identifier, wherein the digital record further includes a representation that the payer identifier is obligated for the potential payer liability level to at least one of the seller identifier and the owner identifier in consideration for activities of the offsetting area identifier in accordance with the offsetting area level providing a right to facilitate activities associated with the negative factor area identifier in accordance with the negative factor area level;

identifying, by the computing entity, an asset authenticity computing of the computing infrastructure based on at least one of the asset identifier, the payer identifier, the seller identifier, the negative factor area identifier, and the offsetting area identifier;

issuing, by the computing entity to the asset authenticity computing entity, a request to select and authenticate a digital record that represents an available public benefit credit asset based on the digital record representing the hypothetical public benefit credit asset to produce a selected public benefit credit asset;

issuing, by the asset authenticity computing entity to the computing entity, a digital record of the selected public benefit credit asset that includes authenticity information associated with the selected public benefit credit asset utilizing the at least one of the asset identifier, the payer identifier, the seller identifier, the negative factor area identifier, and the offsetting area identifier;

determining, by the computing entity, that the authenticity information associated with the selected public benefit credit asset indicates that the selected public benefit credit asset matches the hypothetical public benefit credit asset;

generating, by the computing entity, a smart contract to indicate availability of the selected public benefit credit asset to include the authenticity information;

obtaining, by the computing entity, a portion of a copy of the object distributed ledger;

hashing, by the computing entity, the smart contract utilizing a receiving public key associated with a receiving computing entity of the object distributed ledger to produce a next transaction hash value;

encrypting, by the computing entity, the next transaction hash value utilizing a private key of the computing entity to produce a next transaction signature;

generating, by the computing entity, a next block of a blockchain of the object distributed ledger to include the smart contract and the next transaction signature; and causing, by the computing entity, inclusion of the next block in the object distributed ledger.

2. The method of claim 1 further comprises:

interpreting, by the computing entity, the digital record representing the hypothetical public benefit credit to extract an identifier of the asset authenticity computing entity.

3. The method of claim 1 further comprises:

establishing, by the computing entity, selected public benefit credit asset available terms when the authenticity information includes an available lifecycle status indicator; and updating, by the computing entity, the smart contract to include the selected public benefit credit asset available terms.

4. The method of claim 1 further comprises:

interpreting, by the asset authenticity computing entity, a multitude of ingested data to produce time-varying and time-sensitive evaluation data associated with a multitude of public benefit credit assets that includes the available public benefit credit asset;

comparing, by the asset authenticity computing entity, the digital record representing the hypothetical public benefit credit asset to the time-varying and time-sensitive evaluation data to produce a level of match for each of the multitude of public benefit credit assets; and selecting, by the asset authenticity computing entity, the available public benefit credit asset as the selected public benefit credit asset when a level of match associated with the available public benefit credit asset has reached a threshold level to trigger declaration of a favorable match.

5. The method of claim 1 further comprises:

receiving, by the computing entity from the asset authenticity computing entity, a multitude of time-varying and time-sensitive evaluation data associated with a multitude of public benefit credit assets that includes the available public benefit credit asset;

comparing, by the computing entity, the digital record representing the hypothetical public benefit credit asset to the time-varying and time-sensitive evaluation data to produce a level of match for each of the multitude of public benefit credit assets; and selecting, by the computing entity, the available public benefit credit asset as the selected public benefit credit asset when a level of match associated with the available public benefit credit asset has reached a threshold level to trigger declaration of a favorable match.

6. The method of claim 1 further comprises:

updating, by the computing entity, a generative artificial intelligence (GAI) knowledge base with a multitude of time-varying and time-sensitive evaluation data associated with a multitude of public benefit credit assets that includes the available public benefit credit asset; and accessing, by the computing entity, the GAI knowledge base using the digital record representing the hypothetical public benefit credit asset to identify the available public benefit credit asset as the selected public benefit credit asset.

7. A computing infrastructure system, the computing infrastructure system comprising:

a computing entity comprising a first interface, a first local memory, and a first processor operably coupled to the first interface and the first local memory;

an asset authenticity computing entity comprising a second interface, a second local memory, and a second processor operably coupled to the second interface and the second local memory;

wherein the first processor performs functions to:

generate a digital record representing a hypothetical public benefit credit asset, the digital record comprising an asset identifier, a lifecycle status indicator, a potential payer liability level, a payer identifier, a negative factor area identifier, a negative factor area level, an offsetting area identifier, an offsetting area level, a seller identifier, and an owner identifier, wherein the digital record further includes a representation that the payer identifier is obligated for the potential payer liability level to at least one of the seller identifier and the owner identifier in consideration for activities of the offsetting area identifier in accordance with the offsetting area level providing a right to facilitate activities associated with the negative factor area identifier in accordance with the negative factor area level;

identify the asset authenticity computing entity based on at least one of the asset identifier, the payer identifier, the seller identifier, the negative factor area identifier, and the offsetting area identifier; and issue, via the first interface to the asset authenticity computing entity, a request to select and authenticate a digital record that represents an available public benefit credit asset based on the digital record representing the hypothetical public benefit credit asset to produce a selected public benefit credit asset;

wherein the second processor performs functions to:

issue, via the second interface to the computing entity, a digital record of the selected public benefit credit asset that includes authenticity information associated with the selected public benefit credit asset utilizing the at least one of the asset identifier, the payer identifier, the seller identifier, the negative factor area identifier, and the offsetting area identifier; and wherein the first processor performs further functions to:

determine that the authenticity information associated with the selected public benefit credit asset indicates that the selected public benefit credit asset matches the hypothetical public benefit credit asset;

generate a smart contract to indicate availability of the selected public benefit credit asset to include the authenticity information;

obtain, via the first interface, a portion of a copy of the object distributed ledger;

hash the smart contract utilizing a receiving public key associated with a receiving computing entity of the object distributed ledger to produce a next transaction hash value;

encrypt the next transaction hash value utilizing a private key of the computing entity to produce a next transaction signature;

generate a next block of a blockchain of the object distributed ledger to include the smart contract and the next transaction signature; and cause, via the first interface, inclusion of the next block in the object distributed ledger.

8. The computing infrastructure system of claim 7, wherein the first processor performs further functions to:

interpret the digital record representing the hypothetical public benefit credit to extract an identifier of the asset authenticity computing entity.

9. The computing infrastructure system of claim 7, wherein the first processor performs further functions to:

establish selected public benefit credit asset available terms when the authenticity information includes an available lifecycle status indicator; and update the smart contract to include the selected public benefit credit asset available terms.

10. The computing infrastructure system of claim 7, wherein the second processor performs further functions to:

interpret a multitude of ingested data to produce time-varying and time-sensitive evaluation data associated with a multitude of public benefit credit assets that includes the available public benefit credit asset;

compare the digital record representing the hypothetical public benefit credit asset to the time-varying and time-sensitive evaluation data to produce a level of match for each of the multitude of public benefit credit assets; and select the available public benefit credit asset as the selected public benefit credit asset when a level of match associated with the available public benefit credit asset has reached a threshold level to trigger declaration of a favorable match.

11. The computing infrastructure system of claim 7, wherein the first processor performs further functions to:

receive, via the first interface from the asset authenticity computing entity, a multitude of time-varying and time-sensitive evaluation data associated with a multitude of public benefit credit assets that includes the available public benefit credit asset;

compare the digital record representing the hypothetical public benefit credit asset to the time-varying and time-sensitive evaluation data to produce a level of match for each of the multitude of public benefit credit assets; and select the available public benefit credit asset as the selected public benefit credit asset when a level of match associated with the available public benefit credit asset has reached a threshold level to trigger declaration of a favorable match.

12. The computing infrastructure system of claim 7, wherein the first processor performs further functions to:

update a generative artificial intelligence (GAI) knowledge base with a multitude of time-varying and time-sensitive evaluation data associated with a multitude of public benefit credit assets that includes the available public benefit credit asset; and access, via the first interface, the GAI knowledge base using the digital record representing the hypothetical public benefit credit asset to identify the available public benefit credit asset as the selected public benefit credit asset.

* * * * *